US011786419B1

(12) United States Patent
Dean et al.

(10) Patent No.: US 11,786,419 B1
(45) Date of Patent: Oct. 17, 2023

(54) SYSTEM AND METHOD FOR PROVIDING HAPTIC FEEDBACK TO A POWER WHEELCHAIR USER

(71) Applicant: Patroness, LLC, Brentwood, TN (US)

(72) Inventors: Jered Harvey Dean, Arvada, CO (US); Charles C G Cooper, Arvada, CO (US); Barry George Dean, Franklin, TN (US); Dan Alan Preston, Bainbridge Island, WA (US)

(73) Assignee: Patroness, LLC, Brentwood, TN (US)

( * ) Notice: Subject to any disclaimer, the term of this patent is extended or adjusted under 35 U.S.C. 154(b) by 88 days.

(21) Appl. No.: 17/480,958

(22) Filed: Sep. 21, 2021

Related U.S. Application Data

(63) Continuation of application No. 15/880,686, filed on Jan. 26, 2018, now Pat. No. 11,154,442.
(Continued)

(51) Int. Cl.
*B62M 6/50* (2010.01)
*A61G 5/04* (2013.01)
*H02P 31/00* (2006.01)

(52) U.S. Cl.
CPC ............ *A61G 5/042* (2013.01); *A61G 5/045* (2013.01); *B62M 6/50* (2013.01); *H02P 31/00* (2013.01)

(58) Field of Classification Search
CPC ......... A61G 5/042; A61G 5/045; B62M 6/50; H02P 31/00
See application file for complete search history.

(56) References Cited

U.S. PATENT DOCUMENTS 8,280,561 B2 * 10/2012 Griggs .................. G05G 9/047
701/1
10,215,568 B2   2/2019 Klosinski, Jr. et al.
(Continued)

FOREIGN PATENT DOCUMENTS

DE         3336656 A1 * 12/2016 ............... G06F 3/01

OTHER PUBLICATIONS

Chénier, Félix, Pascal Bigras, and Rachid Aissaoui. "A new wheelchair ergometer designed as an admittance-controlled haptic robot." IEEE/ASME Transactions on Mechatronics 19.1 (2013): 321-328. (Year: 2013).*
(Continued)

*Primary Examiner* — Russell Frejd
*Assistant Examiner* — Ana D Thomas
(74) *Attorney, Agent, or Firm* — Polsinelli PC; Derek D. Donahoe

(57) ABSTRACT

A system for a motorized mobile chair includes a human machine interface (HMI) to receive one or more user inputs, transmit one or more first control instructions in response to the one or more user inputs, receive one or more second control instructions, and provide haptic feedback through the human machine interface to assist user navigation of the motorized mobile chair in response to the one or more second control instructions. One or more sensors generate sensor data about an area proximate to the motorized mobile chair. At least one processor receives the one or more first control instructions, receives the sensor data from the one or more sensors about the area proximate to the motorized mobile chair, determines one or more states of the motorized mobile chair based on the sensor data, generates the one or more second control instructions based on at least the one or more states of the motorized mobile chair and the one or
(Continued)

more first control instructions, and transmits the one or more second control instructions to the human machine interface.

58 Claims, 64 Drawing Sheets

Related U.S. Application Data

(60) Provisional application No. 62/612,617, filed on Dec. 31, 2017, provisional application No. 62/543,896, filed on Aug. 10, 2017, provisional application No. 62/491,737, filed on Apr. 28, 2017.

(56) References Cited

U.S. PATENT DOCUMENTS

| | | |
|---|---|---|
| 2002/0121394 A1 | 9/2002 | Kamen et al. |
| 2008/0294300 A1 | 11/2008 | Ashmore et al. |
| 2009/0292468 A1 | 11/2009 | Wu et al. |
| 2011/0190972 A1 | 8/2011 | Timmons et al. |
| 2013/0231800 A1 | 9/2013 | Ricci |
| 2014/0146167 A1 | 5/2014 | Friend et al. |
| 2014/0165159 A1 | 6/2014 | Baade et al. |
| 2015/0183431 A1 | 7/2015 | Nanami |
| 2015/0244779 A1 | 8/2015 | Fitzgerald |
| 2015/0346724 A1 | 12/2015 | Jones et al. |
| 2015/0363986 A1 | 12/2015 | Hoyos et al. |
| 2016/0025499 A1 | 1/2016 | Moore et al. |
| 2017/0095382 A1 | 4/2017 | Wen et al. |
| 2019/0064823 A1 | 2/2019 | Jiang et al. |

OTHER PUBLICATIONS

Narayanan, Vishnu K., et al. "Vision-based adaptive assistance and haptic guidance for safe wheelchair corridor following." Computer vision and image understanding 149 (2016): 171-185. (Year: 2016).*
Boy, Eng Seng, Chee Leong Teo, and Etienne Burdet. "Collaborative wheelchair assistant." IEEE/RSJ International Conference on Intelligent Robots and Systems. vol. 2. IEEE, 2002. (Year: 2002).*
Hadj-Abdelkader, Amine, Brahim Cherki, and Guy Bourhis. "Powered wheelchair driving using a 3D haptic device." 2015 International Conference on Virtual Rehabilitation (ICVR). IEEE, 2015. (Year: 2015).*
"Electric Vehicle Conductive Charging System—Part 1: General Requirements," International Standard, IEC Std. 61851-1:2017, The International Electrotechnical Commission, Geneva, Switzerland, ISBN 978-2-8322-3766-3, Feb. 7, 2017, 292 pages.
"IEEE Guide for Wireless Access in Vehicular Environments (WAVE)—Architecture," IEEE Vehicular Technology Society, IEEE Standard 1609.0-2013, The Institute of Electrical and Electronics Engineers, Incorporation, New York, NY, USA, ISBN 978-0-7381-8756-3 STD98459, Mar. 5, 2014, 78 pages.
"IEEE Health Informatics Personal Health Device Communication—Part 20601: Application Profile—Optimized Exchange Protocol," IEEE Standards Association 11073-20601-2014, The Institute of Electrical and Electronics Engineers, Incorporation, New York, NY, USA, ISBN 978-0-7381-9314-4 STD98793, Oct. 10, 2014, 253 pages.
"IEEE Standard for Air Interface for Broadband Wireless Access Systems," IEEE Computer Society and the IEEE Microwave Theory and Techniques Society, IEEE Standard 802.16-2012, The Institute of Electrical and Electronics Engineers, Incorporated, New York, NY, USA, ISBN 978-0-7381-7291-0 STD97266, Aug. 17, 2012, 2544 pages.
"IEEE Standard for Information Technology—Portable Operating System Interface (POSIX)," Base Specifications, Issue 7, IEEE Standard 1003.1-2008, The Institute of Electrical and Electronics Engineers, Incorporated, New York, NY, USA, ISBN 978-0-7381-5798-6 STD95820, Dec. 1, 2008, 3968 pages.
"IEEE Standard for Information Technology Telecommunications and Information Exchange between Systems Local and Metropolitan Area Networks Specific Requirements—Part 11: Wireless LAN Medium Access Control (MAC) and Physical Layer (PHY) Specifications," IEEE Standard 802.11-2016, The Institute of Electrical and Electronics Engineers, Incorporation, New York, NY, USA, ISBN 978-1-5044-3645-8 STDPD22369, Dec. 14, 2016, 3534 pages.
"IEEE Standard for Local and Metropolitan Area Networks: Overview and Architecture," IEEE Computer Society, IEEE Standard 802-2014, The Institute of Electrical and Electronics Engineers, Incorporation, New York, NY, USA, ISBN 978-0-7381-9219-2 STD98723, Jun. 30, 2014, 74 pages.
"IEEE Standard for Low-Rate Wireless Networks Amendment 2: Ultra-Low Power Physical Layer," IEEE Computer Society, IEEE Standard 802.15.4q-2016, The Institute of Electrical and Electronics Engineers, Incorporation, New York, NY, USA, ISBN 978-1-5044-0782-3 STD20852, Apr. 29, 2016, 52 pages.
"IEEE Standard for Low-Rate Wireless Networks Amendment 4: Higher Rate (2 Mb/s) Physical (PHY) Layer," IEEE Computer Society, IEEE Standard 802.15.4t-2017, The Institute of Electrical and Electronics Engineers, Incorporation, New York, NY, USA, ISBN 378-0-1-5044-3933-6 STDPD22524, Apr. 14, 2017, 25 pages.
"IEEE Standard for Low-Rate Wireless Networks," IEEE Computer Society, IEEE Standard 802.15.4-2015, The Institute of Electrical and Electronics Engineers, Incorporated, New York, NY, USA, ISBN 978-1-5044-0846-2 STDPD20893, Apr. 22, 2016, 708 pages.
"IEEE Standard for Wireless Access in Vehicular Environments (WAVE)—Identifier Allocations," IEEE Vehicle Technology Society, IEEE Standards Association 1609.12-2016, The Institute of Electrical and Electronics Engineers, Incorporated, New York, NY, USA, ISBN 978-1-5044-0765-6 3TD20840, Mar. 11, 2016, 39 pages.
"IEEE Standard for Wireless Access in Vehicular Environments (WAVE)—Multi-Channel Operation," IEEE Vehicular Technology Society, IEEE Standard 1609.4-2016, The Institute of Electrical and Electronics Engineers, Incorporation, New York, NY, USA, ISBN 978-1-5044-0761-8 3TD20838, Mar. 21, 2016, 205 pages.
"IEEE Standard for Wireless Access in Vehicular Environments (WAVE)—Over-the-Air Electronic Payment Data Exchange Protocol for Intelligent Transportation Systems (ITS)," IEEE Standards Association, IEEE Standard 1609.11-2010, The Institute of Electrical and Electronics Engineers, Incorporation, New York, NY, USA, ISBN 978-0-7381-6501-1 STD97080, Jan. 9, 2011, 62 pages.
"IEEE Standard for Wireless Access in Vehicular Environments-Security Services for Applications and Management Messages," IEEE Vehicular Technology Society, IEEE Standard 1609.2-2016, The Institute of Electrical and Electronics Engineers, Incorporated, New York, NY, USA, ISBN 978-1-5044-0767-0 STD20841, Mar. 1, 2016, 884 pages.
"Information Processing systems—Local Area Networks—Part 2: Logical Link Control," ANSI/IEEE Standard 802.2, The Institute of Electrical and Electronics Engineers, Incorporated, New York, NY, USA, ISBN 1-55937-019-X, Dec. 31, 1989, 114 pages.
"Information Technology—ASN.1 Encoding Rules: Specification of Packed Encoding Rules (PER)," International Telecommunication Union, ITU-T Telecommunication Standardization Sector of ITU X.691, Geneva, Switzerland, Aug. 2015, 74 pages.
"Information Technology—Open Systems Interconnection—Basic Reference Model: The Basic Model," International Standard, ISO/IEC 7498-1:1994 (E), Geneva, Switzerland, Nov. 15, 1994, 68 pages.
"Information Technology—Security Techniques—Evaluation Criteria for IT Security—Part 1: Introduction and General Model," The International Organization for Standardization and the International Electrotechnical Commission Joint Technical Committee, ISO/IEC Standard 15408-1:2009 (E), 3rd Edition, Geneva, Switzerland, Dec. 15, 2009, 74 pages.
"Information Technology—Security Techniques—Evaluation Criteria for IT Security—Part 2: Security Functional Components," The International Organization for Standardization and the International Electrotechnical Commission Joint Technical Committee, ISO/IEC Standard 15408-2:2008 (E), 3rd Edition, Geneva, Switzerland, Aug. 15, 2008, 240 pages.
"Information Technology—Telecommunications and Information Exchange between Systems—Near Field Communication—

(56) References Cited

OTHER PUBLICATIONS

Interface and Protocol (NFCIP-1)," The International Organization for Standardization and the International Electrotechnical Commission, ISO/IEC Standard 18092:2013 Technical Corrigendum 1, Joint Technical Committee, Geneva, Switzerland, Jul. 15, 2015, 2 pages.

"Information Technology—Telecommunications and Information Exchange between Systems—Near Field Communication—Interface and Protocol (NFCIP-1)," The International Organization for Standardization and The International Electrotechnical Commission Joint Technical Committee, ISO/IEC Standard 18092:2013, Geneva, Switzerland, Mar. 15, 2013, 52 pages.

"Information Technology Security Techniques—Evaluation Criteria for IT Security—Part 3: Security Assurance Components," The International Organization for Standardization and the International Electrotechnical Commission Joint Technical Committee, ISO/IEC Standard 15408-3:2008(E), 3rd Edition, Geneva, Switzerland, Aug. 15, 2008, 188 pages.

"Intelligent Transport Systems (ITS); Access Layer Specification for Intelligent Transport Systems Operating in the 5 GHZ Frequency Band," ETSI European Standard EN 302 663 (V1.2.1), European Telecommunications Standards Institute, Sophia Antipolis, France, Reference REN/ITS-0040028, Jul. 2013, 24 pages.

"Intelligent Transport Systems (ITS); Decentralized Congestion Control Mechanisms for Intelligent Transport Systems Operating in the 5 GHz Range; Access Layer Part," ETSI Technical Specification TS 102 687 (V1.1.1), European Telecommunications Standards Institute, Sophia Antipolis, France, Reference DTS/ITS-0040014, Jul. 2011, 45 pages.

"Intelligent Transport Systems (ITS); Mitigation Techniques to Avoid Interference between European CEN Dedicated Short Range Communication (CEN DSRC) Equipment and Intelligent Transport Systems (ITS) Operating in the 5 GHz Frequency Range," ETSI Technical Specification TS 102 792 (V1.2.1), European Telecommunications Standards Institute, Sophia Antipolis, France, Reference RTS/ITS-00438, Jun. 2015, 23 pages.

"Intelligent Transport Systems (ITS); Radio Communications Equipment Operating in the 5 855 MHz to 5 925 MHz Frequency Band; Harmonized EN Covering the Essential Requirements of Article 3.2 of the R&TTE Directive," ETSI Harmonized European Standard EN 302 571 (V1.2.1), European Telecommunications Standards Institute, Sophia Antipolis, France, Reference REN/ERM-TG37-009, Sep. 2013, 47 pages.

"Part 15.1: Wireless Medium Access Control (MAC) and Physical Layer (PHY) Specifications for Wireless Personal Area Networks (WPANs)," IEEE Computer Society, IEEE Standard 802.15.1-2005, The Institute of Electrical and Electronics Engineers, Incorporated, New York, NY, USA, ISBN 0-7381-4707-9 SH95323, Jun. 14, 2005, 600 pages.

"SAE Electric Vehicle and Plug in Hybrid Electric Vehicle Conductive Charge Coupler," Surface Vehicle Standard—J1772, SAE International, Warrendale, Pennsylvania, USA, Oct. 13, 2017, 116 pages.

\* cited by examiner

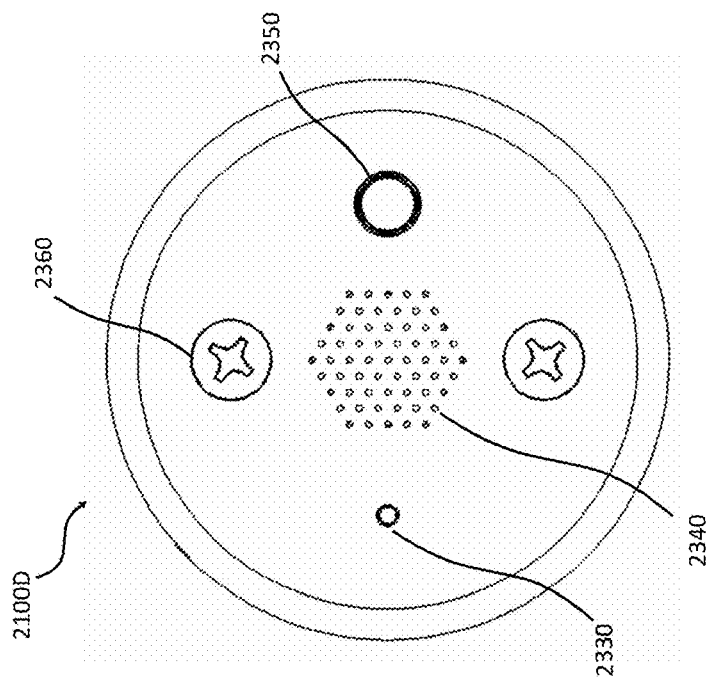
FIG. 23C TOP VIEW
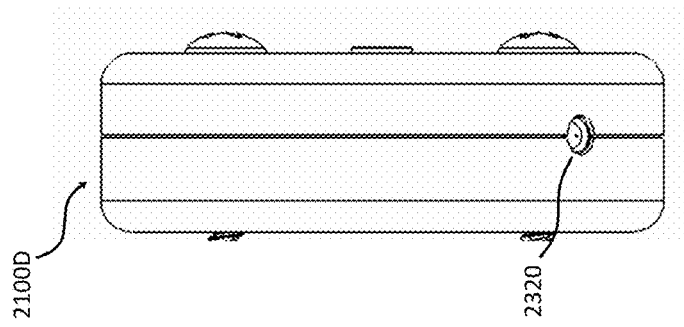
FIG. 23B SIDE VIEW
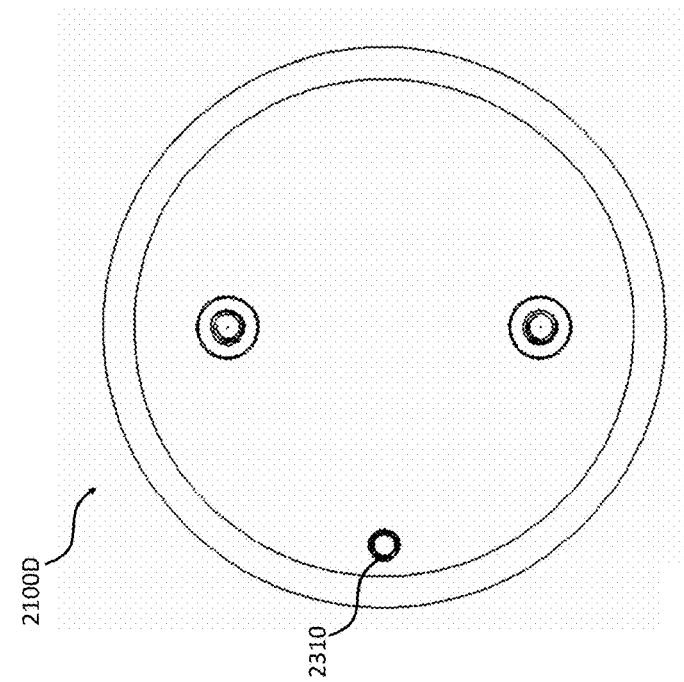
FIG. 23A BOTTOM VIEW

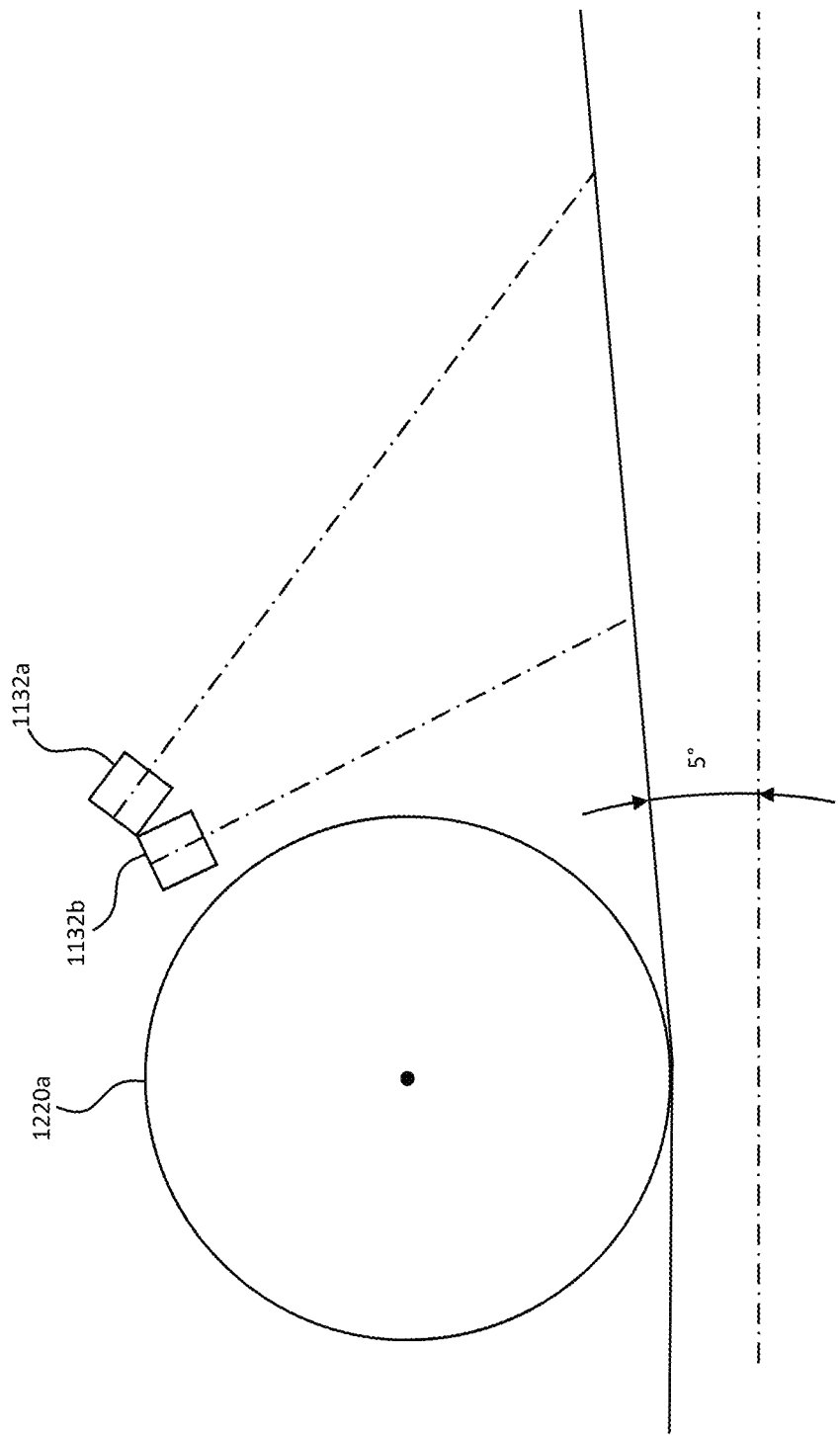

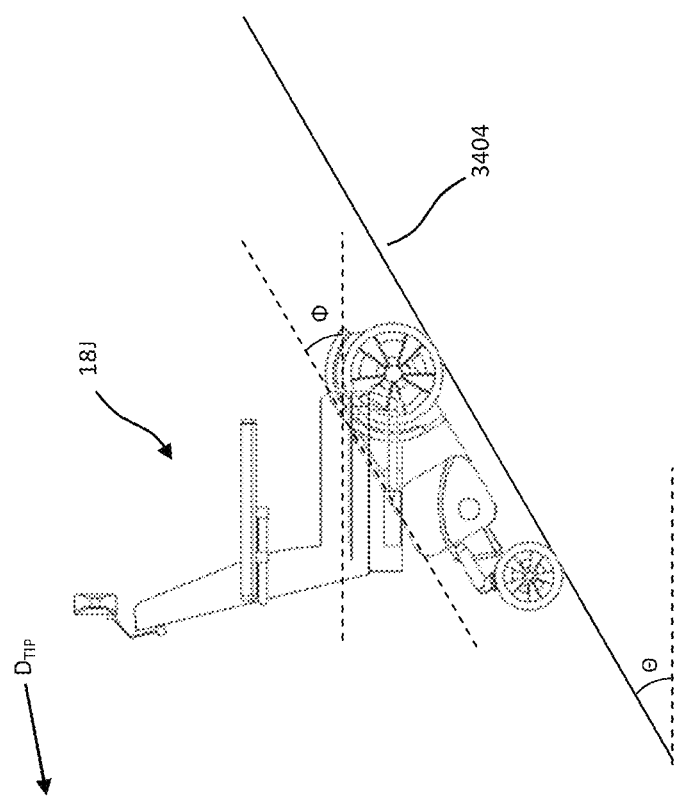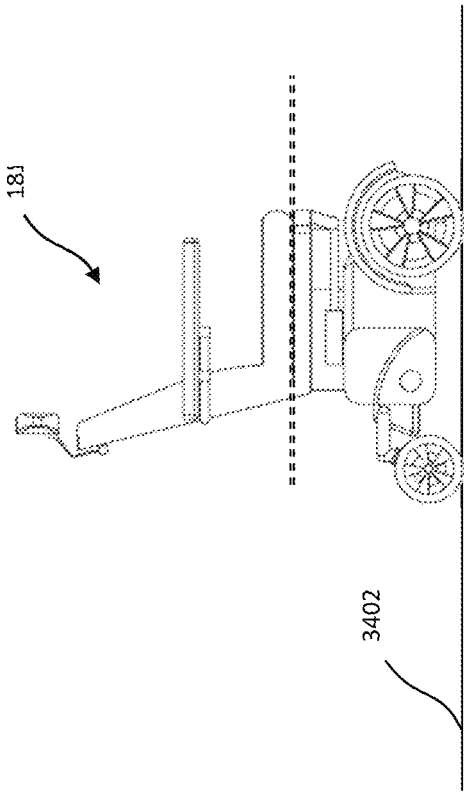
FIG. 34B
FIG. 34A

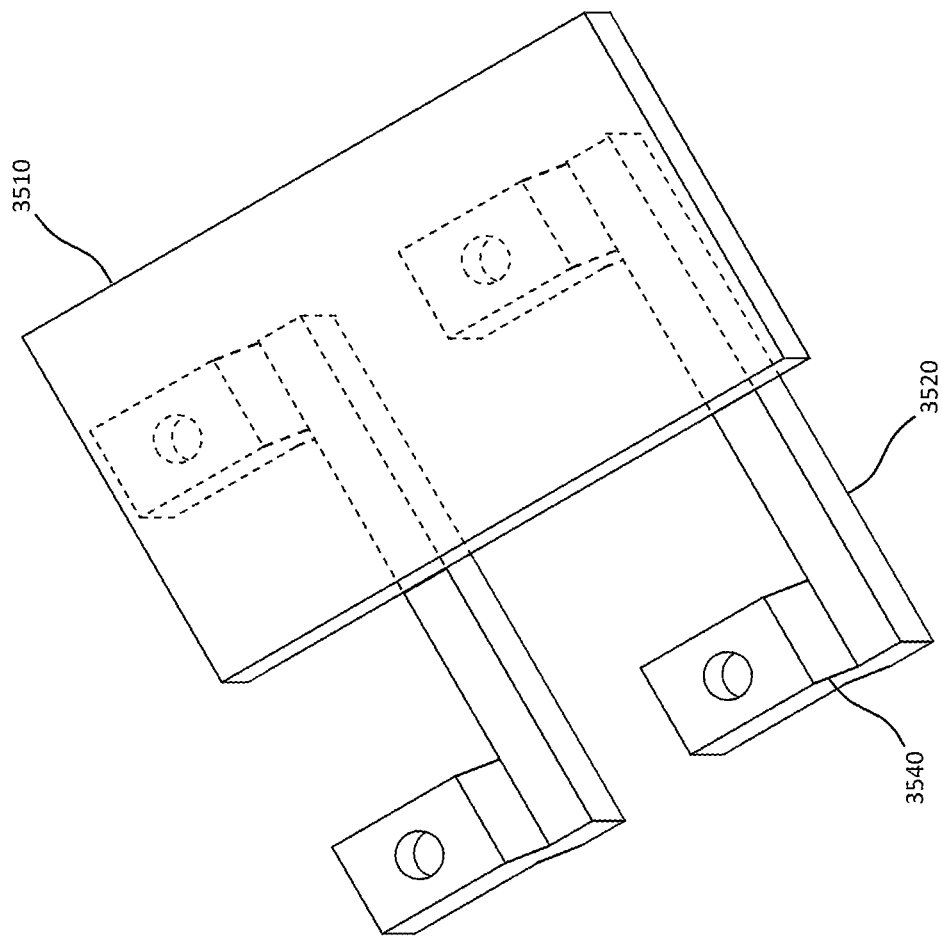
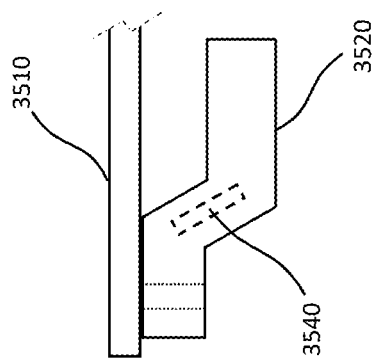
FIG. 35B
FIG. 35A

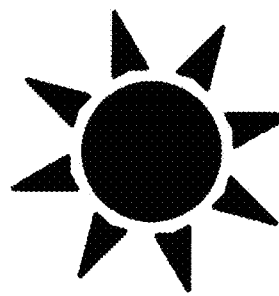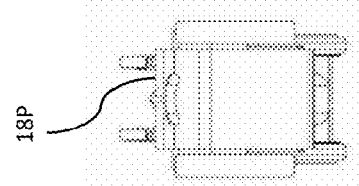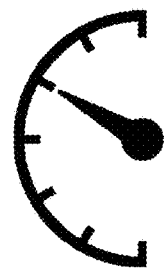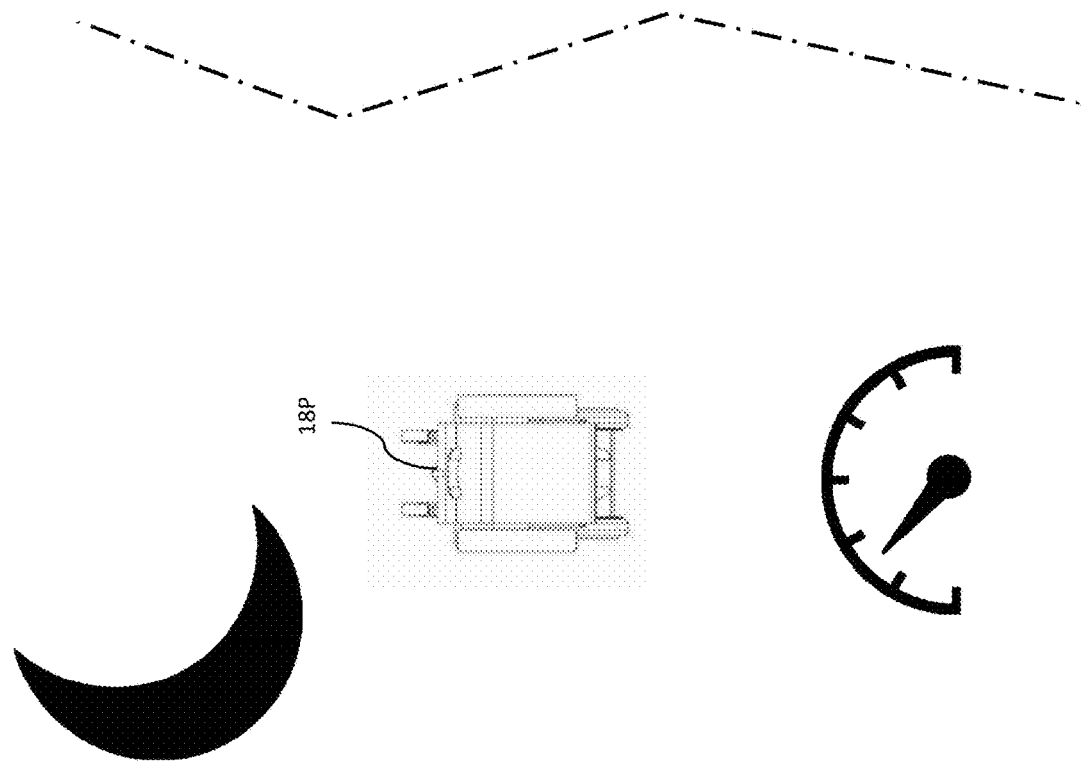
FIG. 48B
FIG. 48A

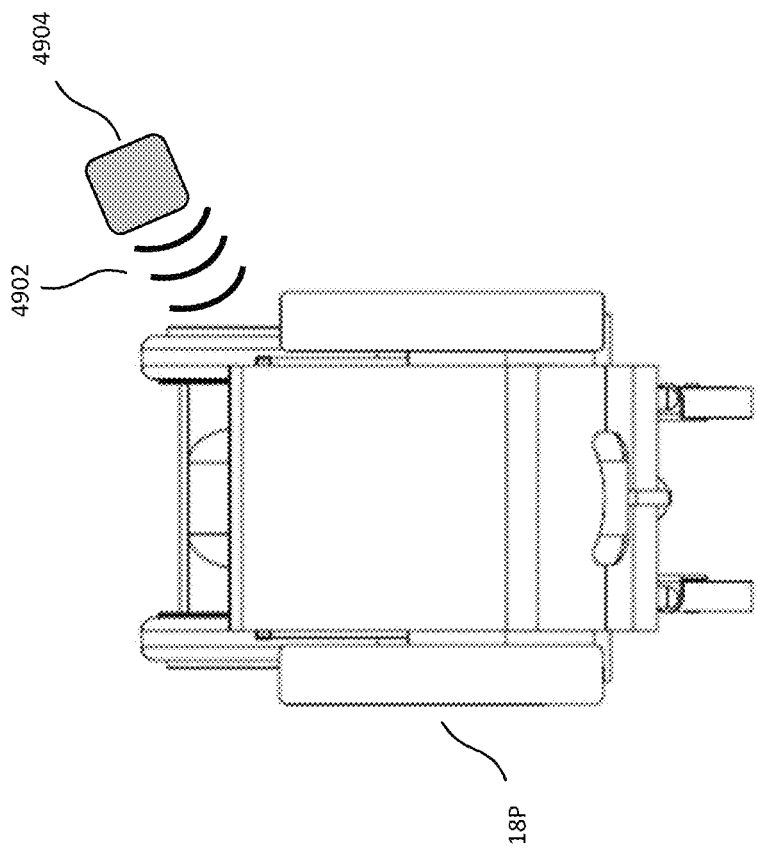
FIG. 49

SYSTEM AND METHOD FOR PROVIDING HAPTIC FEEDBACK TO A POWER WHEELCHAIR USER

RELATED APPLICATIONS

The present application is a continuation of U.S. patent application Ser. No. 15/880,686, entitled Federated Sensor Array For Use with a Motorized Mobile System and Method of Use, filed Jan. 26, 2018, which claims priority to U.S. Provisional Patent App. No. 62/612,617, entitled Systems and Methods for Enhanced Autonomous Operations of a Motorized Mobile System, filed Dec. 31, 2017, U.S. Provisional Patent App. No. 62/543,896, entitled Systems and Methods for Motorized Mobile Systems, filed Aug. 10, 2017, and U.S. Provisional Patent App. No. 62/491,737, entitled Sensor Array for Use with a Mobile Chair and Method of Use, filed Apr. 28, 2017, which are incorporated herein by reference in their entirety. The present application is related to U.S. patent application Ser. No. 15/880,663, entitled Secure Systems Architecture for Integrated Motorized Mobile Systems, filed Jan. 26, 2018 (now U.S. Pat. No. 11,075,910), and U.S. patent application Ser. No. 15/880,699, entitled System and Method for Sensor Integration in Support of Situational Awareness for a Motorized Mobile, filed Jan. 26, 2018 (now U.S. Pat. No. 10,656,652), all of which are incorporated herein by reference in their entirety.

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software, screenshots and data as described below and in the drawings hereto and All Rights Reserved.

FIELD

This disclosure relates generally to control systems and sensor systems for motorized mobile systems.

BACKGROUND

Drive-by-wire (DbW), steer-by-wire, or x-by-wire technology is the use of electrical or electro-mechanical systems for performing vehicle functions traditionally achieved by mechanical linkages. This technology replaces the traditional mechanical control systems with electronic control systems using electromechanical actuators and human-machine interfaces. The technology is similar to the fly-by-wire systems used in the aviation industry. Use of these "by-wire" systems began with manned aircraft, migrated to drones, as well as marine and rail operations, and are now being used in autonomous or self-driving vehicle applications. These once expensive technologies are emerging in the market as commodity products, including products with sensors, processors, integrated mobile devices, and various communication mediums, including bandwidth increases for soon to be $5^{th}$ generation (5G) wireless devices on 5G networks.

This application and co-pending applications will create and achieve safe, secure independence and a richer experience for all motorized mobile system (MMS) users. As an example of the need for improved MMSs, consider that today, with the advances in robotics and systems of systems integration, as well as medical advances that allow device integration with the human nervous system, there is a widening split between MMS users with varying physiological functionality. Some mobile chair users may have significant remaining upper body mobility and cognitive function. An example of this would be a person who does not have the use of their legs and who uses a manual mobile chair for mobility but is otherwise able to navigate day-to-day life with minimal to no assistance. Such an individual may be able to adapt to an artificial limb, such as a leg, or an exoskeleton and reasonably be able to go about their day to day life with few restrictions. However, another example would be a user with certain health issues that greatly impacts the user's mobility and/or cognition. It is unlikely that these users will benefit from the same artificial leg or exoskeleton technologies due to their physiological condition. These users may use a motorized mobile system, such as a mobile chair.

Many mobile chair users report they are frequently frustrated by the general public's poor understanding of their abilities and needs. In general, the mobile chair is an extension of a user's body. People who use them have different disabilities and varying abilities. Some can use their arms and hands, while others can get out of their mobile chairs and walk for short distances. "Disability" is a general, medical term used for a functional limitation that interferes with a person's ability to walk, hear, learn, or utilize other physiological and/or cognitive functions of the body.

Conditions like cerebral palsy can be a sub-set of either physiological or cognitive disabilities since there are a number of sub-types classified based on specific ailments they present, resulting in varying degrees of ability. For example, those with stiff muscles have what is medically defined as spastic cerebral palsy, those with poor coordination have ataxic cerebral palsy, and those with writhing movements have athetoid cerebral palsy, each type requiring individual mobility plans.

Following are a few definitions used in this disclosure.

People with disabilities: This term represents a universe of potential conditions, including physical, cognitive, and/or sensory conditions.

Mobility disability: This term represents a condition for a person who uses a mobile chair or other MMS to assist in mobility.

User: This term refers to an individual who uses an MMS. A "user" of a mobile chair is referred to herein as a "mobile chair user".

Operator: This term refers to an individual who operates an MMS, including manual, local, and remote operation.

Caregiver: This term represents any individual that assists an MMS user. Family, friends, aides, and nurses may all be included in this category. The term "Attendant" is used synonymously with the term caregiver.

Technician: This term includes one or more of those individuals who setup, service, modify, or otherwise work technically on an MMS. These individuals may be formally licensed or may include operators and caregivers who are comfortable working with the system.

A mobile chair is essentially a chair with wheels used when walking is difficult or impossible due to illness, injury, or disability. Mobile chairs come in a wide variety to meet the specific needs of their users, including:

Manual self-propelled mobile chairs.
Manual attendant-propelled mobile chairs.
Powered mobile chairs (power-chairs).
Mobility scooters.

Single-arm drive mobile chairs.
Reclining mobile chairs.
Standing mobile chairs.
Combinations of the above.

Mobile Chairs include specialized seating adaptions and/ or individualized controls and may be specific to particular activities. The most widely recognized distinction in mobile chairs is powered and unpowered. Unpowered mobile chairs are propelled manually by the user or attendant while powered mobile chairs are propelled using electric motors.

Motorized mobile chairs are useful for those unable to propel a manual mobile chair or who may need to use a mobile chair for distances or over terrain which would be fatiguing or impossible in a manual mobile chair. They may also be used not just by people with 'traditional' mobility impairments, but also by people with cardiovascular and fatigue-based conditions. A Motorized Mobile System (MMS) is a non-automobile motorized device which provides powered mobility to one or more users, including such systems as powered mobile chairs, mobility scooters, electronic conveyance vehicles, riding lawn mowers, grocery carts, all-terrain vehicles (ATVs), golf carts, and other recreational and/or medical mobility systems, but excludes automobiles (passenger cars, trucks, passenger buses, and other passenger or property transporting motorized vehicles intended for licensed operation on state and national highways). For the sake of clarity, a mobile chair MMS is described herein as an exemplary embodiment; however, it should be clear that the same or similar systems and methods may be applied to other MMS embodiments.

A mobile chair MMS is generally four-wheeled or six-wheeled and non-folding. Four general styles of mobile chair MMS drive systems exist: front, center, rear, and all-wheel drive. Powered wheels are typically somewhat larger than the trailing/castering wheels, while castering wheels on a motorized chair are typically larger than the casters on a manual chair. Center wheel drive mobile chair MMSs have casters at both front and rear for a six-wheel layout and are often favored for their tight turning radii. Front wheel drive mobile chair MMSs are often used because of their superior curb-climbing capabilities. Powerchair chassis may also mount a specific curb-climber, a powered device to lift the front wheels over a curb of 10 cm or less.

Mobile chair MMSs are most commonly controlled by arm-rest mounted joysticks which may have additional controls to allow the user to tailor sensitivity or access multiple control modes, including modes for the seating system. For users who are unable to use a hand controller, various alternatives are available, such as sip-and-puff controllers, worked by blowing into a sensor. In some cases, a controller may be mounted for use by an aide walking behind the chair rather than by the user. Capabilities include turning one drive-wheel forward while the other goes backward, thus turning the mobile chair within its own length.

The seating system on a mobile chair MMS can vary in design, including a basic sling seat and backrest, optional padding, comfortable cushions, backrest options, and headrests. Many companies produce aftermarket seat, back, leg, and head rest options which can be fitted onto mobile chair MMSs. Some seat, back, leg, and head rests are produced to aid with increased need for stability in the trunk or for those at increased risk of pressure sores from sitting. Leg rests may be integrated into the seating design and may include manual and/or powered adjustment for those users who want or need to vary their leg position. Mobile chair MMSs may also have a tilt-in-space, or reclining facility, which is particularly useful for users who are unable to maintain an upright seating position indefinitely. This function can also help with comfort by shifting pressure to different areas over time, or with positioning in a mobile chair when a user needs to get out of the chair or be hoisted.

Most mobile chairs are crash tested to ISO standards 7176 and 10542. These standards mean that a mobile chair can be used facing forward in a vehicle if the vehicle has been fitted with an approved tie down or docking system for securing the mobile chair and a method of securing the occupant to the mobile chair.

Rehabilitation engineering is the systematic application of engineering sciences to design, develop, adapt, test, evaluate, apply, and distribute technological solutions to problems confronted by individuals with disabilities. Current practitioners of rehabilitation engineering are often forced to work with limited information and make long term decisions about the technologies to be used by an individual on the basis of a single evaluation; a snapshot in time. Under current best-case conditions, rehabilitation engineering practitioners work closely in a long-term relationship with their clients to follow-up and readjust assistive technology systems on a regular basis. However, even in these situations, they are often working with limited information and only at periodic intervals.

What is needed is an evolution of existing motorized mobile systems (MMSs) to consider the users' abilities, needs, and health, with the goal of a safe, secure, and social independence. To accomplish this, systems and methods are disclosed herein comprising: integrated software and hardware systems, sensors for situational awareness, sensors for user monitoring, communications between users and caregivers, users and other users, and users and the "cloud", and human machine interfaces (HMIs) designed for users with a variety of physiological and cognitive conditions. The systems and methods disclosed herein are based on new underlying technologies, architectures, and network topologies that support the evolution of the MMS.

SUMMARY

Four co-pending-applications disclose various aspects of improved MMSs. All four are disclosed as related above and each incorporates by reference herein in the entirety of the other applications in full.

The application entitled "Secure Systems Architecture for Motorized Mobile Systems," relates to systems and methods for implementing a control system onboard an MMS capable of securely communicating with and utilizing external systems. This may include integrating external devices and user health monitoring sensors with an off the shelf (OTS) or custom MMS. Integration of a smart device, such as a smart phone or tablet, with an OTS or custom MMS is another example. Today, most smart devices contain a host of applications and sensors, including one or more of image capturing devices, rate and acceleration sensors, gyroscopes, global positioning system (GPS) receivers, biometric sensors, iris scanners, fingerprint scanners, and facial recognition software. Other sensors are possible. A secure architecture for an MMS controller is disclosed in support of device integration and data security with a focus on extensibility.

The application entitled "Federated Sensor Array for Use with a Motorized Mobile System and Method of Use" discloses the integration of non-contact sensors and control logic into an MMS controller. The federated sensors have overlapping sensing fields, generally operate independently, and report certain data relevant to navigation and stability which is then used by the MMS controller. Motor, seat, and auxiliary controllers may be hosted in the MMS controller along with the federated sensor logic. The integration of these systems and applications into an MMS lays the foundation for situational awareness (SA).

Situational awareness is the ability to be cognizant of oneself in a given space. It is an organized knowledge of objects and state kinematics in relation to oneself in a given space or scenario. Situational awareness also involves understanding the relationship of these objects when there is a change of position or kinematic state. The goal is to integrate this data into the MMS and use it to support a richer, safer, and more independent experience for the user.

The application entitled "System and Methods for Sensor Integration in Support of Situational Awareness for a Motorized Mobile System" further discloses the integration of new sensor technologies in support of a deeper and richer situational awareness for the user. These new systems use the data generated about the user, the environment, targets in the environment, and the user's relationship to them. This information may be generated from one or more sources and include data from non-contact sensors, like radar, optical, laser, and ultrasonic sensors. These non-contact sensors can generate data about the environment, including range measurements, bearing measurements, target classification, and target kinematics. The new sensors provide a much richer set of data about the environment.

The federated system uses a single type of sensor that generates a single report (i.e. a communication with or identifying data sensed by the sensor) with what is called a single mode variance, where each sensor has distinct capabilities and one or more fixed errors inherent to the sensor. Ultra-sonic sensors have better range determination than cross range position determination, for instance. In an example, using data from a different type of sensor, a good cross range report can be generated, but with poor down range determination. In this evolving system, the best of two (or more) separate reports may be combined. This is referred to as a dual mode variance.

The application entitled "System and Methods for Enhanced Autonomous Operations of a Motorized Mobile System" discloses the implementation of advanced filtering techniques and sensor fusion in support of situational awareness and autonomy. Adding more sensors to a federation of sensors increases expense, weight, and power consumption. Integration and use of sensor fusion (e.g. using different types of sensors in one system) and advanced filtering techniques improves the information the MMS controller uses to track the user and environment, while reducing complexity and cost when compared to a federated approach. Decision logic consisting of data association techniques, track and target management, handling out of sequence measurements, and sensor frame management are all building blocks for this leap in system capability.

In this enhanced system, raw data is received and "filtered", or as is known in the art fused, with other data related to the MMS user and their activities while navigating in the environment. The other data may include certain biometric data, user inputs, and user activities. Filtering and state estimation are some of the most pervasive tools of engineering. In some embodiments, a model may be used to form a prediction of a state into the future, followed by an observation of the state or actual measurement of the expectation. A comparison of the predicted state and the measured state is then made. If the observations made are within the predicted measurements, the model may be adjusted by reducing the covariance of the next measurement, thereby increasing system confidence. If the observations are outside of the predicted measurements, the model may be adjusted to increase the covariance of the next measurement, thereby decreasing system confidence.

In this enhanced system, the MMS is fully aware of its environment and can travel safely wherever the user wishes to go, within reason. Moreover, the MMS may learn to anticipate the needs of the user. The result is a user experience that is safe, secure, and independent, based on the user's base abilities and current condition.

In one aspect, a system for a motorized mobile chair includes a human machine interface (HMI) to receive one or more user inputs, transmit one or more first control instructions in response to the one or more user inputs, receive one or more second control instructions, and provide haptic feedback through the human machine interface to assist user navigation of the motorized mobile chair in response to the one or more second control instructions. One or more sensors generate sensor data about an area proximate to the motorized mobile chair. At least one processor receives the one or more first control instructions, receives the sensor data from the one or more sensors about the area proximate to the motorized mobile chair, determines one or more states of the motorized mobile chair based on the sensor data, generates the one or more second control instructions based on at least the one or more states of the motorized mobile chair and the one or more first control instructions, and transmits the one or more second control instructions to the human machine interface.

In another aspect, a system for a motorized mobile chair includes a human machine interface (HMI) to receive one or more user inputs, transmit one or more first control instructions in response to the one or more user inputs, receive one or more second control instructions, and provide haptic feedback by the human machine interface to assist user navigation of the motorized mobile chair in response to the one or more second control instructions. One or more sensors generate sensor data about one or more objects proximate to the motorized mobile chair. At least one processor receives the one or more first control instructions, receives the sensor data from the one or more sensors about the one or more obstacles proximate to the motorized mobile chair, determines one or more states of the motorized mobile chair based on the sensor data, generates the one or more second control instructions based on the one or more states of the motorized mobile chair and the one or more first control instructions, and transmits the one or more second control instructions to the human machine interface.

In another aspect, a method for a motorized mobile chair includes generating sensor data from one or more sensors about an area proximate to the motorized mobile chair, receiving one or more user inputs at a human machine interface (HMI) and transmitting one or more first control instructions from the human machine interface in response to the one or more user inputs, and receiving the one or more first control instructions at at least one processor. The method further includes receiving the sensor data from the one or more sensors about the area proximate to the motorized mobile chair at the at least one processor, determining, by the at least one processor, one or more states of the motorized mobile chair based on the sensor data, and generating, by the at least one processor, one or more second control instructions based on at least the one or more states of the motorized mobile chair and the one or more first control instructions. The method further includes transmitting the one or more second control instructions to the human machine interface, receiving the one or more second control instructions at the human machine interface, and providing haptic feedback through the human machine interface to assist user navigation of the motorized mobile chair in response to the one or more second control instructions.

In another aspect, a method for a motorized mobile chair includes generating sensor data from one or more sensors about one or obstacles proximate to the motorized mobile chair, receiving one or more user inputs at a human machine interface (HMI) and transmitting one or more first control instructions from the human machine interface in response to the one or more user inputs, and receiving the one or more first control instructions at at least one processor. The method further includes receiving the sensor data from the one or more sensors about the one or more obstacles proximate to the motorized mobile chair at the at least one processor, determining, by the at least one processor, one or more states of the motorized mobile chair based on the sensor data, and generating, by the at least one processor, one or more second control instructions based on at least the one or more states of the motorized mobile chair and the one or more first control instructions. The method further includes transmitting the one or more second control instructions to the human machine interface, receiving the one or more second control instructions at the human machine interface, and providing haptic feedback through the human machine interface to assist user navigation of the motorized mobile chair in response to the one or more second control instructions.

Other systems may be integrated to improve user experience. As a non-limiting example, augmented reality (AR) may be included. Augmented reality is a live direct or indirect view of a physical, real-world environment where the elements are augmented (or supplemented) by computer-generated sensory input. The input can be sound, smell, or graphics. It is related to a more general concept called computer-mediated reality, in which a view of reality is modified, possibly even diminished rather than augmented, by a computer. As a result, the technology functions by enhancing one's current perception of reality. Virtual Reality (VR) is another technology that may be integrated to improve user experience. By contrast, VR replaces the real world with a simulated one. Augmentation is conventionally in real time and in semantic context with environmental elements, such as sports scores on TV during a match. However, VR refers to computer technologies that use VR headsets, sometimes in combination with physical spaces or multi-projected environments, to generate realistic images, sounds, and other sensations that simulate a user's physical presence in a virtual or imaginary environment.

Applicant(s) herein expressly incorporate(s) by reference all of the following materials identified in each paragraph below. The incorporated materials are not necessarily "prior art".

ISO/IEC 15408-1:2009, 3rd Edition: "Information technology—Security techniques—Evaluation criteria for IT security—Part 1: Introduction and general model".

ISO/IEC 15408-2:2008, 3rd Edition: "Information technology—Security techniques—Evaluation criteria for IT security—Part 2: Security functional components".

ISO/IEC 15408-3:2008, 3rd Edition: "Information technology—Security techniques—Evaluation criteria for IT security—Part 3: Security assurance components".

802.11-2016: "IEEE Standard for Information technology—Telecommunications and information exchange between systems Local and metropolitan area networks—Specific requirements—Part 11: Wireless LAN Medium Access Control (MAC) and Physical Layer (PHY) Specifications".

1609.0-2013: "IEEE Guide for Wireless Access in Vehicular Environments (WAVE)—Architecture".

1609.2-2016: "IEEE Standard for Wireless Access in Vehicular Environments—Security Services for Applications and Management Messages".

1609.4-2016: "IEEE Standard for Wireless Access in Vehicular Environments (WAVE)—Multi-Channel Operation".

1609.11-2010: "IEEE Standard for Wireless Access in Vehicular Environments (WAVE) —Over-the-Air Electronic Payment Data Exchange Protocol for Intelligent Transportation Systems (ITS)".

1609.12-2016: "IEEE Standard for Wireless Access in Vehicular Environments (WAVE)—Identifier Allocations".

ETSI EN 302 663 (V1.2.1): "Intelligent Transport Systems (ITS); Access layer specification for Intelligent Transport Systems operating in the 5 GHz frequency band."

ETSI EN 302 571 (V1.2.1): "Intelligent Transport Systems (ITS); Radio communications equipment operating in the 5855 MHz to 5925 MHz frequency band; Harmonized EN covering the essential requirements of article 3.2 of the R&TTE Directive".

ETSI TS 102 792 (V1.2.1): "Intelligent Transport Systems (ITS); Mitigation techniques to avoid interference between European CEN Dedicated Short Range Communication (CEN DSRC) equipment and Intelligent Transport Systems (ITS) operating in the 5 GHz frequency range".

IEEE 802-2014: "IEEE Standard for Local and Metropolitan Area Networks: Overview and Architecture".

ANSI/IEEE Std 802.2 (1998): "IEEE Standard for Information technology—Telecommunications and information exchange between systems—Local and metropolitan area networks—Specific requirements—Part 2: Logical Link Control".

ISO/IEC 7498-1:1994: "Information technology—Open Systems Interconnection—Basic Reference Model: The Basic Model".

ITU-T Recommendation X.691 (2015): "Information technology—ASN.1 encoding rules: Specification of Packed Encoding Rules (PER)".

ETSI TS 102 687 (V1.1.1): "Intelligent Transport Systems (ITS); Decentralized Congestion Control Mechanisms for Intelligent Transport Systems operating in the 5 GHz range; Access layer part".

IEEE 1003.1-2008: "IEEE Standard for Information Technology—Portable Operating System Interface (POSIX®)".

IEEE 802.15.1-2005: "Wireless medium access control (MAC) and physical layer (PHY) specifications for wireless personal area networks (WPANs)".

IEEE 802.15.4-2015: "IEEE Standard for Low-Rate Wireless Networks".

ISO/IEC 18092:2013: "Information technology—Telecommunications and information exchange between systems—Near Field Communication—Interface and Protocol (NFCIP-1)".

IEEE 802.16-2012: "IEEE Standard for Air Interface for Broadband Wireless Access Systems".

ISO/IEEE 11073-20601-2014: "IEEE Health informatics—Personal health device communication—Part 20601: Application profile—Optimized Exchange Protocol".

Bluetooth SIG: "Bluetooth Core Specification", v5.0.

If it is believed that any of the above-incorporated material constitutes "essential material" within the meaning of 37

CFR 1.57(d)(1)-(3), applicant(s) reserve the right to amend the specification to expressly recite the essential material that is incorporated by reference as allowed by the applicable rules.

Aspects and applications presented here are described below in the drawings and detailed description. Unless specifically noted, it is intended that the words and phrases in the specification and the claims be given their plain and ordinary meaning to those of ordinary skill in the applicable arts. The inventors are aware that they can be their own lexicographers if desired. The inventors expressly elect, as their own lexicographers, to use only the plain and ordinary meaning of terms in the specification and claims unless they clearly state otherwise and expressly set forth the "special" definition of that term. Absent such clear statements of intent to apply a "special" definition, it is the inventors' intent and desire that the plain and ordinary meaning to the terms be applied to the interpretation of the specification and claims.

Further, the inventors are informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f) to define the systems, methods, processes, and/or apparatuses disclosed herein. To the contrary, if the provisions of 35 U.S.C. § 112(f) are sought to be invoked to define the embodiments, the claims will specifically and expressly state the exact phrases "means for" or "step for" and will also recite the word "function" (i.e., will state "means for performing the function of . . . "), without also reciting in such phrases any structure, material, or act in support of the function. Thus, even when the claims recite a "means for performing the function of . . . " or "step for performing the function of . . . ", if the claims also recite any structure, material, or acts in support of that means or step then it is the clear intention of the inventors not to invoke the provisions of 35 U.S.C. § 112(f). Moreover, even if the provisions of 35 U.S.C. § 112(f) are invoked to define the claimed embodiments, it is intended that the embodiments not be limited only to the specific structures, materials, or acts that are described in the preferred embodiments, but in addition, include any and all structures, materials, or acts that perform the claimed function as described in alternative embodiments or forms, or that are well known present or later-developed equivalent structures, materials, or acts for performing the claimed function.

BRIEF DESCRIPTION OF THE DRAWINGS

A more complete understanding of the systems, methods, processes, and/or apparatuses disclosed herein may be derived by referring to the detailed and the following illustrative figures. In the figures, like-reference numbers refer to like-elements or acts throughout the figures.

FIG. 23A is a bottom view of an embodiment of a standalone tip alert system.

FIG. 23B is a side view of an embodiment of a standalone tip alert system.

FIG. 23C is a top view of an embodiment of a standalone tip alert system.

FIG. 29B illustrates an embodiment of a sensor system of an S-MMS that is preparing to travel up a slope.

FIG. 34A depicts an embodiment of an S-MMS on a flat, even plane.

FIG. 34B depicts an embodiment of an S-MMS adjusting to a slope to improve instantaneous tipping tolerance.

FIG. 35A depicts a side view of an embodiment of a weight distribution tracking seat base or back plate.

FIG. 35B depicts an angled view of an embodiment of a weight distribution tracking seat base or back plate.

FIG. 48A depicts an S-MMS traveling in dim light.

FIG. 48B depicts an S-MMS traveling in bright light.

FIG. 49 depicts an S-MMS approaching a wireless beacon.

Figure 1:
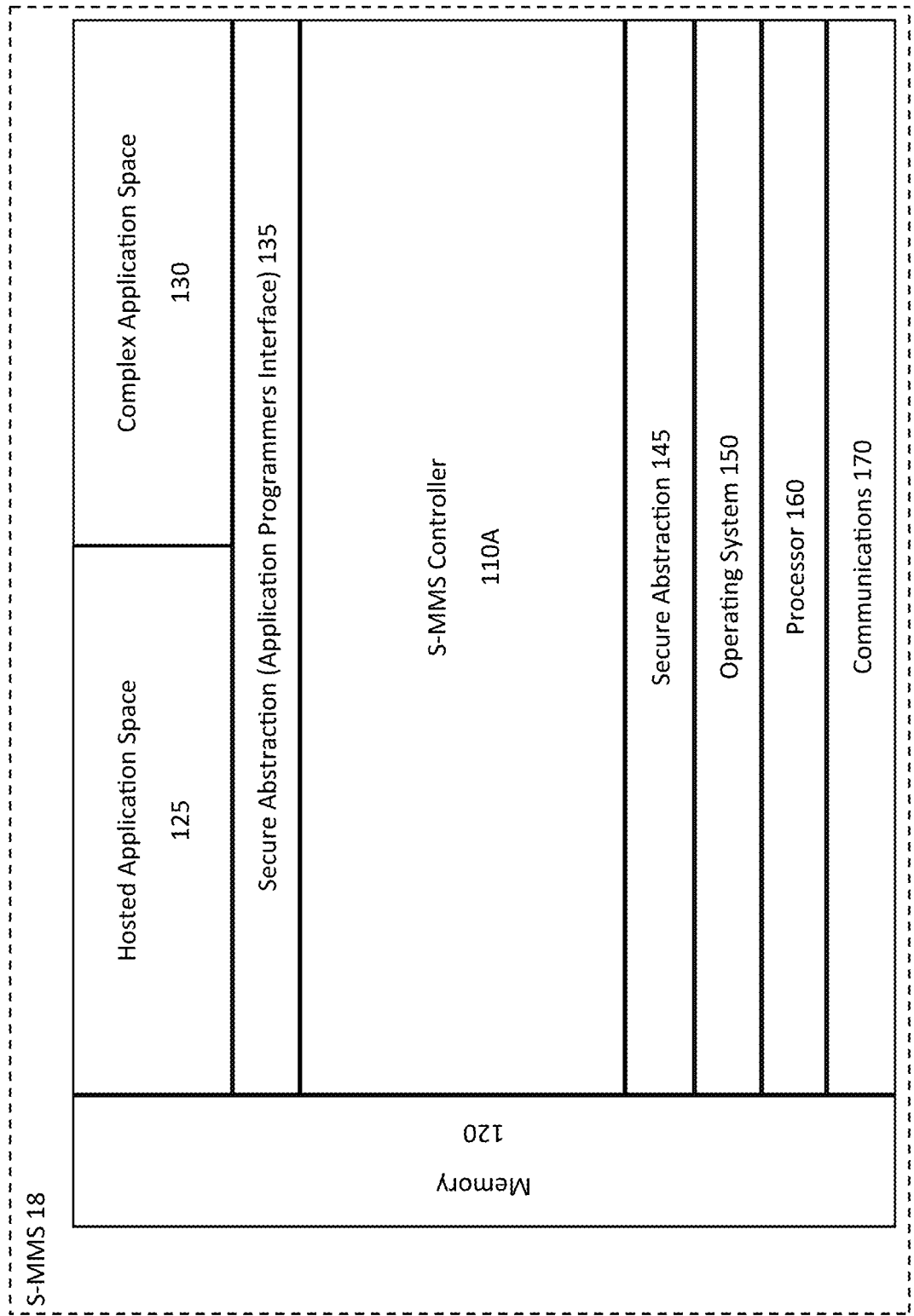
FIG. 1 depicts a control system architecture with hardware and software components for an S-MMS.

Elements and acts in the figures are illustrated for simplicity and have not necessarily been rendered according to any particular sequence or embodiment.

DETAILED DESCRIPTION

In the following description, and for the purposes of explanation, numerous specific details, process durations, and/or specific formula values are set forth in order to provide a thorough understanding of the various aspects of exemplary embodiments. However, it will be understood by those skilled in the relevant arts that the apparatus, systems, and methods herein may be practiced without all of these specific details, process durations, and/or specific formula values. Other embodiments may be utilized and structural and functional changes may be made without departing from the scope of the apparatus, systems, and methods herein. It should be noted that there are different and alternative configurations, devices, and technologies to which the disclosed embodiments may be applied. The full scope of the embodiments is not limited to the examples that are described below.

In the following examples of the illustrated embodiments, references are made to the accompanying drawings which form a part hereof, and in which is shown by way of illustration various embodiments in which the systems, methods, processes, and/or apparatuses disclosed herein may be practiced. It is to be understood that other embodiments may be utilized and structural and functional changes may be made without departing from the scope.

Systems and methods are disclosed for implementation of safety systems on a smart motorized mobile system (S-MMS). Referring generally to FIGS. 1-49, systems, methods, and apparatuses for providing safety and independence for S-MMS users are illustrated. The systems and methods disclosed support non-automobile motorized mobile systems, such as powered mobile chairs, mobility scooters, electronic conveyance vehicles, riding lawn mowers, grocery carts, ATVs, golf carts, off-road vehicles, and other recreational and/or medical mobility systems, but excludes automobiles. For the purposes of this disclosure, automobiles are defined as passenger cars, trucks, passenger buses, and other passenger or property transporting motorized vehicles intended for licensed operation on state and national highways. A non-limiting, illustrative example of a motorized mobile chair is used throughout the disclosure. In various embodiments, a placement or location of at least one sensor may be determined based at least in part upon unique S-MMS dynamic characteristics, user seating position, wheel or track location associated with the S-MMS, or other characteristics relevant to the disclosed systems and methods.

Some embodiments of the S-MMS architecture(s) of the present disclosure and related applications may be referred to as separate generations based on different functionality. While these generations are discussed as separate embodiments, one or more aspects of one or more generations may be combined to form other control systems not explicitly disclosed herein (or in the related co-pending applications). The generations are as follows: Generation 0 (Gen 0), Generation I (Gen I), Generation II (Gen II), and Generation III (Gen III).

The motorized mobile systems (MMS) in existence today are referred to herein as Generation 0 (Gen 0). This existing MMS has a user interface and a limited control system. Gen 0 is hosted in (e.g. processed by) a controller with a Human Machine Interface (HMI) typically consisting of a joystick, tactile surface array, sip and puff type array, or similar interface. In some embodiments, the HMI may further include touch screens, voice command interfaces, and audible indicators, or be replaced by a brain machine interface (BMI). The joystick receives input indicating a direction for movement, the command is generated, and control instructions are sent to the motor controller, which responds with a preconfigured response. The control instructions may include a change in state or an adjustment of an operating parameter. The preconfigured response may include taking operational control of steering, starting the MMS, or stopping the MMS. The state of the art for this type of system is to provide extremely simple control instructions and open loop limits on the MMS. Open loop systems lack the ability for self-correcting actions. An example of an open loop limit currently in use on MMSs is to cut the maximum MMS speed to a predetermined set point if the user raises the seat position above a certain threshold. The motor controller responds directly to the user input regardless of the environment proximate to the MMS. A new user may have a learning curve to master before they can confidently maneuver close to people, objects, or in confined environments.

A Smart Motorized Mobile System (S-MMS) of the present disclosure is an evolution of MMS technology and includes embodiments of a new controller and control architecture, some of which include secure methods for collecting and transmitting data across one or more networks.

The present application and one or more related applications disclose improved generations of S-MMS architectures, including Generations I-III architectures. Generation I is an embodiment for a group of sensors reporting to a controller for the S-MMS. Generation II embodiments further include consideration for scanning and/or image sensors operating in overlapping regions. Using a sensor with good down range error, and a second sensor with good cross range error, a Generation II system embodiment can coordinate reports in real-time, associate them, and take the best measurements in an ability to make the situational awareness picture more accurate. This use of more than one sensor is typically referred to as dual mode variance.

Generation II S-MMSs may take advantage of their ability to exchange data with other like equipped systems about their environment. In addition to other like equipped systems, the S-MMS may be configured to receive data from traffic through Dedicated Short-Range Communications (DSRC) across an IEEE 802.11P link. This data may help the user to better navigate next to a road way or along paths that are shared by automobiles and other MMSs. For an S-MMS user, the ability to announce one's presence and the ability to control traffic could be lifesaving.

Generation II systems are based on historical data or on observations of state at a finite time, in this case time $T_1$. In one example, an event is measured at time $T_1$, the event is processed at time $T_2$, data for the processed event is transmitted at time $T_3$, the data for the processed event is related to other data at time $T_4$, and any other actions that need to be carried out are done at time $T_5$. This can be done very quickly, e.g. from tenths of a second to even seconds. Regardless of delay, it is all historic.

Generation III is an embodiment for a multi-generation controller architecture and logic. In some embodiments, a Generation III system may host one or more of the previous generations or combinations thereof. Generation III systems go beyond dual mode variance to true sensor fusion.

The S-MMS controller may be one or more processors (hardware), application-specific integrated circuits, or field-programmable gate arrays that host the disclosed architecture. Control signals may be via wired or wireless communications and comprised of digital and/or analog signals.

Control System Embodiment

FIG. 1 depicts an embodiment of an S-MMS 18 control system composed of hardware and software components. An S-MMS controller 110 lies between two secure abstraction layers 135 and 145. Abstraction layers are used as a way of hiding the implementation details of a particular set of functionalities, allowing the separation of concerns to facilitate interoperability and platform independence. The upper abstraction layer 135 abstracts through an Application Programmers Interface (API) to a hosted application space 125 and a complex application space 130. The API is a set of subroutine definitions, protocols, and tools for building applications. An API allows for communication between the various components. The complex application space 130 may include hosted control logic for an S-MMS 18. Below the S-MMS controller 110 and its secure abstraction 145 is a breakout of the operating system 150, one or more processors 160 (which are hardware), and a communications layer 170, which may include a hardware communications interface. Memory 120, which is hardware, cross cuts all of the layers in the depicted embodiment and may include volatile and non-volatile non-transitory computer storage media for storing information. The S-MMS controller 110 is software that executes on one or more processors 160 on the S-MMS 18 and is stored in memory 120.

Figure 2:
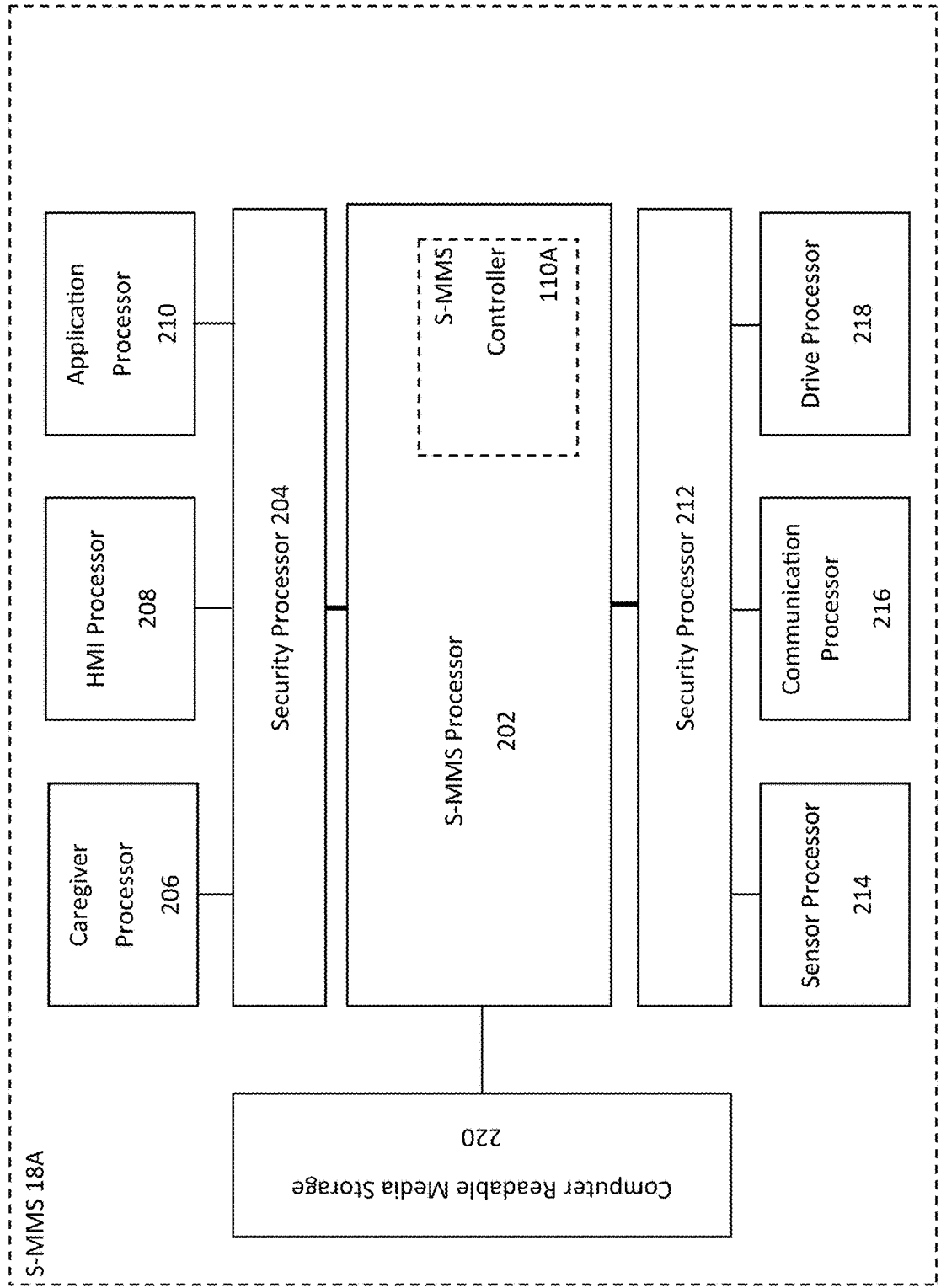
FIG. 2 depicts an embodiment of an S-MMS hardware architecture.

With a focus now on the one or more hardware processors that the S-MMS controller 110 is executed on and interacts with, FIG. 2 depicts a hardware embodiment of an S-MMS 18A architecture. The depicted electrical architecture comprises an S-MMS processor 202 between two security processors 204 and 212, each of which is hardware. The S-MMS processor 202 may be paired with a lock-step processor (not depicted) for critical life, health, and safety applications, in some embodiments. The security processors 204 and 212 may host (i.e. execute) modules and other software, such as the previously disclosed secure abstraction APIs 135 and 145. Additionally or alternatively, the security processors may host services, such as watch-dog and data source authentication services. The S-MMS controller 110A is hosted on an S-MMS processor 202. The processors may comprise one or more of a processor, multiple processors, an application-specific integrated circuit, or a field-programmable gate array.

The S-MMS controller 110A utilizes computer readable storage media 220, which includes the memory 120, for data storage and retrieval during operation. Executable program instructions for the S-MMS controller 210D also may be stored in the memory 120. The memory 120 is one or more of a volatile and non-volatile non-transitory computer storage medium for storing information and may be located onboard the S-MMS 18A, may be remote storage available on a smart device or server, or some combination of the foregoing. One or more secure, encrypted memory partitions are used to store electronic protected health information (ePHI) and other secure health data. The data stored on the secure memory is only made available to one or more pre-authorized systems, wherein the pre-authorized system comprises a device or service associated with an individual user. This may include a mobile motorized system, a smart device, a computer, a data terminal, or a device or service associated with an approved third party.

The S-MMS 18A hardware system may comprise multiple additional processors beyond the core S-MMS processor 202. In the case of a power wheelchair S-MMS, these additional hardware processors may include one or more caregiver processors 206, one or more HMI processors 208, one or more application processors 210, one or more sensor processors 214, one or more communication processors 216, and one or more drive processors 218, each of which is hardware. Each processor executes software and may produce control signals wherein the control signal is a wired or wireless signal, and wherein the control signal comprises one or more of a digital or an analog signal, and generally comprises or indicates data, instructions, and/or a state. A brief description of each of the additional processors for the depicted embodiment is provided below.

A caregiver processor 206 may be physically attached to the S-MMS or may be part of a remote device. In one embodiment, a caregiver processor 206 is a duplicate HMI and associated processor for the S-MMS that allows a caregiver to physically drive or otherwise maneuver or control the S-MMS or its components.

An HMI processor 208 may accept one or more user inputs from one or more HMI devices, such as a joystick or touch screen, and convert them into one or more control signals with data and/or instructions which are transmitted in response to the one or more user inputs at the HMI. Control instructions may comprise one or more of a calculation, a logical comparison, a state, a change in state, an instruction, a request, data, a sensor reading or record, an adjustment of an operating parameter, a limitation of a feature or capability, or an enablement of a feature or capability.

An application processor 210 may include one or more processors embedded in ancillary products, such as a seat controller, lighting controller, or $3^{rd}$ party device. Typically, these processors receive one or more control signals that causes them to respond with a preconfigured response, wherein the preconfigured response may include moving, measuring, changing a state, transmitting data, or taking operational control of the associated hardware (e.g. raising, lowering, or angling a seat or increasing or decreasing a light brightness or turning a light on or off). An application processor 210 may additionally or alternatively supply data about the S-MMS or use data generated from one or more sensors.

A sensor processor 214 receives data generated from one or more sensors used by the S-MMS or otherwise associated with one or more characteristics of the mobile system or a user of the mobile system. The received data may be stored in a memory and/or transmitted. Multiple sensors may use a single sensor processor 214 or multiple processors. Additionally or alternatively, individual sensors may have their own (e.g. dedicated) processors.

A communication processor 216 is used to establish one or more connections with one or more devices and transmits communications to, and receives communications from, one or more devices through associated devices of the S-MMS (e.g. one or more transceivers). Devices may communicate with the processor via wired or wireless means. These devices may be located on the S-MMS 18A or may be remote to the S-MMS 18A. A communication processor 216 may be part of a communication system for a mobile system for secure transmission and/or secure reception of data. In some embodiments, the S-MMS processor 202 may have an integrated communication processor or the S-MMS processor performs the functions of the communication processor In an exemplary embodiment, a communication processor 216 on the S-MMS 18A is configured to establish secure connections between the S-MMS 18A and one or more other wireless devices over which data is transmitted and received by the communication processor and the one or more wireless devices. Responsive to a secure connection being established by the communication processor 216 with a wireless device, the communication processor retrieves from a secure memory 220 one or more of stored first data or stored second data; wherein first data is data generated from one or more sensors associated with one or more characteristics of the mobile system (e.g. sensors on or used by the S-MMS 18A for measurement of distances, angles, or planes at which the S-MMS is operating, drive speed or direction, angular momentum, or other operational characteristics of the S-MMS itself) and second data is data generated from one or more sensors associated with a user of the mobile system (e.g. user presence in the seat, heart rate, seat moisture, or other characteristics of the user of the S-MMS). One or more of the first data and second data is then communicated to the wireless device via the secure connection for storage in a secure second memory of the wireless device. The wireless device associated and the communication processor 216 may communicate using one or more of cellular, 802.11, Wi-Fi, 802.15, Bluetooth, Bluetooth Low Energy, 802.20, and WiMAX.

A drive processor 218 receives one or more control signals, for example from the S-MMS controller 110A, that cause the drive processor to respond with a preconfigured response to the steering system and/or drive motor(s) of the S-MMS, wherein the preconfigured response includes one or more of taking operational control of the steering system or drive motor(s), steering the S-MMS, or starting and/or stopping one or more drive motors to move the S-MMS in one or more directions. A drive processor 218 may additionally or alternatively supply data generated from one or more sensors associated with one or more characteristics of the mobile system to the S-MMS controller 110A.

In some embodiments, one or more sensors may be mounted to different physical locations on an S-MMS 18A. In some embodiments, the sensing area/view/field of one or more sensors may overlap the sensing area/view/field of one or more other sensors or a contiguous sensing field may exist between sensors to obtain a complete 360-degree sensing area view around the S-MMS 18A, which is referred to herein as a federation of sensors. In some embodiments, the one or more sensors are non-cooperating independent sensors that generate a detection response to objects with some confidence (e.g. generate a control signal that indicates one or more objects were detected and a distance to the one or more objects or other measurement data relative to the one or more objects). In such an embodiment, the kinematic states of detection that can be determined include position and time of detection. In some embodiments, control logic may be deployed in an S-MMS controller 110A to create an integrated system of systems within the S-MMS 18A.

Situational Awareness System

Situational awareness (SA) is the perception of environmental elements, objects, conditions, and events with respect to the observer, in terms of time and space. Situational awareness involves being aware of what is happening in the vicinity of the user to understand how information, events, and one's own actions will impact objectives, both immediately and in the near future. More importantly, situational awareness involves the comprehension of information's meaning, and the projection of an object's status after some variable has changed or occurred, such as time, or some other variable has changed or occurred, such as a predetermined event. Situational awareness is also the field of study concerned with understanding the environment critical to a decision-making process in a complex dynamic system. Dynamic situations may include ordinary, but nevertheless complex, tasks such as maneuvering an S-MMS in an environment safely.

A federation of sensors may be oriented proximate to an S-MMS 18 in such a way to ensure 360-degree sensor coverage. These sensors may report to an S-MMS controller 110 that is tasked with receiving information from one or more sensors, interpreting information from one or more sensors, and taking action based on information provided by the one or more sensors. The S-MMS controller 110 may attempt to assign meaning to the information and create a projection of one or more statuses or states of the S-MMS 18, including after some variable has changed or occurred. When one or more sensors report data identifying an object, the S-MMS controller 110 may respond based on those reports, either automatically or with user input.

Figure 3:
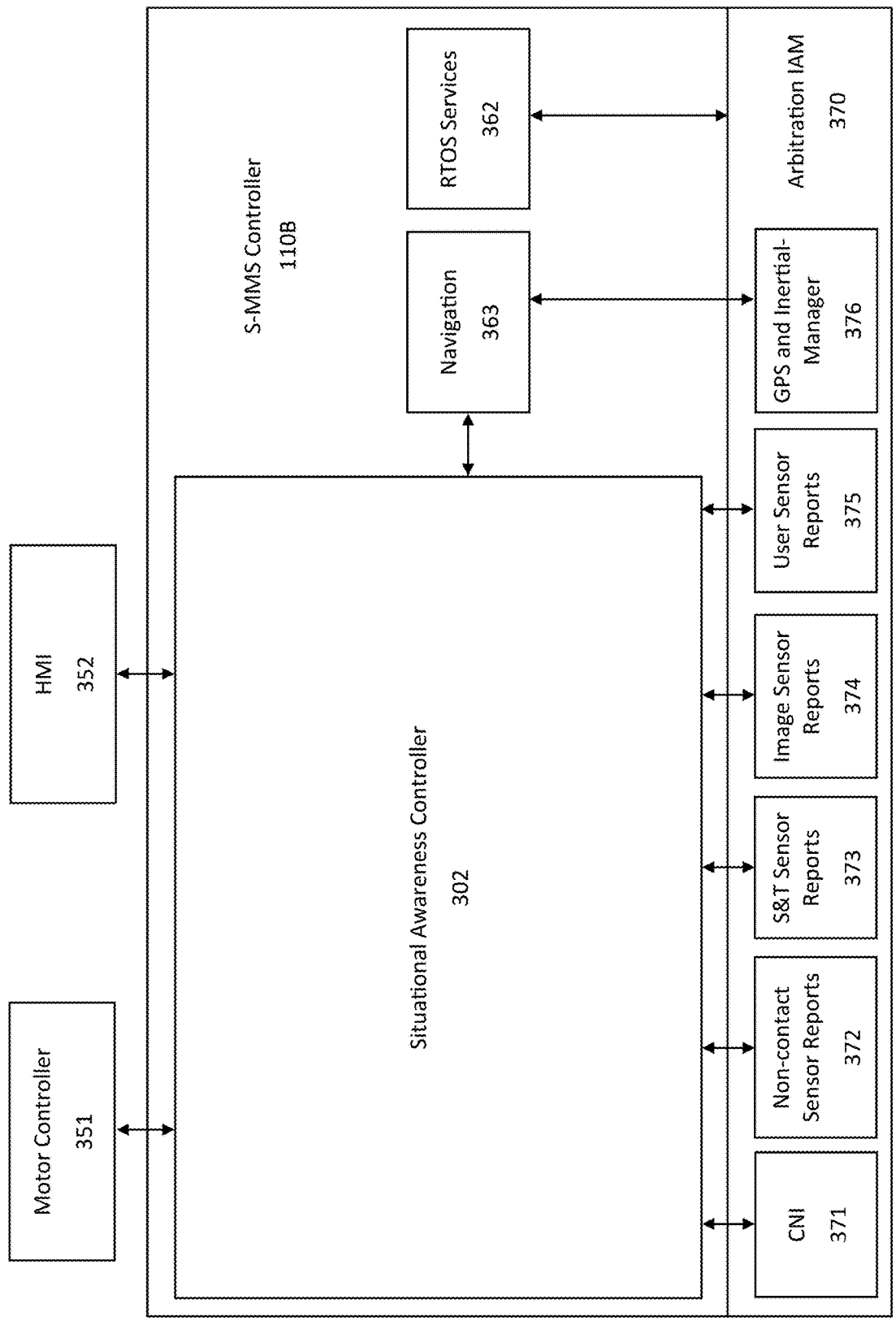
FIG. 3 depicts an embodiment of a control system architecture for an S-MMS hosting an integrated situational awareness controller.

FIG. 3 depicts an embodiment in which the S-MMS controller 110B is deployed on an S-MMS. The depicted embodiment comprises a situational awareness controller 302 within the S-MMS controller 110B. The S-MMS situational awareness controller 302 communicates with a motor controller 351 and a Human Machine Interface (HMI) 352. In some embodiments, one or more of the motor controller 351 and HMI 352 may be integrated into the S-MMS controller 110B. The depicted S-MMS controller 110B further comprises real-time operating system (RTOS) services 362 and navigation 363.

An arbitration Information Assurity Manager (IAM) 370 manages sensor reports from one or more sensors on or used by the S-MMS 18 and may include communication, navigation, and identification (CNI) 371 processing capabilities. In some embodiments, the arbitration IAM 370 resides on a security or arbitration processor 212 (FIG. 2). Additionally or alternatively, functions of the CNI 371 may be performed by a dedicated communication processor 216 (FIG. 2). Sensor reports received and managed by the arbitration IAM 370 may include non-contact sensor reports 372, search and track sensor reports 373, image sensor reports 374, and user sensor reports 375. Sensor reports (372-375) may be composed of data stored in one or more of long-term or short-term system memory 120 or read from an input port on an S-MMS 18A processor (e.g. processors 212, 216 or 214). A report (371-376) may include additional data beyond a simple measurement, including sensor status, confidence levels, or other information.

Non-contact sensors are devices used to take a measurement, often a distance, without coming in contact with the detected object. There are many types of non-contact sensors, including optical (e.g. LIDAR), acoustic (e.g. RADAR or ultrasonic), and magnetic (e.g. hall effect sensor). Microphones may additionally be included as a non-contact sensor. Search and track sensors may include image and non-contact sensor types but are sensors that often have larger fields of view and may scan within these fields of view. Image sensors detect and convey information that constitutes an image or series of images/video, wherein the image(s)/video may contain light or electromagnetic radiation information on an area. These sensor reports interface to the specific sensor types in the system to identify measurements, detections, number, efficiency, health, degraded performance, states, statuses, and/or other data of each sensor in the sensing system.

The depicted arbitration IAM 370 further comprises a global positioning system (GPS) and inertial manager 376. In the depicted embodiment, the situational awareness controller 302 communicates with the CNI 371, sensor reports 372, 373, 374, and 375 and navigation 363. Navigation 363 communicates with the GPS and inertial manager 376 in the arbitration IAM 370. The depicted embodiment of the situational awareness controller 302 includes logic to manage the sensors, including one or more of on and off, sweep rate, sensor volume, regional interrogation, and/or other operations.

The CNI 371 manages communications through system links and off board links to enable vehicle to device, intra-vehicle, and inter-vehicle communication and coordination, including cooperative navigation among vehicles and using other devices and identification of devices and vehicles. In some embodiments, the CNI 371 identifies other data sources and retrieves data from other data sources, including for threats detected and kinematic states of sensors, vehicles, and devices. The CNI 371 is also responsible for GPS corrected system-wide time and processor time sync across the system in conjunction with the operating system. For example, the CNI 371 receives an accurate time via the GPS and inertial manager 376 and transmits that accurate time to all hardware processors along with an instruction to sync their internal clocks to that accurate time. This time coordination function is important in some embodiments since errors in time coordination can introduce as much error in system performance as a bad sensor reading in those embodiments. Propagating a sensor measurement to the wrong point in time can induce significant confusion to filters, such as a Kalman filter, especially if time goes backward due to sync errors.

The CNI 371, in some embodiments, may be configured to receive data from one or more different sources, including other like-equipped S-MMSs, vehicles and traffic devices, among others, through a Dedicated Short-Range Transceiver (DSRC), for instance, across an IEEE 802.11P link, which may be formatted in an IEEE 1609 format. This data may help the user to better navigate next to a roadway or along paths that are shared by automobiles. Some embodiments may allow for traffic lights, speed signs, and traffic routing to be dynamically altered. For an S-MMS user, the ability to announce one's presence and thereby enable a traffic control device to effect a change in traffic, such as by changing a stop light to red, could be lifesaving.

A search and track function 373 may be used to maintain sensor health, detect sensor failures, monitor sensor zones of coverage, and notify the situational awareness controller 302 or other component of the S-MMS controller 110B of sensor system degradation or other states. The search and track function 373 may also manage the transition of sensors from online and off-line states (including plug and play future options).

The user sensor reports 375, in some embodiments, may be configured to receive data from one or more sensors used to monitor user condition, user position, and/or user status. This data may allow for assistive behaviors to be triggered and/or tuned by the situational awareness controller 302 to the human in the loop of the S-MMS 18.

The GPS and inertial manager 376 includes one or more inertial measurement unit (IMU) data services that receives one or more reports from an attitude and heading reference system (AHRS) that includes an IMU. An IMU of an AHRS consists of one or more sensors on three axes that provide attitude information of the S-MMS 18 to the GPS and inertial manager 376, including yaw, pitch, and roll of the S-MMS and deviations to each. As an example, an x-axis may typically be lateral across the S-MMS 18 coaxial with the axles of the front wheels of the S-MMS, extending 90-degrees left and 90-degrees right, a y-axis may extend forward and rearward of the S-MMS, and a z-axis may extend vertically through the S-MMS, 90-degrees to the x and y axes. An IMU typically comprises acceleration and rate determining sensors on each axis. In the case of x, y, and z measurements, the IMU is referred to as a 6-Degree of Freedom (DOF) sensor. Some IMUs also have a small hall device on each axis to measure the magnetic line of flux of the earth's magnetic poles, similar to a compass, that allows for the calculation of true, earth referenced orientation. These IMU embodiments are referred to as a 9-DOF sensor and are more accurate than a 6-DOF sensor. However, some systems may interpolate the z-axis by detecting gravity on either the x or y axes, which may be less accurate. The IMU is fixed to the S-MMS 18 in some embodiments and provides reports to the GPS and inertial manager 376.

The GPS and inertial manager 376 also receives GPS signals from a GPS receiver. The GPS receiver may be mounted to the S-MMS 18, be part of a smart device paired or otherwise linked to the S-MMS, or be another receiver that transmits signals to the S-MMS or a smart device linked to the S-MMS.

Navigation 363, in the depicted embodiment, is an inertial reference system, including an inertial navigation system (INS), for navigating using dead reckoning (DR). Dead reckoning is the process of calculating the S-MMS 18 current position by using a previously determined position, or fix, and advancing that position based upon known or estimated speeds and steering over elapsed time and heading. In one embodiment, DR uses GPS location data (e.g. via GPS and inertial manager 376) to update the INS DR fix. Speed, heading, and elapsed time data are then provided by the INS function of navigation 363 to the situational awareness controller 302. S-MMS speed (e.g. velocity and/or acceleration) may be received directly from one or more motor controllers 351. Additionally, speed and heading may be received or calculated from one or more GPS and inertial manager 376 reports. Elapsed time is provided by RTOS services 362. The navigation 363 allows the S-MMS 18 to navigate inside a building without GPS or otherwise (e.g. outside of GPS coverage) to a similar degree of accuracy as navigating outside with continuous GPS data or otherwise. Speed, heading, and elapsed time for navigation 363, in some other embodiments, is calculated onboard the processors of internal and/or external sensors, including one or more GPS receivers and one or more solid state inertial measurement units (IMUs). In some embodiments, the S-MMS processor 202 calculates speed, heading, and elapsed time and generates steering and drive signals, including optionally based on one or more non-contact sensor reports and/or GPS and inertial manager reports.

Figure 4:
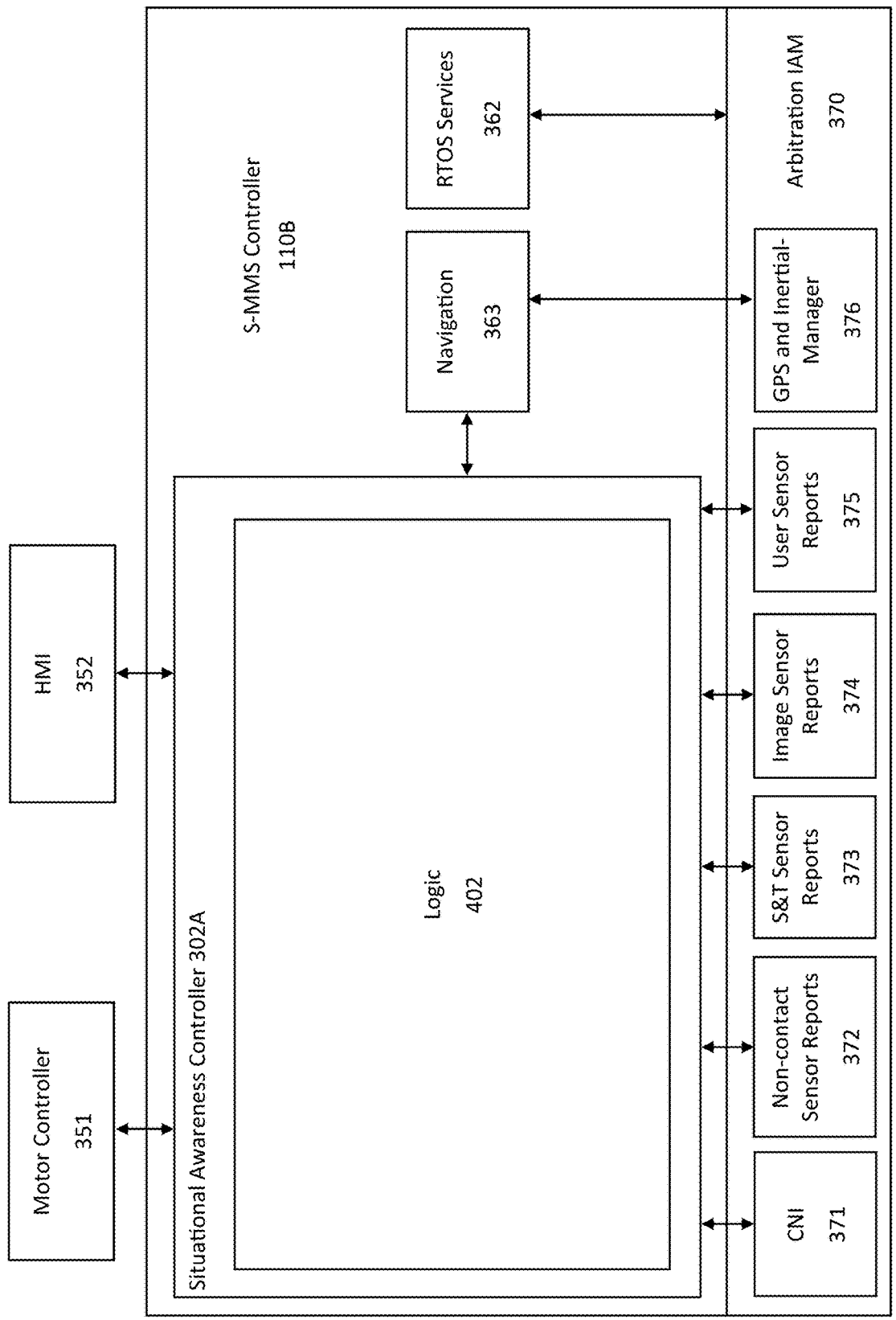
FIG. 4 depicts an embodiment of a control system architecture for an S-MMS with a situational awareness controller.

FIG. 4 illustrates an embodiment of a system in which logic 402 for one or more architectures, including one or more generations referenced above, is deployed on the control system architecture depicted in FIG. 3. The logic 402 may take full advantage of the entire suite of sensors available in the depicted control system embodiment and/or other sensors not depicted. The logic 402 processes reports and other data from smart sensors, including smart non-contact sensors 372, search and track sensors 373, and image sensors 374. These sensors often have larger fields of view and may scan within these fields of view. These sensors may be able to characterize reports, i.e. generate both quantitative and qualitative attributes to sensor reports and coordinate sensor reports in time. These capabilities may be used to support data association techniques that can eventually be used in predictive systems.

The complexity and capability of the situational awareness controller 302 may dictate the types of applications it will support. In one example, the logic 402 supports simple applications, like tip detection, drop off detection, and/or function override for safety. In another example, the logic 402 supports user assistance systems that will result in a workload reduction for both the user and/or caregiver. In another example, the logic 402 supports increased user independence due to increased confidence in system actions.

Figure 5:
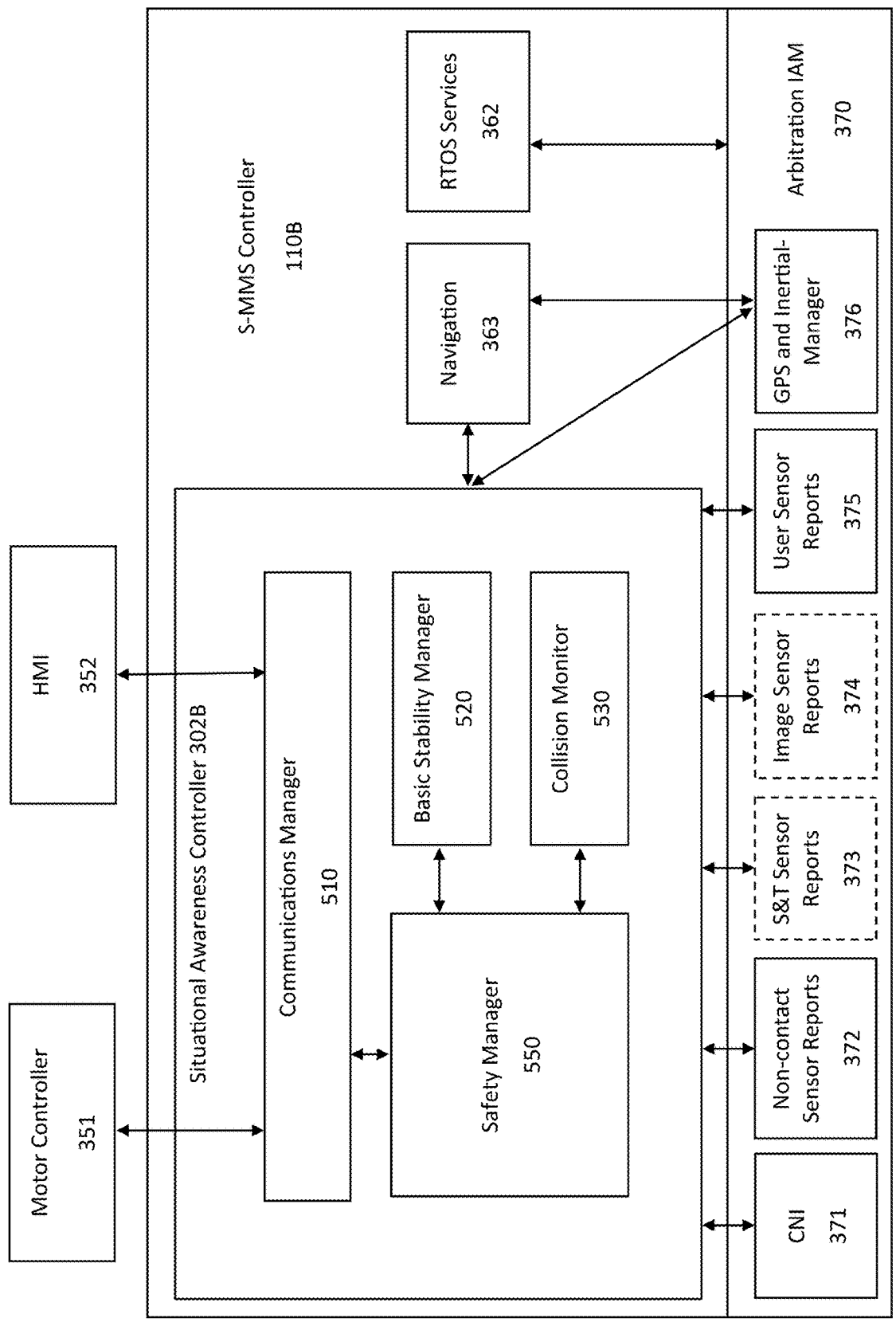
FIG. 5 depicts an embodiment of a situational awareness controller.

FIG. 5 depicts an embodiment of FIG. 4 where the situational awareness controller 302B comprises a communications manager 510, a basic stability manager 520, a collision monitor 530, and a safety manager 550. Each of these processes receive data from one or more sensors, including data from the non-contact sensor reports 372 and/or data provided via the CNI 371. S-MMS orientation sensor reports from the GPS and inertial manager 376 are transmitted to the situational awareness controller (SAC) 302B via navigation 363. The human machine interface (HMI) 352 transmits user input to the SAC 302B.

Signals from the HMI 352 are used as an input to the SAC 302B safety manager 550. The HMI 352 input is analyzed by the SAC 302B and compared by the SAC to the situational awareness states determined by the basic stability manager 520 and collision monitor 530 (e.g. unstable or collision states, as described more fully below). If an unstable or impending collision state is detected by the basic stability manager 1320 or collision monitor 1330, respectively, then the SAC 902C may replace the HMI input values by one or more new values calculated by the safety manager 550. In this way, the SAC 302B may arbitrate messages between the HMI 352 and the motor controller 351. Additionally or alternatively, the physical behavior of the HMI 352, such as joystick force resistance, may be modified by the SAC 302B to provide feedback to the user based on the output of the safety manager 550. The motor controller 351 reports drive processor 218 (FIG. 2) outputs, application processor 210 (FIG. 2) outputs such as seating system positions, and other available data from the S-MMS to the SAC 302B for use in decision making by the associated processes. In some embodiments, communication between the HMI 352, the motor controller 351, and the safety manager 550 may be controlled by a communications manager 510.

The basic stability manager 520 monitors sensor inputs from non-contact sensor reports 372 and GPS and inertial manager 376 and determines the current and/or predicted future stability of the S-MMS 18. The basic stability manager 520 may be configured to classify drops and rises along a path of travel to be within a safe zone, within a warning zone, or within a stop zone. A timeline for any necessary steering corrections and any future coupled steering maneuvers to minimize accidents due to instability are computed by the basic stability manager 520, such as based on the non-contact sensor reports 372 and GPS and inertial manager 376 reports/sensor inputs. Any system cutoffs, emergency braking, and/or drive processor 218 (FIG. 2) disengagement functions also are performed by the basic stability manager 520, such as based on the non-contact sensor reports 372 and GPS and inertial manager 376 reports/sensor inputs.

A collision monitor 530 monitors sensor inputs from non-contact sensor reports 372 and/or optionally from one or more image sensor reports 374 and determines the current and/or predicted future time to impact for objects detected within a certain distance and/or perimeter of the S-MMS based on the non-contact sensor reports and/or optionally from the one or more image sensor reports. The collision monitor 530 is a single-mode variance system in one embodiment. A single-mode variance system makes logical decisions by analyzing individual sensor reports, where each sensor has distinct capabilities and a fixed set of errors inherent to the sensor. The appropriate timeline for any necessary steering corrections and any future coupled steering maneuvers to minimize accidents due to collision may be computed by the collision monitor 530, such as based on the non-contact sensor reports 372 and/or optionally on one or more image senor reports 374. Any system cutoffs, emergency braking, and/or motor controller disengagement functions may be performed by the collision monitor 530, such as based on the non-contact sensor reports 372 and/or optionally on one or more image senor reports 374.

The safety manager 550 communicates with sub-processes that look at S-MMS 18 stability states and/or other data (e.g. via the basic stability manager 520) and collision states and/or other data (e.g. via the collision monitor 530) and decides what actions should be taken based on the stability and collision states and/or other data. For example, based on the stability and/or collision states and/or other data, the safety manager 550 may modify user inputs for steering and/or drive control, e.g. via overriding/modifying user inputs received from the HMI 352 before they are communicated to the motor controller 351, process the user inputs to create an output to be sent to the motor controller 351, or transmit new outputs/instructions to the motor controller 351. The safety manager 550 may independently send commands to both the HMI 352 (e.g. to provide instructions or feedback to the user via the HMI) and the motor controller 351 (e.g. to control steering and/or drive motors or other devices or request status of the motors and/or devices). Functions that may be performed by the safety manager 550 include instructing sensors to take sensor readings and using a rules engine to determine control command outputs based on the states of the basic stability manager 520 and collision monitor 530. The goal of the safety manager 550 is to produce a combined view of the safety of the S-MMS surroundings at any given moment. In some implementations, the functions of the safety manager 550 may be referred to as tactical management and threat assessment and may use predictive algorithms and determination/designation of safe directions and/or velocity of travel.

The S-MMS 18, in some embodiments, communicates with other devices, such as a smart phone, tablet, or computer, (e.g. via the communication processor 216 (FIG. 2) of the S-MMS 18) with Bluetooth, Bluetooth Low Energy, Wi-Fi, and/or other wireless signals, such as light frequency navigation being deployed for indoor tracking and navigation. As these systems grow in use, the S-MMS 18 will take advantage of them. In combination with previously known GPS locations and DR, the S-MMS 18 will be able to estimate its position in indoor environments with even greater accuracy. Additionally or alternatively, the SAC 302B my use S&T sensor reports 373 and or image sensor reports 374 in some embodiments.

Cloud Integration

Figure 6:
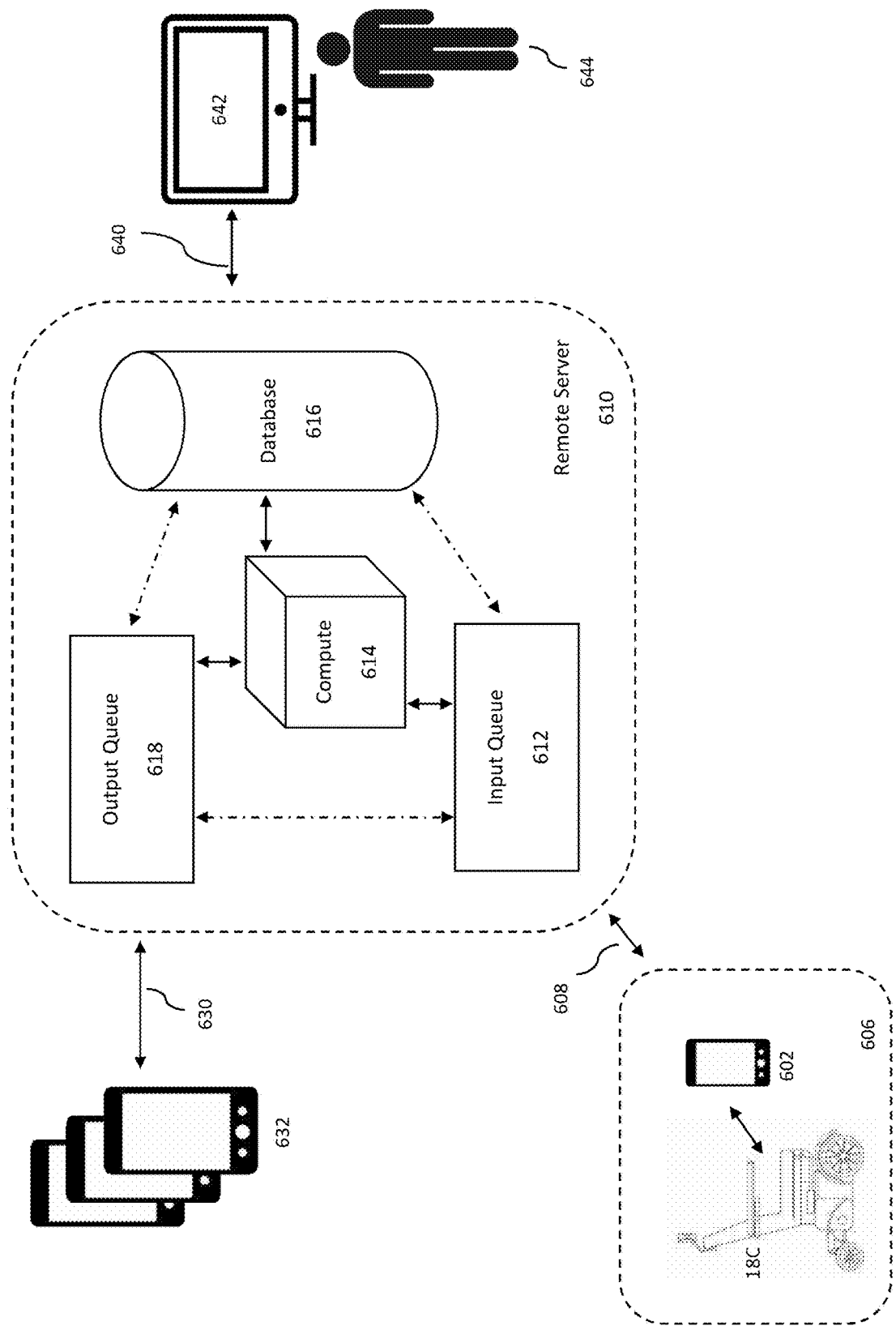
FIG. 6 depicts an embodiment of an S-MMS system securely connected to a remote server.

FIG. 6 depicts an embodiment of an S-MMS system 606 securely connected to a remote server 610. In the depicted embodiment, a wireless processor either onboard the S-MMS 18C or associated with the S-MMS 602 as a paired or connected wireless smart device 602 is operably coupled to a second wireless processor via a secure wireless connection 608, wherein the second wireless processor is configured to operate on a public packet network. The connection 608 to the public packet network from the S-MMS system 606 allows access to one or more remote servers 610 configured to receive data from memory on the S-MMS 18C and/or the memory on the associated smart device 602 of the S-MMS system 606. The received data may then be stored in a secure memory on the remote server 610 wherein the secured, stored data is accessible to pre-authorized systems or pre-authorized persons.

In an embodiment, an S-MMS controller 110B retrieves a key (e.g. a code or security credential) from secure memory on a paired device 602 over a secure wireless connection (secure in an embodiment). This key may be stored on a secure memory on the S-MMS 18C and is then transmitted to a remote server 610. The key, provided by the paired device 602, is used by the remote server 610 compute engine 614 or input queue service 612 to authenticate the S-MMS 18C on the remote server 610 and identify the S-MMS system 620 with a unique, authorized user account. This key authentication authorizes the input queue 612 to receive further messages transmitted from the S-MMS system 606 to the remote server 610 and/or associate those messages with a unique user account. Additionally or alternatively, the key authentication may authorize the output queue 618 to send data to the S-MMS system 620 for use by the S-MMS controller 110B on the S-MMS 18C and/or paired device 602. In an embodiment, the paired smart device 602 may be replaced by an alternative device configured to transmit or receive wireless signals, such as an RF tag or BLE beacon.

In an embodiment, a pre-authorized system may be a web interface 642 accessed through an internet connected device, wherein a pre-authorized user 644 logs in using security credentials and may view a history of events and other data associated with a particular S-MMS user or the S-MMS of that user. In another embodiment, the web interface 642 may be used to communicate with the S-MMS user or modify or add data to the S-MMS users' unique data file. Data transmitted to the web interface 640 may be delivered via a secure connection, such as a secure sockets layer (SSL) connection.

In one embodiment, the remote server 610 may be configured to accept, process, store, and complete specific actions based on messages received from an S-MMS system 606. FIG. 6 depicts a remote server 610 configured to receive incoming messages from an S-MMS system 606 via a secure connection 608. Messages may be sent from the S-MMS system 606 when a particular event takes place (e.g. on a tipping event), at state events (e.g. at startup of the device), and/or at pre-scheduled times (e.g. at midnight each night). These incoming messages are received by an input queue 612 of the remote server 610. Messages from the input queue 612 may then be sent to one or more of a compute engine 614, a database or data storage system 616, and an output queue 618. The compute engine 614 may compare data included in incoming messages from the input queue to predefined rules. Additionally or alternatively, the compute engine 614 may work as a filter to associate individual messages with unique user accounts prior to storing data in a database 616. The compute engine 614 may also, based on the content of a received message, push alerts or action requests to an output queue 618. The output queue 618 may be a subscription/publication service that, when activated, sends alerts to internet connected devices 632, such as an S-MMS users' caregiver's smart device. Alerts may be sent as text messages, voice messages, voice calls, or video over a cellular and/or Internet Protocol (IP) network 630, including the internet. In some embodiments, the services depicted 612-618 on the remote server 610 may be executed on one or many individual server instances that work together to complete tasks as a single unit on one or more hardware processors. Additionally or alternatively, multiple other remote server architectures are possible to accomplish the intended functionality. As a non-limiting example dashed-dot lines have been included to show alternative connections that may be enabled in some embodiments. Additionally, the compute function may include more advanced machine learning logic, such as a neural network, in some embodiments. Diagnostics and other basic server components have been left off of the diagram for the purpose of clarity.

Figure 7:
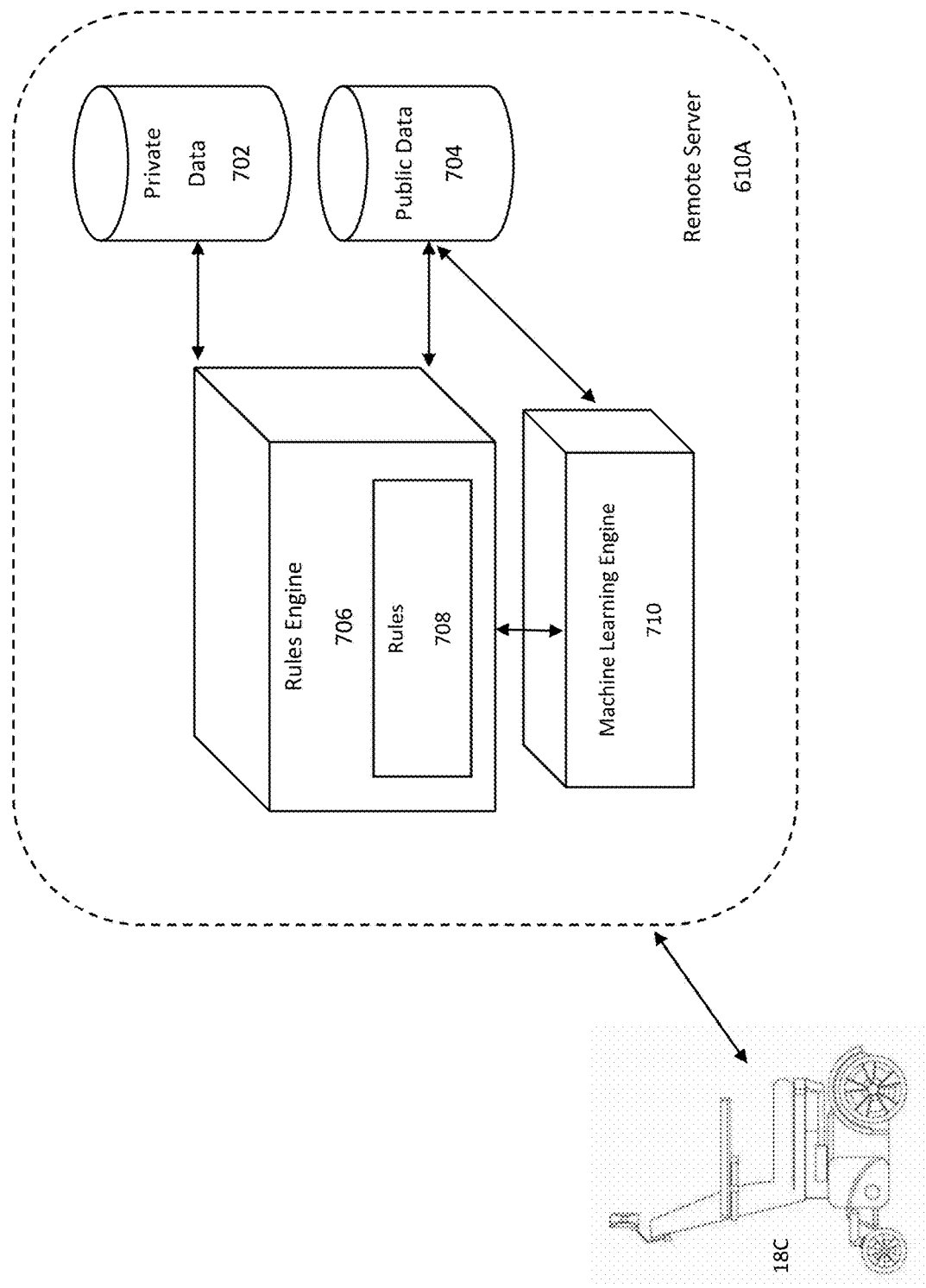
FIG. 7 depicts one or more S-MMSs connected to a remote server.

In some embodiments, data associated with one or more S-MMS 18C sensors or memory may be shared directly with remote services and servers 610 (FIG. 6). Additionally or alternatively, the data may be shared with a paired smart device 602 as previously disclosed. FIG. 7 depicts an embodiment of an S-MMS 18C wirelessly connected with a remote server 610A. The remote server 610A may be configured to accept information related to the user from the S-MMS 18C over a public packet network, such as the internet. Additionally or alternatively, the information related to the user may be processed by a rules engine 706 to separate any personally identifiable information from other information, store the personally identifiable information as private data 702, and store non-identifiable information to or merge it with public data 704. In an embodiment, received data may be further anonymized using published best practices for data anonymization by scrubbing data based on predefined rules 708 or a program that modifies or mixes information (614, FIG. 6) prior to being placed in public data 704. In an alternative embodiment, data may be sorted and/or anonymized onboard the S-MMS 18C prior to being transmitted to the remote server 610A. In some embodiments, public data relevant to the user can be overlaid on, or included in, existing databases adding significantly to the resolution of the health data available for a given purpose (e.g. a research study). In this embodiment, the S-MMS 18C may connect directly to a service over a public packet network or public data 604 from a remote server 610A may be fed to a service or location for use by a $3^{rd}$ party.

User Profile

Motorized Mobile Systems are meant to assist people of all ability levels. In the case of mobile chairs, the S-MMS is intended to be used by people with cognitive and/or physical disabilities. For any system, users have a unique mix of capabilities on a spectrum, both physical and cognitive. Moreover, individuals' capabilities are not static, but change over time and depend on situational and environmental parameters. What is needed is a way to truly tune S-MMS capabilities to the user.

In some embodiments, the SAC 302B may accept user sensor reports 375 which may be stored in memory 120 and used by S-MMS controller 110 processes, such as the safety manager 550, communications manager 510, basic stability manager 520, and collision monitor 530. In an embodiment, the S-MMS controller 110 may be configured to receive control instructions from an HMI 352, process the control instructions, and, in response, generate one or more control signals to one or more other components of the S-MMS 18, wherein the generated control signal causes the one or more other components to take an action or otherwise respond. The S-MMS 18 may comprise one or more sensors operably configured to generate health data related to a user 375, wherein the health data related to the user is stored in a secure first memory 120 connected to the controller, wherein the stored user health data is used by the S-MMS controller 110 as an input to generate one or more of the control signals for the one or more components of the S-MMS.

The HIPAA Privacy Rule addresses the saving, accessing, and sharing of medical and personal information of any individual, while the HIPAA Security Rule more specifically outlines security standards to protect health data created, received, maintained, or transmitted electronically, also known as electronic PHI (ePHI). Anyone hosting ePHI data with a HIPAA compliant hosting provider must have certain administrative, physical, and technical safeguards in place, according to the U.S. Department of Health and Human Services. The S-MMS controller 110 may process ePHI relating to the user and store ePHI in system memory 120. This data is encrypted at rest and secured in transit. In addition, access control protocols are used to limit the accessibility of ePHI to pre-authorized individuals. A data access control strategy is used herein in order for the previously disclosed system architecture and communication strategies to comply with HIPAA requirements for ePHI handling.

Figure 8:
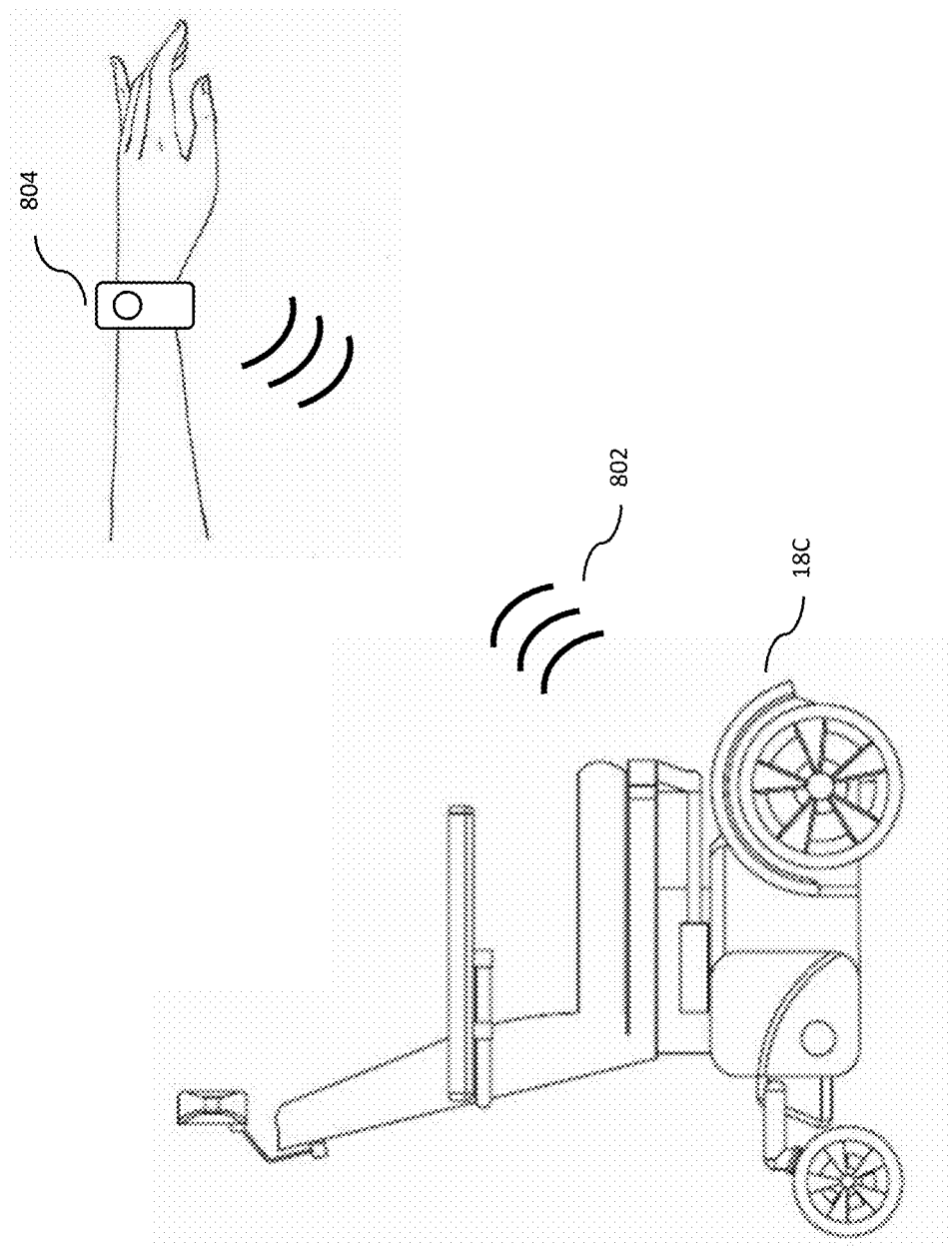
FIG. 8 depicts an embodiment in which a wearable device with an embedded transceiver communicates with an S-MMS.

Creating individual user profiles allows for a robust access control strategy and opens up new possibilities for S-MMS 18 features. FIG. 8 depicts an embodiment of an S-MMS 18C which communicates with a user key 802. Presence of a user key 802, when sensed by the S-MMS 18C via one or more onboard communication processors 216, may allow the S-MMS controller 110 to access a user profile stored in secure memory 120, access user data stored on a secure remote server 610, and write to either memory locations 120, 610. Where and how user data is stored and retrieved may be determined in one example by user preferences and settings. The user key may be one or more of a smart device 602 configured to provide a preconfigured access code or other identifier, an electronic key (such as a memory stick) which physically connects to the S-MMS 18C and provides an access code, or a wireless device configured to communicate with the S-MMS controller 110 and provide an access code or other identifier to the S-MMS controller, including an RF tag or BLE beacon.

A unique user profile may provide user settings and information, including expected capabilities and preferences, to one or more rules engines running as part of the safety manager 550 or communications manager 510 on the SAC 302B. Additionally or alternatively, the S-MMS controller 110 may access a historical record of data that can be used for setting thresholds and expected acceptable ranges for the S-MMS controller 110 and/or other controllers on the S-MMS 18 (e.g. motor controller 351, HMI 352, etc.). The baseline of user settings, historical record data, and other required data may be retrieved from the S-MMS memory 120 and/or a remote memory on a paired device (e.g. 602).

Additionally or alternatively, the S-MMS controller 110 may communicate ePHI data between external sources such as external servers 610. In one example, a user profile contains data about the user (e.g. weight, other physical or cognitive characteristics of the user that would be relevant to an S-MMS or its operation, reaction time, and/or a numeric indicator of skill), user preferences, data identifying functionality and capabilities of an S-MMS based on a user, such as speed limitations, drive and steering limitations based on HMI input, seat position, sensor calibrations, user-preferred joystick or other HMI calibrations, and/or other S-MMS and user data.

Each S-MMS 18 may be configured with a unique user profile that informs the S-MMS controller 110 of the individual user's baseline capabilities, preferences, and information. The user profile may be stored in onboard memory 120. Additionally or alternatively, the user profile may be stored on a remote server 610. In some embodiments, user data and/or S-MMS data for a user profile may be gathered over time and stored in a memory location (e.g. 610) associated with a unique user profile. In some embodiments, a user's profile may be accessed by a user, caregiver, third party, and/or the S-MMS controller 110 or related server 610 in future analyses. In some embodiments, the analyzed data may be sent to a caregiver by the S-MMS controller 110 or related server 610 when attention may be needed.

In some embodiments, the S-MMS controller 110 uses the user data in the user profile to learn about the user and to adapt to the user accordingly. In some embodiments, the user data in the user profile may include aspects such as reaction time and a numeric indicator of skill (e.g. rank 1 thru 10). Along with user data, information about the S-MMS 18 may be gathered and stored in the user profile, including make and model and information regarding any associated accessories mounted to the S-MMS 18. User profiles may be stored externally to the S-MMS 18 at a remote server 610 associated with the S-MMS 18, on an associated smart device 602, or on another electronic key and available for import when the user switches systems, for instance when they are traveling. The ability to port a user profile allows for simple, quick, seamless, and comfortable transitions between different S-MMSs 18.

User Profile Setup

Figure 9:
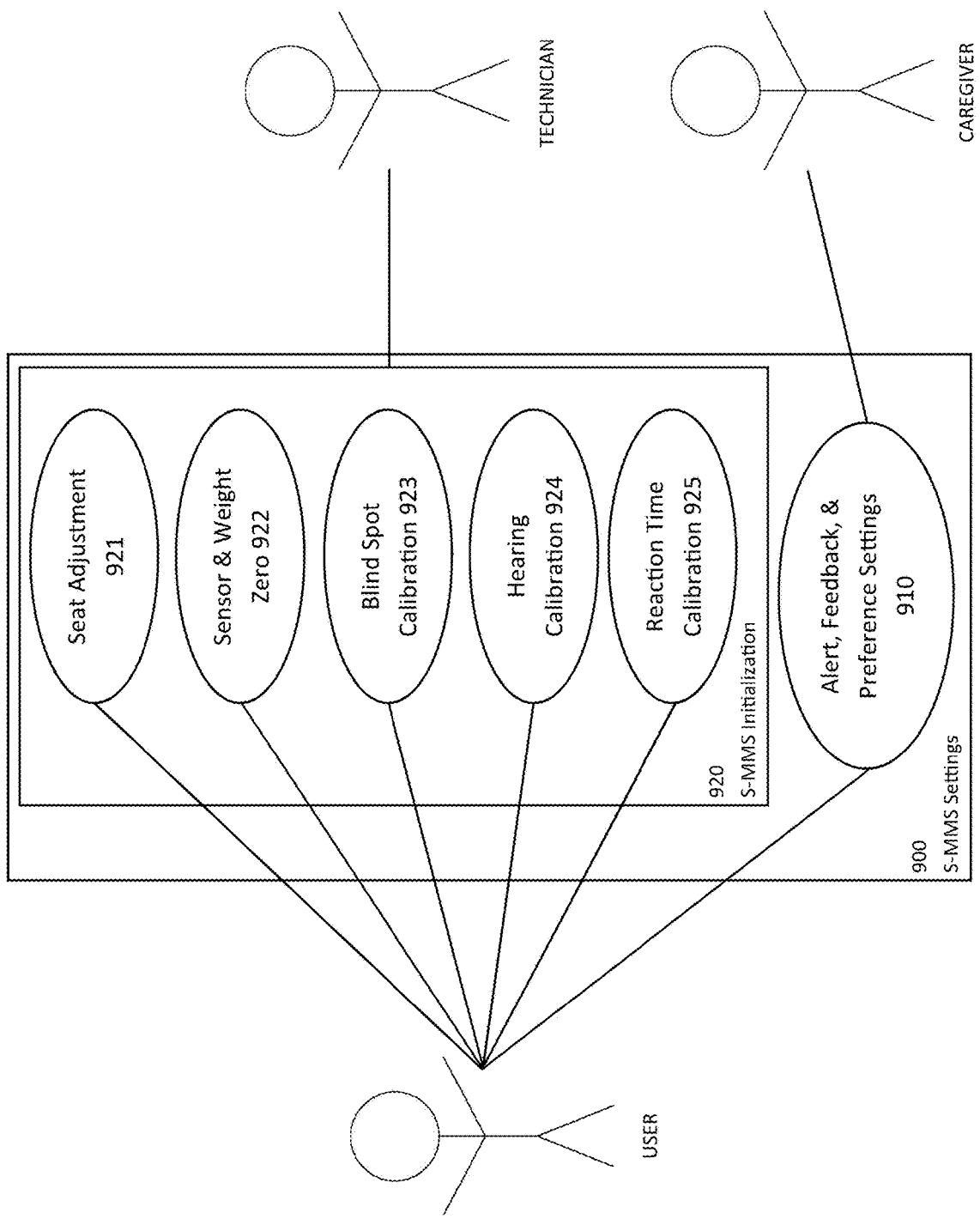
FIG. 9 depicts an example embodiment for initial user setup on an S-MMS.

With consideration for increasing the abilities and independence of all MMS users, the S-MMS 18 is designed to allow initial customization of system behavior to fit individual user preferences, abilities, and/or requirements. At system initialization, a user, technician, caregiver, or other operator may use an application interface to configure the S-MMS controller 110 behavior by creating or storing the unique user profile in memory 120. FIG. 9 illustrates an exemplary embodiment of initializing settings for an S-MMS 18 using an S-MMS settings application 900 on a connected device 602 or internet terminal 642. The settings may be stored in a user profile. In one example, the settings application is stored in memory 120 of the S-MMS 18 and executed by one or more processors of the S-MMS controller 110. In another example, the settings application 900 is stored on memory of a smart device communicatively coupled 602 to the S-MMS controller 110 of the S-MMS and executed by the processor of the smart device. For this example, the S-MMS settings application 900 transmits data and/or control information to the S-MMS controller 110 and receives data and/or control information from the S-MMS controller to initialize the settings and/or devices (e.g. sensors) of the S-MMS 18. The depicted S-MMS settings application 900 is directed to a mobile chair S-MMS 18 embodiment. The depicted S-MMS settings application 900 comprises alert, feedback, and preference settings 910 and S-MMS initialization settings 920. The S-MMS initialization settings 920 in the depicted embodiment comprise seat adjustment 921, sensor and weight zero 922, blind spot calibration 923, hearing calibration 924, and reaction time calibration 925. An example of such an application 900 is a phone or tablet application downloaded from the Apple App Store, Google Play, or The Windows Store that can be associated with the S-MMS 18 (e.g. by pairing the phone to the S-MMS via Bluetooth or otherwise linking or associating a smart device to the S-MMS), downloaded from a server as described by entering a user name and password and/or other security data, or downloaded otherwise.

The S-MMS settings application 900 may generate one or more questions to a user about, and receive user inputs or other data identifying, the user's sight, hearing, mobility, dexterity, and/or reaction time. Other non-limiting examples of user preference settings that may be configured during initialization via user inputs to the S-MMS settings application 900 include user driving characteristics, S-MMS suspension settings, notification settings, and/or other personal preferences 910. The S-MMS settings application 900 may then transmit data received for the user inputs and other data to the S-MMS controller 110 or remote server 610 for storage, including for storage in a user profile.

Figure 10:
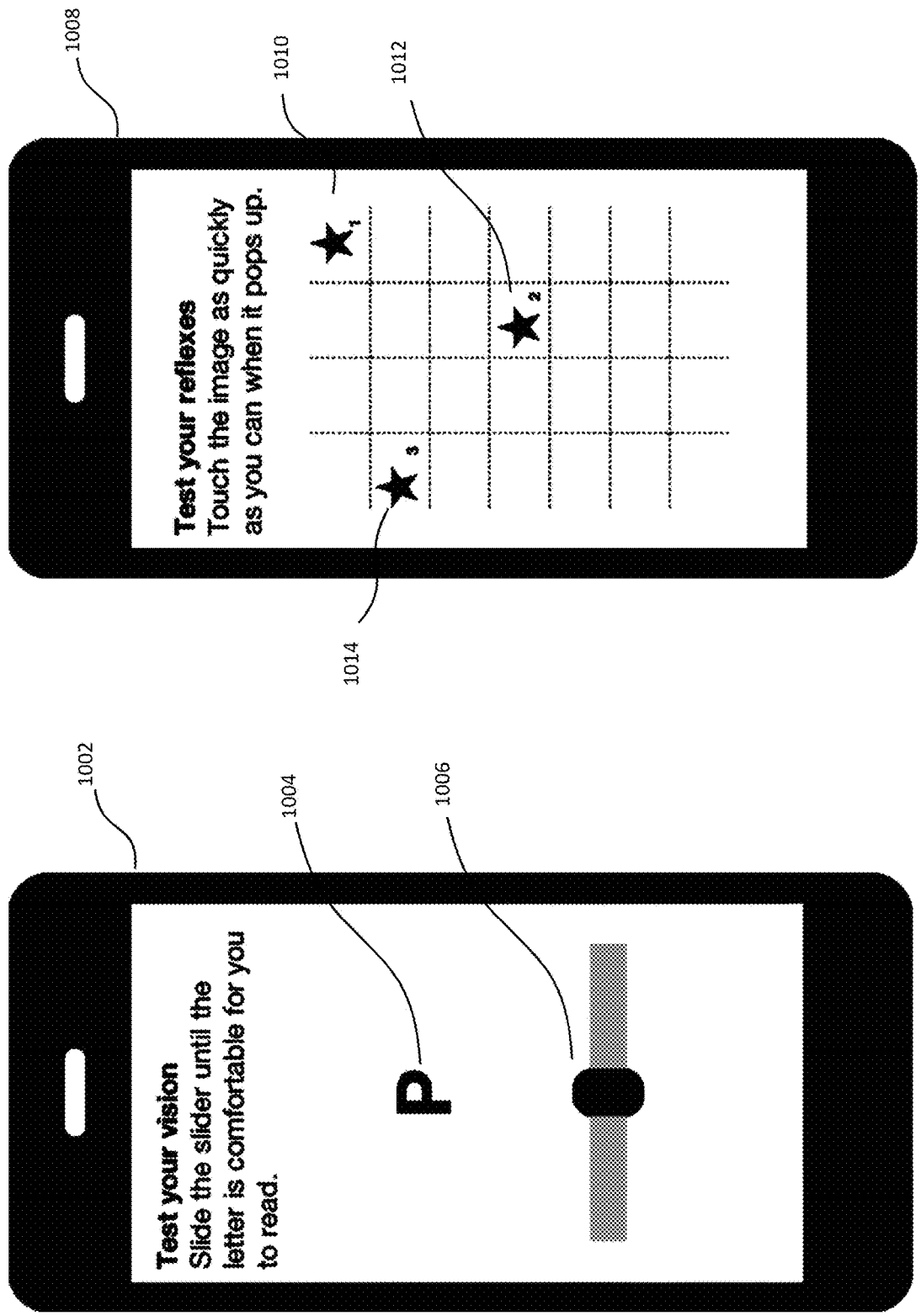
FIG. 10 depicts an embodiment of an application operating on a smart device used to measure capabilities.

In some embodiments, reaction time and/or other capabilities may be measured by having the user play a game on a smart device or blind spots may be measured by having the user watch a smart device as a technician walks around the S-MMS 18. FIG. 10 depicts an embodiment of an application used to measure user capabilities operating on a smart device. In an embodiment, the application is loaded on a smart device 602 associated with the S-MMS 18C (FIG. 6) (e.g. by pairing the phone to the S-MMS via Bluetooth or otherwise linking or associating a smart device to the S-MMS), the user enters security credentials (e.g. user name and password, biometric such as a fingerprint or facial scan, etc.) into the application, and the application, S-MMS 18C, or remote server 610 verifies/authenticates the credentials. Once the user is verified/authenticated, the application is able to access secure memory onboard the smart device 602, the S-MMS 18C, and/or a remote server 610 that contains the unique user profile of that particular user. Through an application user interface 1002, the user may be presented with a sample, script letter 1004 and asked to use a slider 1006 to adjust the size of the script letter until it is comfortable for them to read. This scaler value (e.g. 0-10) may then be associated with the user profile in memory 120 of the S-MMS 18C and used by the S-MMS controller 110 as described below. Additionally or alternatively, the user may be presented with a reflex game 1008. In the game, the user may be prompted to touch an image 1010 that moves around the screen (e.g. 1012 and 1014) in order assess the user's reaction time. The user reaction time may be determined by measuring the time it takes for the user to tap the image 1010 from when the image is first displayed. This data may be added to the user's individual user profile, which may be stored securely in one or more locations locally 120 and/or remotely (e.g. 602 and/or 610) so that it may travel with the user if the user switches to a temporary S-MMS or uses another, compatible S-MMS while traveling.

Some examples of how the user settings data may be used by one or more rules engines in the S-MMS controller 110 include:

a. For users with poor vision or slow reaction times, the S-MMS controller 110 may decrease the maximum allowable top speed of the S-MMS 18 for the user.
b. For a user with slow reaction times, the S-MMS controller 110 may increase the distance that threats are considered relevant and/or begin scaling speed sooner when a threat is detected near the S-MMS 18 to allow adequate time for the user to avoid collisions.
c. For a user with a fused back, who cannot look behind them, the S-MMS controller 110 may increase the sensitivity of the rear facing safety sensors to help compensate for physical limitations.

A Sensor System Embodiment

Figure 11:
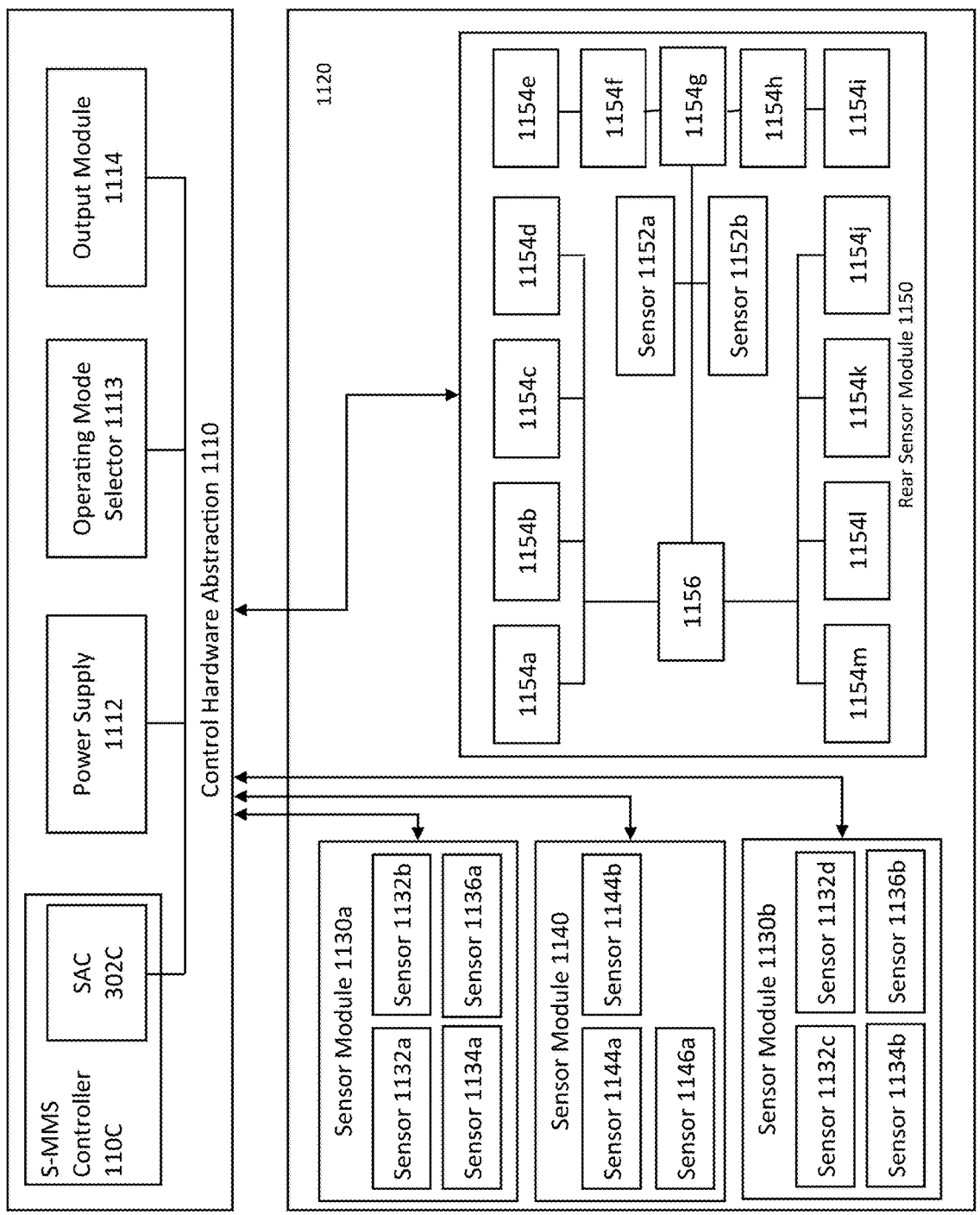
FIG. 11 depicts an exemplary embodiment of the system of FIG. 5 for use with a front-wheel drive powered mobile chair S-MMS.

FIG. 11 illustrates an exemplary physical architecture embodiment of the system depicted in FIG. 5 for use with a front-wheel drive mobile chair S-MMS 18. This example architecture is used to illustrate sensors that may be used to achieve user safety and increase user independence for an S-MMS 18. Sensors include an electronic device that detects or measures a physical property. Sensors may store and/or transmit the detected or measured property or characteristics to another component of the S-MMS 18, such as the S-MMS controller 110C, motor controller 351, HMI 352, or to an authorized third party (e.g. 644 FIG. 6). The sensor layout for each S-MMS 18 may be tuned to fit specific S-MMS capabilities, dynamic behavior, and user requirements and/or preferences.

The example embodiment of FIG. 11 comprises a combined ultrasonic, IMU, and LIDAR sensing system 1120. With reference to FIGS. 5 and 11, the LIDAR and ultrasonic sensors may provide non-contact sensor reports 372 to the S-MMS controller 110B or 110C for use by the SAC 302B or 302C. Additionally or alternatively, the IMU may provide GPS and inertial manager 376 data to the S-MMS controller 110B or 110C which may be used by navigation 363 and the SAC 302B or 302C. In some embodiments, each of the control hardware 1110 and the sensor modules 1130*a*, 1130*b*, 1140, and 1150 may be coupled to, or otherwise associated with, an S-MMS 18.

Referring to FIG. 11, the control hardware 1110 comprises one or more of an S-MMS controller 110C, a power supply 1112, an operating mode selector 1113, and an output module 1114. The S-MMS controller 110C operates the SAC 302C. Items such as the operating system, drivers, communication services, and sensor taskers may be included as part of the control hardware 1110 and/or the S-MMS controller 110C. One or more of the S-MMS controller 110C, the power supply 1112, the operating mode selector 1113, and the output module 1114 may be coupled to a conductive bus, in some embodiments. One or more of the S-MMS controller 110C, the power supply 1112, the operating mode selector 1113, and the output module 1114 may be coupled to one or more elements of the sensor system 1120 via one or more wireless communication protocols and devices, such as Bluetooth, Bluetooth Low Energy, ZigBee, cellular, and/or other wireless protocols and devices. In some embodiments, one or more of the S-MMS controller 110C, the operating mode selector 1113, and the output module 1114 may be implemented using a single processor or logic module and/or circuitry, or may be implemented by a plurality of processing or logic modules and/or circuitry. Further, one or more logic modules, and at least a portion of operations associated therewith, may be hosted either locally on or remotely to the control hardware 1110. In some embodiments, a portion of, or all, operations may be performed in a remote or distributed manner.

The power supply 1112 receives input power from an external source (e.g., from an external alternating current (AC) or direct current (DC) power source) and/or from an internal source (e.g. a battery). The power supply 1112 provides operating power for one or more of the control hardware 1110, the rear sensor module 1150, the front right and left sensor modules 1130*a,b*, and the front middle sensor module 1140. In some embodiments, the power supply 1112 may be configured to receive input power from another power supply of the S-MMS 18 and to provide operating power to one or more components of the S-MMS.

The operating mode selector 1113 provides a manual and/or automated means to control operation of one or more components or operations of the system 1100. In some embodiments, the operating mode selector 1113 is an on/off switch configured to permit manual activation and deactivation of one or more components of the system 1100, including activation and deactivation of the S-MMS 18. In another embodiment, the operating mode selector 1113 is a button or input location on a smart device communicatively coupled to the S-MMS 18.

The output module 1114 includes one or more tactile, audio, and/or visual output devices configured to convey one or more alarms, alerts, and/or notifications relating to the SAC 302C or otherwise for the S-MMS 18. The output module may be directly incorporated into an HMI 352 (FIG. 3), be deployed as a standalone system, and/or integrated using a smart device associated with the S-MMS 18 (e.g. 602). In some embodiments, the output module 1114 comprises an audio speaker configured to provide an output corresponding to a warning notification to a user. The output module 1114 may be further configured to provide an output notification to a caregiver or third party of a tip warning or other alarm condition. For example, in some embodiments, the output module 1114 includes an audio speaker configured to provide an audible warning of a current or anticipated tipping condition of the S-MMS 18, and may be further configured to provide an audible alarm and/or electronic notification to the caregiver or third party or device and/or account associated with the caregiver or third party in the event that the S-MMS 18 tips over or is near tipping.

The sensing system 1120 embodiment depicted in FIG. 11 includes a front right sensor module 1130*a*, a front left sensor module 1130*b*, a front middle sensor module 1140, and a rear sensor module 1150. The rear sensor module 1150 may include one or more collision avoidance sensors 1154*a*-1154*m*, one or more ground monitoring sensors 1152*a,b*, and/or one or more orientation sensors (such as an IMU) 1156. The front right sensor module 1130*a* may include one or more ground monitoring sensors 1132*a,b*, one or more collision avoidance sensors 1134*a,b*, and/or one or more orientation sensors 1136*a* (e.g. IMUs). The front left sensor module 1130*b* is a mirror of the front right sensor module 1130*a*. The front middle sensor module 1140 may include one or more collision avoidance sensors 1144*a-b* and/or one or more orientation sensors 1146*a* (e.g. IMUs). The S-MMS controller 110B receives one or more signals with sensor data from the sensors in the front right sensor module 1130*a*, the front left sensor module 1130*b*, the front middle sensor module 1140, and the rear sensor module 1150 and/or transmit one or more signals to the sensor modules and/or individual sensors requesting sensor data and/or configuring the one or more sensors. As previously disclosed, these sensor reports (371-376) may be received via an arbitration IAM 370.

One or more of the sensor modules 1130a, 1130b, 1140 and/or 1150 in the sensing system 1120, or one or more individual sensors in the sensor modules, may be configured to convey data, a notice, a request, or another signal via a wired or wireless communication protocol or device. In some embodiments, the control hardware 1110 conveys data associated with the S-MMS 18 (e.g. sensor data from one or more sensors) via a wireless communications protocol and/or medium, such as a Wi-Fi connection via a Wi-Fi module, a Bluetooth connection via a Bluetooth module, a telecommunications data connection via a telecommunications protocol such as 3G, 4G, or 5G using a telecommunications module, or another wireless communication protocol, wherein one or more wireless transceivers are directed by a communication controller that is included in each of one or more sensor modules.

One or more of the front right sensor module 1130a, front left sensor module 1130b, front middle sensor module 1140, and rear sensor module 1150 may be directly communicatively coupled to the control hardware 1110 (e.g. the S-MMS controller 110C) to transmit and receive one or more signals/communications to the SAC 302C. Although not depicted in FIG. 11, any one or more of the individual sensor modules in the sensing system 1120 may be communicatively coupled to any one of the other individual sensor modules, including the front right sensor module 1130a, front left sensor module 1130b, front middle sensor module 1140, and rear sensor module 1150. Additional sensor modules (not depicted) may be included in the sensing system 1120 in some embodiments.

Two or more of the collision avoidance sensors 1154a-m, 1134a-b, 1144a-b, the ground monitoring sensors 1132a-d, 1152a-b, and the orientation sensors (e.g. IMUs 1136a-b, 1146a, 1156) of the sensor modules in the sensing system 1120 depicted in FIG. 11 may be communicatively coupled via one or more conductive buses or wired or wireless communication mediums in an embodiment. Although illustrated and described as all being within specific sensor modules 1130a, 1130b, 1140, or 1150, one or more components of the rear sensor module 1150 may be located external and/or remote to the rear sensor module 1150 (e.g., in a remote or distributed configuration). Similarly, one or more sensors or other components of the front right sensor module 1130a, front left sensor module 1130b, and/or front middle sensor module 1140 may be located external and/or remote to the respective sensor modules (e.g., in a remote or distributed configuration). Although labeled as sensor modules associated with specific portions of a mobile chair S-MMS 18, all or a part of the rear sensor module 1150 is not required to be physically or logically at or associated with a rear portion of the S-MMS 18. Similarly, all or a part of the front sensor modules 1130a, 1130b, and 1140 is not required to be physically or logically at or associated with a front portion of the S-MMS 18. For example, one or more sensors of the sensor modules 1130a, 1130b, 1140, and/or 1150 may be physically located at a side of the S-MMS 18 in one example.

The sensing system 1120, in some embodiments, may be customized per the preferences and/or requirements of individual users. The disclosed systems are intended to increase the security and independence of S-MMS 18 users. As a non-limiting example, an individual with a visual impairment may need a system that fully covers the surroundings and watches for collisions in all directions. Alternatively, a user that has good eyesight but has a back with one or more fused vertebrate, so that they cannot turn around, may want a system that only covers the rear of the S-MMS 18. In either case, the disclosed system allows tuning of coverage zones and system capabilities by omitting or adding sensors as required for a given user or S-MMS configuration.

Figure 12A:
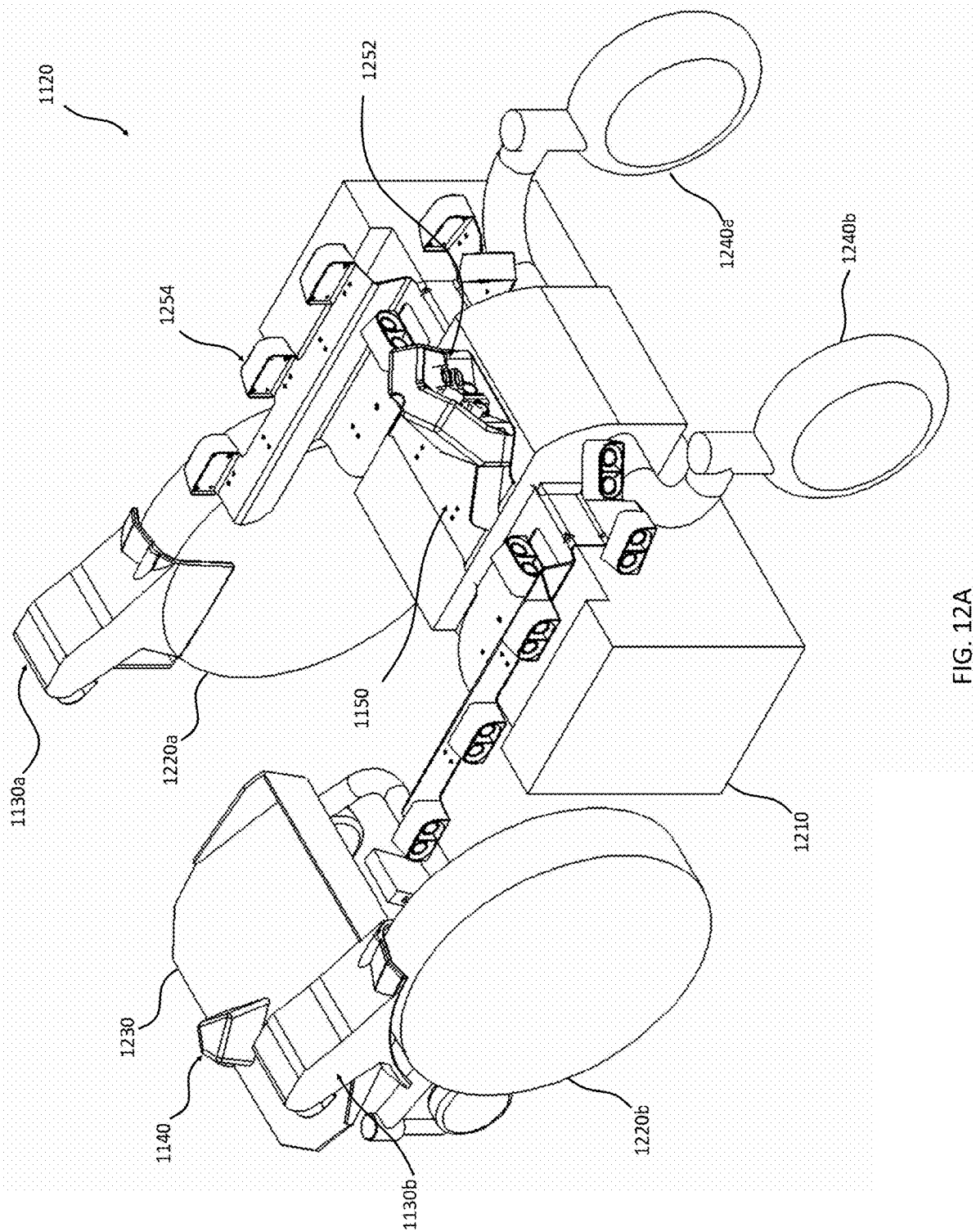
FIG. 12A is a rear isometric view depicting an example embodiment of sensor placement on a front wheel drive mobile chair S-MMS.
Figure 12B:
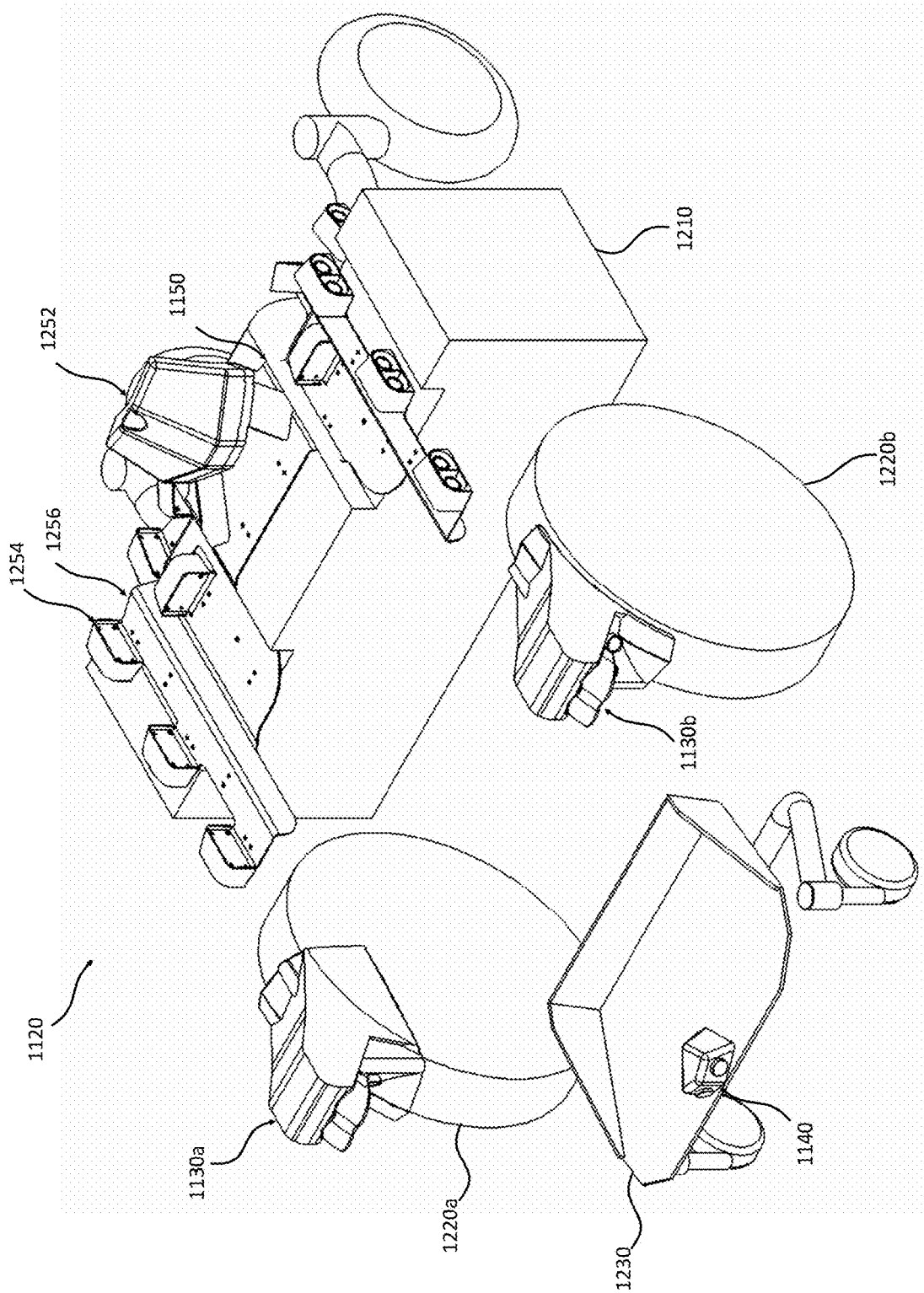
FIG. 12B is a front isometric view depicting an example embodiment of sensor placement on a front wheel drive mobile chair S-MMS.

FIGS. 12A and 12B illustrate an embodiment of a physical implementation of a sensing system 1120 on an exemplary front-wheel drive mobile chair S-MMS 18. Collision avoidance sensors are positioned to provide a clear view of the surroundings. The relationship between the ground monitoring sensors and the ground is important in this embodiment. Therefore, sensor modules may be associated with four depicted frames of reference on the S-MMS 18 (S-MMS reference bodies) namely, the mobile chair chassis 1210, the independently suspended wheel assembles 1220a, b, and the seating assembly foot plate 1230. In this embodiment, the rear sensor module 1150 is mounted to the main mobile chair chassis 1210, the front right and front left sensor modules 1130a,b are mounted to the independently suspended wheel assemblies 1220a,b, and the front middle sensor module 1140 is mounted to the seating assembly foot plate 1230 of the mobile chair S-MMS 18. Each of the four S-MMS 18 reference bodies 1210, 1220a, 1220b, 1230 is capable of moving independently of the others based on the physical characteristics of the S-MMS 18 suspension and seating system. The motion of the independent S-MMS reference bodies 1210, 1220a, 1220b, 1230 may be tracked by an orientation sensor in each sensor module (for example sensor 1136a in front sensor module 1130a). Additionally or alternatively, an S-MMS controller 110 may have orientation data available directly from one or more application processors 210 (FIG. 2) onboard the S-MMS 18 in some embodiments.

In some embodiments, the S-MMS controller 110C or one of its processes (e.g. SAC 302C) may choose to use one or more specific sensor reports based on the orientation of the measured orientation of a sensor module. As an example, consider if the foot plate 1230 of the seating assembly were oriented at 90-degrees from its current orientation in FIG. 12A. In that case, the sensor reports from sensor module 1140 may not be relevant to forward-looking collision avoidance. In this example, the SAC 302C may choose to ignore sensor reports from sensors 1144a-b based on the orientation data received from sensor 1146a of the front, middle sensor module 1140. In an embodiment, a rules engine on the S-MMS controller 110C and/or arbitration IAM 370 may be programed to automatically filter out this data. In this way, S-MMS controller 110C behaviors may be triggered by reported changes in orientation to one or more sensor orientations.

In an embodiment, an IMU 1156 is coupled to the rear sensor assembly 1150, which is mounted to the main mobile chair chassis 1210. In an example, one IMU 1156 is sufficient to monitor overall S-MMS 18 orientation. However, ground monitoring and system situational awareness is enhanced by adding additional IMUs (e,g. sensors 1136a, 1136b, and 1146a) to the front sensor modules 1130a, 1130b, 1140 to provide absolute orientation of the sensor modules relative to one another and relative to the ground plane.

In an embodiment of a rear sensor assembly 1150, the assembly includes one or more sensors or sensor assemblies 1252, 1254 optionally mounted on a mounting bracket 1256. In some embodiments, one or more sensors 1252, 1254 may be coupled to a mounting bracket 1256 at corresponding mounting positions. Although described with reference to a mounting bracket 1256, one or more sensors may be coupled directly to an S-MMS 18 without the use of a mounting bracket, may be manufactured as part of an S-MMS 18, or may be retrofit to an existing S-MMS 18, without departing from the spirit and the scope of the present disclosure. Further, a size and/or shape of the mounting bracket 1256 may vary based at least in part upon a particular S-MMS 18 specification or may be provided as a generic bracket configured for use in a plurality of designs or configurations.

In some embodiments, one or more of the sensor modules (1130a, 1130b, 1140 and 1150) may each contain one or more sensing units or assemblies included therein or associated therewith. For example, each of the sensor modules 1130a, 1130b, 1140, and/or 1150 may include one or more sensing units included therein or coupled thereto. Similarly, the sensor modules may include one or more sensing units included therein or coupled thereto to sense orientation (e.g. 1136a, 1136b, 1146a, and 1156 FIG. 11). In the depicted embodiment, the rear sensor module 1150 is comprised of a main rear sensor assembly 1252 and multiple individual sensor assemblies 1254.

Figure 13:
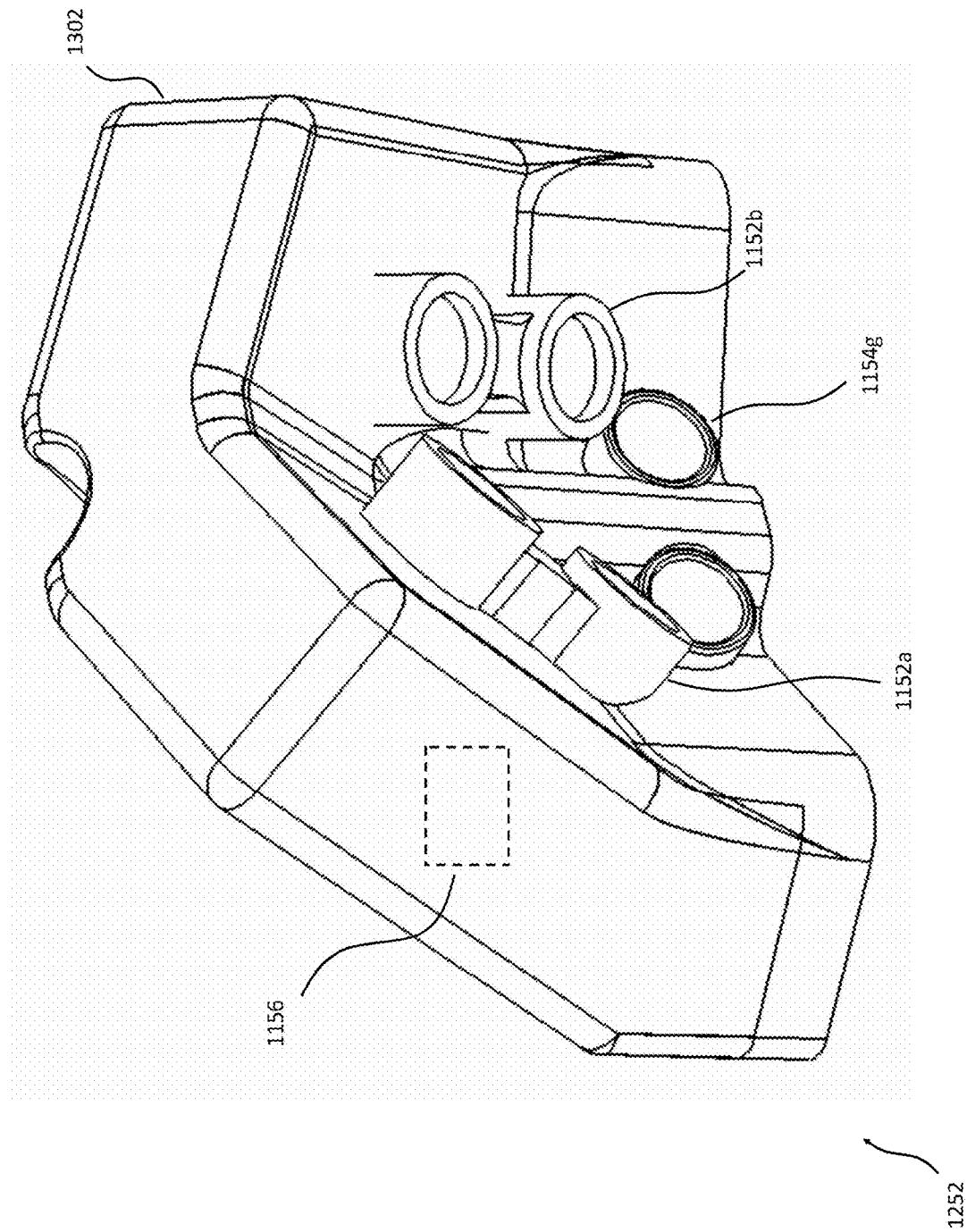
FIG. 13 illustrates an embodiment of a rear sensor housing.

FIG. 13 depicts an embodiment of a main rear sensor assembly 1252. The assembly 1252 includes two LIDAR sensors 1152a,b, one or more IMUs 1156, and/or one or more ultrasonic sensors 1154g. Each of the two LIDAR sensors 1152a,b, one or more IMUs 1156, and/or one or more ultrasonic sensors 1154g may be communicatively coupled to the S-MMS controller 110 via a wired or wireless connection.

In the depicted embodiment, for illustrative description, the IMU 1156 is positioned inside the housing 1302, but other positioning options for the IMU 1156 are possible. In some embodiments, additional sensors, cameras, and/or operating lights or indicators may be incorporated with the main rear sensor assembly 1252. The LIDAR sensing sensors 1152a,b may be configured to sense a distance between the sensor and one or more objects or surfaces within the field of vision (also referred to herein as a field of detection or sensing field) of that sensor module. For example, one or more Garmin Lidar Lite sensor units may be positioned so that each takes a reading of a distance from the sensor unit to the ground proximate to the S-MMS 18. Additionally or alternatively, one or more of the rear sensor assembly 1252 may use an ultrasonic sensor, infrared sensor, distance camera, and/or another sensor capable of determining a distance between the sensor and the ground. Some embodiments may include the rear sensor module 1252 implemented with an optical sensor, without departing from the spirit and the scope of the present disclosure.

One or more of the sensor assemblies 1254 of the rear sensor module 1150 may contain an ultrasonic sensor configured to measure a distance between the sensor 1254 and one or more objects within the sensing field of the sensor 1254. In some embodiments, one or more of the sensors 1254 are implemented as an ultrasonic sensor and one or more other sensors 1254 are implemented as a RADAR or infrared sensor, without departing from the spirit and the scope of the present disclosure. Placement of one or more sensors 1254 may be configured such that one or more areas of overlap exist in the sensing fields of two or more sensors 1254. The placement of one or more sensors 1254 may be configured such that a contiguous sensing field exists between two or more sensors 1254.

Figure 14:
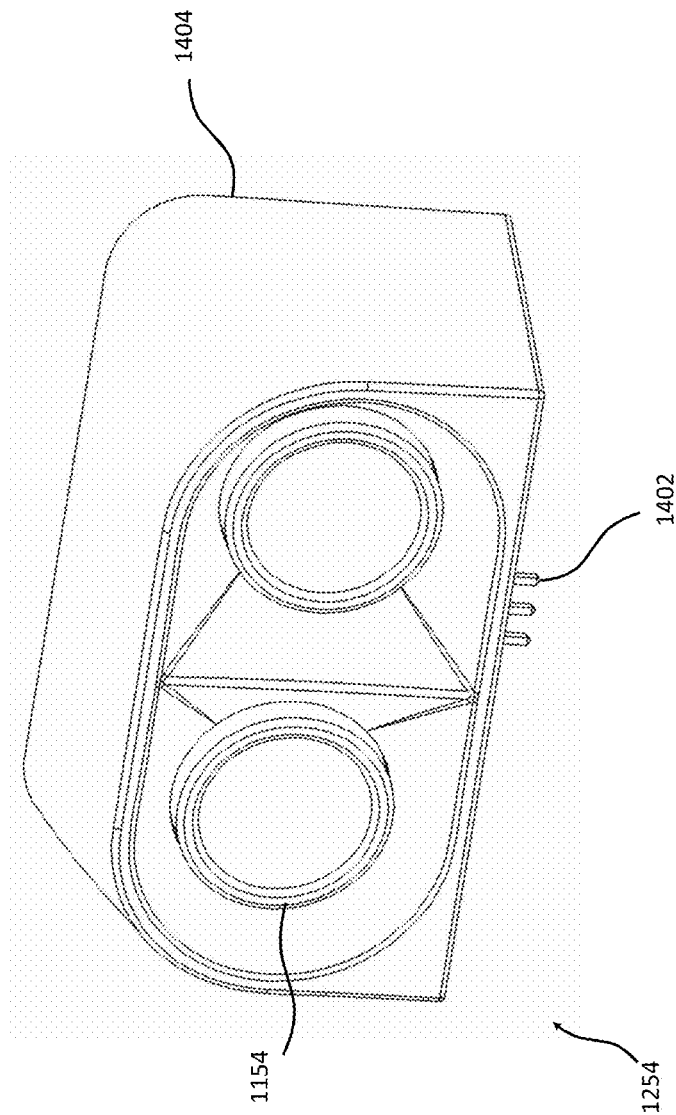
FIG. 14 illustrates an embodiment of an ultrasonic sensor for use in a sensor array.

FIG. 14 illustrates an embodiment of a sensor assembly 1254 for use in a sensor array. The sensor assembly 1254 may be used as a sensor in the sensor array 1150 as previously described with reference to FIG. 11 and FIG. 12. In one example, one or more of the sensors 1154 may be a Parallax Ping Ultrasonic Distance Sensor. Additionally or alternatively, one or more of the sensors 1154 may be an optical sensor or another sensor capable of determining a distance between the sensor 1154 and an object, plane, or surface.

The ultrasonic sensor assembly 1254 is comprised of one or more ultrasonic sensors 1154 and has a connector 1402 and a housing 1404. Each of the one or more ultrasonic sensors 1154 may be communicatively coupled to the S-MMS controller 110 via a wired or wireless connection. The connector 1402 may be configured to communicatively couple to one or more circuits or conductive buses, which for example may be coupled to the S-MMS controller 110. In some embodiments, the connector 1402 may be configured to receive operating commands and/or power and transmit one or more sensor signals. Additionally or alternatively, the ultrasonic sensor 1154 may be configured to transmit and/or receive one or more signals via a wired or wireless communication medium using a communications module associated with the ultrasonic sensor 1154 (e.g., either as an element of the ultrasonic sensor, coupled to the ultrasonic sensor, external to the ultrasonic sensor, or a combination thereof).

Figure 15:
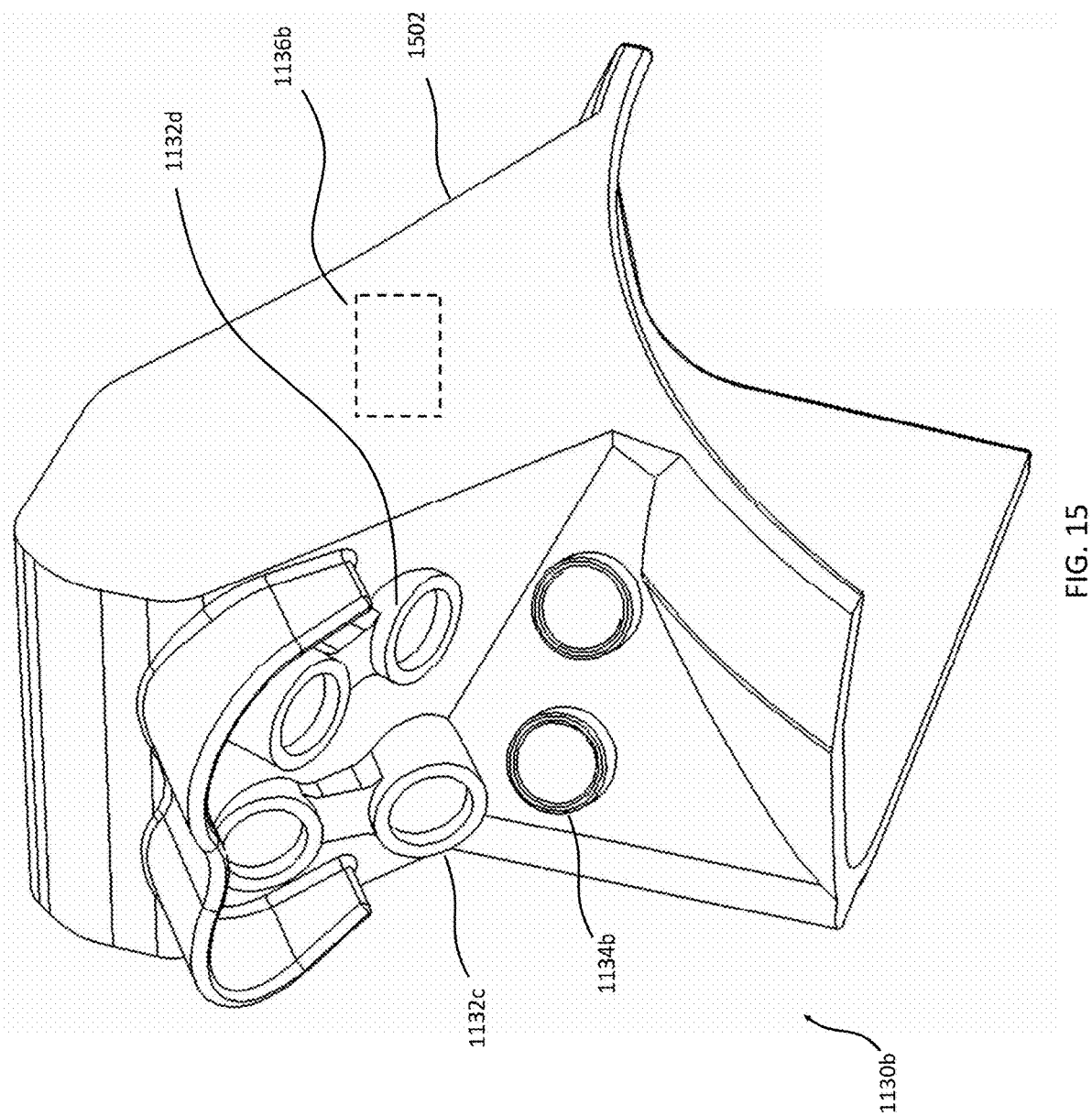
FIG. 15 illustrates an embodiment of a front left sensor housing.

FIG. 15 depicts an embodiment of a front left sensor assembly 1130b. In this embodiment, the front left sensor housing 1502 includes one or more LIDAR units 1132c,d and may include an IMU 1136b and/or an ultrasonic sensor 1134b. In alternative embodiments, additional sensors, cameras, and or operating lights or indicators may be incorporated in the front left sensor assembly 1130b. Each of the front sensors 1132c,d may be communicatively coupled to the S-MMS controller 110 via a wired or wireless connection.

In a continued discussion of alternative embodiments, LIDAR sensors offer numerous advantages over other sensors for use with ground monitoring. For example, LIDAR sensors are capable of rapidly measuring accurate distances to objects or surfaces of various types. However, one disadvantage of a LIDAR sensor is that the sensor, depending on operating frequency and angle of attack, may have trouble reading accurate distances to reflective objects (e.g. puddles or highly polished surfaces) and will not detect objects that are optically clear at the sensor operating frequency. Modulation of LIDAR operating frequency during operation can minimize some of these negative effects. For this reason, some embodiments may pair a second, complementary type of sensor, such as radar, with the LIDAR ground monitoring sensor(s).

The disclosed sensors (e.g. FIG. 11 through FIG. 15) may be configured to capture sensor data for readings (e.g. measurements), such as a distance to an object or orientation, and transmit the sensor data from one or more sensor processors 214 or communications processors 216 onboard the sensor and/or sensor assemblies to the S-MMS controller 110, such as for use by navigation 363 and/or the SAC 302 (FIG. 3). A sensor may be further configured to receive one or more sensor usage commands from the S-MMS controller 110B and operate at least in part in accordance with the one or more sensor usage commands. For example, during operation, an ultrasonic sensor 1154 may be configured to receive a command from the S-MMS controller 110 to perform a distance measurement. Responsive to the received command, the ultrasonic sensor 1154 may be configured to perform the distance measurement and transmit sensor data of or identifying the distance measurement to the S-MMS controller 110. The SAC 302 may then process the received sensor data of or identifying the distance measurement. Additionally or alternatively, a sensor may be configured to perform one or more processing operations on the sensor data prior to transmitting the sensor data or a processed representation or subset thereof to the S-MMS controller 110. In some embodiments, one or more of the sensor and the SAC 302, either alone or in combination, may be configured to process raw sensor data and to determine a distance of one or more objects, planes, or surfaces relative to the sensor via the processed raw sensor data. Each sensor may transmit sensor data for multiple distance measurements and/or repeated distance measurements. The S-MMS controller 110 and SAC 302 may process or otherwise use some, all, or none of that sensor data.

A Safety Manager Embodiment

Referring to FIG. 6 and FIG. 5, the safety manager 550 communicates with sub-processes that monitor S-MMS 18 states relative to tipping (basic stability manager 520) and collision (collision monitor 530). Safety manager 550 includes a rules engine which uses inputs from one or more of a basic stability manager 520, collision monitor 530, and/or communications manager 510 to maintain a master list of known objects, planes, surfaces, and conditions (e.g. such as ground profiles) in relation to the S-MMS 18. The safety manager 550 combines one or more inputs in order to determine where the S-MMS 18 may safely drive and the current status of the S-MMS 18. Additionally or alternatively, the safety manager 550 may include a sensor tasker which may change one or more sensor update rates for possible unsafe conditions (e.g. such as collisions and/or tipping danger). The safety manager 550 may modify or override user inputs from the HMI 352 before they are communicated to the motor controller 351. It may independently send commands to one or more of the HMI 352 and the motor controller 351.

In some embodiments, a user of an S-MMS 18 may be provided with an override button configured to override one or more operations or decisions of the safety manager 550. The override button may be a physical switch or button or may be displayed on an HMI 352 of the S-MMS 18 and/or on a connected device (e.g. 602 FIG. 6). Additionally or alternatively, a caregiver input may be provided on the S-MMS 18 which enables a caregiver to override one or more safety systems of the S-MMS controller 110 and/or a safety process output of the safety manager 550.

Figure 16:
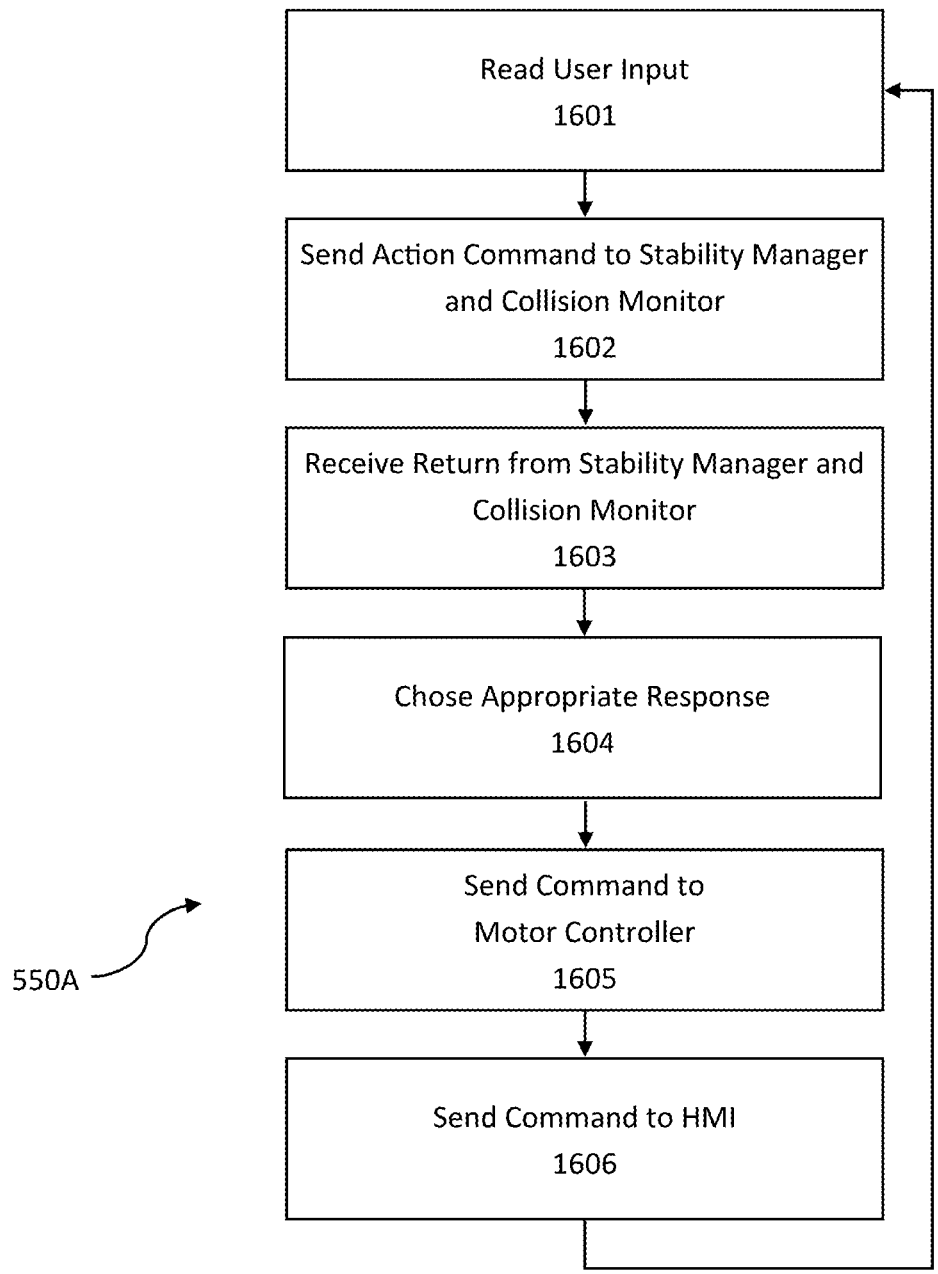
FIG. 16 is a flowchart depicting an embodiment of the logic employed by a safety manager process of a situational awareness controller.

FIG. 16 illustrates logic employed by an exemplary embodiment of an safety manager 550A of the situational awareness controller 302B (FIG. 5). The safety manager 550A begins by reading one or more user inputs to the S-MMS at 1601. These inputs may include data related to the desired direction of travel, velocity, and/or user settings, such as accessory status or seat position.

As a non-limiting example, inputs may be received from an HMI 352, such as a joystick, as two values between 0 and 255. One of the values represents left/right user input, and the other value represents forward/backward user input. A left/right signal of 0 represents full left, a left/right signal of 255 represents full right, and a left/right signal of 127 represents neutral (no user input). Values between these extremes represent a percentage of the input direction. Similar logic may be employed for forward/backward input where a first value corresponds to full forward, a second value corresponds to full backward, a third value correspondences to neutral, a fourth value between neutral and full forward corresponds to a proportional or percentage forward speed, and a fifth value between neutral and full backward corresponds to a proportional or percentage backward speed. This allows both desired direction and velocity on a 2D plane to be communicated succinctly.

In another embodiment, as an example of an additional input, a binary signal may also be received from a seat sensor (e.g. weight sensor) regarding whether the seat position has deviated significantly from a nominal position. When the safety manager 550A receives a signal indicating the seat position has deviated significantly enough from a nominal position, the safety manager 550A may not allow movement of the S-MMS 18 regardless of input from the HMI 352. A more advanced S-MMS 18 may provide information to the SAC 302 including, but not limited to, detailed seat position settings currently in use by the user and/or performance mode settings input by the user that may be used for active stability management as disclosed below.

One or more action commands may be sent from the safety manager 550A to the stability manager 520 and/or collision monitor 530 at 1602. These commands may trigger an analysis of sensor data from one or more sensor readings by the stability manager 520 and collision monitor 530, respectively. Optionally, the one or more commands may cause the stability manager 520 and/or collision monitor 530 to request sensor data from one or more sensors. The action commands are based on user input and include user input information, in some embodiments. As a non-limiting example, if the user has indicated they wish to travel directly forward at a moderate speed, then the safety manager 550A may indicate to the stability manager 520 (FIG. 5) and collision monitor 530 to analyze sensor data relevant to the forward direction and for a distance corresponding to a moderate rate of speed.

An exemplary embodiment of an action command may look like [dir]:[velocity]:[modifier] where [dir] is a number that represents the direction of travel indicated by the user, [velocity] is a value that indicates the desired speed based on user input, and [modifier] is an optional value that indicates a system threat level. In response to the received action command, the stability manager 520 and collision monitor 530 analyze sensor data received from one or more sensors and determine, based on the received action command if a warning condition exists. For example, the collision manager 530 may determine, based on sensor data it receives and calculations disclosed below, if a collision condition with an object is possible, likely, imminent, or not an issue and transmits a return signal to the safety manager 550 indicating the determined condition and/or other status. Similarly, the stability manager 520 may determine, based on the sensor data it receives and calculations disclosed below, if a tipping condition is possible, likely, imminent, or not an issue and transmits a return signal to the safety manager 550 with the determined condition and/or other status. Detailed descriptions of embodiments of the basic stability manager 520 and collision monitor 530 processes are included below and illustrated in FIGS. 19 and 42 respectively.

At step 1603, the safety manager 550A receives return signals from the stability manager 520 and/or collision monitor 530 and determines the condition and/or other status identified in each signal (e.g. lack of stability or collision is possible, likely, imminent or not an issue). Based on the conditions and/or other status identified in the return signals, the safety manager 550A chooses one or more appropriate responses at step 1604 (e.g. allow or not allow the S-MMS 18 to move in a particularly direction). Additionally or alternately, the stability manger 520 and collision monitor 530 may include threat assessments and motion restriction data in the return signals provided to safety manager 550A based on threat assessment and motion restrictions they determine. Other data may be included.

The safety manager 550A then determines the appropriate response at step 1604 based on the data in the return signal in this example. As a non-limiting example, the stability manager 520 and/or collision monitor 530 may transmit return signals in the form of [threat]:[velocity]:[modifier] with each bracket indicating a value. The [threat] signal provided to the safety manager 550A may include one or more predetermined state values for a status. These values assist the safety manager 550A in quickly prioritizing information and selecting states. For example, the status identified in the return signal may correspond to one or more of the following statuses during operation:

State 0—All OK—no need to interfere with user inputs and/or system functions.

State 16—Warning—sensor data indicates approaching unsafe levels, certain directions of travel and/or select system functions may need to be limited, slowed, and/or activated.

State 32—Stop—sensor data indicates unsafe condition in a given direction, and that direction of travel should be blocked and/or select system functions should be limited and/or activated.

State 64—Get Help—sensor data indicates extremely unsafe condition, and all directions of travel should be blocked and/or select system functions should be limited and/or activated.

State 128—Panic—sensor data outside of normally expected values, and all directions of travel and/or select system functions should be blocked and help should be alerted.

The above list of threat states for a status is merely intended to be exemplary, and a greater or lesser number of states or different states or other or different statuses may be determined or predetermined.

The [velocity] value indicates the allowable velocity for the S-MMS 18 based on current sensor data. This value may simply be a velocity cap (e.g. not to exceed X value) or it may be a scaling percentage value used to linearly or non-linearly modify user input target velocities to safe levels based on the sensor data and optionally on one or more levels present in the stability manager 520 or collision monitor 530, respectively. As a non-limiting example, the [velocity] value may be a number between 0 and 100 that represents the percent of the user input target velocity that should be used. For example, if the user indicated full forward, which was read as 255, then a [velocity] value in the return signal of 100 would indicate that it is acceptable to travel forward at maximum velocity. A [velocity] value of 50 in the return signal from either the collision monitor 530 or the stability manager 520 would indicate that it was only safe to travel forward at half the users' desired velocity based on the findings of the collision monitor or stability manager, respectively.

The [modifier] value may be used to communicate exceptions to the safety manager 550A or other critical information. As a non-limiting example, the [modifier] value may simply be a binary 0 or 1 where a 1 indicates there was a process exception and a 0 indicates there were no process exceptions. A process exception is an anomalous or exceptional condition requiring special processing, often changing the normal flow of program execution.

Returning to step 1604, as return signals are received by the safety manager 550A from the stability manager 520 and the collision monitor 530, the safety manager 550A chooses an appropriate response 1604 to the available data. In order to maintain safety, the first rule in some embodiments is to act first on the most severe threat status that is received. As an example, if the collision monitor status from the collision monitor return signal for rearward travel has a threat status of warning [16] but the stability manager status from the stability manager return signal for rearward travel has a threat status value of stop [32], the system will act on the more severe stop [32] threat. This rule may be violated under certain circumstances, such as if a modifier message has been received indicating low confidence in a given status identified on a return signal.

Similar logic is employed for prioritization of velocity messages. If multiple warning [16] commands are received with different velocity values, then the most limiting velocity value is selected, in some embodiments. As an example, if the collision monitor status from the collision monitor return signal for rearward travel has a maximum velocity allowable of [50] (e.g. 50% of maximum), but the stability manager status from the stability manager return signal for rearward travel a maximum velocity allowable of [100], the system will act on the more limiting velocity limit of [50]. This rule may be violated under certain circumstances, such as if a modifier message has been received indicating low confidence in a given status identified on a return signal.

Via this process, status and data from individual return signals from the stability manager 520 and the collision monitor 530 are processed by the safety manager 550A to create a single, actionable command to be issued by the safety manager 550A. At steps 1605 and 1606, the rules-based decisions on acceptable S-MMS 18 actions made by the safety manager 550A are sent as commands. In one embodiment, the S-MMS controller 110B may be configured to monitor and/or manipulate one or more operations of the S-MMS 18 responsive to one or more signals from one or more of the safety manager 550 and the communications manager 510. The S-MMS controller 110B may implement commands received from the safety manager 550A by sending one or more signals to one or more of a motor controller 351 and HMI 352.

At step 1605, the safety manager 550A transmits a command via the S-MMS controller 110B for one or more motor controllers 351 on the S-MMS 18. In one embodiment, the motor controller 351 is configured to control the drive motors on the S-MMS 18. Additionally or alternatively, a motor controller 351 may be configured to control actuators associated with the seating system or other actuated ancillary devices on the S-MMS 18. For example, in one embodiment when an alarm or hazard condition is determined by the safety manager 550A, it may generate a command that causes one or more operations of the S-MMS 18 motor controller 351 to be limited, stopped, or engaged. The one or more manipulated operations may include, for example, causing the S-MMS 18 to decrease speed while approaching a detected condition, preventing the S-MMS 18 from moving in a particular direction, modifying a characteristic of the S-MMS 18, or implementing or modifying any other operation capable of being performed by the S-MMS 18.

At step 1606, the safety manager 550A transmits a command via the S-MMS controller 110B to the HMI 352 on the S-MMS 18. The HMI 352 may comprise one or more HMI processors 208. In one embodiment, the HMI 352 may include a display and user input device such as a joystick on the S-MMS 18. The safety manager 550A may send a command which causes the manipulation of one or more operations of the HMI 352. For example, in one embodiment the command to HMI 1606 is transmitted by the S-MMS controller 110B to the HMI 352 and provides user feedback according to one or more detected conditions associated with the stability manager 520 and/or collision monitor 530 (e.g., a detected tilt condition, collision condition, or drop/step condition). The manipulated operations on the HMI 352 may include, for example, audio warnings, visual warnings, haptic feedback, and/or warnings sent to outside systems, devices, and/or caregivers.

While the safety manager 550A is described above as primarily linear for clarity, operations described above may be executed in an asynchronous or parallel manner.

Stability Manager Overview

Tipping is a major issue for MMSs such as mobile chairs. Studies of mobile chair related injuries show that tips and falls account for over half of all wheelchair related injuries in the US. The majority of these injuries occur due to uneven terrain, like curbs, ramps, stairs, and other ground features. Some studies have put these numbers as high as 75-80% of all wheelchair related injuries. Tips and falls can cause severe injuries, including broken bones, concussions, and traumatic brain injuries. And yet, when suggesting and developing solutions to address the challenge of tipping, the prevailing wisdom has been to improve the chassis or suspension of MMSs rather than looking at sensor or control system improvements.

Figure 17:
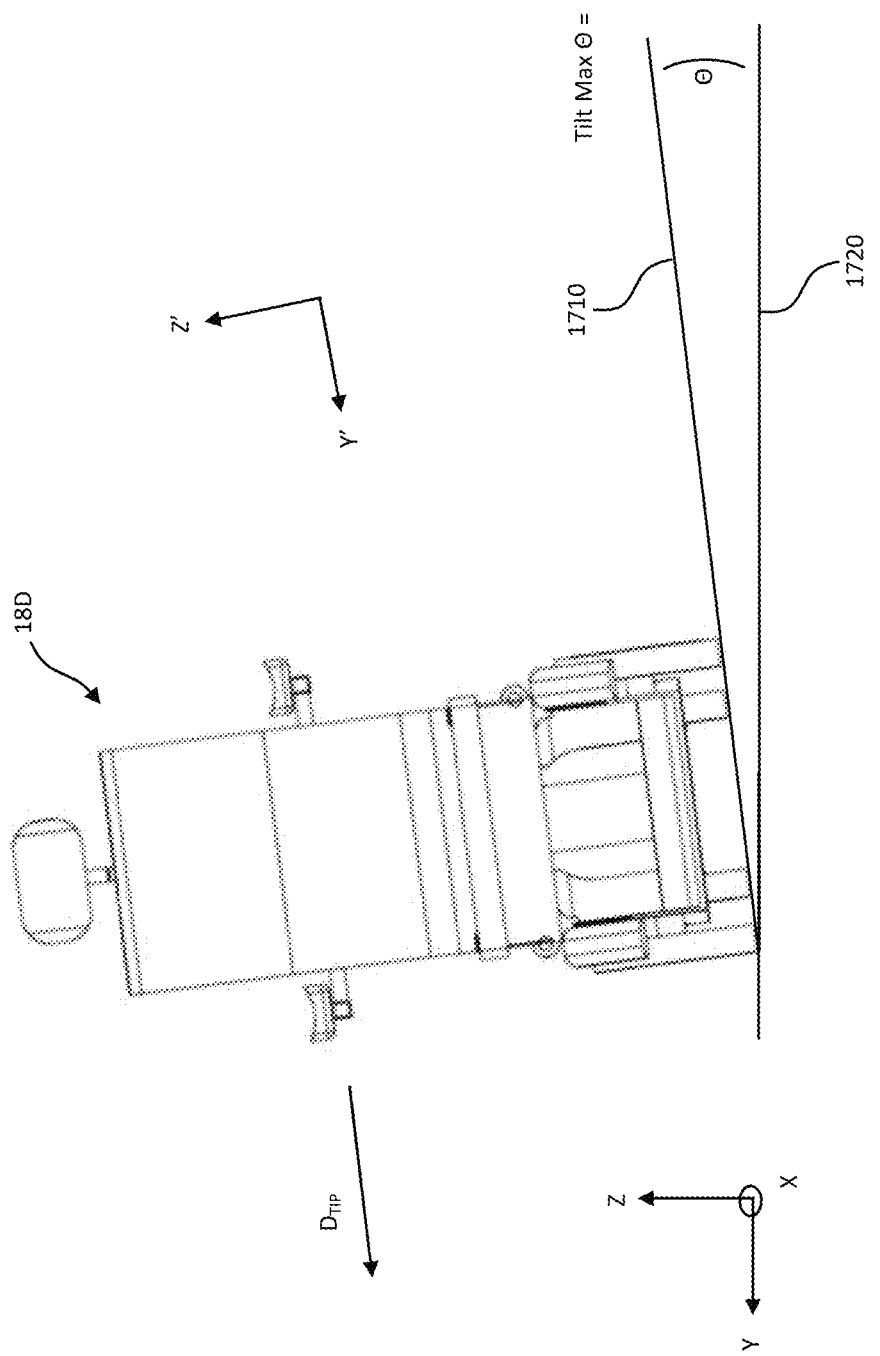
FIG. 17 illustrates an S-MMS tipping condition.

FIG. 17 illustrates a typical tipping condition for an S-MMS 18D. Tipping is defined for the purposes of this disclosure as rotation of the S-MMS 18D about the x or y-axes with the x-axis extending from the front to back of the S-MMS 18D and the y-axis extending side-to-side of the S-MMS 18D. Rotation about the x-axis is considered roll, and rotation about the y-axis is considered pitch. Many S-MMSs 18 have small wheelbases and high centers of gravity, which leads to a relatively low tolerance to pitch and roll. All S-MMS 18D have some maximum tilt angle $\theta_{MAX}$ (Theta-max) that is based on a deviation from a theoretical, ideal flat ground plane 1720. Inclines traveled by the S-MMS 18D that exceed the maximum tilt angle $\theta_{MAX}$ for that axis will cause the S-MMS 18D to tip. In the example of FIG. 17, an incline 1710 traveled by the S-MMS 18D that is greater than the maximum tilt angle $\theta_{MAX}$ on the x-axis will cause the S-MMS 18D to tip in the direction $D_{TIP}$. Systems may have the same or different maximum tilt angles relative to pitch, roll, or combinations of the two.

Figure 18:
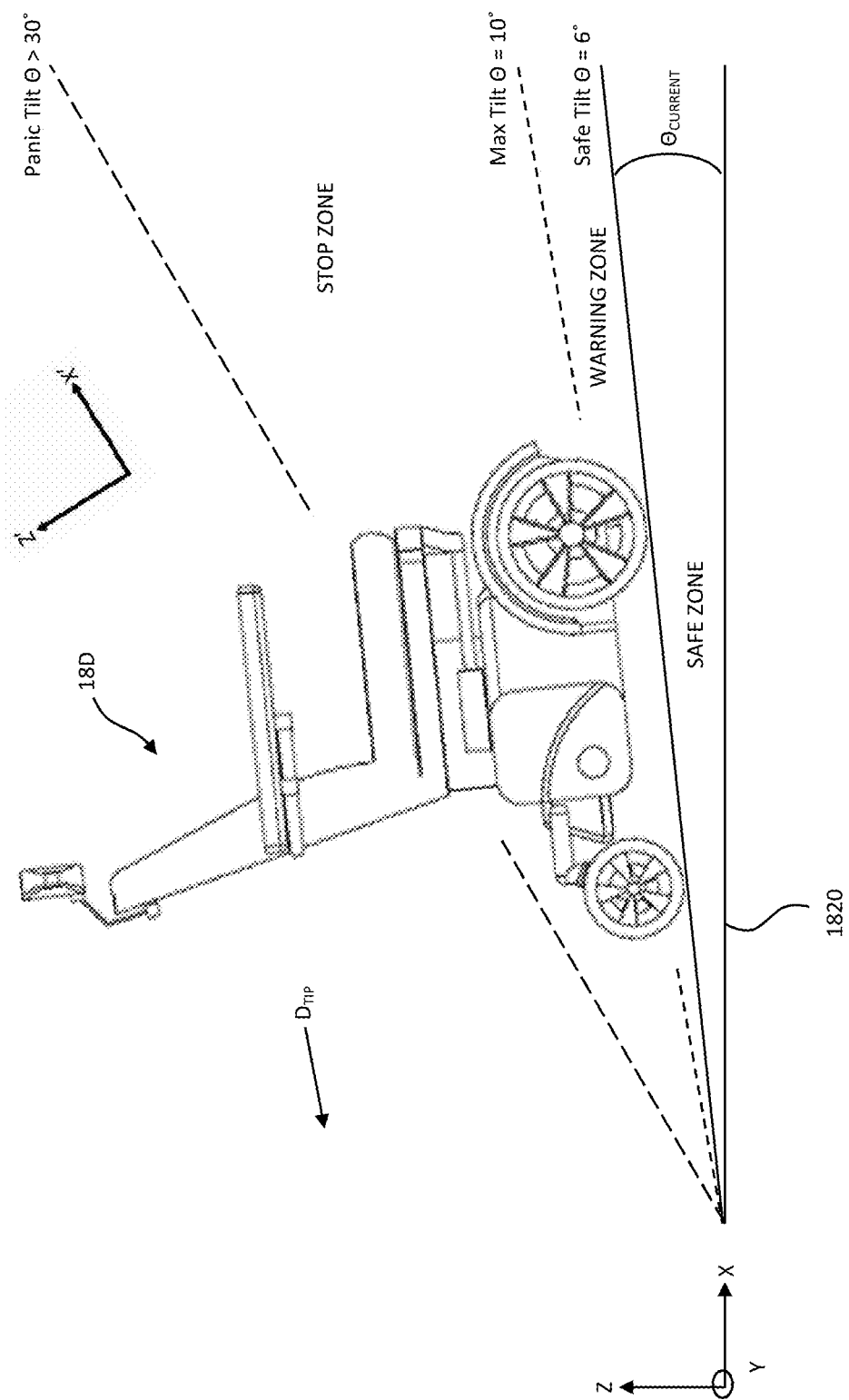
FIG. 18 illustrates an alternative embodiment of tip conditions for an S-MMS.

Each S-MMS 18D has unique tilt characteristics as illustrated in FIG. 18. The S-MMS 18D may have a predetermined or dynamically determined maximum tilt angle $\theta_{MAX}$ (Theta-max) relative to a level surface 1820. Operation of the S-MMS 18D at angles exceeding that threshold is likely to cause the S-MMS 18D to tip over. In the example of FIG. 18, inclines traveled by the S-MMS 18D that are greater than the maximum tilt angle $\theta_{MAX}$ about the y-axis will cause the S-MMS 18D to tip in the direction $D_{TIP}$. Although illustrated in FIG. 18 as being 10°, the maximum tilt angle $\theta_{MAX}$ of a particular S-MMS 18D may be greater than or less than 10° (e.g. 5°-20° or another value) and may be determined during or after manufacture of the S-MMS 18D (e.g., in implementations where aftermarket modifications have been or plan to be made to the S-MMS 18D). The determined current tilt angle $\theta_{CURRENT}$ of the S-MMS 18D may be compared to one or more predetermined or dynamically determined tilt zones. For example, in the depicted embodiment, tilt zones may include a safe tilt zone corresponding to the S-MMS 18D operating at a current tilt angle of 6° or less where it is unlikely that operation of the S-MMS 18D at an incline within that safe tilt zone could cause a tipping event, a warning tilt zone for operation of the S-MMS at a current tilt angle between 6° and 10° where common, unexpected obstacles become a possible tipping hazard possibly resulting in a tipping event when the S-MMS is operating or present at an incline within that warning tilt zone, a stop tilt zone for operation of the S-MMS at a current tilt angle between 10° and 30° possibly resulting in a tipping event when the S-MMS is operating or present at an incline within the stop tilt zone, and a panic zone for operation of the S-MMS at a current tilt angle outside of expected operation regimes such as those greater than 30°, likely resulting in a tipping event when the S-MMS is operating at present at an incline within the panic tilt zone. Although described with reference to particular tilt angle values of 6°, 10°, and 30°, it should be appreciated that one or more of the tilt angle values may vary, for example based upon a characteristic of the S-MMS 18D or a user of the S-MMS 18D, and that one or more of the tilt angle values may be optionally implemented or altered, without departing from the spirit and the scope of the present disclosure. Systems may have the same or different minimum and maximum tilt angles relative to pitch, roll, or combinations of the two.

In the example of FIG. 18, tipping avoidance includes both monitoring the current orientation of the S-MMS 18D (pitch and roll) and acquiring knowledge of upcoming terrain, such as slopes and drops. Moreover, proper understanding of the safety of upcoming terrain in this example involves terrain information being analyzed with respect to the current orientation of the S-MMS 18D.

In an embodiment, an S-MMS 18 comprises a human machine interface 352 operably configured to provide one or more control signals with control instructions and an S-MMS controller 110 configured to receive the control signals and generate one or more control signals in response, wherein each control signal generated by the S-MMS controller causes another component of the S-MMS 18 to respond. The response may be preconfigured and include operation of one or more motors or actuators by one or more motor controllers 351. The embodiment further comprises one or more sensors operably configured to measure the distance to a surface proximate the S-MMS 18 and/or one or more sensors operably configured to measure the pitch and/or roll of the S-MMS 18, wherein the sensor data is stored in memory 120 connected to the controller 110, and/or wherein the sensor data and one or more control signals from the HMI 352 are transmitted to the S-MMS controller as inputs to the S-MMS controller, the S-MMS controller processes the inputs to determine one or more operation(s) to be taken by one or more other components of the S-MMS, and the S-MMS controller transmits one or more control signals to one or more other components of the S-MMS to cause the operation(s) to be taken by the one or more other components of the S-MMS.

Figure 19:
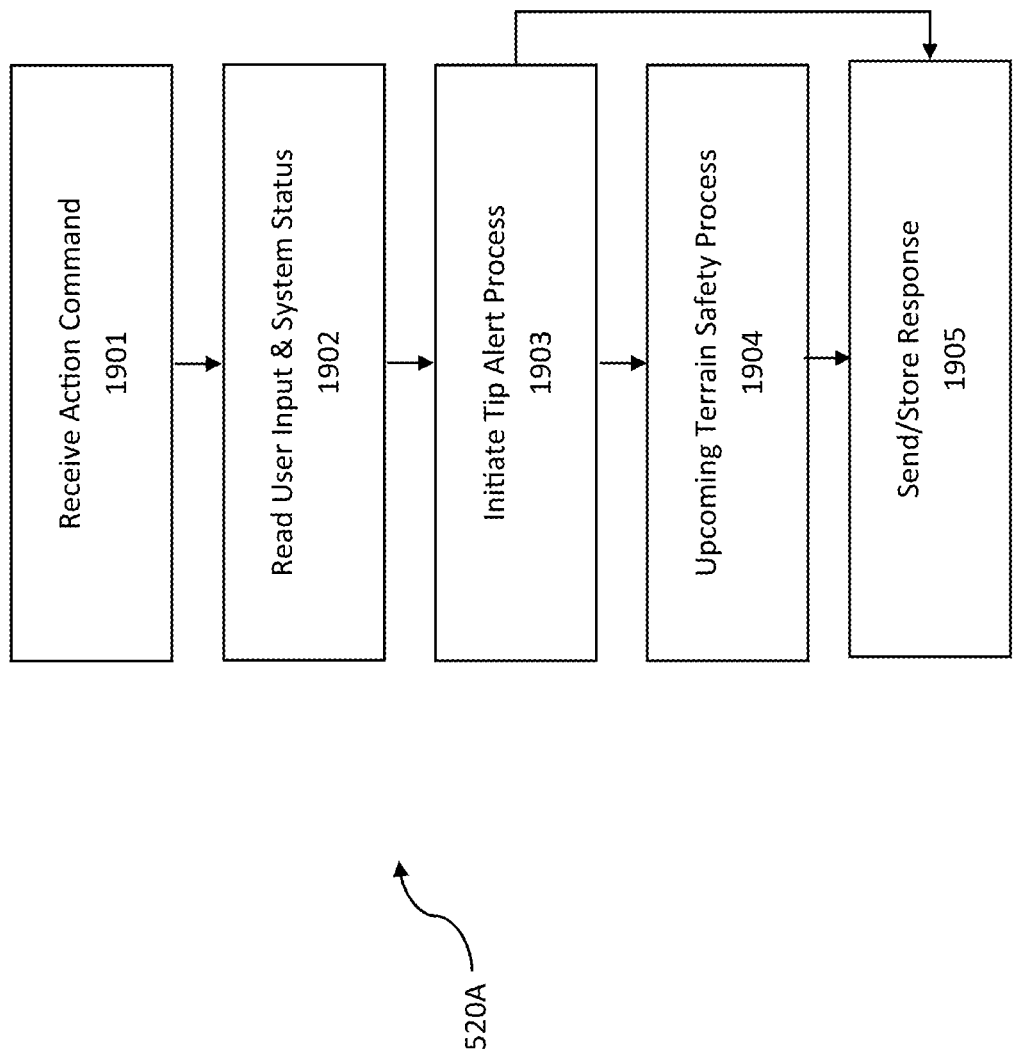
FIG. 19 is a flowchart depicting an embodiment of logic for a stability manager.

FIG. 19 illustrates an embodiment of logic for a basic stability manager 520A executed by the S-MMS controller 110B. At 1901, the stability manager 520A can be initiated by receiving an action command from the safety manager 550 (FIG. 5). The stability manager 520A also may be run in parallel to the safety manager 550 and may receive action commands based on elapsed time or resource availability from RTOS Services 362 on the S-MMS controller 110B. At 1902, the current user input values and S-MMS status are read. For example, the current user input values and the S-MMS status may be retrieved from memory 120, received as part of the action command received at step 1901, or provided to the stability manager process 520A via an alternative command or register.

Next, the tip alert process (see FIG. 20) is initiated at 1903. The tip alert process characterizes the orientation of the S-MMS 18 (e.g. pitch and/or roll) using one or more sensors and compares the current orientation (e.g. pitch and/or roll) to tipping zones as illustrated in FIG. 18. Data from the tip alert process may be passed to the upcoming terrain safety process at 1904. However, if the tip alert process determines an urgent, unsafe condition is experienced at 1903, the tip alert process may bypass the upcoming terrain safety process of step 1904 and send and/or store a response immediately at 1905. The response includes states, statuses, and/or other data determined from the tip alert process. In some embodiments, the response may occur immediately and be sent to the safety manager 550.

In some embodiments, the tip alert process may use data from one or more orientation sensors, such as an inertial measurement unit (IMU). These orientation sensors may be coupled to, included as a part of, or otherwise associated with one or more of the sensor housings 1130a, 1130b, 1140, 1150 and are configured to measure the pitch tilt angle and/or roll tilt angle of the S-MMS 18, such as along an x-axis or y-axis of the S-MMS 18 (or other reference plane of the S-MMS), with reference to an ideal reference plane (e.g., a horizontal reference surface, such as reference level 1720 (FIG. 17)). The pitch tilt angle and/or roll tilt angle of the S-MMS 18 may be measured using an IMU in some embodiments. In some embodiments, the IMU may be an Adafruit BNO055 Absolute Orientation Sensor, or another sensor capable of operating in the manner described herein, which in this case operates as an Attitude Heading Reference System (AHRS). The AHRS consists of either solid-state or microelectromechanical systems (MEMS) gyroscopes, accelerometers, and magnetometers on all three axes.

The upcoming terrain safety process is initiated at 1904 (presuming it is not skipped by step 1903). The upcoming terrain safety process sends and/or stores a response at 1905. The response includes states, statuses, and/or other data determined from the upcoming terrain safety process.

In an embodiment, the upcoming terrain safety process uses one or more non-contact sensors in combination with one or more orientation sensors to monitor and analyze upcoming terrain with respect to the current dynamic state of the S-MMS 18. Data from the upcoming terrain safety process is passed to the send/store response step 1905. An embodiment of the upcoming terrain safety process is further described in FIG. 26.

Integrated Tip Alert

Figure 20:
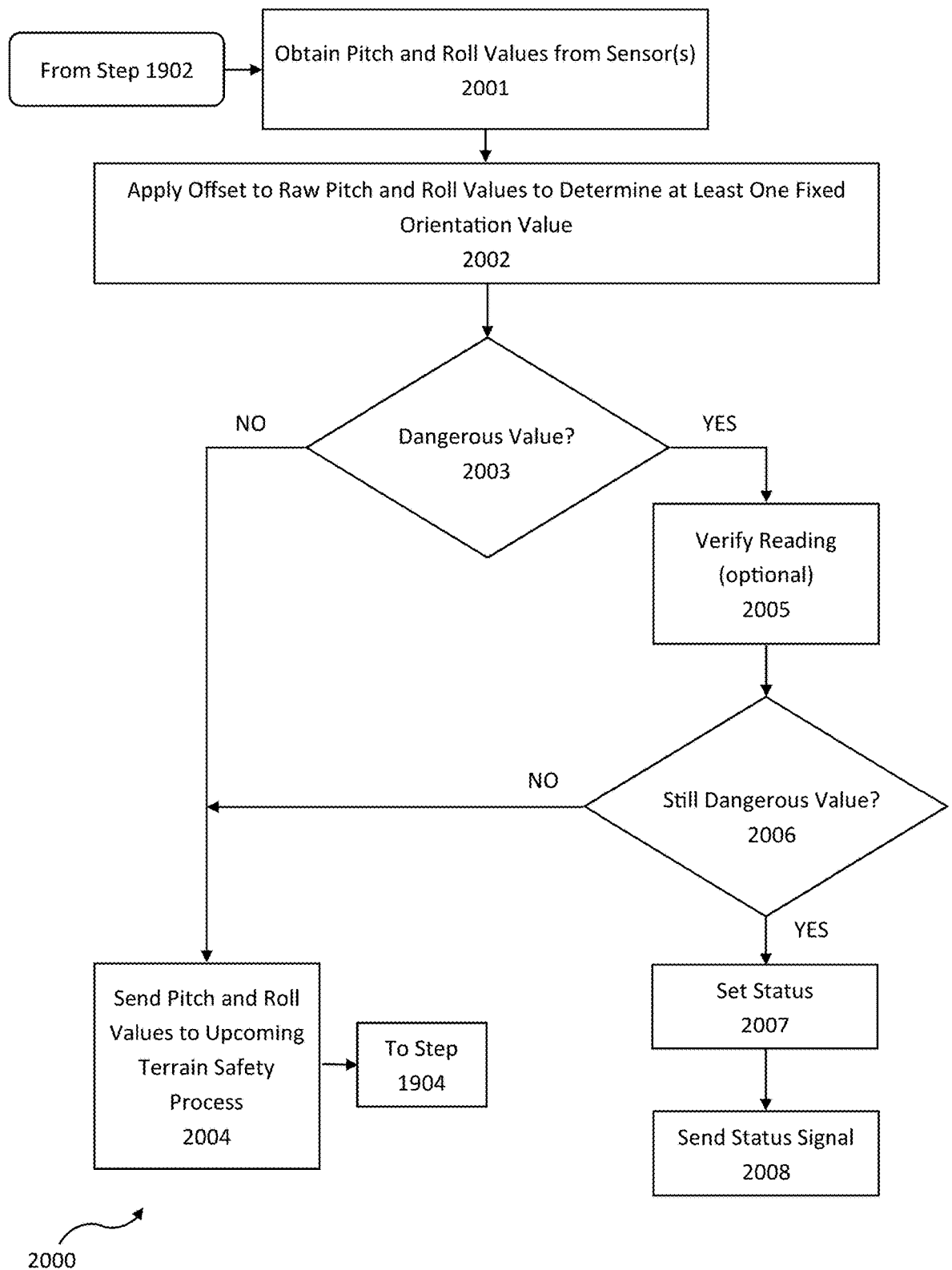
FIG. 20 is a flowchart depicting an embodiment of a tip alert process.

FIG. 20 is a flowchart depicting an embodiment of a tip alert process 2000. The tip alert process 2000 monitors the current orientation (e.g., pitch and roll) of the S-MMS 18. It reports these values to other processes, such as the upcoming terrain safety process, as part of a larger system and/or alerts users, caregivers, and/or other interested parties when S-MMS 18 orientation values go outside of acceptable ranges.

The tip alert process 2000 begins at a step 2001, where pitch and roll values are obtained from one or more orientation sensors associated with the S-MMS 18. In an embodiment, reports from one or more IMUs in the rear sensor module 1150, the front middle sensor module 1140, and/or the front right or left sensor modules 1130a, b may be used. These sensor reports may be received, for example, directly from one or more of the sensor modules 1130a,b, 1140, and/or 1150 or from the GPS and inertial manager 376.

After obtaining the sensor value(s), the process continues to a step 2002, where an offset and/or other corrections are optionally applied to the obtained pitch and/or roll values to transform the pitch and/or roll value(s) into a known reference plane. As an example, the IMU 1156 of the rear sensor module 1150 may be mounted at a known offset angle relative to the horizontal plane when the S-MMS 18 is on level ground 1720 (FIG. 17). The tip alert process 2000 may subtract the known offset angle relative to the horizontal plane from the pitch and/or roll values in one or more or all sensor reports received from the IMU 1156 to result in a corrected pitch and/or roll value that represents a true deviation from an ideal horizontal plane for each sensor report.

If multiple pitch and/or roll values are obtained, the system may use a mathematical model of the S-MMS 18 system dynamics (e.g. suspension response model) to combine those pitch and/or roll values into single, system-level orientation values for pitch and/or roll that capture the dynamic state of the S-MMS 18. In an extremely simple embodiment, sensor data received from IMUs in the front sensor modules 1130a,b and the rear sensor module 1150 may all be received by the S-MMS controller 110B as reports from the GPS and inertial manager 376 via the arbitration IAM 370. The basic stability manager 520 of the SAC 302B may calculate an average of the three sensor reports and use it as a representation of the overall S-MMS 18 pitch and/or roll. Additionally or alternatively, this calculation may be completed by navigation 363. These new, corrected values may be used for all other operations, in some embodiments.

Pitch and/or roll values, which are corrected in some embodiments as described above, are checked for dangerous values against tilt angle thresholds at step 2003, such as the exemplary tilt angle thresholds depicted in FIG. 18. A dangerous condition may include, for example, a tilt angle value within one or more of a warning or error threshold zone. If it is determined that no dangerous condition exists at step 2003, processing may continue by sending the pitch and/or roll values to the upcoming terrain safety process at step 2004. Processing then continues at step 1904 of FIG. 19.

If it is determined that a dangerous value exists, the process continues to step 2005, where the pitch and/or roll values are verified. Step 2005 includes determining whether a pitch and/or roll value is not within a typical sensor variance (e.g., based at least in part upon specification sheet population performance characteristics). An example of an atypical reading that may be determined to be an error may include a change in pitch or roll that happens at a rate faster than is physically possible based on physics. These readings may be ignored by the system. A sensor reading may be verified, for example, by re-taking a measurement or other reading by the sensor, obtaining a reading from a different sensor, or another means of verifying the accuracy of a received pitch and/or roll value. Additionally or alternatively, the tilt alert process 2000 may, via the S-MMS controller 110B, request additional sensor readings to confirm the report.

It is then determined whether the measured pitch and/or roll value remains a dangerous value at step 2006. If the pitch and/or roll value is determined not to be a dangerous value, the processing continues by sending the pitch and/or roll values to the upcoming terrain safety process at step 2004. Processing then continues at step 1904 of FIG. 19.

If it is determined that a dangerous value still exists at step 2006, the process continues to step 2007, where a warning, stop, panic, or other status is set. In setting the status at step 2007, one or more error or other statuses or flags associated with a measurement process, self-test request, or other value (e.g. dangerous value) determination may be used to set an error status. After determining a status, the process continues to step 2008, where a status signal is provided to the safety manager 350 (FIG. 3), which is configured to operate, at least in part, in accordance with the status signal.

When the current angle of pitch and/or roll $\theta_{CURRENT}$ is within the safe zone of pitch and/or roll (i.e., is less than the value of the safe tilt angle $\theta_{SAFE}$), the stability manager process 520 (FIG. 5) of the S-MMS controller 110B may allow the S-MMS 18 to proceed without any system overrides. That is, the S-MMS 18 may operate in a standard manner, without any intervention by the S-MMS controller 110. If the current angle of pitch and/or roll $\theta_{CURRENT}$ is within a warning zone (i.e., is greater than or equal to the value of the safe tilt angle $\theta_{SAFE}$ but is less than the value of the max tilt angle $\theta_{MAX}$), the S-MMS controller 110B (FIG. 5) may allow the S-MMS 18 to operate, but may limit S-MMS 18 outputs (e.g., in the form of motor controller 351 output power to the wheels, turning radius, turn directions allowed, etc.). As a non-limiting example, the top allowable speed of the S-MMS 18 may be scaled linearly so that it decreases as the tilt angle approaches an unsafe angle. When the current angle of pitch and/or roll $\theta_{CURRENT}$ is within a stop zone (i.e., is greater than or equal to the value of the max tilt angle $\theta_{MAX}$ but is less than the value of the panic tilt angle $\theta_{PANIC}$), the S-MMS controller 110B may be configured to override one or more operations of the S-MMS 18 such that the S-MMS 18 is caused to stop movement in one or more directions, or is prevented from implementing one or more operations. If the current angle of pitch and/or roll $\theta_{CURRENT}$ is within a panic alarm zone (i.e., is greater than or equal to the value of panic tilt angle $\theta_{PANIC}$), the S-MMS controller 110B may be configured to override and/or stop one or more operations of the S-MMS 18, and may be further configured to cause one or more alarms and/or notices to be transmitted or generated from an output module 1114 (FIG. 11) and/or the S-MMS 18 to one or more of a user of the S-MMS 18, a caregiver, a remote alarm server, or another entity or may convey another status condition or update to an entity.

Stand-Alone Tip Alert

In one embodiment, the tip alert process 2000 depicted in FIG. 20 may be used independently of the S-MMS controller 110 and configured as a standalone product used as an aftermarket feature with any S-MMS 18. Farmers and ranchers often rely on ATVs to move about their land and may have several family members or employees on their land using these devices at any one time. Imagine the peace of mind and enhanced safety of the rancher if they were alerted on their phone if one of their ATVs were to tip over. Similar use cases are expected for golf courses tracking golf carts, parents monitoring children on recreational off-road vehicles, or caregivers of individuals in manual or power mobile chairs not configured with a full S-MMS controller 110 and/or sensor array disclosed.

Figure 21:
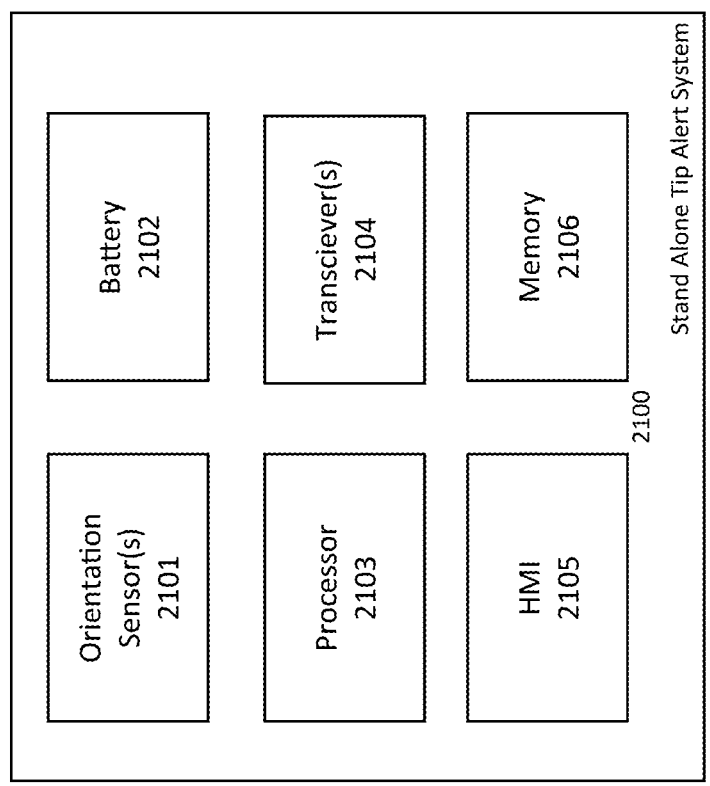
FIG. 21 is a block diagram depicting an embodiment of a tip alert system.

FIG. 21 illustrates an architecture embodiment of a stand-alone tip alert system 2100. In this embodiment, the tip alert system 2100 comprises one or more sensors to monitor orientation 2101, one or more batteries 2102, one or more transceivers for communication 2104, a hardware processor 2103 configured to run the tip alert process 2000 (FIG. 20), a user interface 2105, and memory 2106 with the tip alert process 2000 to be executed by the processor. The one or more transceivers may include Bluetooth, Bluetooth Low Energy, cellular, other wireless communication, and/or GPS transceivers in some embodiments. The user interface 2105 may include provisions such as an audible alarm, haptic feedback device such as a buzzer, warning lights, buttons, and/or input/output devices for initialization and pairing of the system (e.g. touch screen, display, and/or other input and/or output devices). In some embodiments, the stand-alone tip alert system 2100 may be powered by one or more of a battery 2102 and/or an external power source.

Figure 22A:
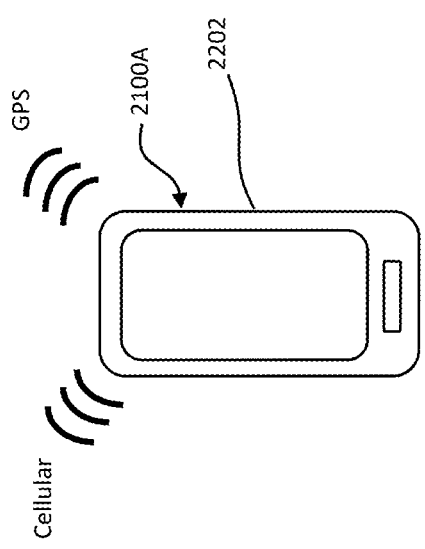
FIG. 22A illustrates an embodiment of a tip alert system.
Figure 22C:
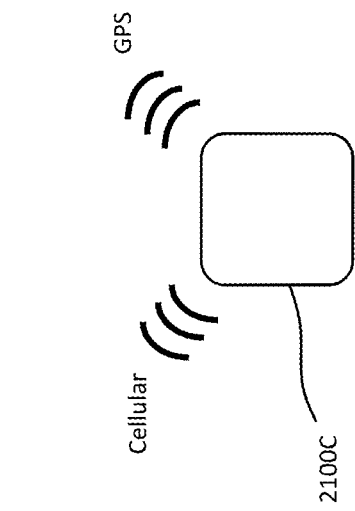
FIG. 22C illustrates an embodiment of a tip alert system.
Figure 22B:
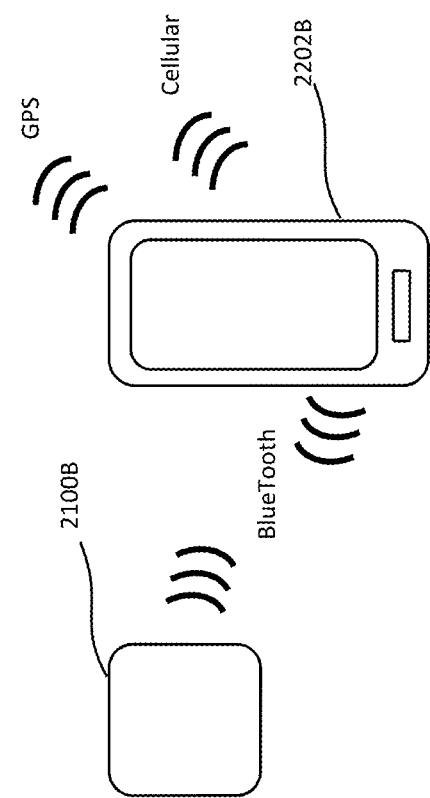
FIG. 22B illustrates an embodiment of a tip alert system.

FIG. 22A illustrates a simplified embodiment of a stand-alone tip alert system 2100A. The depicted embodiment is an application of the tip alert process which configures a smart device 2202 to use its internal elements (e.g. IMU, processors, transceivers, etc.) to execute the tip alert process. FIG. 22B illustrates an embodiment of a stand-alone tip alert system 2100B configured with an internal Bluetooth transceiver and intended to be paired with a smart device 2202B. When a tipping event occurs, the tip alert system 2100B may send an alert to a smart device 2202B via an application on the paired smart device, and the paired smart device may then generate an alert from the device or send an alert to a third party for assistance. The alert may include one or more of the time, location, status (e.g. warning, tip status or other status), and user identification information. FIG. 22C illustrates an embodiment of the tip alert system 2100C where no smart device 2202 is required. Instead, cellular and GPS capabilities are built in to the stand-alone tip alert system 2100C in the depicted embodiment, and the tip alert system transmits one or more of the time, location, status (e.g. warning, tip status, or other status), and user identification to another party, e.g. for assistance.

Referring again to FIGS. 22B and 22C, the tip alert system 2100B, 2100C may be powered by an internal battery and/or external power. As a safety system, some embodiments may include a battery with external powered systems, similar to an alternating current (AC) powered smoke alarm, generally relying on the battery for emergency power. For integration on some S-MMSs, the tip alert system 2100 may be powered by the S-MMS main battery and only be activated when the power to the S-MMS is on. For use with non-powered systems, such as manual mobile chairs, the tip alert system 2100 may include a manual deactivation or may be activated/deactivated by a user activity. One example of deactivation by a user activity would be configuring the stand-alone tip alert system 2100 to automatically deactivate when a manual mobile chair is folded for transport.

FIGS. 23A-C illustrate an embodiment of an exemplary stand-alone tip alert system 2100D. The user may have the ability to set a zero, or level, baseline plane via some means such as a momentary switch 2310 illustrated in FIG. 23A. Tip alert zones may be preprogrammed as shipped (e.g., at the factory), programmed by the user via a user interface, or programmed by an authorized third party. In some embodiments, the user may use the combination of two momentary switches 2310, 2330 located on the unit 2102D to program alarm behavior. The momentary switches 2310, 2330 can also be used to pair the device with a smart device, such as a phone in some configurations. One or more LED indicators 2350 are included in the depicted embodiment to signal system status to the user. Status indications indicated by the one or more LED indicators may include items such as battery or power status, system readiness, alert conditions, and error conditions. The tip alert system 2102D may be powered by one or more of an internal and external power source. The internal power source may be in the form of a battery or batteries which may be replaced and/or recharged via a charging port 2320. Batteries may be charged via wired or wireless means. Additionally, or alternatively, the tip alert system 2102D may be powered directly by the S-MMS it is mounted to via a wired connection using the charging port 2320. In some embodiments, one or more user interfaces may be included in the tip alert system 2102D, such as the depicted speaker 2340 for audible alerts to the user and alarms to notify nearby individuals to help in the event an unsafe condition is detected. The stand-alone tip alert unit 2102D may be mounted via adhesives, screws 2360, fasteners, or any other appropriate means. The stand-alone tip alert system 2100D of FIGS. 23A-23C may use the architecture of FIG. 21 for its operation.

Upcoming Terrain Safety Process

The tip alert process 2000 (FIG. 20) is vital to tip avoidance. However, it can only react to the terrain currently under the wheels of the S-MMS 18. The tip alert process 2000 may avoid a tip condition on a gradually changing slope or may alert others when a tipping event has occurred. There are other scenarios that may cause an S-MMS 18 to tip, such as a sudden step change (vertical rise or drop) in the terrain (e.g. a curb or step) or a rapid slope change in the ground (e.g. a very steep ramp). What is needed is a way for the basic stability manager 520 of the SAC 302 to predict the safety of upcoming terrain proximate to the S-MMS 18.

Figure 24:
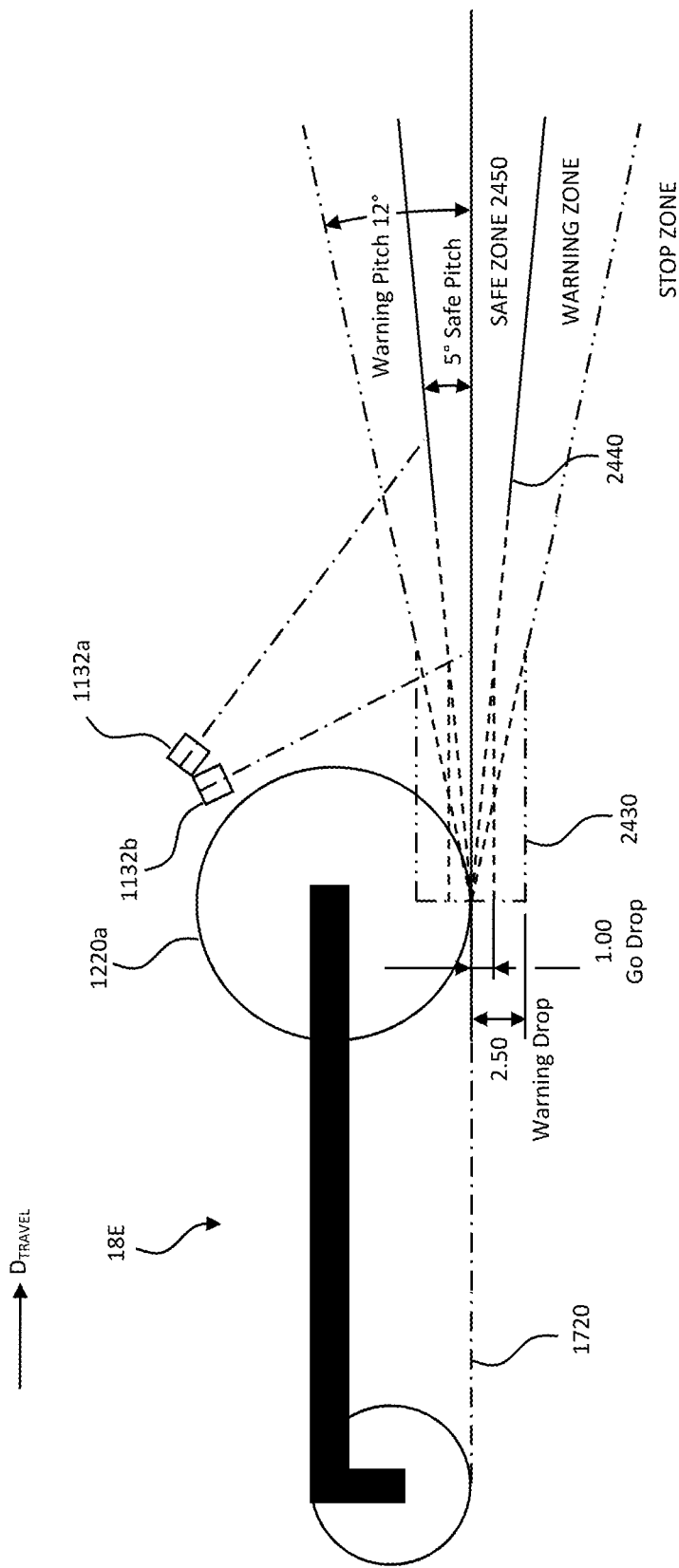
FIG. 24 depicts an embodiment of a ground monitoring sensor configuration and sensing zones.

FIG. 24 illustrates an S-MMS 18E traveling on an imaginary, ideal flat plane 1720. In this example, two conditions may cause the S-MMS 18E to tip: 1) slopes greater than a maximum grade (e.g. slope or angle of incline or decline) for which they are rated/allowed (e.g. greater than the maximum tilt angle) and/or 2) sudden drops or rises. As a non-limiting example, many current mobile chair MMSs are sold with warnings on both the maximum grade for which they are rated and the maximum step height (vertical rise or drop, such as for a step) for which they are rated. A current mobile chair may be rated for a maximum grade of 12-degrees and a maximum step height of 2.5-inches, as an example. Using these example values, if the S-MMS 18E was traveling on level ground 1720 and the front wheel 1220a dropped off a sharp step of 2.5-inches 2430, the S-MMS 18E may tip and injure the user.

Increasing the complexity of the tipping problem, as an S-MMS 18E travels on sloped surfaces, its tolerance to step changes in the ground varies. In an example, if the S-MMS 18E was travelling on a downwardly sloped surface 2440 already, then a step down of less than 2.5-inches may cause the S-MMS 18E to tip. Inversely, if the S-MMS 18E was traveling down that same downwardly sloped surface 2440 and encountered an upward step of greater than 2.5-inches, it may not tip because it would be bringing the S-MMS 18E closer to a flat, non-dangerous pitch. Therefore, an effective tip prevention system monitors the current S-MMS 18 orientation (e.g. pitch and roll) with one or more sensors (e.g. via IMU reports from the GPS and inertial manager 376 FIG. 5) and monitor the terrain proximate to the S-MMS 18 with one or more sensors (e.g. from sensor reports 372-374 FIG. 5) configured to monitor the distance from the one or more sensors to the ground and combine the received data against one or more metrics that are responsive to the orientation and upcoming ground data. In some embodiments, other factors may be included in tip prevention, including the mass of the S-MMS 18, the weight of the user, center of gravity of the occupied S-MMS 18, loading (e.g. extra weight, such as extra battery packs, backpacks, etc.), and other relevant data that may affect how, and if, an S-MMS 18 will tip under certain conditions.

The ground monitoring sensor configuration embodiment depicted in FIG. 24 is comprised of a housing mounted to the S-MMS 18E with one or more noncontact based sensors 1132a,b configured to focus at the ground (e.g. measure to a point or area on the ground or otherwise sense or detect in relation to a point or area on the ground). Depending on where the sensors 1132a,b are configured to focus, the definition for acceptable terrain varies as shown on the diagram. A sensor 1132b configured to focus on the ground at a point directly in front of the front wheel 1220a may have more restrictive go, warning, and stop zones as compared to a sensor 1132a configured to focus on the ground at another point farther from the front wheel 1220a, based on the slope and step limits of the S-MMS 18E. While illustrated as linear, it is understood that these zones will vary dependent on S-MMS 18 characteristics and may be a more complex nonlinear or function driven area.

Figure 25:
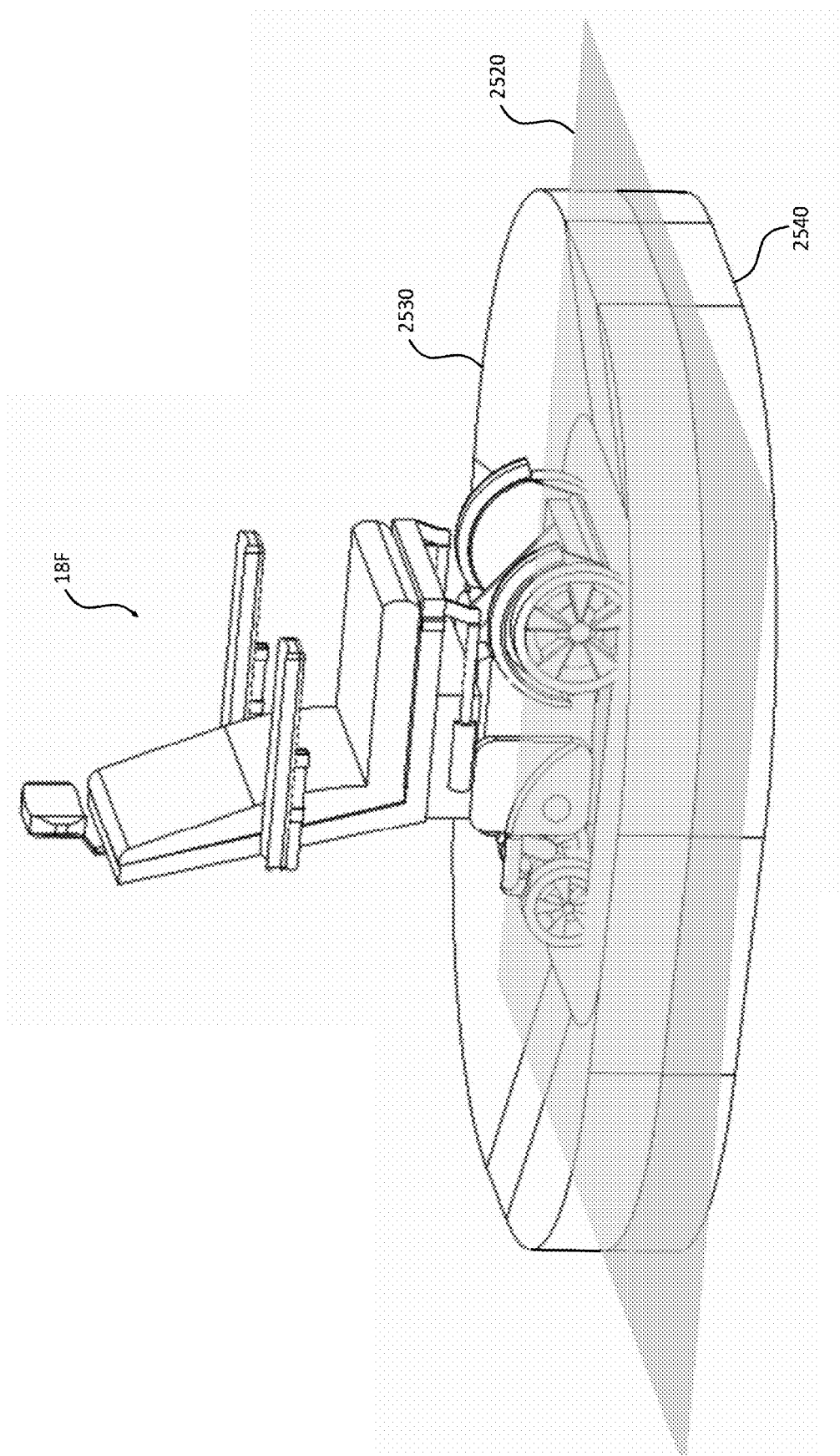
FIG. 25 illustrates an S-MMS traveling on an ideal flat plane and an associated safe zone(s) for upcoming terrain.

FIG. 25 illustrates an embodiment of an S-MMS 18F traveling on an ideal flat plane 2520. In the depicted embodiment, the safe zone 2450 illustrated in FIG. 24 is extended to a 3-dimensional map of what is characterized as safe terrain for the depicted embodiment. The map has both an area above 2530 the ideal flat plane 2520 and an area below 2540 the ideal flat plane 2520. Any terrain features that extend beyond these defined safe areas are characterized as unsafe terrain features. A similar map may be created for any other zones, such as the warning zone or the stop zone. The zones' shape, scale, symmetry (or lack thereof), and other properties may differ between various S-MMS 18 embodiments. Moreover, the zones may be different for each orientation of the S-MMS 18. The zones' shape may also be affected by S-MMS 18 settings, options, and user actions, among other things.

Referring again to FIG. 5, the basic stability manager process 520 may be configured to monitor and/or calculate one or more parameters associated with the upcoming ground to prevent tipping. In some embodiments, an upcoming terrain safety process and/or other process of the SAC 302B on the S-MMS controller 110B is configured to collect sensor data (e.g. via sensor reports 372-374 FIG. 5) from one or more sensors (e.g. 1120, etc. FIG. 11) relating to one or more areas proximate to an S-MMS 18. The sensor data may be used to detect one or more of an orientation angle of the S-MMS 18 (e.g. pitch, roll, or yaw), the slope of upcoming terrain, and/or a drop or step within the monitored area proximate to the S-MMS 18. For example, in an exemplary embodiment, the S-MMS controller 110B is configured to monitor and identify sensor data relating to a drop or step of greater than 2.5-inches and a dangerous slope of greater than 12-degrees within the monitored area. The basic stability manager process 520 may be configured to transmit data and/or sensor status information to a safety manager 550 (FIG. 5) relating to the safety of the terrain proximate to the S-MMS 18.

Figure 26:
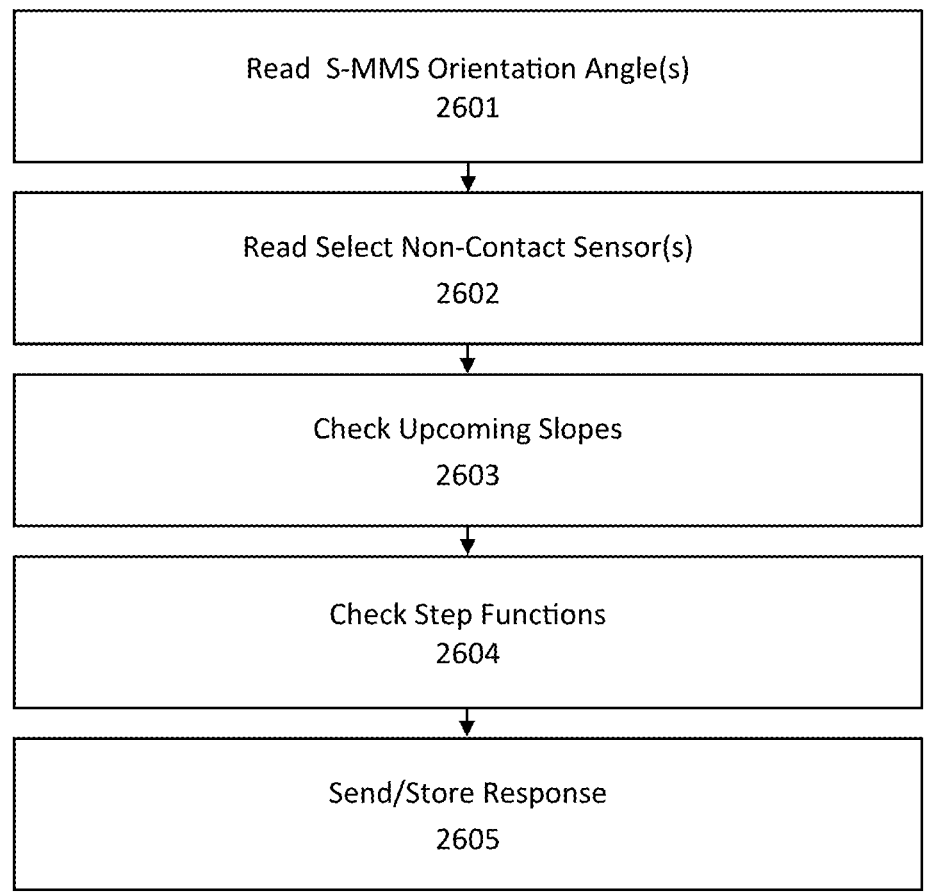
FIG. 26 is a flowchart depicting an embodiment of a terrain safety process.

FIG. 26 is a flowchart illustrating an embodiment of an upcoming terrain safety process 2600. First, one or more of pitch, roll, and yaw orientation angle(s) of the S-MMS 18 are read 2601. Orientation angles may be retrieved from memory 120 or received from the tip alert process 2000 (FIG. 20). The one or more orientation angles may be determined, at least in part, using one or more orientation sensors mounted to the S-MMS 18. In an example, one or more orientation angles may be received as sensor reports (e.g. via the GPS and inertial manager 376 FIG. 5) by the S-MMS controller 110B on the S-MMS 18. In an embodiment, the sensor reports come from one or more IMUs onboard the S-MMS 18 (e.g. 1136a, 1136b, 1146a, and 1156 FIG. 11). Although described with reference to one or more IMUs 1136a, 1136b, 1146a, and 1156, one or more orientation sensors associated with the S-MMS 18 may be physically and/or logically separate from the example IMUs. One or more zones of ground orientation and/or terrain may then be scanned for upcoming, unsafe conditions using one or more non-contact sensors (e.g. 1132a-d, 11152a-b FIG. 11).

Based on the direction of travel of the S-MMS 18, select non-contact sensors may be used to take one or more measurements of the upcoming terrain at 2602. As a non-limiting example, if an S-MMS 18 is traveling forward, optionally only the forward-facing sensors may be tasked with a measurement of the upcoming ground orientation and/or terrain in order to reduce processing time by the S-MMS controller 110B. In some embodiments, the non-contact sensor(s) may include one or more LIDAR sensors. A plurality of non-contact sensors may be used to sense the upcoming ground and/or terrain, whereby two LIDAR distance measurements (from the sensor to the ground focal point or area) may be obtained at each of left and right sides of the front of the S-MMS 18 and one LIDAR distance measurement (from the sensor to the ground focal point or area) may be performed at each of left and right sides of the rear of the S-MMS 18, in some embodiments. The LIDAR sensors transmit senor reports with the distance measurements or measurement data from the distance measurements to the S-MMS controller 110B. The S-MMS controller 110B receives the sensor reports, and the upcoming terrain safety process 2600 of the S-MMS controller processes the data from the received sensor reports.

The upcoming terrain safety process 2600 may then use the measurements to check upcoming slopes for safety at 2603. This is accomplished by comparing the measurements from the received sensor data to pre-defined or calculated safe zones (e.g. FIG. 24-25). Additional information regarding operations associated with step 2603 is described below with reference to FIGS. 27-30.

The upcoming terrain safety process 2600 may then compare the measurements from the received sensor data to historical distance measurements from historical sensor readings in order to check for unsafe step functions in the upcoming terrain at 2604. At step 2604, one or more zones or areas if front of, back of, and/or around the S-MMS 18 are monitored for sudden vertical drops and/or rises that might either (1) cause the S-MMS 18 to tip if done gradually or (2) cause unsafe conditions due to their suddenness. The results of these checks, determinations, and/or comparison may then be sent to the safety manager 550 and/or stored in memory 120 at 2605.

Figure 27:
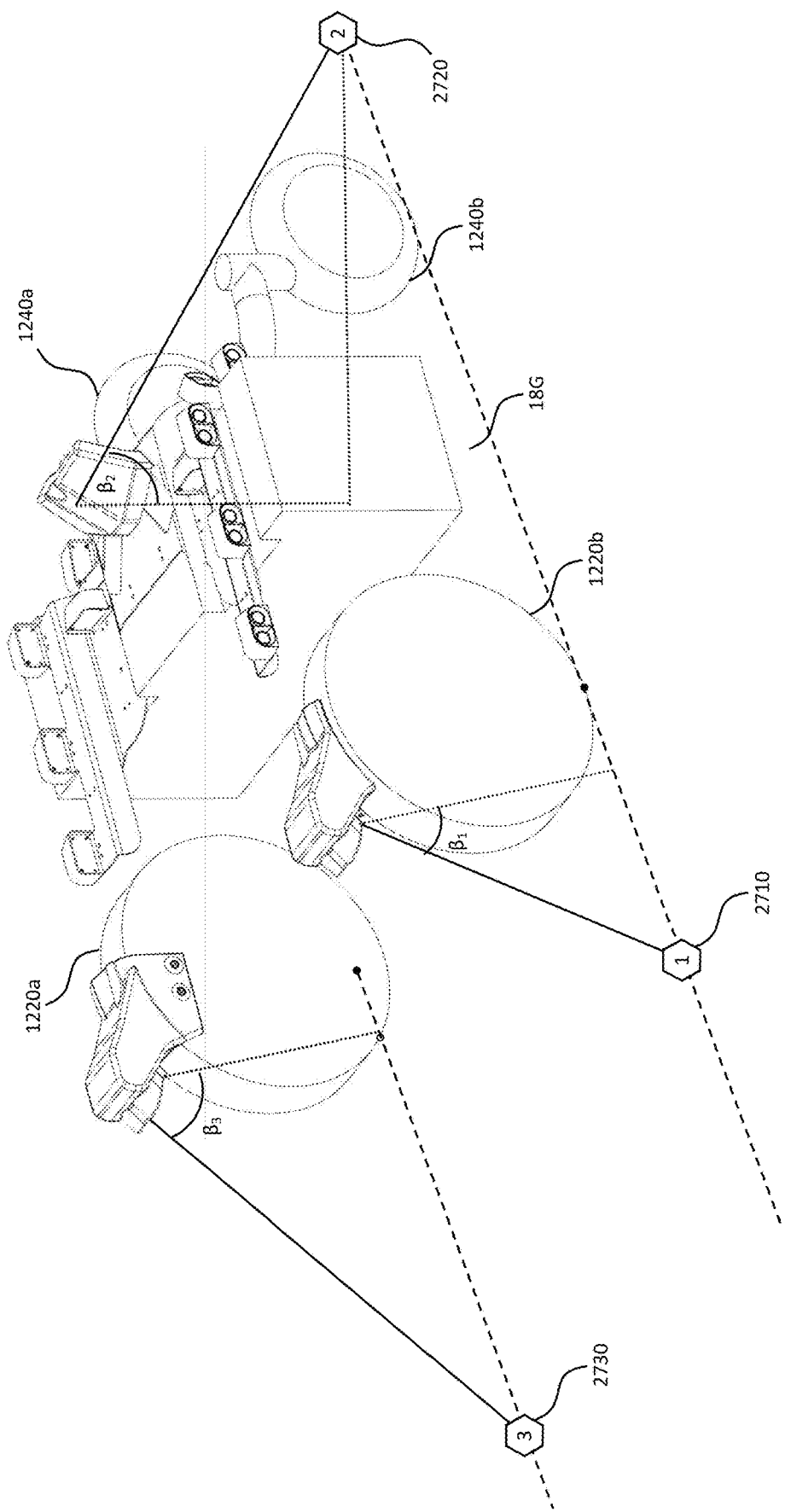
FIG. 27 illustrates an example embodiment of a ground monitoring system.

FIG. 27 illustrates an embodiment of an S-MMS 18 ground monitoring system deployed on a mobile chair S-MMS 18G. The depicted system is comprised of six LIDAR sensors and one or more IMUS for measuring S-MMS 18G orientation (e.g., pitch and roll). In the depicted embodiment, each front wheel 1220a,b has an associated sensor housing which includes a far LIDAR unit 1132a (FIG. 24) and a near LIDAR unit 1132b (FIG. 24). The rear of the S-MMS 18G has an associated sensor housing which includes two LIDAR units, with one of the LIDAR units pointed proximate to each rear wheel 1240a,b, in the depicted embodiment. Each of the LIDAR units transmits sensor reports for measurements it takes, which are received and processed by processes of the S-MMS controller 110B as described above and herein.

The ground monitoring system depicted in FIG. 27 is configured to monitor a point in front of and/or behind each leading and/or trailing wheel of the S-MMS 18G. In the depicted embodiment, one non-contact sensor is configured to monitor Point 1 2710, which is located along the line of travel of the front wheel 1220b. Point 1 2710 is sufficiently in front of the contact patch (the portion of the tire that is in contact with the surface) of the leading wheel 1220b in order to ensure the system will stop before encountering the measured point.

In some embodiments, one or more of the front or rear sensor angles (e.g. $\beta_1$ thru $\beta_3$ FIG. 27) may be based at least in part upon sensor response times, override system characteristics, and how far the S-MMS 18G coasts after a stop command is issued by the S-MMS controller 110B or motor controller 351 while the S-MMS 18G is operating. As a non-limiting example, the distance from Point 1 2710 to the contact patch of the leading wheel 1220b may be determined based on a combination of the safety system response time, S-MMS 18G velocity, S-MMS 18G coasting characteristics, ground characteristics (e.g. carpet versus pavement), and other S-MMS 18G configuration parameters. Point 2 2720 is monitored behind the trailing wheel 1240b in the depicted embodiment. While illustrated on a single side of the S-MMS 18G, it is understood that similar points may be measured on both leading 1220a,b and both trailing wheels 1240a,b of the S-MMS 18G.

Additionally or alternatively, other points may be monitored by the system beyond Point 1 2710 and Point 2 2720. A second, front sensor measurement point (i.e. a point on a surface at which the sensor is focused or otherwise directed, e.g. to take a sensor measurement or other sensor detection) may be selected based at least in part upon a predetermined or dynamically determined distance beyond the furthest protruding point of the S-MMS 18G, in some embodiments. In a depicted embodiment, one non-contact sensor such as a point LIDAR is configured to monitor Point 3 2730 which is located along the line of travel of the front wheel 1220a. As a non-limiting example, a point may be monitored at a distance beyond one point 1 2710 on the same side of the S-MMS 18G as point 1, in the middle or along the sides of the S-MMS 18G, or on another side of the S-MMS 18G (e.g. point 3 2730) based on the reaction time of the user, rather than the reaction time of the system. This may allow the system to provide timely warnings to a user so that the S-MMS controller 110 did not have to engage and/or override user inputs from the HMI 352. Advanced warning may add both to system safety and to a users' feeling of secure independence.

As previously described and depicted in FIG. 24, the stability manager process 520 (FIG. 5), in some embodiments, may permit a safe pitch of +/−5 degrees and a warning pitch of +/−12 degrees. The stability manager 520 may further permit detection and warning and avoidance of slopes, drops, and/or rises. The basic stability manager process 520 of the SAC 302B on the S-MMS controller 110B may be configured to control one or more operations of the S-MMS 18, including those systems directly controlled by the S-MMS controller 110B, the output of one or more onboard motor controllers 351, and/or the output of one or more HMI 352 according to one or more sensor reports received and processed by the basic stability manager. In an embodiment of the system depicted in FIG. 5, one or more outputs of the stability manager process 520 are compared to a rules engine in a safety manager 550 which then sends one or more control signals from the S-MMS controller 110B to one or more actuators, motors, or interfaces of the S-MMS 18. One or more of the safe tilt angle and/or the warning tilt angle may be dynamically determined (e.g. using a process like the one disclosed below) or predetermined and stored in memory 120 (e.g., based on an operating characteristic associated with the S-MMS 18 and/or a predetermined characteristic of the S-MMS 18).

Figure 28:
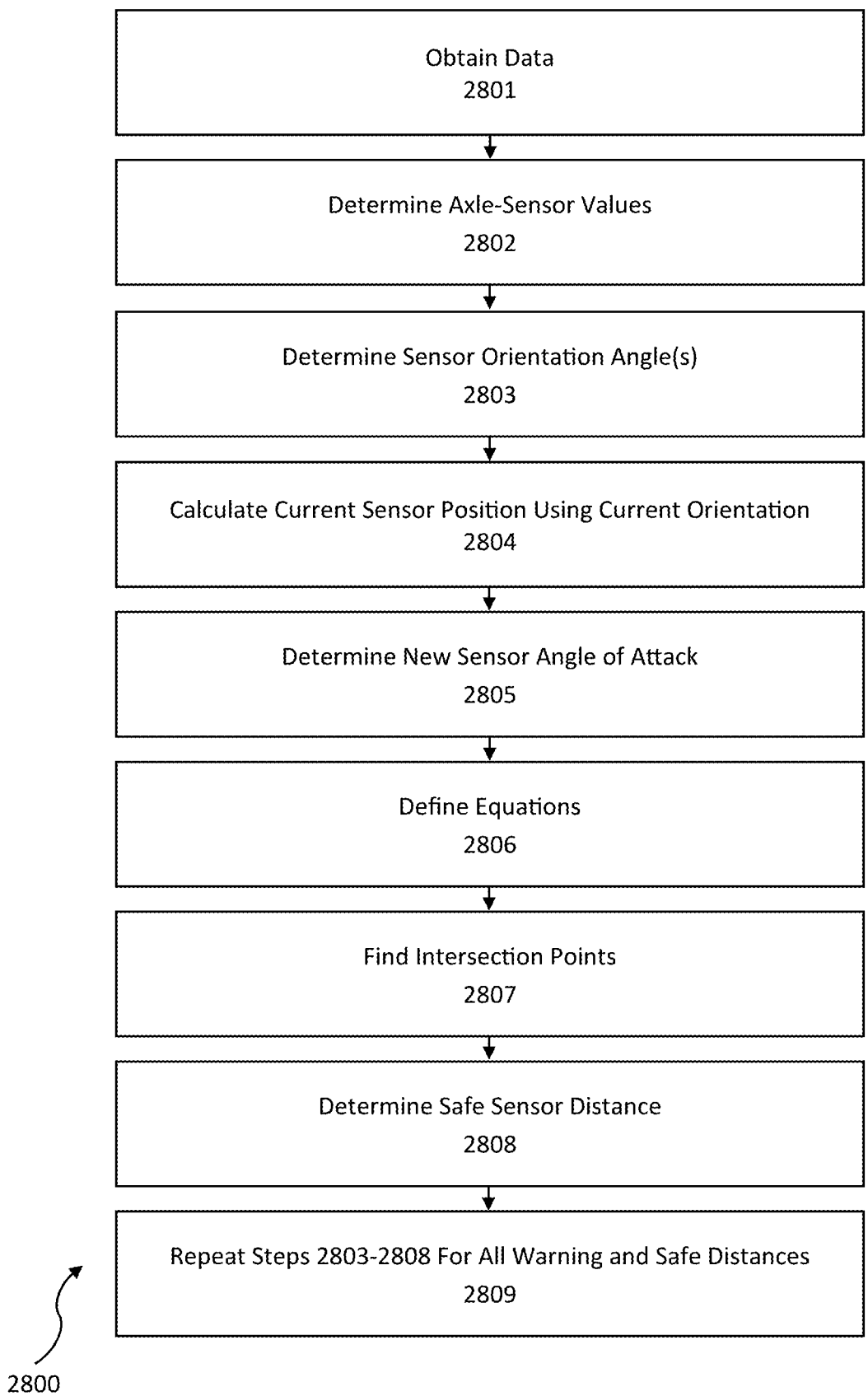
FIG. 28 is a flowchart depicting an embodiment of a process for implementing a check upcoming slopes process.

FIG. 28 is a flowchart illustrating a process for implementing a check upcoming slopes process 2800 of a stability manager process 520 (FIG. 5) according to an exemplary embodiment that dynamically updates the safe zone parameters (e.g. FIGS. 24-25) based on one or more sensor reports and/or characteristics of the S-MMS 18 (e.g. center of gravity). Often motorized mobile system stability is characterized or measured with reference to deviations from a perfectly flat plane (e.g. 1720 FIGS. 24 and/or 2520 FIG. 25). For this reason, and for simplicity, the check upcoming slopes process 2800 will be described in such a way that all calculations are done with reference to a perfect, horizontal line (e.g. 1720 FIG. 24) drawn from the point of contact of each wheel of the S-MMS 18E. When the S-MMS 18 is traveling on a flat plane, this distinction does not matter. However, when the S-MMS 18 is traveling on a plane that causes the S-MMS to be tilted in pitch and/or roll, it does matter. Specifically, the disclosed approach detailed below allows for dynamic altering of the allowable slope and step height thresholds enforced by the S-MMS controller 110B based on S-MMS 18 orientation.

The check upcoming slopes process 2800 begins by obtaining data from memory 120 and/or one or more sensor reports (371-376 FIG. 5) associated with the S-MMS 18 at 2801. In an embodiment, the data obtained from memory 120 may include the diameter of a wheel of the S-MMS 18, the angle of attack of one or more sensors (e.g., as defined as an angle between a vertical plane and plane at which the sensor is directed for sensing), and the location of one or more sensors relative to a given Cartesian reference frame (e.g. along an x-axis, y-axis, and/or z-axis). In an embodiment, the data obtained from one or more sensor reports may include one or more orientation angles from an IMU (e.g. as received from navigation 363, FIG. 5, or directly from GPS and inertial manager 376) and/or one or more distance measurements from non-contact sensors 372. Additionally or alternatively, sensor reports from search and track sensors 373, image sensors 374, and user sensor reports 375 may be obtained. A non-limiting example of values obtained are described below with reference to FIGS. 29A-29O.

Figure 29A:
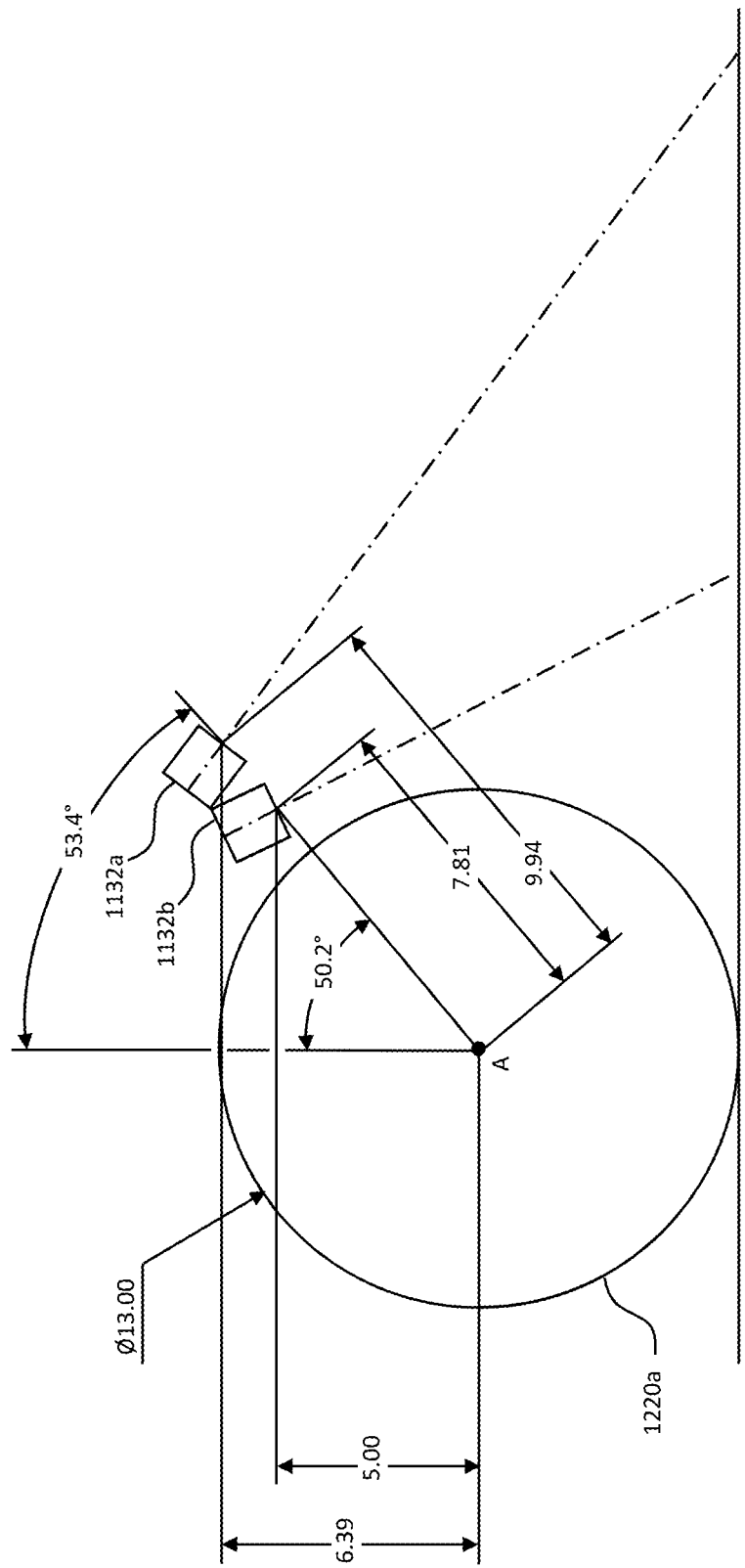
FIG. 29A depicts an embodiment of a sensor system which supports a check upcoming slopes process.

One or more axle-sensor values may be determined at 2802. In an embodiment these values may be stored in memory 120. FIG. 29A depicts an embodiment of a sensor system which identifies such values used by the check upcoming slopes process 2800. The sensor system comprises a far LIDAR unit 1132a and a near LIDAR unit 1132b mounted to an S-MMS 18 in a fixed orientation relative to a wheel 1220a of the S-MMS 18. In some embodiments, the one or more values for the sensors and/or wheels may include one or more of a diameter of the wheel (e.g. 13-inches), an axle-sensor height (a vertical height from the sensor receptor to the wheel axis A, which is 5.00-inches from the near LIDAR unit 1132b and 6.39-inches from the far LIDAR unit 1132a), an axle-sensor distance (measured as a distance from the sensor receptor to the wheel axis A, which is 7.81-inches from the near LIDAR unit 1132b and 9.94-inches from the far LIDAR unit 1132a), and/or an axle-sensor angle (degrees measured as an angle from vertical between the wheel axis A and the sensor, which is 50.2-degrees from the near LIDAR unit 1132b and 53.4 degrees from the far LIDAR unit 1132a respectively). Similar measurements are determined for other sensors.

One or more sensor orientation angle(s) are measured or otherwise determined at step 2803. A sensor orientation angle may correspond to one or more of the S-MMS 18 pitch and/or roll angles. Additionally or alternatively, the sensor orientation angle may be measured independently of the overall S-MMS 18 pitch and/or roll angles. In an embodiment, a positive pitch angle of the S-MMS 18 is treated as a "nose up" condition (e.g. the S-MMS 18 is going up an incline at a positive slope), while a negative pitch angle of the S-MMS 18 is treated as a "nose down" condition (e.g. the S-MMS is going down a decline at a negative slope). FIG. 29B illustrates an embodiment of a sensor system of an S-MMS 18 (illustrated by the front wheel 1220a) that is preparing to travel up a 5-degree slope, which will lead to a nose up condition.

Figure 29C:
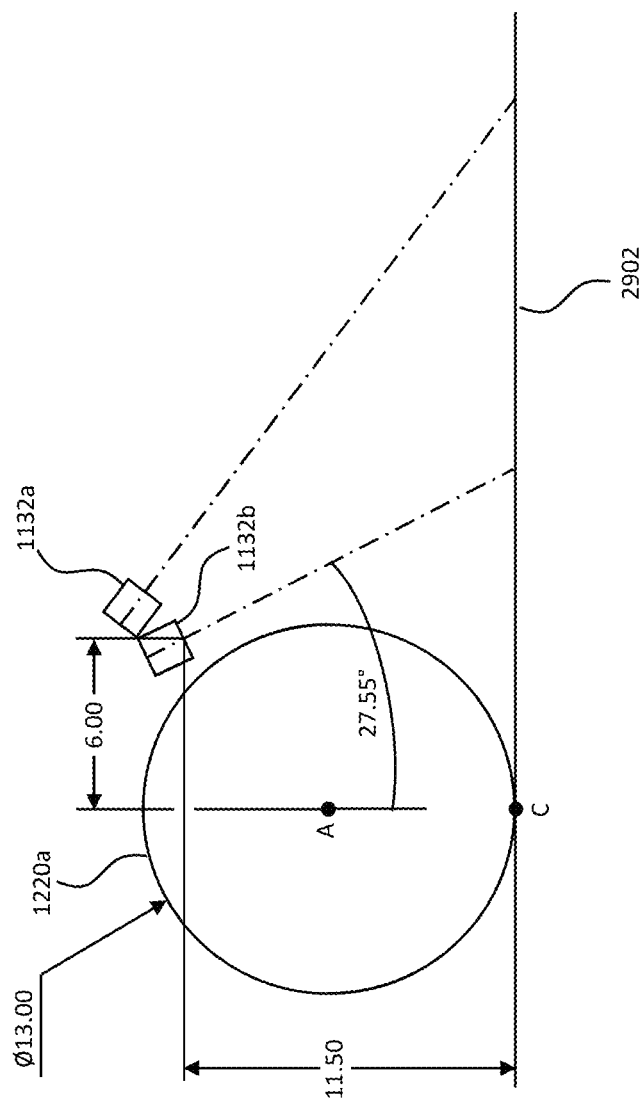
FIG. 29C illustrates an exemplary embodiment of a calculated current sensor position.

At step 2804, a current sensor position is calculated using the one or more sensor orientation angles determined at step 2803. There are many ways to do this, but one approach is described below with reference to FIGS. 29C-G. With reference to FIG. 29C, for an S-MMS 18 traveling on a flat ground plane 2902, the position of sensor 1132b with respect to the ground plane 2902 may be determined if the diameter of the wheel (e.g. 13.00) is known. For example, the horizontal distance of the sensor 1132b receptor from the point of contact of the wheel with the ground plane C is equivalent to the distance from the axle A to the sensor 1132b receptor. Equation 1 shows this calculation, with reference to FIG. 29A.

Horizontal Distance to Receptor=axle-sensor dist.*SIN(axle-sensor angle)=7.81*SIN(50.2)=6  Eq. 1

The height of the sensor 1132b receptor may be calculated from the point of contact of the wheel with the ground plane C per Equation 2, and the sensor angle with respect to the ground plane 2902 may be calculated per Equation 3.

Sensor Height=0.5*wheel diameter+vertical axle-sensor dist.=0.5*13.00+5.00=11.50  Eq. 2

Sensor Angle=ARCTAN(horz. dist. to receptor/sensor height)=ARCTAN(6.00/11.50)=27.55°  Eq. 3

On flat ground (as depicted in FIG. 29C), the point of contact of the wheel with the ground C is directly in line vertically with the axle A. On sloped ground, the point of contact of the wheel may no longer align vertically with the axle.

Figure 29D:
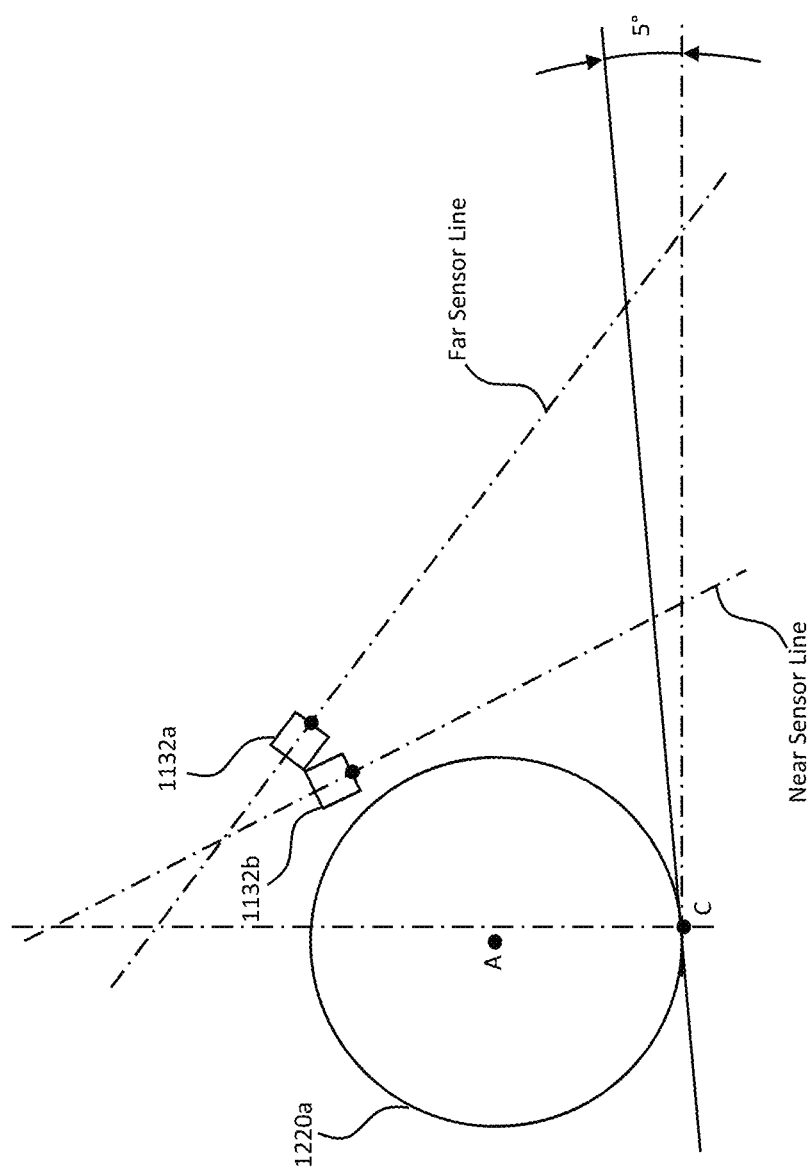
FIG. 29D depicts an S-MMS traveling up a slope.

FIG. 29D depicts the S-MMS 18 traveling up a 5-degree slope. In this situation, the axle A of the front wheel 1220a is no longer vertically aligned with the point of contact of the wheel and the ground C. Therefore, none of the relationships between the wheel point of contact with the ground C and the sensor 1132b receptor are the same as those calculated in Equations 1-3 above. Therefore, deviation in S-MMS 18 pitch and/or roll from perfectly level is incorporated into the check upcoming slopes 2800 calculations. In an embodiment, a change in the S-MMS 18 pitch and/or roll as measured by one or more orientation sensors reporting to the S-MMS controller 110B may be used to calculate one or more current sensor positions at step 2804. The S-MMS controller 110B may receive a report from the GPS and inertial manager 376 with data relevant to the orientation of the S-MMS 18, wherein the orientation is one or more of the pitch and roll of the S-MMS 18. Additionally or alternatively, one or more report from the GPS and inertial manager 376 may be received and combined by navigation 363.

Figure 29E:
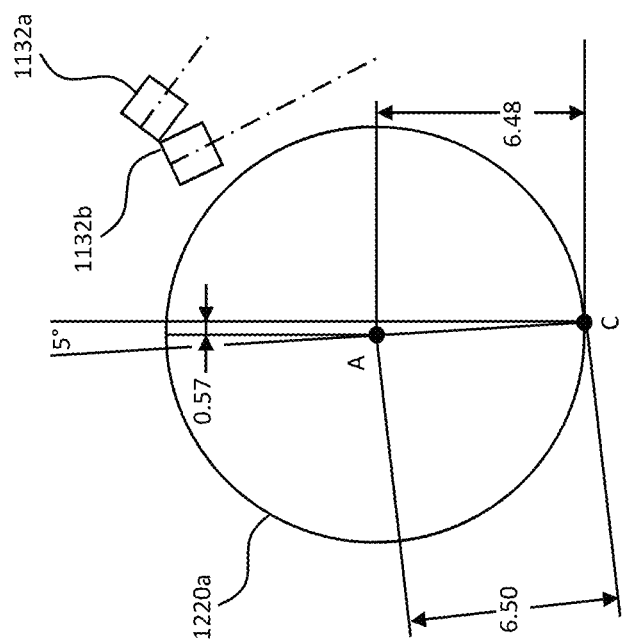
FIG. 29E depicts an S-MMS traveling up a slope with a focus on calculating a point of contact with the ground.

FIG. 29E depicts an S-MMS 18 traveling up a 5-degree slope with a focus on calculating the point of contact with the ground C. The new point of contact between the wheel 1220a and the ground C may be calculated with respect to the axle A using Equations 4-5 and the known radius of the wheel 6.50.

Horizontal Distance from Point $A$ to Point $C$=wheel radius*SIN(slope angle)=6.50*SIN(5.0°)=0.57    Eq. 4

Vertical Distance from Point $A$ to Point $C$=wheel radius*COS(slope angle)=6.50*COS(5.0°)=6.48    Eq. 5

Figure 29F:
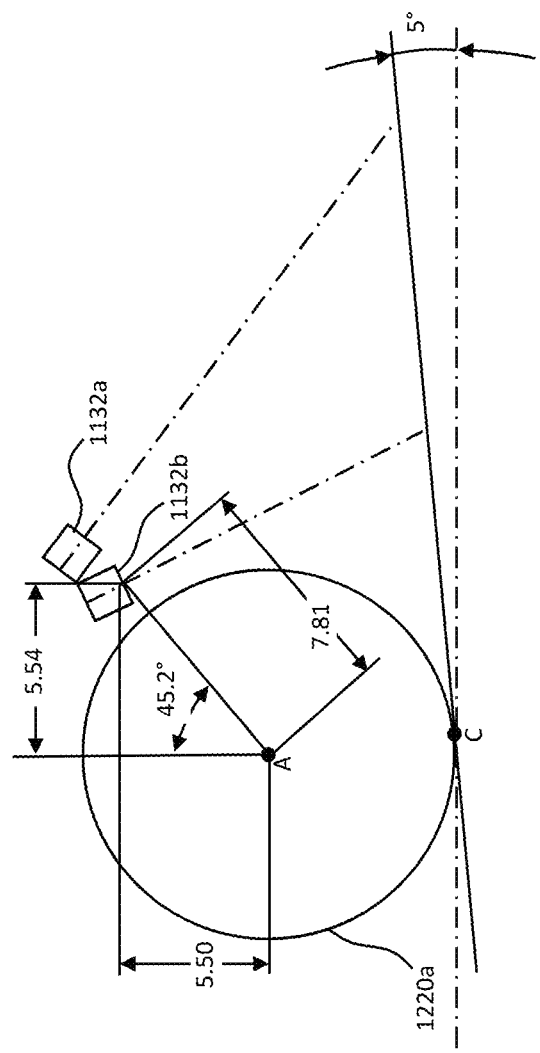
FIG. 29F depicts horizontal and vertical distances from an axle to a sensor receptor.
Figure 29G:
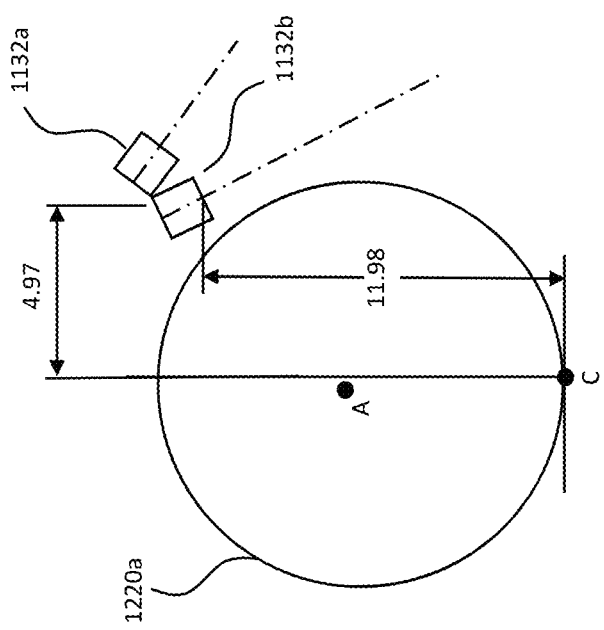
FIG. 29G illustrates an exemplary vertical axle-sensor distance and horizontal axle-sensor distance.

With the vertical and horizontal distances from the new point of contact with the ground C to the axle A calculated, the new distance from the point of contact with the ground to the sensor 1132b receptor is determined. As a next step, FIG. 29F depicts the horizontal and vertical distances from the axle A to the sensor 1132b receptor. They may be calculated using equations 6-7 with respect to the known, constant sensor distance to the axle (e.g. 7.81) and a new sensor angle of 45.2-degrees (e.g. 50.2-degrees from FIG. 29A minus the 5-degree slope).

New Horizontal Distance from Point $A$ to Sensor=axle-sensor dist.*SIN(new axle-sensor angle)=7.81*SIN(45.2°)=5.54    Eq. 6

New Vertical Distance from Point $A$ to Sensor=axle-sensor dist.*COS(new axle-sensor angle)=7.81*COS(45.2°)=5.50    Eq. 7

Combining the distances from FIGS. 29E and 29F, a current vertical ground-sensor distance and a current horizontal ground-sensor distance may be calculated. These values are calculated using Equations 8-9 and depicted in FIG. 29G.

Horizontal Distance from Point $C$ to Sensor=new horz. distance from point $A$ to sensor−horiz. dist. from point $A$ to point $C$=5.54−0.57=4.97    Eq. 8

Vert Distance from Point $C$ to Sensor=vert. distance from point $A$ to point $C$+new vert. distance from point $A$ to sensor=6.48+5.50=11.98    Eq. 9

Figure 29H:
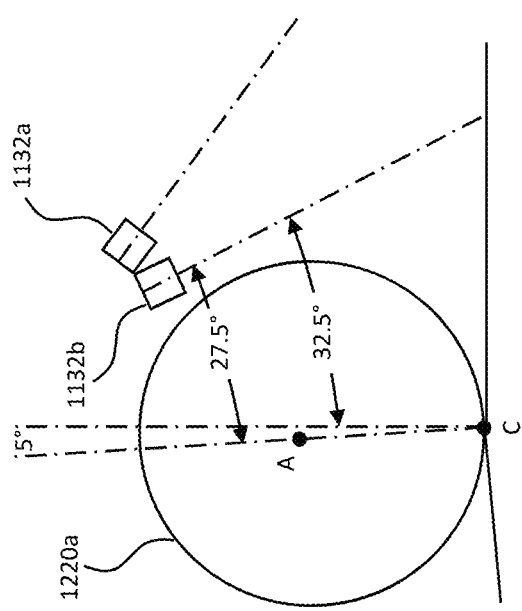
FIG. 29H illustrates an exemplary embodiment of determining a sensor angle of attack.

At step 2805, a new sensor angle of attack (e.g. depicted as 27.5-degrees in FIG. 29C for sensor 1132b) may be determined based upon the current sensor position calculated at step 2804 and/or based on the last sensor angle of attack plus the difference in pitch and/or roll measured since the last calculation. FIG. 29H depicts a new angle of attack (e.g. 32.5-degrees) calculated for sensor 1132b while the S-MMS 18 is traveling up a 5-degree slope. The new angle of attack was calculated using Equation 10. Additionally, FIG. 29H shows the original angle of attack (e.g. 27.5-degrees) from FIG. 29C for reference.

New Angle of Attack=sensor angle+slope angle=27.5°+5.0°=32.5°    Eq. 10

Figure 29I:
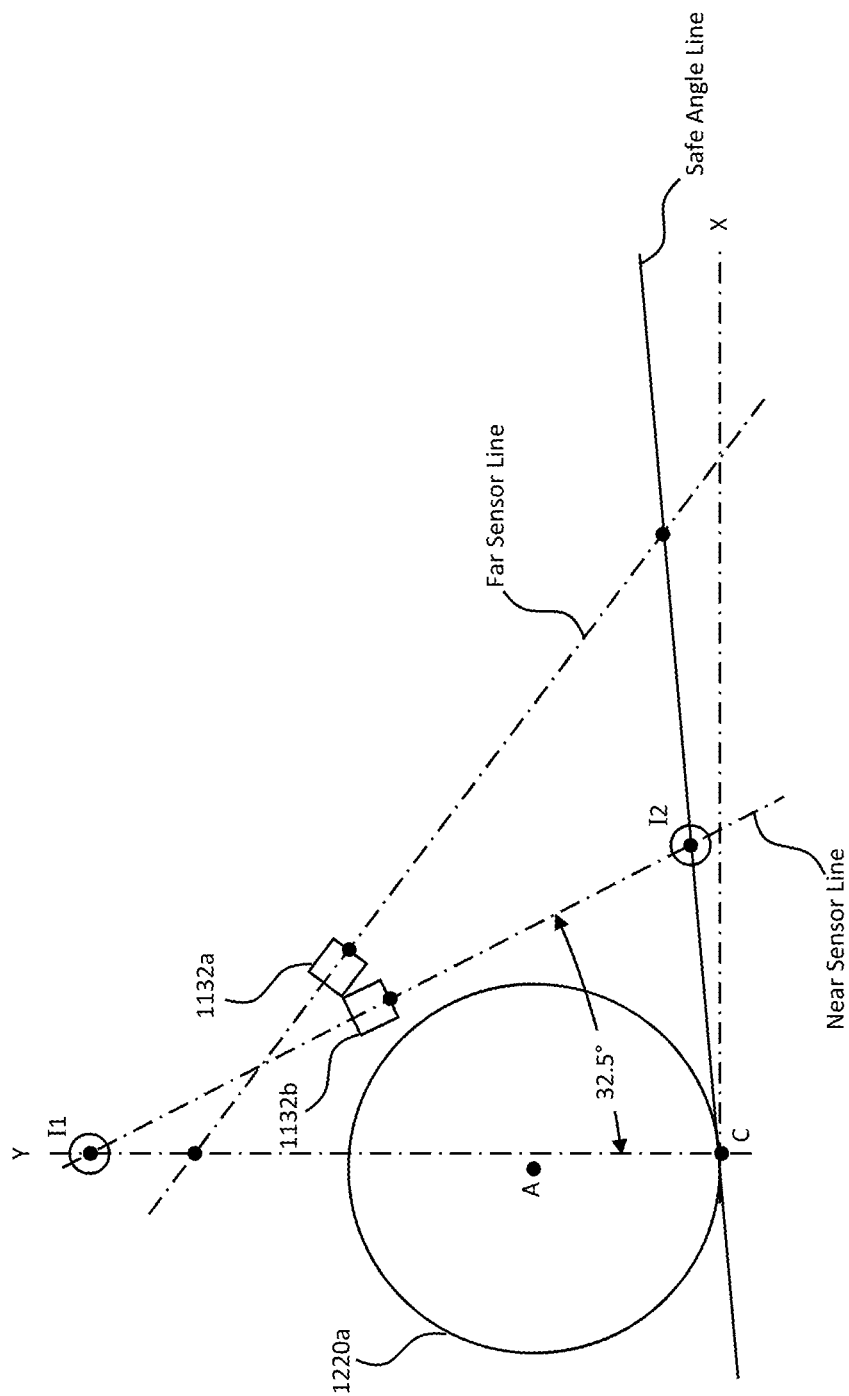
FIG. 29I illustrates an exemplary embodiment of defining line equations for a sensor line.

Equations can now be developed that characterize the sensor measurement and compare it to one or more numerical definitions of a safe surface (e.g. FIGS. 24 and 25). In the depicted embodiment, slope and intercept values of one or more sensor lines of measurement may be defined at step 2806. Step 2806 is depicted in FIG. 29I with a focus on the near sensor line of measurement. The equation of a line is defined by Equation 11 where Y is the distance from the origin along the y-axis at any distance X from the origin along the line x-axis. M is the slope of the line and B is the y-intercept.

FIG. 29I illustrates an embodiment of defining line equations for slopes of the safe angle line, the near sensor line, and the far sensor line. The slope of the safe angle line may be defined as a tangent of the safe angle where the safe angle is 5-degrees in an embodiment (e.g. 0.087). The slope of the near sensor line may be defined as the negative, inverse tangent of 90-degrees minus the sensor angle (e.g. −1.57). In FIG. 29I, based on distances and angles previously calculated, the equation of the near sensor line, with y-intercept point I1, is shown in Equation 12.

$Y=M*X+B$    Eq. 11

$Y$=−ARCTAN(90°−new angle of attack)*$X$+[vert. distance from point $C$ to sensor+horz. distance from point $C$ to sensor/TAN(new angle of attack)]=ARCTAN(90°−32.5°)*$X$+[11.98+4.97/TAN(32.5°)]    Eq. 12

In addition to defining the equations for the sensor lines of measurement, values must be defined for a safe surface. These values may in some embodiments be static threshold values stored in memory 120 or may be predefined equations that may be used to calculate threshold values based on current measurements of state received by the S-MMS controller 110B. As a non-limiting example, FIG. 29I depicts a safe angle line that is used as a safe surface definition. The safe angle line can similarly be defined using equation 11 wherein the y-intercept is zero because the line begins by designating the ground point of the wheel (the point at which the wheel contacts the ground) as an origin. All line equations for the safe angle line, the near sensor line, and the far sensor line are defined from this origin in this example. Additionally or alternatively, additional sensor lines (e.g. far sensor line in FIG. 29I) or safe surface definition equations (e.g. warning and stop lines depicted in FIG. 24) may be defined as part of the define equations step 2806. In some embodiments, equations other than lines may be used to characterize a safe surface.

The process continues to step 2807, where intersection points of the safe angle line to the near sensor line are calculated. The intersection points may be determined using the equations 13-15:

$Y1=M1*X$ and $Y2=M2*X+B2$    Eq. 13

$X=B2/(M1-M2)$    Eq. 14

Figure 29J:
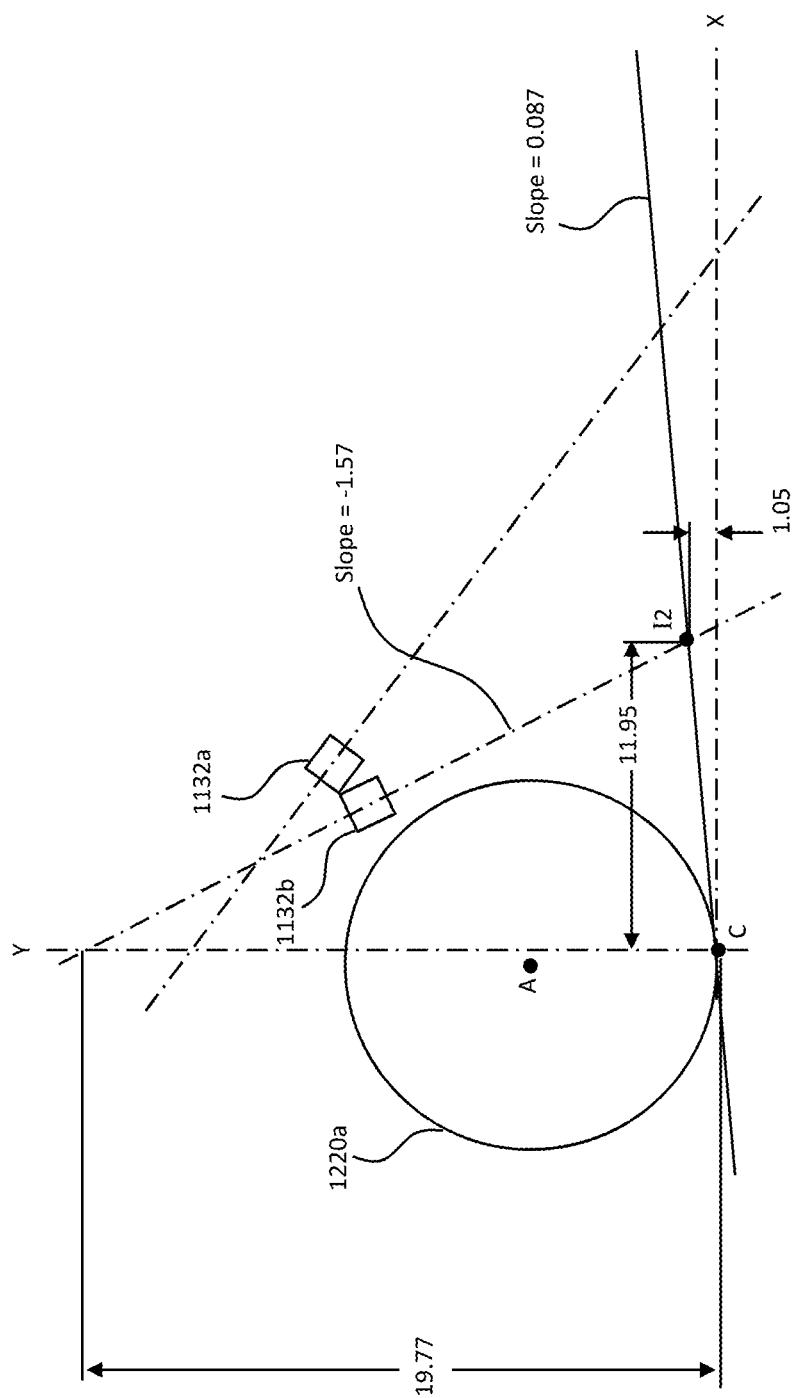
FIG. 29J illustrates an exemplary embodiment of calculated intercepts of a line.
Figure 29K:
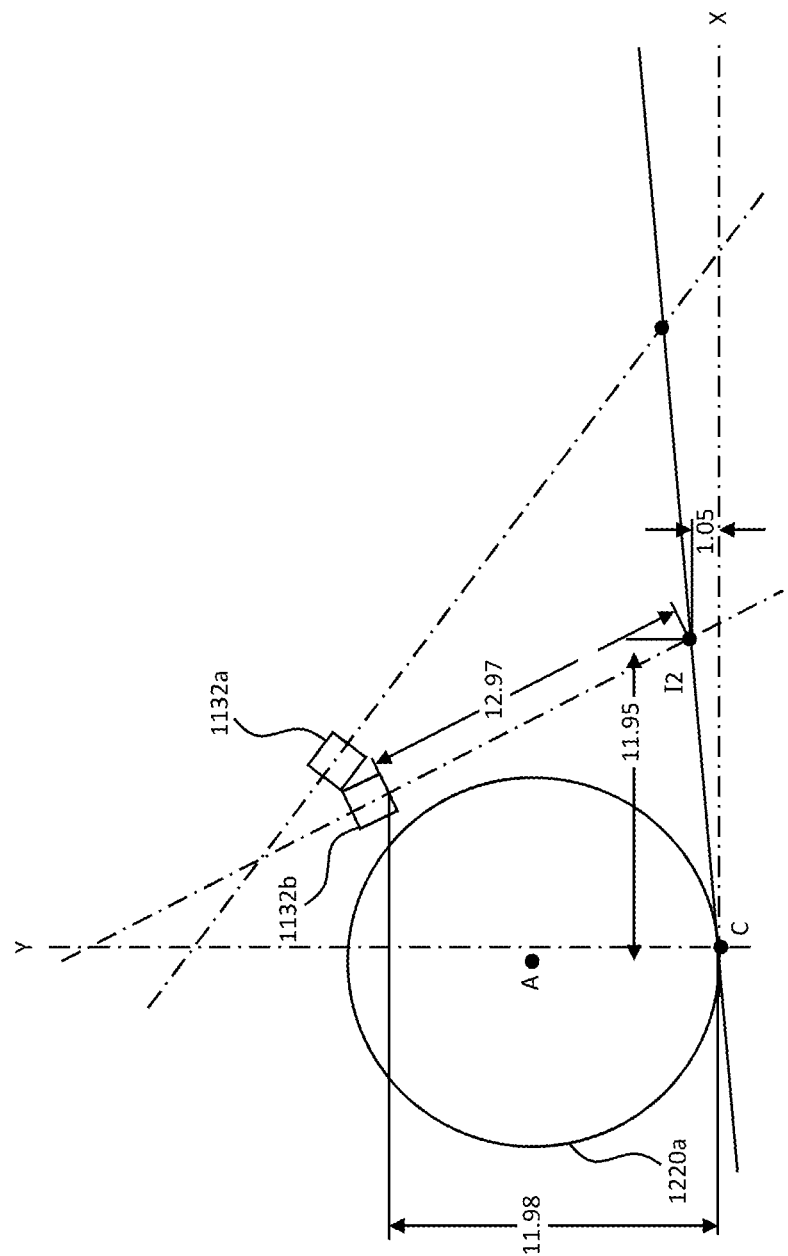
FIG. 29K depicts an exemplary embodiment of finding intersection points of a safe angle line to a near sensor line.
Figure 29L:
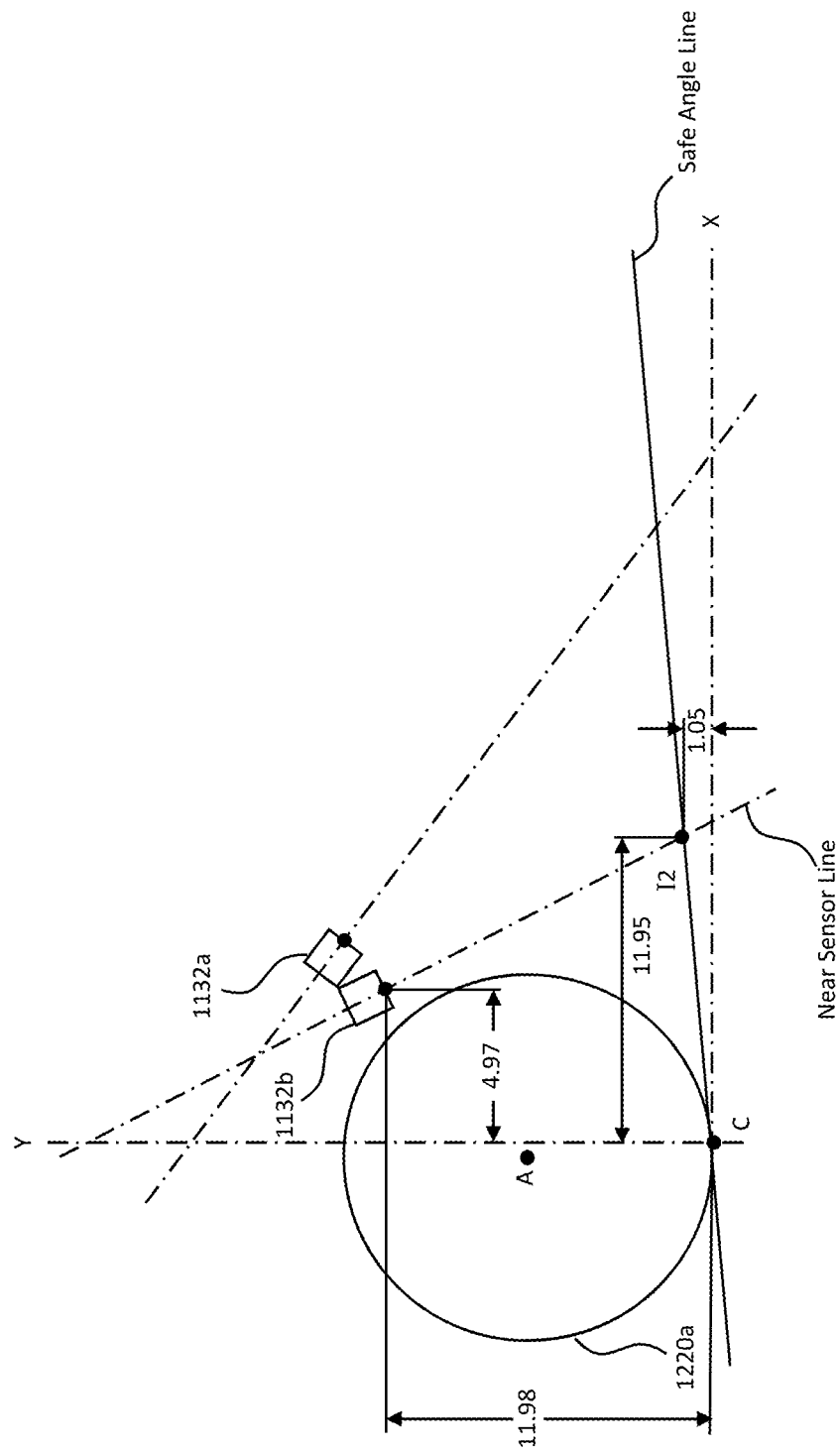
FIG. 29L illustrates an example embodiment of a determined safe sensor distance.

$Y=(M1*B2)/(M1-M2)$    Eq. 15

Wherein M1 is the slope of the safe angle line (FIG. 29I) and M2 is the slope of the near sensor line. The y-intercept of the near sensor line is denoted by B2 above. In equation 14, the two equations (Eq. 13) are set equal to each other and solved for X. Finally, in Equation 15, Equation 14 is inserted in to the first equation for Y1. Together equations 14 and 15 allow calculation of the location of the intercept point I2 in FIG. 29I. A similar process may be used to calculate additional intercept values for additional safe angle lines and/or sensor lines (e.g. far sensor line). The calculated intercepts are depicted in FIG. 29J. FIG. 29K depicts an exemplary embodiment of finding intersection points of the safe angle line to the near sensor line using equations 14 and 15 above. The numeric calculation of the X and Y location of point I2 on FIG. 29J is shown in Equation 16 and 17 respectively.

$X=19.77/(0.087-(-1.57))=11.95$    Eq. 16

$Y=(0.087*19.77)/(0.087-(-1.57))=1.05$    Eq. 17

The process continues to step 2808, where one or more safe sensor distances are determined. A safe sensor distance is a calculated value that may be compared to received sensor reports by one or more rules engines. In an embodiment, the rules engine may be part of the check upcoming slopes process 2800. Additionally or alternatively, all or part of the rules engine may be a part of another part of the SAC 302, such as a safety manager 550. The rules engine may determine if the measured values (e.g. sensor reports 372-734) are within an acceptable range. In an embodiment, the safe sensor distance may be calculated using the equation:

$$d_{SAFE} = \sqrt{((x2-x1)^2+(y2-y1)^2)} \quad \text{Eq. 18}$$

Where x2 is the horizontal distance from the point of contact of the wheel C to the point of intersection I2, and x1 is the horizontal distance from the point of contact of the wheel C to the sensor receptor. Similarly, y2 is the vertical distance from the point of contact of the wheel C to the sensor receptor, and y1 is the vertical distance from the point of contact of the wheel C to the intersection I2. An example embodiment of a determined safe sensor distance is described below with reference to FIG. 29L. The safe sensor distance or the near LIDAR unit 1132b in the exemplary embodiment illustrated by FIG. 29L, may be calculated as:

$$d_{SAFE} = \sqrt{((11.95-4.97)^2+(11.98-1.05)^2)} = 12.97 \quad \text{Eq. 19}$$

Figure 29M:
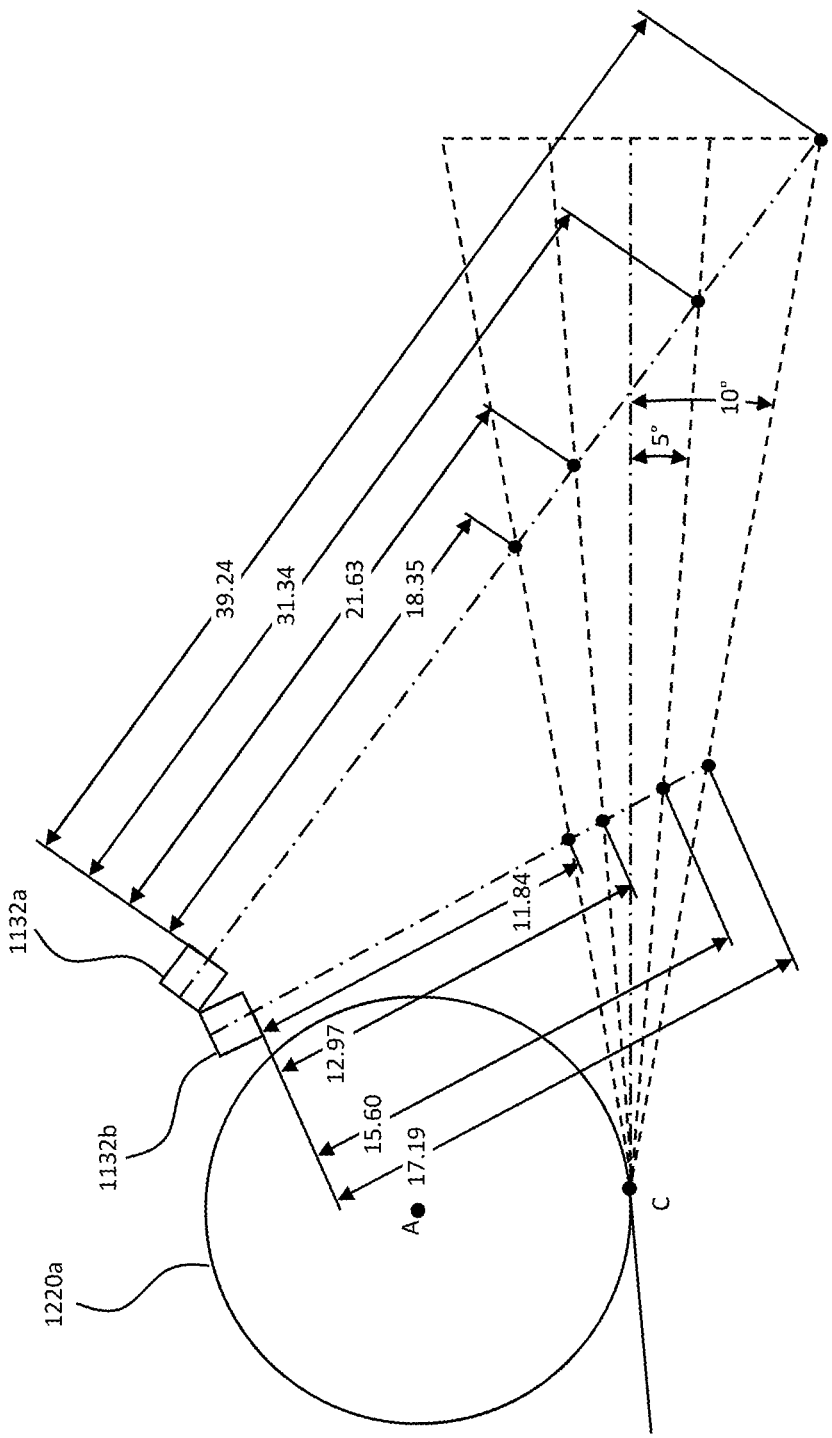
FIG. 29M illustrates an exemplary embodiment of positive safe and warning distances and negative safe and warning distances.

The process concludes at step 2809, where steps 2803-2808 may be repeated for positive warning and safe distances and for negative safe and warning distances. FIG. 29M illustrates an exemplary embodiment of the positive safe and warning distances and negative safe and warning distances calculated using the previously disclosed process and the warning and safety zones consistent with FIG. 24. In the embodiment illustrated by FIG. 29M, the positive warning distance of the near LIDAR unit 1132b is 11.84 inches while the positive warning distance of the far LIDAR unit 1132a is 18.35. The positive safe distance of the near LIDAR unit 1132b is 12.97 inches while the positive safe distance of the far LIDAR unit 1132a is 21.63 inches. The negative safe distance of the near LIDAR unit 1132b is 15.60 inches while the negative safe distance of the far LIDAR unit 1132a is 31.34 inches. The negative warning distance of the near LIDAR unit 1132b is 17.19 inches while the negative warning distance of the far LIDAR unit 1132a is 39.24 inches.

Distance readings from one or more sensors to the ground proximate to the S-MMS 18 (e.g. one or more measurements from one or more sensors) may then be compared to a range of acceptable distances and/or slopes/angles calculated as part of the check upcoming slopes calculations process 2603A. FIG. 29M depicts an embodiment of a range of acceptable distances calculated for a given S-MMS 18 and ground profile through the check upcoming slopes process 2604 that can be compared against sensor readings from a near sensor 1132b and a far sensor 1132a. FIG. 29M assumes a warning zone of 5-degrees and a maximum allowable tilt of the S-MMS 18 of 10-degrees. Therefore, in FIG. 29M, sensor reports from sensor 1132b to the ground that are determined by the SAC 302 to be between the values of 12.97-inches and 15.60-inches to the ground will be considered to be acceptable and no changes to S-MMS 18 operations may be made by the S-MMS controller 110. However, in the same embodiment, a sensor report from the sensor 1132b to the ground of less than 12.97-inches but more than 11.84-inches may be characterized by the SAC 302 as potentially dangerous and may cause the S-MMS 18 speed or allowable direction to be limited by the S-MMS controller 110. Sensor reports from sensor 1132b to the ground proximate the S-MMS 18 of greater than 15.60-inches may be characterized by the SAC 302 as dangerous and may cause one or more directions of travel and/or speeds of the S-MMS 18 to be blocked by the S-MMS controller 110. The numbers used to describe the behavior are representative only and may change based on S-MMS 18 geometry, sensor mounting, etc. This process may be used in all directions (e.g. when traveling backwards or side/side).

FIGS. 29A-L illustrate steps of a check upcoming slopes process 2800 according to an exemplary embodiment. Although provided with specific measurements and angles, one or more of the particular values provided in FIGS. 29A-L may vary between various embodiments.

Additional Upcoming Terrain Embodiment

Figure 30B:
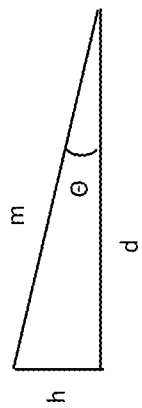
FIG. 30B depicts measurements that may be made to determine an orientation of an S-MMS.
Figure 30C:
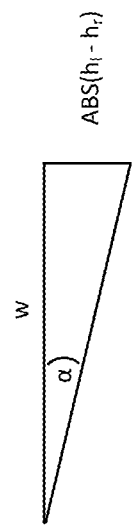
FIG. 30C depicts measurements that may be made to determine an orientation of an S-MMS.
Figure 30A:
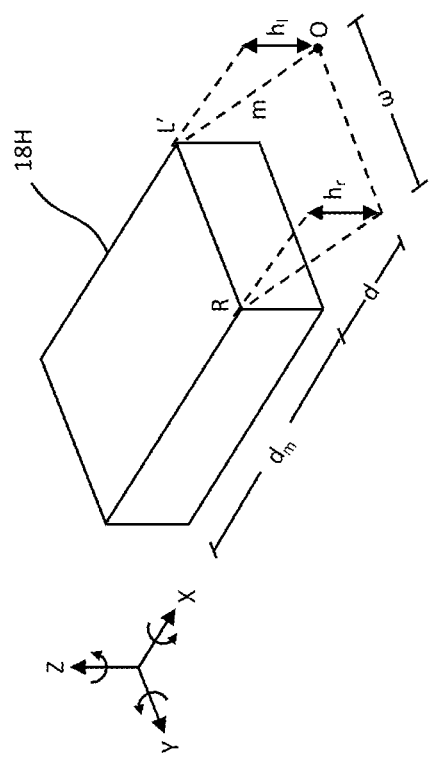
FIG. 30A depicts measurements that may be made to determine an orientation of an S-MMS.

Additionally or alternatively, the previously disclosed upcoming slopes calculations depicted in FIGS. 29A-L may include slope-checking calculations as disclosed in FIGS. 30A-C. FIGS. 30A-C depict a manner of processing received sensor data to determine whether one or more upcoming slopes are unsafe. As a non-limiting example, referring to FIG. 30A, a right (R) to left (L) roll angle of a body 18H (e.g. S-MMS) may be determined by comparing a measured right-side height $h_r$ to a measured left-side height $h_l$. In one exemplary embodiment, the check upcoming slopes process 2800 (FIG. 28) determines the upcoming roll and/or pitch tilt angles of an S-MMS 18H using one or more non-contact sensors, such as LIDAR sensors. The sensors may be configured to measure a distance between the sensor and a surface (e.g., a surface upon which the S-MMS 18H is operating). The S-MMS 18H has a width w. One or more sensors may be placed at right and left sides of the S-MMS 18H in a downward-facing direction to measure a distance to a surface m.

With reference to FIG. 30B and the right side of the S-MMS 18H, the height $h_r$ may be measured if the orientation angle of the sensor relative to some reference $\theta_r$ is known. Assuming a flat surface upon which the body operates, the height on the right side of the body $h_r$ should be equal to the height on the left side of the body $h_l$. However, if the surface the S-MMS 18H is approaching is inclined in either direction (left-right), the measured distance to the surface will be different on each side.

Referring to FIG. 30C, the roll of the approaching surface may be calculated according to the following equations:

$$\text{TAN } \alpha = |h_l - h_r|/w \quad \text{Eq. 20}$$

$$\alpha = \text{ARCTAN}(|h_l - h_r|)/w) \quad \text{Eq. 21}$$

Where the angle alpha ($\alpha$) is the roll of the approaching surface, $h_r$ and $h_l$ are the heights calculated from sensor measurements (m) on the right and left sides of the S-MMS 18, respectively, and w is the width of the S-MMS 18. The predicted pitch and/or roll angle alpha ($\alpha$) of the S-MMS 18 may be adjusted according to the pitch and/or roll angle as measured, for example, by one or more orientation sensors on the S-MMS 18. The same calculations may be performed to determine one or more other operating angles along any other axis defined for the S-MMS 18, such as pitch. When unsafe pitch and/or roll angles are detected in this manner, a tipping angle panic alert may be determined, S-MMS 18H operations may be limited, an appropriate status may be set, and one or more alerts or notifications may be generated by the S-MMS controller 110.

In an embodiment, if a calculated pitch or roll angle is greater than or equal to 12-degrees, a tilt angle panic alert condition may be determined by the SAC 302B, an appropriate status may be set, and/or one or more alerts, actions, or notifications may be generated by the SAC/S-MMS controller 110B. If a pitch or roll angle is greater than or equal to 10-degrees but less than 12-degrees, a tilt angle warning condition may be determined, an appropriate status may be set, and/or one or more alerts, actions, or notifications may be generated by the SAC/S-MMS controller 110B. In response to a tilt angle warning condition, the SAC/S-MMS controller 110B may be configured to limit S-MMS 18 output (e.g., to limit a movement speed and/or direction) and may provide an audible or visual warning to a user of the S-MMS 18 or to a caretaker or third party. If a pitch or roll angle is less than 10-degrees, the SAC 302B may determine that the S-MMS 18 is operating in a safe zone and allow the S-MMS proceed without any intervention, in some embodiments. This behavior is similar to that described in FIG. 18 based on pitch and/or roll measurements by one or more onboard IMU units, but is predictive based on upcoming surfaces in combination with current orientation of the S-MMS 18.

Check for Steps

Due to the construction of many S-MMSs 18, a condition may exist wherein a sudden step or other vertical increase or decrease that is considered safe from a pitch and/or roll perspective (e.g. the logic described in FIG. 29A-L and FIG. 30A-C) may still cause a particular S-MMS 18 to tip. In order to avoid these conditions, a step check process (see step 2604 of FIG. 26) may be included in the upcoming terrain safety process 2600 to check for steps or other vertical or rear vertical increases or decreases in the surface (e.g. ground) proximate to the S-MMS 18.

Figure 31:
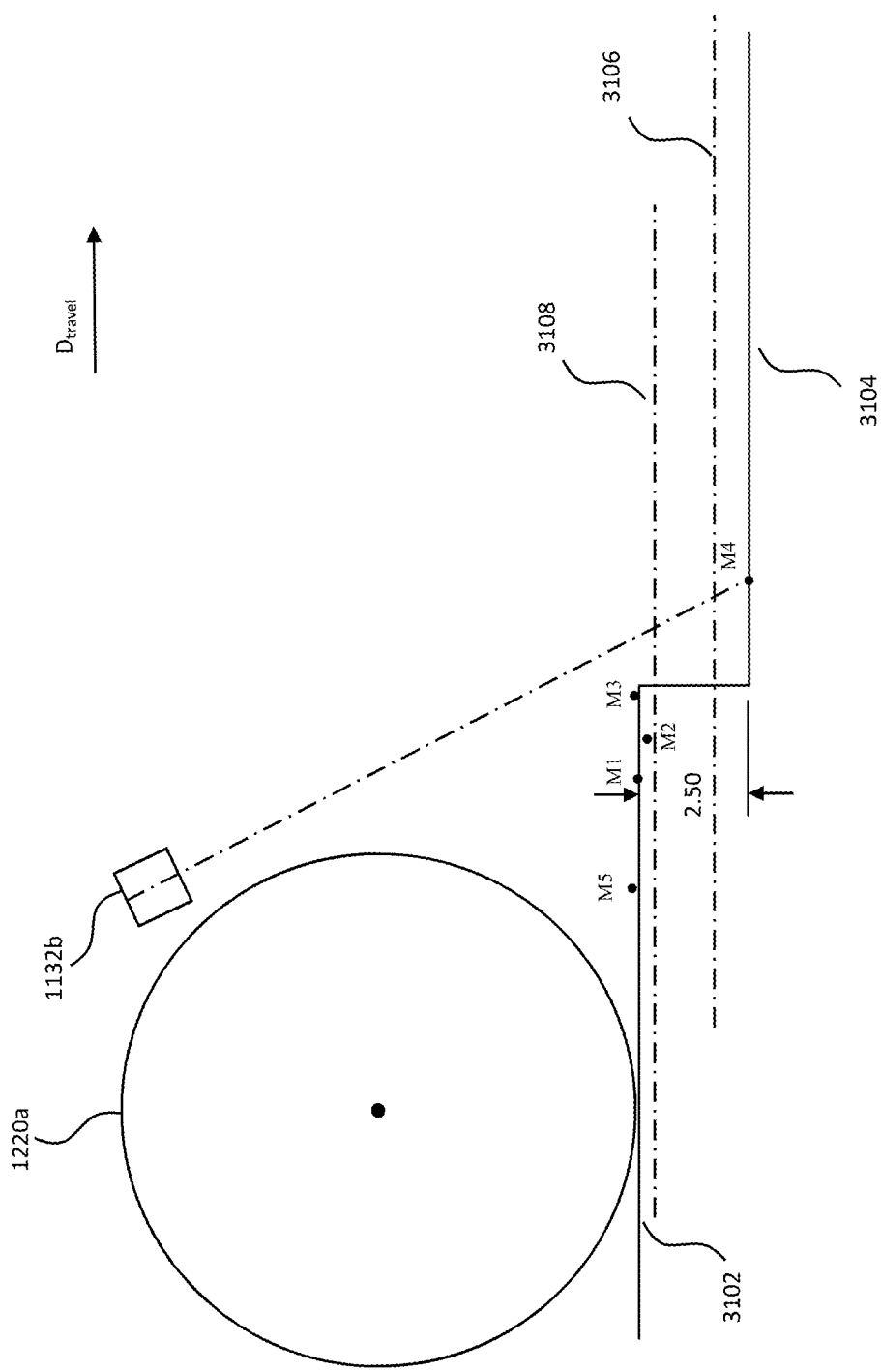
FIG. 31 depicts an S-MMS traveling on a surface with a step change.

FIG. 31 depicts an S-MMS 18 with a front wheel 1220a and a sensor 1132b traveling on a surface 3102. The sensor 1132b is configured to measure the distance from the sensor 1132b to the surface, and three previous sensor measurement locations are shown M1-M3. The surface 3102 has a 2.50-inch step 3104 that the S-MMS 18 is approaching as it travels in $D_{travel}$. The current sensor measurement location M4 is depicted.

In a step check process, one or more current sensor reports (e.g. distance to M4 as measured by non-contact sensor 1132b in an embodiment) is compared to one or more previous sensor reports (e.g. the distances to M1-M3) stored in memory 120 by the SAC 302B. In an embodiment, a rules engine of the SAC 302B (e.g. part of the basic stability manager 520) compares the current distance reading M4 to an average of the last three readings M1-M3 to determine if there is a change in measured distance to the surface greater than a predefined threshold 3106. If a step change or other vertical or near vertical increase or decrease greater than one or more defined thresholds (e.g. 3106) is detected, the SAC 302B may cause the S-MMS controller 110B to stop S-MMS 18 motion in the travel direction $D_{travel}$ where a step has been detected. In an embodiment, motion may be stopped by the S-MMS controller 110B by modifying or overwriting control instructions received from the HMI 352 before they are delivered to one or more motor controllers 351 on the S-MMS 18.

After motion has been stopped by the S-MMS controller 110B in a given direction due to a step change, motion in that direction may be blocked until the basic stability manager 520 of the SAC 302B determines the surface proximate to the S-MMS 18 is safe. In an example, the S-MMS 18 of FIG. 31 backs up in the direction opposite $D_{travel}$ until sensor 1132b reads a distance to a point M5. If this point is determined by the SAC 302B to be equivalent to or within some threshold (e.g. threshold 3108) of the original value. One or more step threshold values (e.g. thresholds 3106 and 3108) may be retrieved from memory 120 or may be calculated based on a combination of S-MMS settings stored in memory 120 and/or current sensor reports received by the S-MMS controller 110B. As a non-limiting example, an embodiment of the rules engine may use a threshold of +/−20% of the original average value measured before the step change was detected to determine the threshold 3108. Once the surface proximate to the S-MMS 3102 is determined safe by the SAC 302B, the S-MMS controller 110B may allow motion in the direction $D_{travel}$. The disclosed step check process may be used on any sensor reports received by the S-MMS controller 110B.

Implementations consistent with the present disclosure may provide a "safe zone" for operating within a range whereby the S-MMS 18 is allowed to drop up to 2.0-inches by the SAC 302B basic stability manager 520 without any limits of movement by the S-MMS controller 110B, in some embodiments. The S-MMS 18 may be allowed to ascend or descend a slope (pitch) up to 6-degrees from horizontal without any limit on movement of the S-MMS 18 by the S-MMS controller 110B, in some embodiments. The S-MMS 18 may further be allowed to tilt side-to-side (roll) up to 6-degrees without any limit on movement of the S-MMS 18 by the S-MMS controller 110B, in some embodiments. A warning zone may include one or more ranges outside the safe zone and may include allowing the S-MMS 18 to drop up to 2.5 inches with increasingly greater limits on S-MMS 18 movement enforced by the S-MMS controller 110B based on outputs from the SAC 302B processes, such as the basic stability manager 520, in some embodiments. The S-MMS 18 may be allowed to ascend or descend a slope (pitch) up to 12-degrees with increasingly greater limits on movement of the S-MMS by the S-MMS controller 110B, in some embodiments. The S-MMS 18 may be allowed to tilt side-to-side (roll) up to 12-degrees with increasingly greater limits on movement of the S-MMS by the S-MMS controller 110B, in some embodiments.

Alternative Sensor Embodiments

In some embodiments search, and track sensor reports 373 and/or image sensor reports 374 (FIG. 5) may be used additionally or alternatively to the non-contact sensor reports 372 previously described. These alternative sensor embodiments may include scanning LIDAR and/or distance camera sensors in some embodiments. A distance camera (a.k.a. range imaging) is a sensor or combination of a camera and a sensor used to produce a 2D image showing the distance to points in a scene from a specific point. Use of one or more scanning and/or image sensors allows a richer dataset for use in one or more of the disclosed processes. The same logic disclosed above may be utilized by the SAC 302B processes where all or a sample of the pixels or data points measured may be used as a unique point measurement applied to a group of data points obtained.

Figure 32:
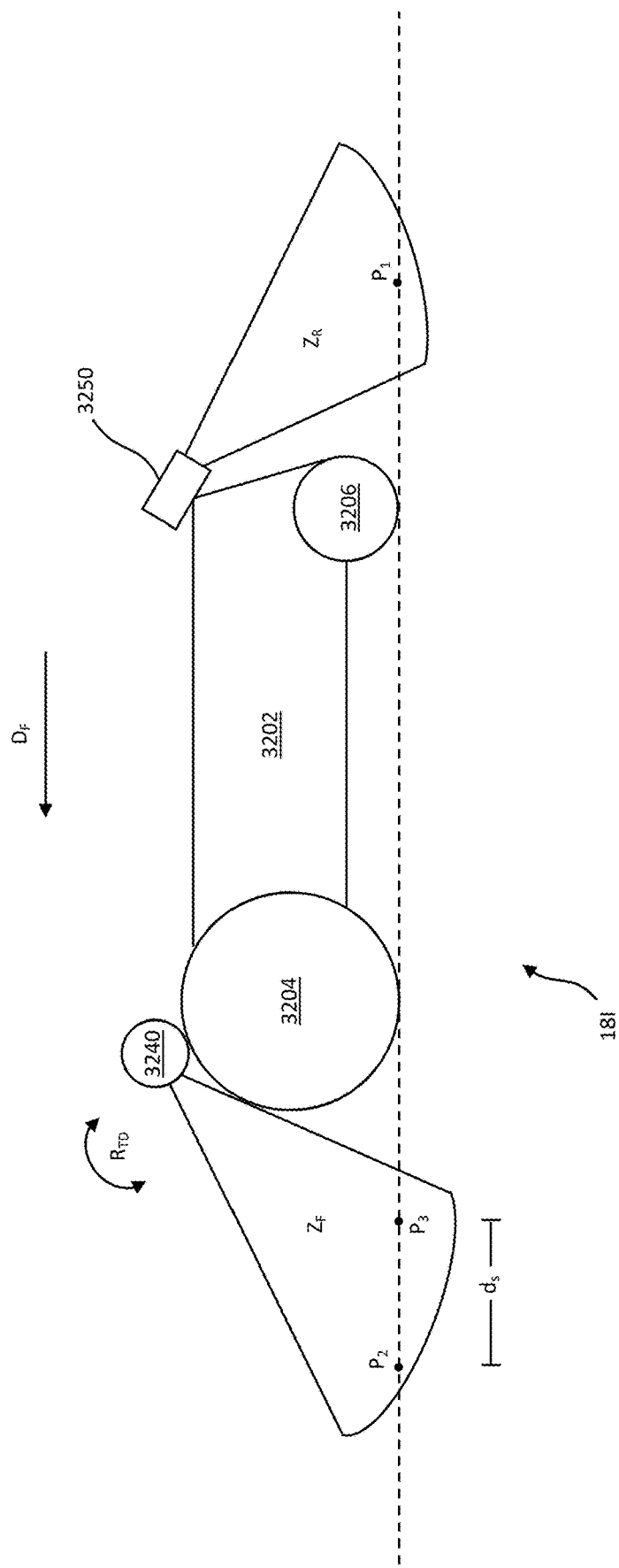
FIG. 32 depicts an embodiment of a scanning sensor configuration for use with an S-MMS.

FIG. 32 illustrates an embodiment of a scanning sensor configuration on an S-MMS 18I. A scanning sensor may be a line-scan or area-scanning device where one or more point sensing units (e.g. a LIDAR or RADAR non-contact sensor) are swept around an arc or over an area making measurements. The typical output of a scanning sensor is a line or point cloud of data points. FIG. 32 includes an S-MMS 18I having a body 3202, a front wheel 3204, and a rear wheel 3206. One or more of a front sensor module 3240 and a rear sensor module 3250 is coupled to the S-MMS 18I. In some embodiments, one or more of the front sensor module 3240 and the rear sensor module 3250 incorporate a single, scanning sensor configured to measure a distance from the sensor to an object or surface. For example, in the embodiment illustrated in FIG. 32, each of the front sensor module 3240 and the rear sensor module 3250 include a single, scanning sensor. In some embodiments, the front sensor module 3240 and/or rear sensor module 3250 may include more than one scanning sensor.

The rear sensor module 3250 measures a distance to a point $P_1$ within the rear sensor zone $Z_R$. The location of point $P_1$ may be predetermined or may be dynamically determined by the S-MMS controller 110B during operation based on one or more of the S-MMS 18I velocity, one or more threats detected by the SAC 302B, or user preferences. Although illustrated with a single zone $Z_R$ and a single point $P_1$, the rear sensor 3250 may be configured to operate and scan (e.g. measure) within a plurality of zones and/or measurement points (e.g., by scanning in association with a plurality of zones or points capable of measurement by the rear sensor 3250).

The front sensor 3240 measures a distance to a point $P_2$ within the front sensor zone $Z_F$ and a point $P_3$ within the front sensor zone $Z_F$, both along the direction $D_F$. The location of each of points $P_2$ and $P_3$ may be predetermined or may be dynamically determined by the S-MMS controller 110B during operation based on one or more of the S-MMS 18I velocity, one or more threats detected by the SAC 302B or user preferences. Although illustrated with a single zone $Z_F$ and two points $P_2$ and $P_3$, the front sensor module 3240 may be configured to operate and scan (e.g. measure) within a plurality of zones and/or measurement points (e.g., by scanning in association with a plurality of zones or points capable of measurement by the front sensor 3240).

A distance $d_s$ between the points $P_2$ and $P_3$ may be predetermined or dynamically determined by the S-MMS controller 110B during operation of the S-MMS 18I. In some embodiments, the front sensor module 3240 is a line-scan LIDAR sensor configured to perform a plurality of distance measurements. In an example of a rotating, scanning LIDAR implantation, a point LIDAR may be affixed to a rotating motor so that the LIDAR sensor can take a measurement at predetermined intervals as it rotates. In an example, the front sensor 3240 may rotate in direction $R_{TD}$ shown in FIG. 32. As the sensing element of the sensor 3240 rotates in the rotation direction $R_{TD}$, a distance between points $P_2$ and $P_3$ may increase or decrease based on commands from the S-MMS controller 110B to one or more sensor processors 214. As such, rather than merely scanning two points in front of each front wheel and one point behind each rear wheel as previously disclosed, various embodiments may include using a scanning sensor to obtain measurement information regarding a plurality of points associated with the front sensor module 3240 and the rear sensor module 3250. The front sensor module 3240 and/or the rear sensor module 3250 may be configured to intelligently re-aim or electively scan based at least in part upon a command from the S-MMS controller 110B.

In an embodiment, an S-MMS 18 comprises an HMI 352 operably configured to provide control signals with control instructions, an S-MMS controller 110B configured to receive the control signals with control instructions and generate another control signal, wherein the generated control signal causes the motorized mobile system 18 to respond, accesses data related to the user as stored in a secure first memory 120 connected to the S-MMS controller 110, wherein the stored user health data is used to bias the control signal for the S-MMS 18.

In one example, for an S-MMS user traveling at a high rate of speed, but with a documented, slow reaction time (e.g. as indicated by user profile data), the S-MMS controller 110B may reposition one or more sensors. In the embodiment of FIG. 32, the S-MMS controller 110B may send a control signal to a sensor processor 214 (FIG. 2) and request sensor reports for the SAC 302B at point P2 rather than point P3 so that the S-MMS controller 110B can have additional time to warn the user with known slow reaction times of upcoming danger determined by one or more of the SAC 302B processes, such as the basic stability manager 520. In this non-limiting example, the reaction time of the S-MMS user may be used, in part, to determine an aimed position of one or more of the sensors.

Although FIG. 32 illustrates sensors 3240, 3250 as rotating vertically (i.e., about an axis of rotation parallel to the ground), some embodiments may also be capable of rotating/scanning in a horizontal axis (for example, by mounting a sensor unit to a 2 or 3-axis mount, which may be controlled using servos for example). Further, although illustrated and described herein as being mounted with reference to a wheel of the S-MMS 18I, one or more sensors may be mounted to, built into, or otherwise be coupleable to other parts of the S-MMS 18I.

Figure 33:
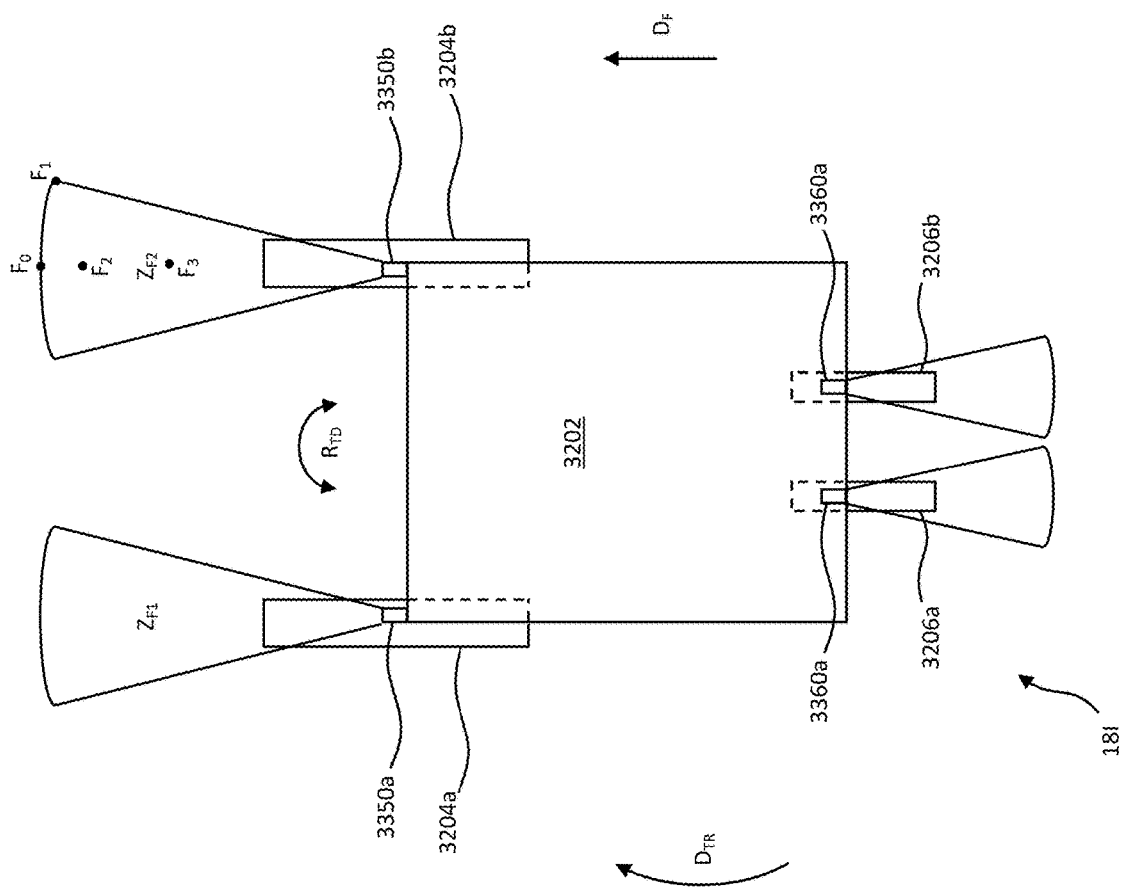
FIG. 33 is a partial overhead view of an embodiment of a scanning sensor implementation.

FIG. 33 illustrates a partial overhead view of an embodiment of a sensor system for an S-MMS 18I which allows for sensor scanning/rotating in both vertically and horizontally. For simplicity, this embodiment will be called a sweep-scanning implementation. FIG. 33 includes an S-MMS 18I having a body 3202, a front left wheel 3204a, a front right wheel 3204b, a rear left wheel 3206a, and a rear right wheel 3206b. One or more of a front left sensor module 3350a and a front right sensor module 3350b may be mounted to, coupleable to, or otherwise positioned relative to one or more of the front left wheel 3204a and the front right wheel 3204b. A first front scan zone $Z_{F1}$ is associated with the front left sensor module 3350a and a second front scan zone $Z_{F2}$ is associated with the front right sensor module 3350b. Each of the front left and right sensor modules 3350a, 3350b are configured to measure a distance within their respective zone $Z_{F1}$ or $Z_{F2}$. For example, the front right sensor module 3350b may be configured to measure a distance to the far front point $F_0$ while the S-MMS 18I is operating at a high velocity. However, as the velocity of the S-MMS 18I slows to a reduced velocity, the SAC 302B of the S-MMS controller 110B may be configured to cause the front right sensor module 3350b to aim at the front point $F_2$. Likewise, the front right sensor module 3350b may be configured to measure the distance to the near front point $F_3$ or may be configured to measure a distance closer to one or more of the front right wheel 3204b and S-MMS 18I. This may be accomplished by a control signal sent from the S-MMS controller 110B to one or more sensor processors 214 which cause the motion of a servo or motor used to position the sensor point of focus.

One or more of the front left sensor module 3350a and the front right sensor module 3350b may be configured to perform scanning in one or more directions other than the forward direction $D_F$. Each of the front left sensor module 3350a and the front right sensor module 3350b may be configured to be aimed in a lateral direction relative to the forward direction $D_F$. For example, in the embodiment illustrated by FIG. 33, the front right sensor module 3350b may be configured to re-aim from the far front point $F_0$ to a far front point $F_1$ when the S-MMS 18I is turning in direction $D_{TR}$. In an embodiment, a rules engine of the SAC 302B monitors the current and desired speed and direction of the S-MMS 18 based on one or more of navigation 363, motor controller outputs 351, and HMI 352 inputs from the user. In the event that the speed or desired direction of the S-MMS 18 change, the SAC 302B rules engine may cause the S-MMS controller 110B to send one or more control signals to one or more sensor processors 214 causing them to re-aim or reposition the focus of the sensor.

While illustrated with reference to a particular S-MMS architecture, the techniques disclosed herein are applicable to any MMS architecture, and the need for multiple scanning sensor systems may be either increased or decreased to meet the particular needs and motion profile of each MMS type.

Active Stability Management

The tipping characteristics of an S-MMS 18 are dynamic in many embodiments. As a non-limiting example, while an average mobile chair MMS weighs between 150 and 250 pounds, the average man in the US weighs approximately 195 pounds. From these numbers, it is easy to see that user seating position and weight distribution will have a significant effect on the tipping characteristics of an S-MMS 18. The impact of user positioning on tipping characteristics is further exacerbated by the fact that the user is often seated in an elevated position on an S-MMS 18 with a narrow wheelbase. Systems currently on the market largely ignore this reality. When acknowledged, current MMSs simply limit top speed or block all driving capabilities based on positioning of the seat or other configuration settings. These attempts at tipping mitigation have no awareness of the actual weight distribution (e.g. the apportioning of weight within an area, often written in the form x/y, where x is the percentage of weight in the front, and y is the percentage in the back and or left/right) of the user or safety of the environment. The S-MMS system architecture and sensor configurations previously disclosed may be configured to support the implementation of both actively tracking instantaneous S-MMS 18 stability (i.e. tipping tolerance) and actively adjusting the S-MMS 18 configuration (as described below) to improve instantaneous tipping tolerance in a given situation.

FIGS. 34A-B illustrate an exemplary embodiment of actively adjusting the S-MMS 18 configuration (e.g. by activating one or more actuators on the S-MMS 18 seating system) to improve instantaneous tipping tolerance. When the mobile chair S-MMS 18J is traveling on a level surface 3402, the seating position may be held to whatever the user preference settings may be. When the S-MMS 18J traverses a sloped surface 3404, angled at an arbitrary angle theta ($\Theta$), the SAC 302B (FIG. 5) may intervene and modify the seating position of the user at an angle phi ($\phi$) determined to improve user comfort and/or increase the tip tolerance of the S-MMS 18J in a given direction ($D_{TIP}$). In an embodiment, the stability of the S-MMS 18J is calculated by the basic stability manager 520 of the SAC 302B based on one or more sensor inputs previously disclosed. In response to a current or predicted instability, the S-MMS controller 110B may send a control signal to one or more motor controllers 351 associated with the seating assembly of the S-MMS 18J to cause the seat position to move responsive to the calculations of the basic stability manager 520. For example, the S-MMS controller 110B may send a control signal to one or more motor controllers 351 to cause one or more motors or actuators controlled by the motor controller(s) to raise or lower a level of the back, front, left, or right side of the seat, or combinations thereof (i.e. one of the front or back in combination with one of the left or right), while maintaining the level of the opposite side(s) of the seat. In another example, the S-MMS controller 110B may send a control signal to one or more motor controllers 351 to cause a foot support, arm rest, or actuated seating component, where the component may be actuated directly by a motor or by a motorized device, such as a linear actuator, servo, or geared mechanism. Additionally or alternatively, the seating assembly may be rotated about an axis of the seat.

In an embodiment, active stability management would be further improved by actively tracking the weight distribution of the user and incorporating the weight distribution into the SAC 302B calculations. By optimizing the seating position angle (e.g. angle phi) to match upcoming terrain (e.g. angle theta), the capabilities of the S-MMS 18J are increased, and user comfort can be increased since the motion to counteract hills is typically "leveling" to the user.

This capability to adjust the seat position angle can be used to adjust for both front-back (pitch) slopes (e.g. adjust the seat position angle phi ($\phi$) by a positive or negative angle with respect to the S-MMS y-axis to compensate for pitch of the S-MMS associated with an angle theta ($\Theta$) of the upcoming terrain) and side-to-side (roll) slope (e.g. adjust the seat position angle phi' ($\phi'$) (not shown in FIGS. 34A-B) by a positive or negative angle with respect to the S-MMS x-axis to compensate for roll of the S-MMS associated with an angle theta' ($\Theta'$) (not shown in FIGS. 34A-B) of the upcoming terrain with properly equipped S-MMS 18J embodiments. In the examples above, a positive angle added to the seat position angle phi or phi' compensates for a negative slope, and a negative angle added to the seat position angle phi or phi' compensates for a positive slope, where the example of FIG. 34B shows a negative angle added to the seat position angle phi to compensate for a positive slope.

Low cost, low resolution mapping of weight distribution on a seat may be accomplished, in one example, using bladder-based pressure sensors. Bladder based pressure sensors detect weight and have some capability to sense a passenger's general seating position. This is accomplished with silicone filled bladders fitted into a seat and tied to one or more pressure sensors. New technologies, such as smart fabrics and imaging, may be used to replace current bladder systems. BeBop Sensors of Berkeley Calif. is producing a fabric-based alternative to bladder-based pressure sensor systems that provides more resolution and, with time, may be cost competitive with current systems. There are several other types of sensors in development, such as electronic pressure mats and sheer mats. Both of these technologies are high resolution, high accuracy measurement tools. In an embodiment, one or more of these sensors may be connected to the S-MMS controller 110B and used as a user sensor report 375 by the SAC 302B. The provided, refined view of user weight distribution may then be used in the stability calculations of the basic stability manager 520.

In some embodiments, weight distribution measurement sensors may be built into the seat mechanism of an S-MMS 18 and connected to the S-MMS controller 110B. For tip avoidance, a general reading of user weight distribution on the S-MMS seating system is sufficient. For some S-MMSs 18, measurement of the weight distribution between the seat back, seat bottom, arm rests, and foot supports may be read directly from force feedback on actuators used to position each of these mechanical systems or from other sensor mechanisms. In some embodiments, force sensors may be added to the mounting provisions of the seat system actuators to gain weight distribution data. This data, in combination with the mechanical position of the seat allows for a more accurate calculation of the tipping characteristics of the S-MMS 18 at any point in time.

In an embodiment, an S-MMS 18 comprises an HMI 352 operably configured to provide control instructions, an S-MMS controller 110B configured to receive the control instructions and generate a control signal, wherein the generated control signal causes a component of the MMS to respond, and one or more sensors operably configured to generate health data related to a user, wherein the health data related to the user is stored in a secure first memory 120 connected to the S-MMS controller 110, wherein the stored user health data is used to bias the control signal for the S-MMS 18. In some embodiments, user data may comprise one or more of orientation, location, position, distance, time, force, mass, weight, pressure, temperature, image, video, light, resistance, voltage, current, power, medical data, raw sensor data, conclusions data, patient measurements, chemical, moisture, electro-dermal, bio-electric impedance, galvanic skin resistance, heart rate, pulse, respiratory rate, blood pressure, wetness, sight, hearing, reaction time, pain status, emotional state, event, state, and action.

Figure 36A:
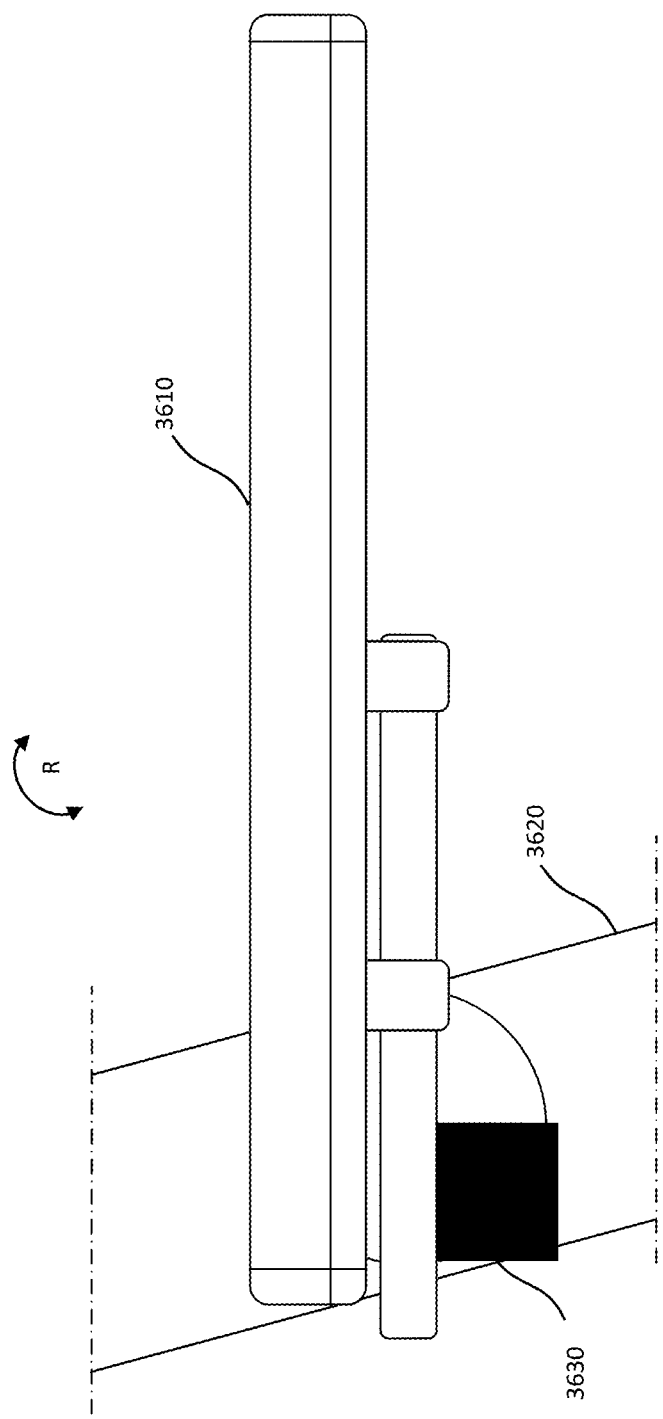
FIG. 36A illustrates an embodiment that uses force sensors to monitor the force applied to arm rests on an S-MMS.
Figure 36B:
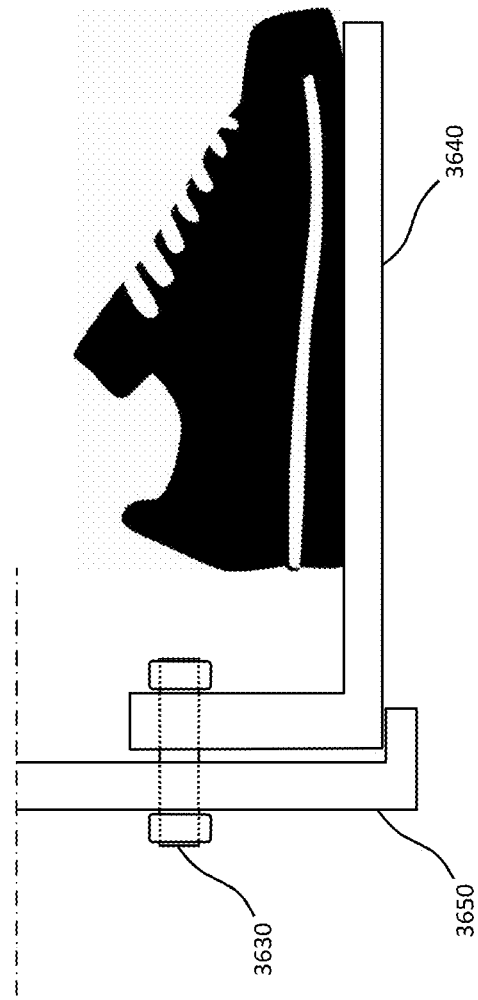
FIG. 36B illustrates an embodiment that uses force sensors to monitor the force applied to a footrest on an S-MMS.

In an exemplary embodiment, the S-MMS 18 includes one or more weight sensors built into a seat or seating system as an integral part of the seat or seating system. FIGS. 35A-B illustrate an exemplary weight distribution sensing seat base or back plate that may accept aftermarket cushions currently on the market. The seat plate 3510 may mount to a rigid frame 3520 of an S-MMS 18 or S-MMS seating system via four strain gauge based force sensors 3540, in the depicted embodiment. This configuration is similar to a Wii® Balance Board and allows sensing and optional tracking of user weight distribution on the plate 3510. FIGS. 36A and 36B illustrate embodiments of strain gauge based force sensors 3630 used to monitor force applied to the foot plate 3640 (FIG. 36B) and arm rests 3610 (FIG. 36A) with respect to the frame of the S-MMS 18 or S-MMS seating system 3620, 3650. A seating system configured with strain gauge based force sensors, when coupled with knowledge of the mechanical position of the seat, is capable of sensing user weight distribution at a resolution sufficient to make robust decisions about current S-MMS 18 tipping characteristics. One or more measurements from the disclosed sensors may be transmitted to the S-MMS controller 110B (in some embodiments via an arbitration layer 370) as user sensor reports 374 and used by the SAC 302B processes, such as the basic stability manager 520, to determine necessary adjustments to the seating position.

Accurate knowledge of user weight distribution on an S-MMS 18 can be used both to avoid unsafe conditions and to increase the capabilities of an S-MMS 18. By understanding the current weight distribution of the user, S-MMS system thresholds for acceptable slopes and steps considered safe by the S-MMS 18 can be either increased or decreased as appropriate. For example, if the user is leaned backwards, thereby placing significant weight toward the rear of the S-MMS 18, then it is likely to be more sensitive to tipping backwards.

Beyond the safety benefits of actively adjusting seating, weight distribution sensing also allows other unique S-MMS 18 capabilities. S-MMS 18 technicians may use the weight distribution data measured by one or more disclosed sensors (e.g. FIG. 35-36) to be displayed on one or more the HMI 352, a paired device (e.g. 602 FIG. 6), or a remote device (e.g. 642 FIG. 6) to assist with S-MMS 18 setup and the mechanical configuration of pads, supports, and other provisions. Users could use the data from the S-MMS 18 seating system for user weight tracking and for games, exercises, and other physical therapy activities. Off-road S-MMSs 18, such as ATVs, may use the data for driver training and/or alerts while jumping or performing other extreme maneuvers. An active seating system may also be used for pressure relief and treatment of pressure sores, which are a significant health problem for S-MMS 18 users. As a non-limiting example, the S-MMS controller 110B may be configured to assist or enforce a weight shifting schedule on the user. This weight shifting schedule may include the S-MMS controller 110B sending a control signal to one or more motor controllers 351 or drive processors 218 at predefined intervals, which cause one or more actuators in a seating system move. This would effectively adjust the positioning of various seat components to move the focus of weight on the bottom and release pressure from the bottom at set intervals. One or more of these modes of use may be enhanced by the use of one or more accompanying applications accessed via a paired smart device (e.g. e.g. 602 FIG. 6).

A Collision Monitor

Mobile chairs often operate in confined spaces and must maneuver around many objects that can be damaged if impacted by the mobile chairs. In addition, mobile chairs can seriously injure both the user and those around the mobile chairs in the event of a collision. For most mobile chair users, impact is a way of life. Bumping into walls, furniture, tables, and other objects is a standard part of the day. An effective collision avoidance system therefore would be a great aide to mobile chair users and would increase the safety of those systems for others.

Many current passenger automobile systems have sensor systems that detect possible collisions and alert the user to the danger. These systems typically consist of non-contact sensor arrays and may or may not override user inputs to the vehicle to keep the driver safe. Similarly, many university research groups have explored the concept of putting passenger automobile-like collision avoidance systems on mobile chair MMS chassis. These existing solutions are inadequate for several reasons, including improper inclusion of MMS vehicle dynamics and lack of inclusion of user abilities in the system.

Figure 37A:
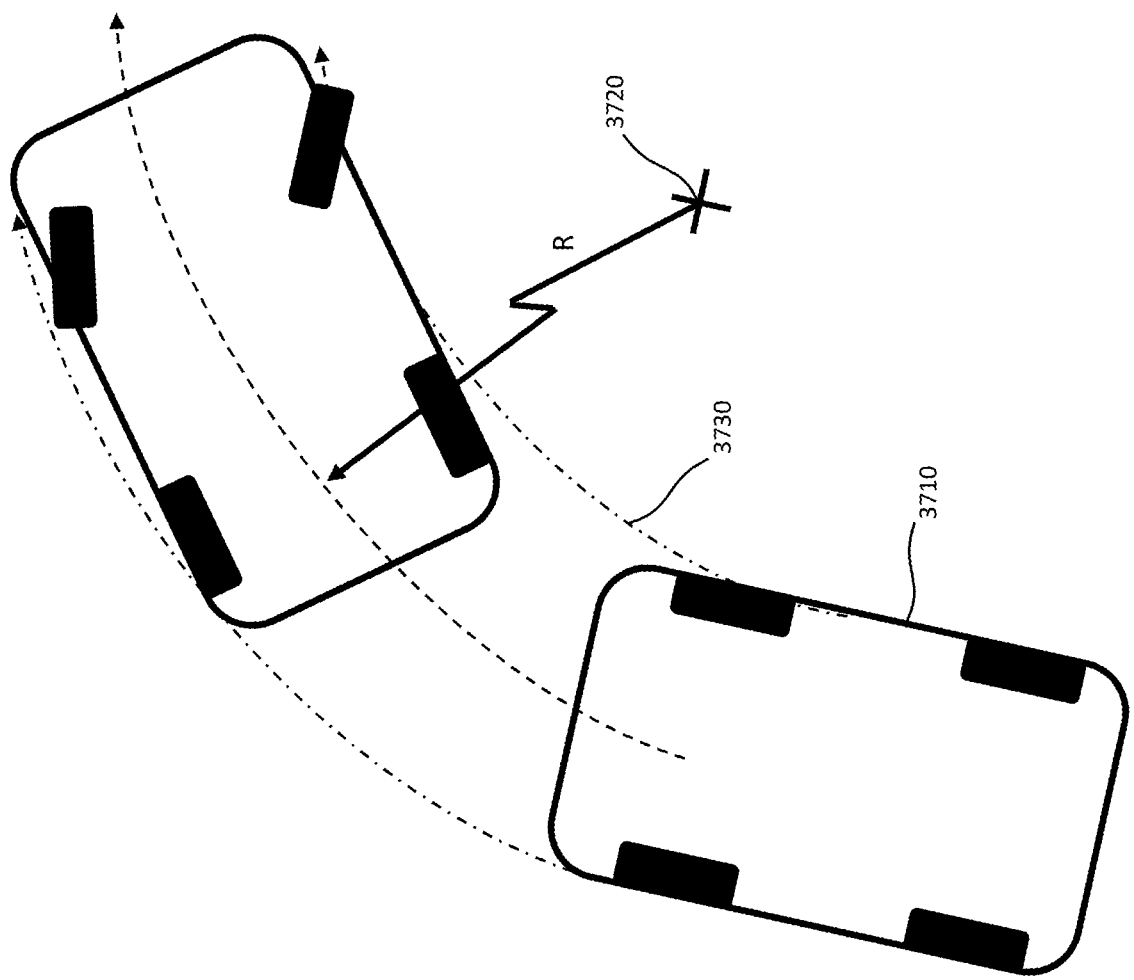
FIG. 37A illustrates turning characteristics of a typical automotive vehicle.

An MMS has unique vehicle dynamics compared to passenger automobile settings. FIG. 37A illustrates the turning characteristics of a typical passenger automobile. In a standard front wheel steer configuration, the automobile 3710 has a defined, minimum turn radius R about an idealized center of rotation 3720. This means that sensor coverage for a collision avoidance system may be ignored inside of a circle defined by the minimum turn radius 3730. This works well as the user and/or passenger entries (e.g., the doors) of the automobile 3710 are located on the sides of the vehicle. So, sensors can be mounted primarily in collision zones (front and rear), quarter panels, and the roof of the passenger automobile. This general architecture deviates from many mobile chairs, all-terrain vehicles (ATVs), and electric convenience vehicles (ECVs).

Figure 37B:
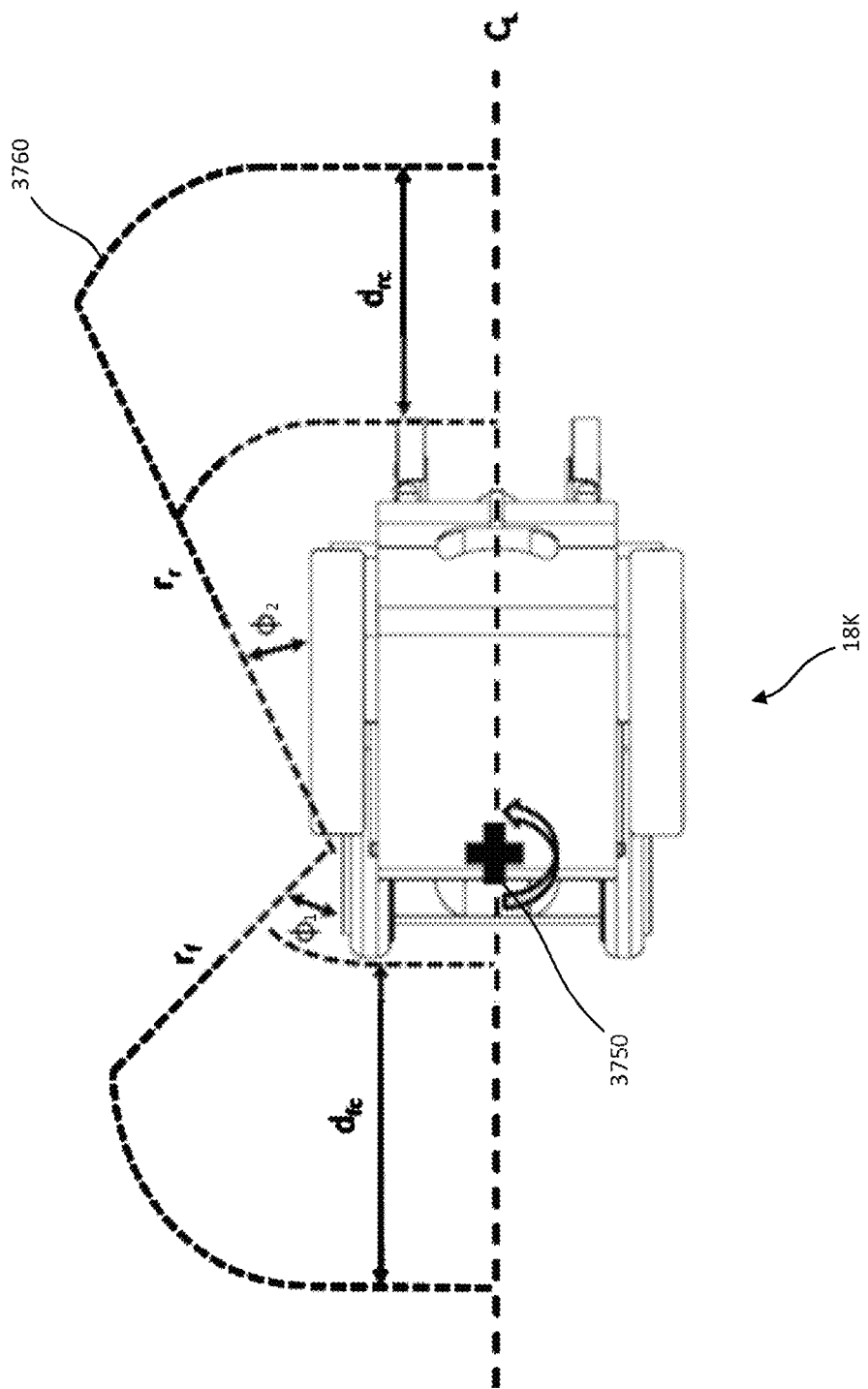
FIG. 37B illustrates turning characteristics of an embodiment of a front wheel drive mobile chair S-MMS.

FIG. 37B illustrates an embodiment of front-drive mobile chair S-MMS turning characteristics. The S-MMS 18K may pivot about a center of rotation 3750 located between the right and left front wheels. This is accomplished by rotating each front wheel in an opposite direction simultaneously. The center of rotation moves forward/backward for front, rear, and mid-wheel drive variants, which shifts the associated turn collision zones in relation thereto. The ability to perform extremely tight turns, even zero-point-turns in some cases, means that sensor systems that would be sufficient for basic collision avoidance in a passenger automobile application are not sufficient in many S-MMS 18K applications.

With an S-MMS 18K embodiment as illustrated in FIG. 37B, the user can initiate movement directly forward, directly backward, rotating about the center of rotation 3750 in either direction, or combinations of these actions. The dashed line 3760 around the S-MMS 18K denotes the possible collision zone due to user input of the S-MMS 18K. The parameters of this collision zone can be determined based on S-MMS 18K parameters. As non-limiting examples with reference to FIG. 37B, the collision zone coverage angles $\phi_1$ and $\phi_2$ may be determined based on the turn rate (angular velocity) of the S-MMS 18K in combination with one or more of the reaction time of the S-MMS controller 110B and/or the distance the S-MMS 18K coasts after a stop command is initiated (e.g. by the S-MMS controller) or a user or caregiver stops requesting forward or other motion via the HMI 352. Distances $d_{fc}$ and $d_{rc}$ may be determined in a similar manner, based on the linear velocity of the S-MMS 18K in combination with one or more of the reaction time of the S-MMS controller 110B and/or the distance the S-MMS 18K coasts after a stop command is initiated or a user or caregiver stops requesting forward or other motion via the HMI 352. Additional parameters of the collision zone may be determined in a similar fashion based on the unique characteristics of the S-MMS 18K type being considered. As seen from a comparison of FIGS. 37A and 37B, a sensor system configured to monitor collisions based on a vehicular minimum turn radius will not adequately avoid collisions on an S-MMS 18K, particularly as angles $\phi_1$ and $\phi_2$ increase.

Figure 38:
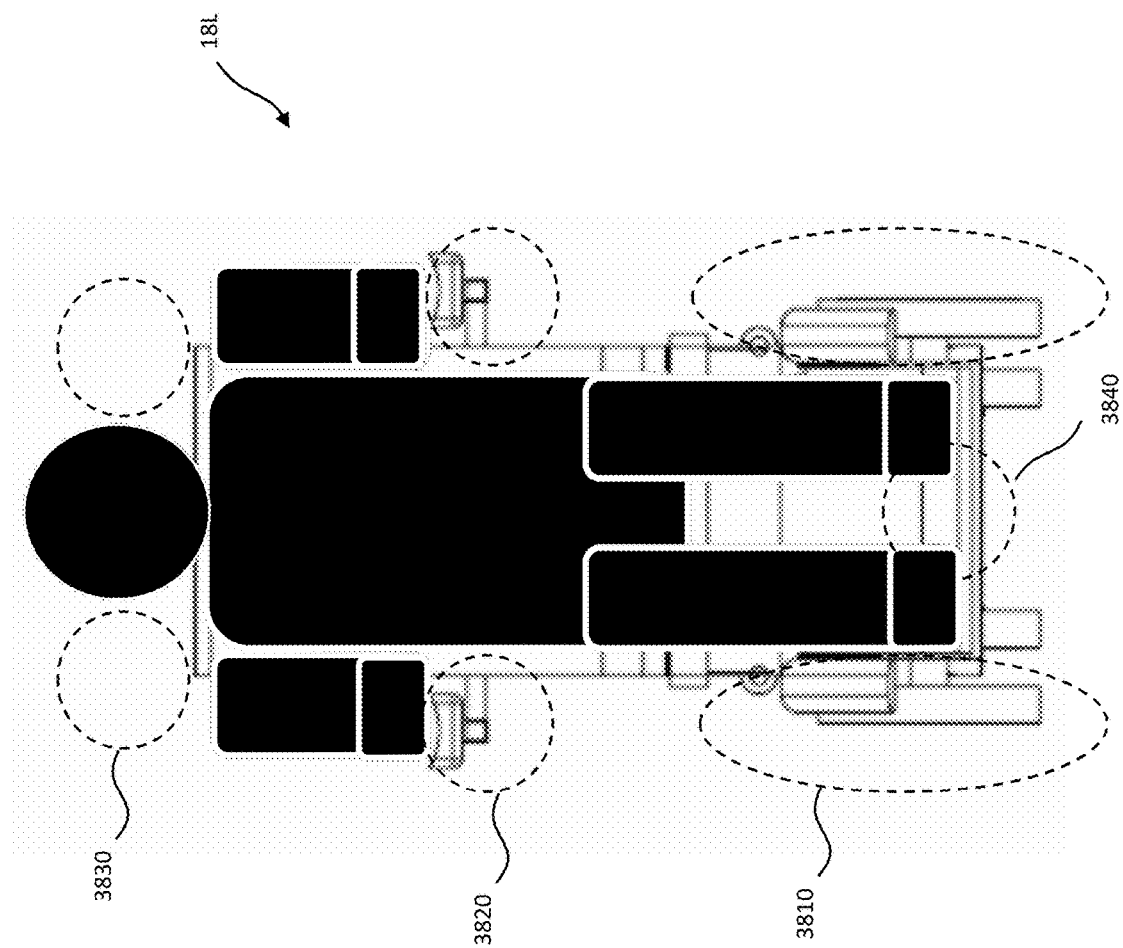
FIG. 38 illustrates available forward-facing sensor placement options for an embodiment of a mobile chair S-MMS.

Moreover, as opposed to passenger automobile systems, there is often a lack of sensor mounting options available for an S-MMS 18 due to the (often) exposed user. FIG. 38 illustrates this challenge using the non-limiting example of a mobile chair S-MMS 18L. Due to the exposed nature of the user, it may be difficult to place sensors in optimum positions. For a mobile chair S-MMS 18L, the available forward-facing sensor placement options may be limited to areas 3810, 3820, 3830, 3840 illustrated in FIG. 38.

Figure 39:
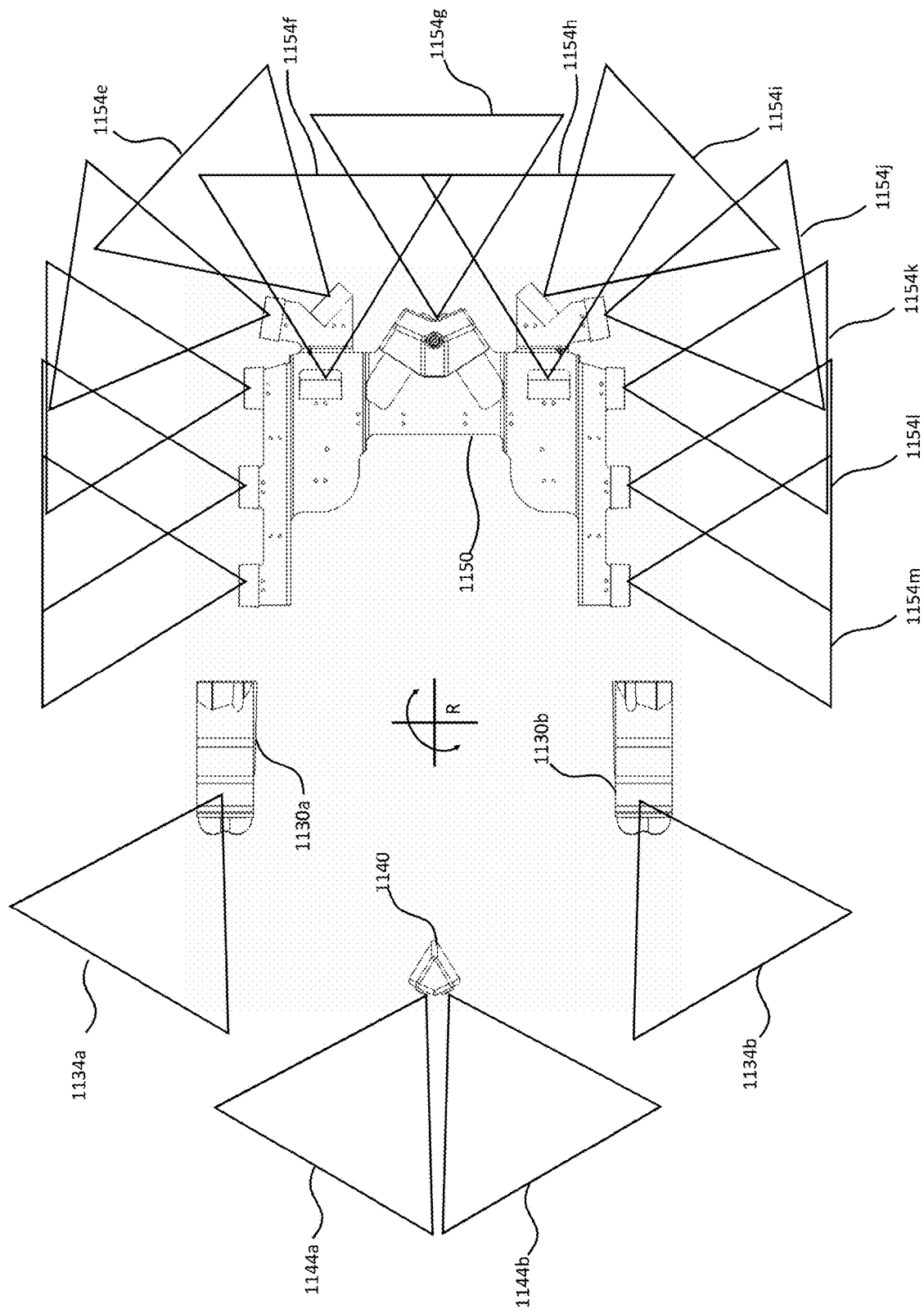
FIG. 39 illustrates a partial top view of an exemplary collision avoidance sensor system for use with a front wheel drive S-MMS.

FIG. 39 illustrates a partial top view of an exemplary set of sensors (e.g. sensor system) for collision avoidance for use with a front wheel drive mobile chair S-MMS 18. The collision avoidance sensor system is consistent with the federated sensor system 1120 embodiment previously disclosed in FIG. 11, but with triangular overlays of the non-contact sensor coverage provided by the sensors. Each sensor may be configured to be capable of measuring movement and/or distance to objects and surfaces (a.k.a. tracks) within the corresponding sensor coverage zone. One or more sensors are placed such that sensor coverage zones may touch or overlap such that there is a contiguous and/or overlapping field of vision associated with the sensors relative to the S-MMS 18. All sensors may continuously scan or may be individually controlled, controlled in segments, or controlled as a whole by the SAC 302B (FIG. 5), or a combination thereof. When compared to the collision zone 3760 of FIG. 37B, the sensor coverage of FIG. 39 allows for detection of pending collisions in the collision zones of the S-MMS 18 related to a zero-point turn maneuvers (e.g. particularly the boundary 3760 defined by angles $\phi_1$ and $\phi_2$).

In the exemplary embodiment illustrated by FIG. 39, a total of seventeen sensors are used. However, additional sensors or fewer sensors may be used without departing from the spirit and scope of the present disclosure, as a preferable or desired number of sensors may vary based on a size of an S-MMS 18, a sensing field of a sensor, a particular drive system (e.g., front-, mid-, rear-wheel), etc.

FIG. 39 illustrates a secondary challenge with implementing a successful collision avoidance system on an S-MMS 18, that dense sensor placement can lead to sensor crosstalk. In order to make the sensor layout function more effectively, one or more of the following techniques optionally may be used:

a. utilizing tuned sensors that operate at different wavelengths so that they can independently take readings simultaneously.

b. utilizing multiple types of sensors (e.g., ultrasonic and infrared) in a mixed fashion so that sensors of the same variety are spaced far enough away from one another to avoid cross-talk. A non-limiting example of this implementation would include having sensors 1154*m* and 1154*k* be ultrasonic sensors while sensor 1154*l* would be an infrared sensor for example.

c. utilizing sensor multiplexing to minimize cross talk. As a non-limiting example of this implementation, sensors on FIG. 39 might be fired in a sequence of 1154*m*, then 1154*i*, then 1154*k*, and so-on.

Additionally or alternatively, in some embodiments, distance measuring sensors that emit a form of radiation, e.g. radar in the form of radio frequencies, ultrasonic in the form of sound, or LIDAR sensors in the form of light include a modulated signal in the carrier signal from the sensor. This modulation does not impact the operation of the sensor. Instead, the modulated signal is unique to the sensor and subsequent user. The modulation in this case carries the MAC address of the sensor, which is globally unique by standard and is used to the advantage of the sensor transmissions. For example, the S-MMS controller 110B may have a list of acceptable MAC addresses. Upon receipt of a modulated MAC address containing carrier signal from the sensor, the MAC address is identified, compared to acceptable MAC addresses, and accepted by the S-MMS controller 110B. If, however, the MAC address is not identified by the S-MMS controller 110B or is otherwise wrong, and therefore did not come from one of the sensors on board the S-MMS 18, the signal is rejected by the S-MMS controller 110B. This would occur, for example, if two S-MMS 18 systems were meeting and both transmitting on the same frequencies. In an embodiment, one or more of accepting the modulated signal, identifying the MAC address, and comparing the MAC address to acceptable addresses may alternatively be completed by one or more sensor processors 214 and/or security processors 212 of the S-MMS.

In other embodiments, the MAC address in a signal received by a sensor is associated to a particular target in the SAC 302B. This would be helpful under a couple of scenarios. For example, as described above, the S-MMS controller 110B may simply ignore the signal as noise. However, in another embodiment, a sensor from an off-board system also modulates signals to include kinematic state, velocity, position, and direction of travel of its respective S-MMS. The S-MMS controller 110B demodulates the signal to obtain this data and uses this data in the situational awareness processes described above, e.g. by the SAC 302B. If the off-board system is crossing the path of the S-MMS 18 and is clearly not a threat, the SAC 302B treats the data differently, then if the off-board system was inbound to the S-MMS with an unknown intent.

In another embodiment, the S-MMS 18 is surrounded with sensors the S-MMS controller 110B is able to identify uniquely and establish the kinematic states of the sensors. The S-MMS controller 110B goes into a low power or low observable mode, and all of the data needed by the S-MMS controller is sent to the S-MMS controller from one or more of the identified off-board sensors.

FIG. 39 does not explicitly show the incorporation of sensors used in the basic stability manager process 520 (e.g. as illustrated in FIG. 27), such as the forward and rear facing LIDAR sensors. However, it should be understood that one or more of these sensors may additionally or alternatively be used to provide additional or alternative coverage zones as part of the collision monitor process 530 (FIG. 5).

Figure 40:
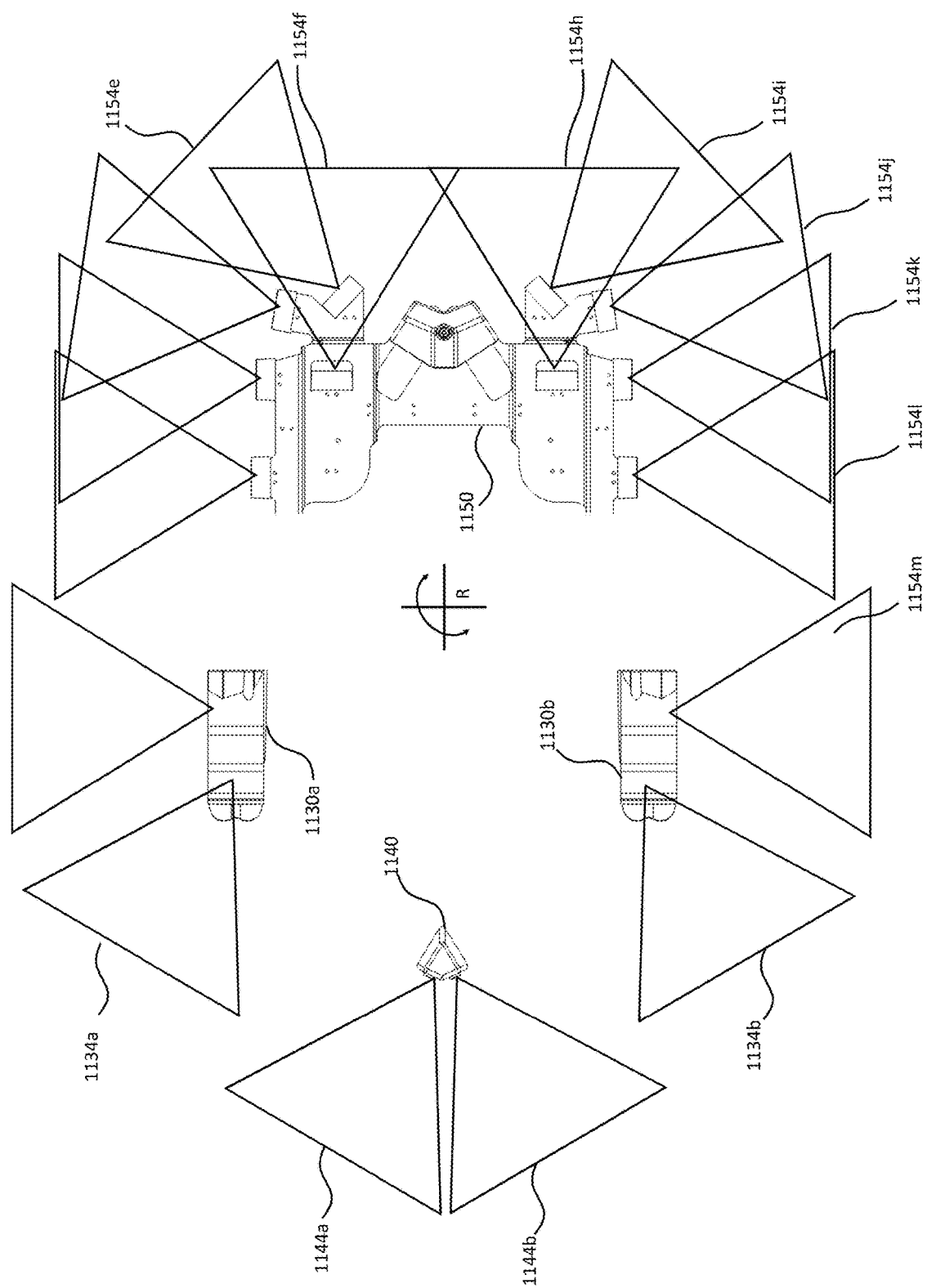
FIG. 40 illustrates partial top view of an exemplary collision avoidance sensor system for use with a mid-wheel drive S-MMS.

The layout illustrated in FIG. 39 may be adjusted for use with other S-MMS 18 configurations. As a simple, non-limiting example, FIG. 40 depicts a set of sensors for a mid-wheel drive S-MMS 18 where the center of rotation R has moved compared to that shown in FIG. 39. In order to accommodate the new center of rotation, sensors previously depicted towards the rear of the S-MMS 18 center of rotation R may be shifted forward. For example, sensor 1154m has been moved to the left and included in a front sensor housing. More significant changes to the S-MMS 18 configuration may require greater modification of the sensor layout.

The collision avoidance sensor system (e.g. FIGS. 39-40) may be tuned based on user needs, preferences, and abilities. As a non-limiting example, forward zones may not be needed by some users, but may be desired by others. Additionally or alternatively, the disclosed sensor system may be improved by inclusion of one or more cameras for the purpose of assisting a driver's ability to reverse or turn. These cameras may be co-located with the non-contact anti-collision sensors and may stream video to a connected smart device (e.g. 602 FIG. 6) for certain user actions, such as backing up via input to the HMI.

In an embodiment, the SAC 302B may cause the S-MMS controller 110B to request reports from one or more sensors (e.g. non-contact sensor reports 372) onboard the S-MMS 18. Sensor reports may be requested based on one or more of HMI 352 input indicating the desired direction of travel of the S-MMS 18, signals indicating the actual motor controller 351 outputs (e.g. velocity and/or acceleration) and/or reports of the current S-MMS 18 trajectory received from navigation 363. The sensor reports may be received by the S-MMS controller 110B via an arbitration IAM 370 and passed to a collision monitor 530 in an embodiment. When a possible collision is determined by the collision monitor 530 of the SAC 302B, the S-MMS controller 110B may bias one or more control signals for one or more components of the S-MMS 18 (e.g. as described above), wherein biasing a control signal is changing a value of the control signal or otherwise changing an effect on the behavior of a control signal or causing an effect of the control signal. In an embodiment, the biased control signal is the control signal between the HMI 352 and a motor controller 351.

Figure 41:
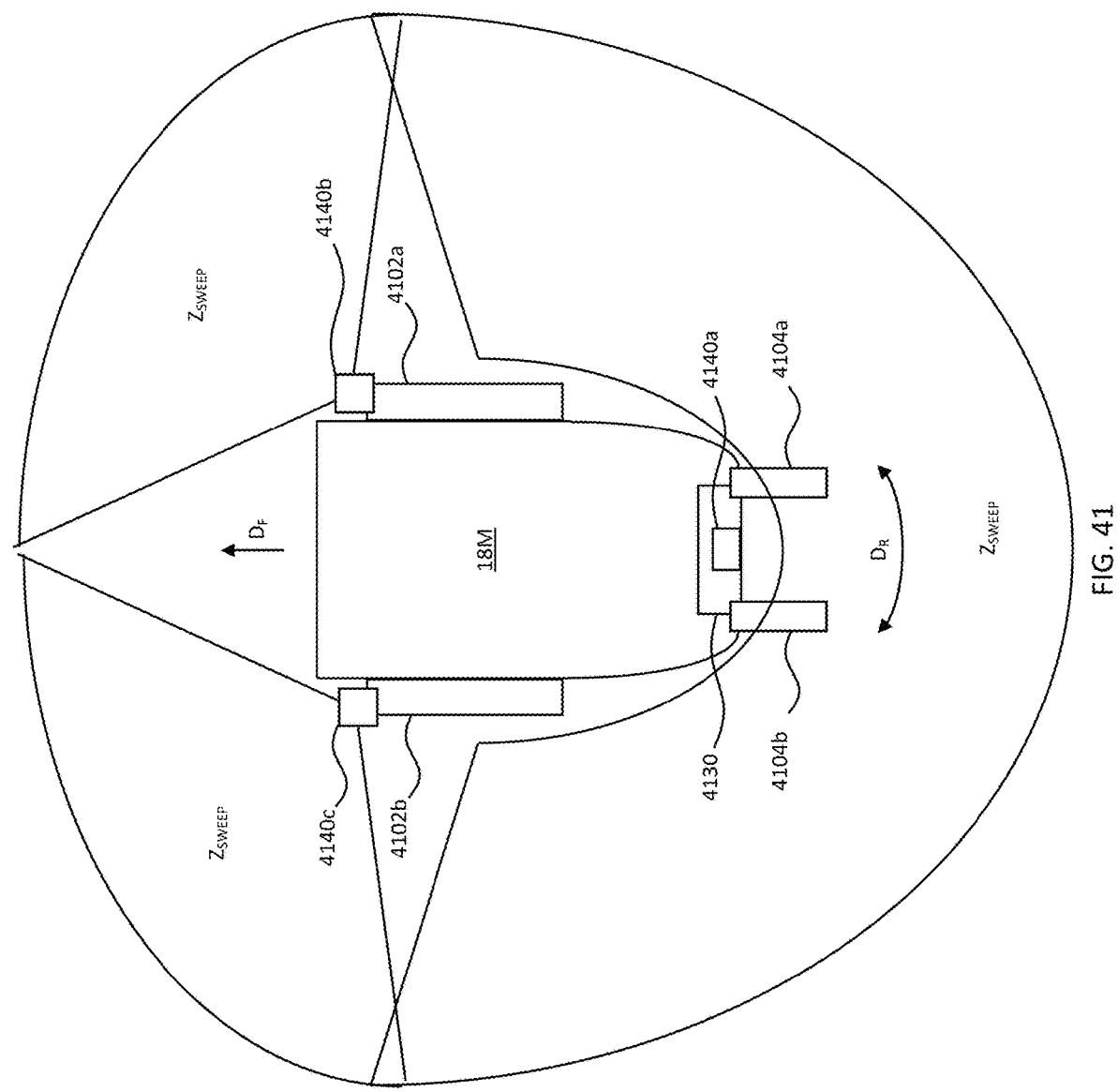
FIG. 41 depicts an embodiment of a scanning sensor configuration for use with an S-MMS.

FIG. 41 illustrates an embodiment of a scanning sensor configuration for use with an S-MMS 18M for collision avoidance. The sensor configuration includes an S-MMS 18M having a front right wheel 4102a, a front left wheel 4102b, a rear right wheel 4104a, and a rear left wheel 4104b. Scanning sensor(s) 4140a-c are coupled to the S-MMS 18M and/or to a mounting bracket 4130 that is optionally mounted to the S-MMS 18M. The scanning sensor(s) 4140a-c may be configured to scan one or more zones $Z_{SWEEP}$ covering the collision zones appropriate for the S-MMS 18M, as illustrated in FIG. 41. The zones $Z_{SWEEP}$ correspond to a scanning zone capable of measurement by the scanning sensor 4140a-c. In some embodiments, one or more of the scanning sensor(s) 4140a-c may be a LIDAR sensor, for example a Scanse™ Sweep sensor. The scanning sensors 4140a-c may be configured to operate according to one or more control signals received, for example, from the S-MMS controller 110B, from a remote command source, or another source or combination thereof. In some embodiments, the scanning sensors 4140a-c are a rotating or otherwise adjustable sensor capable of receiving one or more commands and providing sensor data (e.g. to the SAC 302B via one or more transmissions of the sensor data) relating to a received command (e.g., distance measurements corresponding to a target location or area).

Although illustrated as three scanning sensors 4140a-c, another number of scanning sensors 4140 may be implemented with an S-MMS 18. In some embodiments, the scanning sensor(s) 4140a-c may be configured to take one or more measurements and/or return sensor reports for use by the collision monitor 530 (FIG. 5). The scanning sensor(s) 4140a-c optionally may be configured to replace the functionality of each of the sensors depicted in FIG. 39 and/or FIG. 40 previously described with reference to the collision monitor 530. Although illustrated as being mounted to certain positions on the S-MMS 18M, the scanning sensor(s) 4140a-c may be mounted to or otherwise associated with the S-MMS 18 at any surface or position of the S-MMS 18. In operation, the scanning sensor(s) 4140a-c may be used in place of the entire collision monitor sensor system depicted in FIGS. 39 and/or 40.

At least a portion of the sensor data from the scanning sensors 4140a-c optionally may be used by or for the stability manager 520 (FIG. 5) during operation. In an embodiment, the one or more sensor reports from sensors used for collision avoidance may be used by collision monitor 530 to detect an obstacle, such as a wall. The presence of an impending collision may then be reported to the safety manager 550. At the same time, one or more sensor reports may be used by the stability manager 520 to detect the same wall as a possible step or inclined surface. In this example, the safety manager 550 of the SAC 302B may choose to treat the sensor reports consistent with the collision monitor 530. Additionally or alternatively, in some embodiments, the scanning sensors 4140a-c may be positioned or otherwise configured to perform a scan of the zone $Z_{SWEEP}$ at an elevation greater than one or more sensor positions used by the stability manager 520 (FIG. 5) (i.e., the scanning sensor 4140a-c may be configured to measure distance of objects or surfaces other than the surface upon which the S-MMS 18 is operating).

Figure 42:
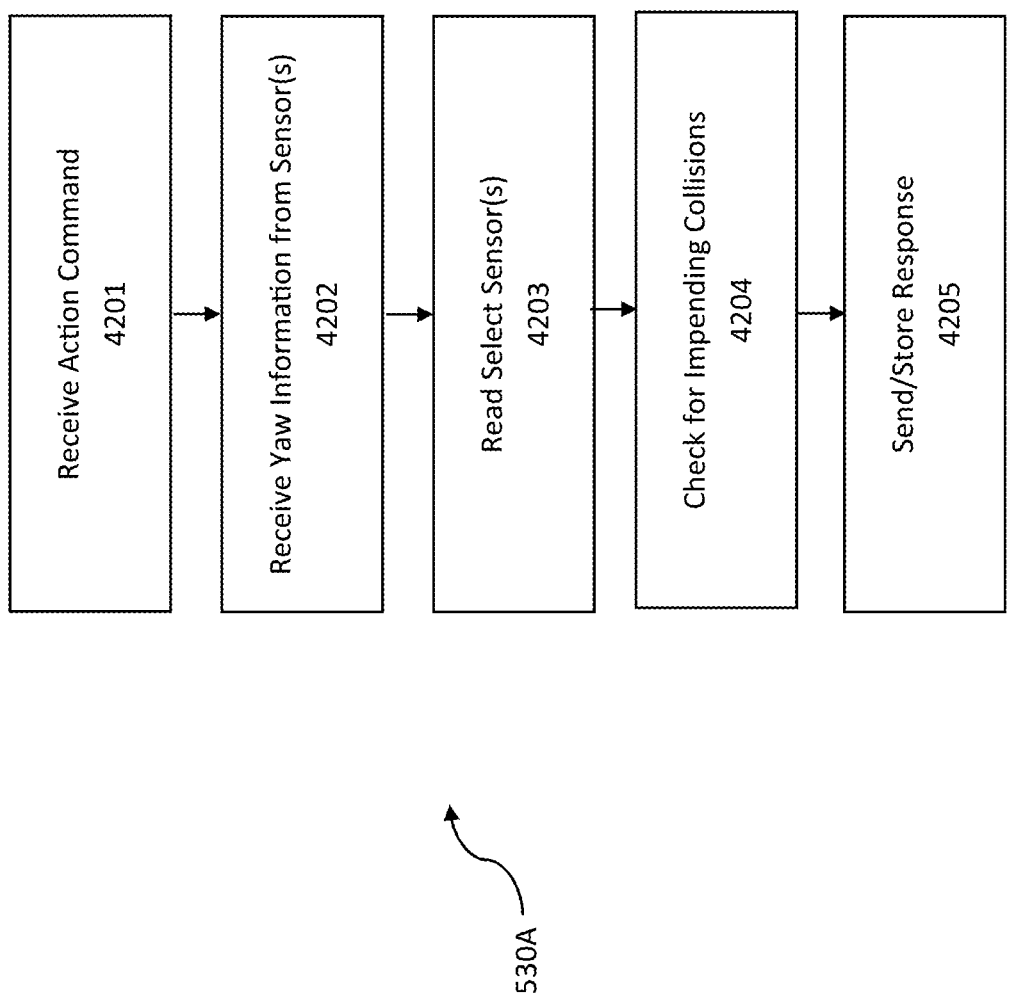
FIG. 42 is a flowchart illustrating an exemplary process flow for a collision monitor process.

FIG. 42 is a flowchart illustrating an exemplary embodiment of a process flow of a collision monitor process 4200, for example using a collision avoidance sensor system such as in FIG. 39. In step 4201, the collision monitor 4200 can be either initiated by receiving an action command from the safety manager 550 (FIG. 5), or it may be run in parallel to the safety manager 550 and may receive action commands based on elapsed time or resource availability from the RTOS Services 362 on the S-MMS controller 110B. Next, the yaw angle(s) of the S-MMS 18 are determined at 4202. Yaw is defined as rotation about the z-axis, as illustrated in FIG. 17 and/or FIG. 18. The one or more yaw angles may be determined, at least in part, using an IMU 1156 (FIG. 11) of a rear sensor module 1150 (FIG. 11) in one embodiment. Although described with reference to the IMU 1156 of FIG. 11, it should be appreciated that one or more orientation sensors associated with the S-MMS 18 may be physically and/or logically separate from the IMU 1156 and more than one IMU or other orientation sensor may be used to determine one or more yaw angles.

The process continues to step 4203, where one or more zones are scanned for upcoming collision conditions using non-contact sensor(s), e.g. sensors in the collision avoidance system depicted in FIG. 39, and sensor reports for the scanned zones are read. Based on the direction of travel of an S-MMS 18, select non-contact sensors may be used to take measurement(s). As a non-limiting example, if an S-MMS 18 is traveling forward, only the forward-facing sensors may be tasked with a measurement by the SAC 302B on the S-MMS controller 110B in order to reduce system processing time. In some embodiments, the sensor(s) may include one or more ultrasonic sensors and/or one or more infrared sensors. A plurality of non-contact sensors may be used. In some embodiments, one or more sensors of the stability manager system depicted in FIG. 27 may be used by the collision monitor 530. Additionally or alternatively, other sensor reports from search and track sensors 373, image sensors 374, and remote sensors reporting through CNI 371 may be used by collision monitor 530 in some embodiments. Additionally or alternatively, data from the smart device 602 (FIG. 6) coupled with the S-MMS 18 may be used by the collision monitor 530.

The one or more sensor reports 372 are received by the S-MMS controller 110B, and/or retrieved from memory 120, and used by the collision monitor 530 of the SAC 302B to check for impending collisions at 4204. This is accomplished by the collision monitor 530 at step 4204 in one or more of the following ways:

a. by comparing sensor readings to collision thresholds for each direction and/or sensor that may be retrieved from memory 120, such as an allowable proximity to the S-MMS 18 that may be static and configured at design time and/or setup time of the S-MMS 18,
b. by comparing sensor readings to one or more collision thresholds calculated by the SAC 302B for each direction and/or sensor of the S-MMS 18, such as an allowable proximity, and/or,
c. by the SAC 302B calculating an estimated time to impact of one or more objects proximate to the S-MMS 18 based on sensor readings and comparing the calculated time to impact to one or more of a response time of the S-MMS 18 and/or user.

Assume an object is in the environment surrounding an S-MMS 18, there are two primary ways the S-MMS 18 may approach the object. The S-MMS 18 may approach the object from the front or rear in a linear fashion, or it may rotate into a collision as the S-MMS 18 spins about its center of rotation (e.g. 3750 FIG. 37B). Additionally or alternatively, the S-MMS 18 may move with a combination of linear and angular motions in some instances. An embodiment of the calculations for checking for impending collisions (see step 4204) are further disclosed below. The results of these checks, determinations, and/or comparison may then sent to safety manager 550 and/or stored in memory 120 at step 4205.

Impending Collision: Linear Velocity

Figure 43:
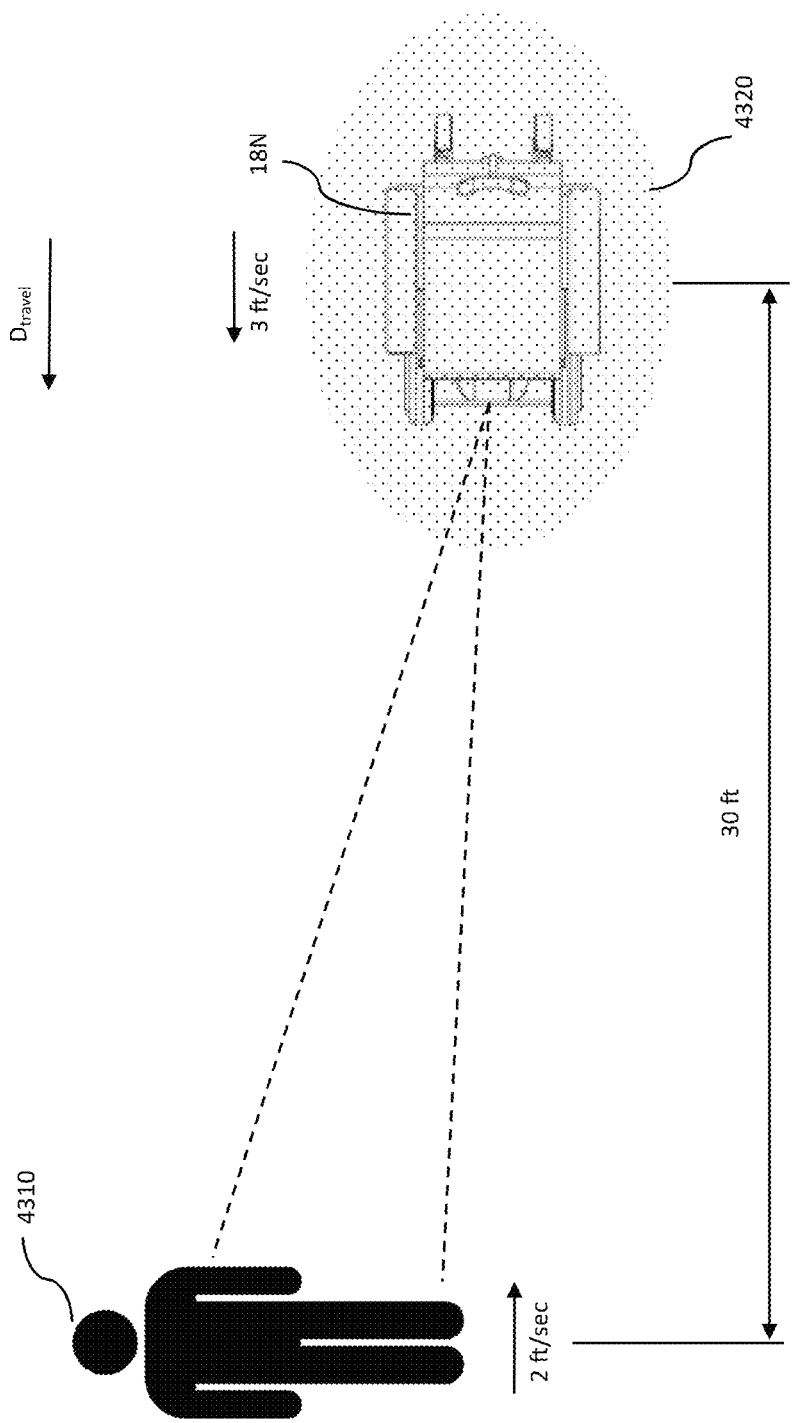
FIG. 43 depicts an S-MMS traveling towards a person.

FIG. 43 depicts an S-MMS 18N traveling in direction $D_{travel}$ at 3-ft/sec towards a person 4310. In an example, the S-MMS 18N collision monitor 4200 of the SAC 302B is running on the S-MMS controller 110B. The S-MMS controller 110B receives sensor reports (e.g. 372-372 FIG. 5) from one or more sensors (e.g. as depicted in FIGS. 39 and/or 41) on the S-MMS 18N which report one or more distances, including a distance to the person 4310. Additionally, the S-MMS controller 110B may retrieve one or more pieces of information about the S-MMS user from memory 120. In some embodiments, the one or more pieces of information about the user may be a reaction time of the user. In some embodiments, the reaction time of the user may be calculated or measured by one or more sensors onboard the S-MMS 18N. As the S-MMS 18N approaches an object 4310, where the object maintains a constant bearing, with decreasing range, it is intuitively obvious there will be a collision at some point unless one or both deviate.

In this simple example, the collision monitor 4200 of the SAC 302B may calculate the time to impact with the person 4310. As a first step, the SAC 302B may calculate the closing velocity of the object 4310 as 5-ft/sec using Equation 22.

$$\text{Closing Velocity=Change in Distance To Object/Time Between Readings} \qquad \text{Eq. 22}$$

Additionally or alternatively, the closing velocity of the object may be directly reported from one or more sensors as part of the sensor report. In some embodiments, the SAC 302B may receive the S-MMS 18N velocity (e.g. 3-ft/sec) from the motor controller 351 of the S-MMS 18N. If the closing velocity on object 4310 is 5-feet per second and the distance from the S-MMS 18N to the object 4310 is measured by one or more sensors as 30-feet, then the S-MMS must stop in less than 6-seconds to avoid a collision. This calculation is done using Equation 23.

$$\text{Time to Impact=distance to object/closing velocity=30-feet/5-ft/sec=6-seconds} \qquad \text{Eq. 23}$$

Additional factors may be included in time to impact calculations, including one or more of an amount of time required for the S-MMS 18N to stop moving after a stop command has been issued by the S-MMS controller 110B, an amount of time required for a system element (e.g. motor controller 351) to react after a stop command has been issued by the S-MMS controller, and/or a safety factor or buffer time.

When a time to impact to one or more objects, calculated by the collision monitor 530, falls below a threshold value, the SAC 302B may cause the S-MMS controller 110B to transmit a control signal to one or more other controllers onboard the S-MMS 18N (e.g. motor controller 351) which causes the S-MMS to stop moving. In an embodiment, the threshold value may be a value retrieved from memory 120. Additionally or alternatively, the threshold value may be calculated based on a number of factors including S-MMS 18N velocity, acceleration, or a combination of environmental or user factors as disclosed below. In an embodiment, a minimum allowable proximity or distance (e.g. a proximity to the S-MMS 18N illustrated in FIG. 43 as shaded zone 4320) may be enforced by the S-MMS controller 110B and cause the S-MMS 18N to be stopped when the minimum allowable proximity zone 4320 is violated.

Impending Collision: Angular Velocity

Figure 44B:
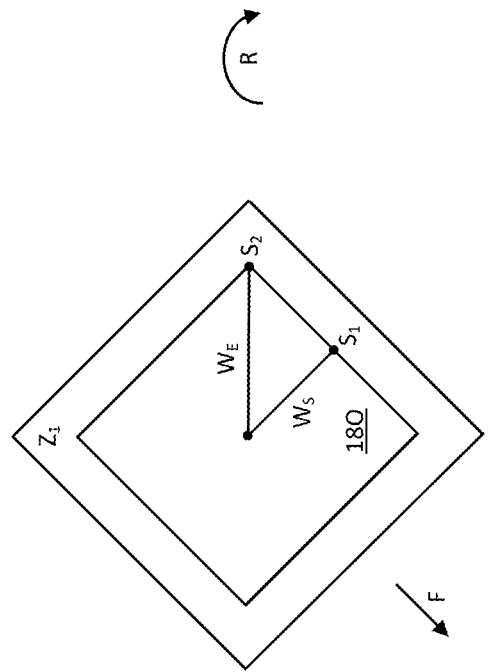
FIG. 44B represents the S-MMS embodiment of FIG. 44A after having been rotated 45 degrees in the rotation direction R.
Figure 44A:
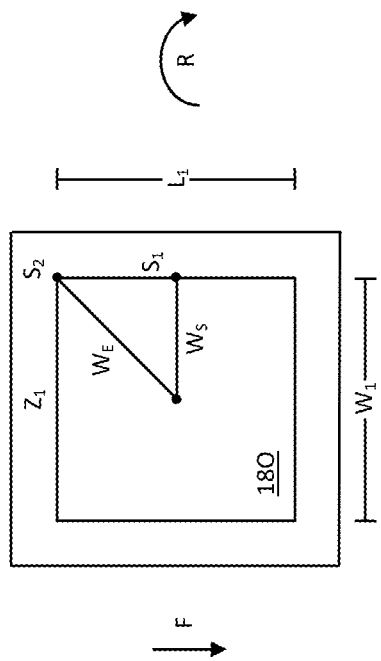
FIG. 44A illustrates an exemplary rotation position of an S-MMS.

The angular velocity of an S-MMS 18 is an important parameter in avoiding collisions, particularly when maneuvering a zero-point turn. One or more implementations of a collision monitor 4200 or other process of the SAC 302B may operate by calculating either time to impact and/or distance to collision to one or more objects based on angular velocity. Angular velocity is the rate of change of angular position of a rotating body. FIGS. 44A-B are block diagrams illustrating a first rotation position of S-MMS 18O and a second rotation position of S-MMS 18O according to an embodiment. The S-MMS 18O may have a total body width $W_1$ and a length $L_1$ where the length $L_1$ is greater than the width $W_1$.

FIG. 44A illustrates a first rotation position of an S-MMS 18O. The S-MMS 18O includes one or more sensors that take distance measurements in a sensing zone $Z_1$. The S-MMS 18O has a side width $W_S$ from a center of rotation of the S-MMS 18O to a sensor located at point $S_1$. The S-MMS 18O has a corner edge width $W_E$ from a center of rotation of the S-MMS 18O to a sensor located at a corner edge at point $S_2$. If length $L_1$ is greater than the edge width $W_1$, then the edge width $W_E$ is greater than the side width $W_S$. In such an embodiment, the sensor located at point $S_2$ with the edge width $W_E$ has a greater angular velocity during rotation than the sensor located at point $S_1$ with the side width $W_S$. FIG. 44B represents the S-MMS 18O of FIG. 44A after having been rotated 45-degrees in the rotation direction R. An embodiment of the SAC 302 is configured to cause the S-MMS controller 110B to send a control signal which stops or slows the S-MMS 18O when a) a predefined threshold occurs or b) a time to collision is calculated based on linear velocity models, in some embodiments. However, in an embodiment, the SAC 302B (FIG. 5) is configured to measure and/or calculate the angular velocity of one or more sensors providing data to or otherwise used in connection with the collision monitor 530 and/or the stability manager process 520 to determine whether rotation of the S-MMS 18O should be slowed or stopped to avoid contact between the S-MMS and one or more objects or surfaces.

Figure 45:
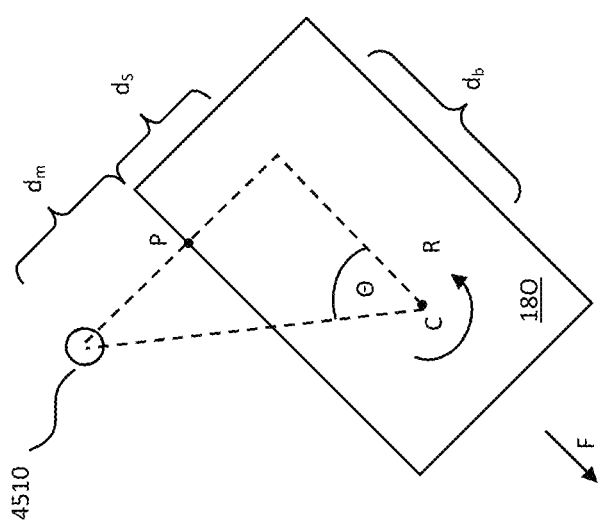
FIG. 45 depicts an embodiment of an impending S-MMS collision.

Referring to FIG. 45, angular velocity of an S-MMS 18O can be used to predict the time to impact with a given object. In this example, an S-MMS 18O is rotating in direction R towards an object 4510, and there is a sensor located at point P (sensor P), reading (sensing) a distance from sensor P to the object 4510 of $d_m$. Sensor P has a known location on the S-MMS 18O defined by dimensions $d_s$ and $d_b$ from the center of rotation C of the S-MMS 18O (distances parallel to the x-axis and y-axis, respectively, from sensor P that would intersect a respective perpendicular plane through center of rotation C). Presuming that the S-MMS 18O has a known angular velocity $V_\omega$ and angular acceleration $a_\omega$, the estimated time to impact of the S-MMS 18O on the object 4510 can be calculated. The angular velocity and acceleration values may be determined by one or more IMU units on the S-MMS 18O, navigation 363, and/or directly from the motor controller 351 driving the wheels of the S-MMS 18O.

Referring to FIG. 45, the predicted time to impact (t) of the S-MMS 18O to the object 4510 can be calculated using the quadratic equation developed with the following equations:

$$\Theta = \tan^{-1}[(d_m + d_s)/d_b] \quad \text{Eq. 24}$$

$$\Theta = a_\omega t^2 + V_\omega t \quad \text{Eq. 25}$$

therefore, $$t^2 + (V_\omega/a_\omega)t - \tan^{-1}[(d_m + d_s)/d_b] \approx 0 \quad \text{Eq. 26}$$

Theta is the angle measured from the center line of the S-MMS 18O to the line of intersection drawn between the center of rotation of the S-MMS 18O and the point of collision on the object 4510.

Additional factors may be included in a time variable to impact calculations, including one or more of an amount of time required for the S-MMS 18N to stop moving after a stop command has been issued by the S-MMS controller 110B, an amount of time required for a system element (e.g. motor controller 351) to react after a stop command has been issued by the S-MMS controller, and/or a safety factor or buffer time. Additionally or alternatively, one or more SAC 302B settings or calculations may be scaled or adjusted according to a sensor position and/or angular velocity.

When a time to impact to one or more objects, which is calculated by the collision monitor 530, falls below a threshold value, the SAC 302B may cause the S-MMS controller 110B to transmit a control signal to one or more other controllers onboard the S-MMS 18N (e.g. motor controller 351) which causes the S-MMS to stop moving. In an embodiment, the threshold value may be a value retrieved from memory 120. Additionally or alternatively, the threshold value may be calculated based on a number of factors, including S-MMS 18N angular velocity, angular acceleration, or a combination of environmental or user factors as disclosed below.

Incorporating User in Collision

With reference to the previous disclosure, time-to-impact is often used in collision avoidance systems, but systems often base their control decisions only on the reaction time of the controllers, sensors, or actuators involved in executing a given command. In other words, the estimated time to impact calculated using a method like the one described in Equation 22 is compared to how fast the electro-mechanical systems of the S-MMS 18 can respond, and actions are taken appropriately. This control strategy is appropriate for implementing critical safety dead stops for an S-MMS 18. However, in order to integrate the user more seamlessly in the disclosed systems, user reaction times may also be considered.

In some embodiments, safely moving within the world requires the S-MMS 18 user to navigate with precision and an awareness of their surroundings. The user cannot control the speed, actions, or objects in the world around them—they can only react to it. An S-MMS controller 110B not only receives measured input from the user (e.g. via HMI 352), it also has an awareness of the world around it (e.g. via the processes of the SAC 302B). While the user reacts, and instructs the S-MMS 18 actions, the S-MMS controller 110B is itself assessing its surroundings for conditions that may require an automated action to ensure the safety of the user. The awareness by the S-MMS 18 of both the user's input and the surrounding environment allows the assessment of the reaction time of the user to their surroundings. This assessment is used to measure the user's abilities at a moment in time.

Human factors, such as exhaustion, stress, or illness also affect the reaction time of the user and therefore the human-in-the-loop system. At initial setup, each S-MMS 18 may be configured with a unique user profile that informs the S-MMS controller 110B of their baseline capabilities. But, the user is constantly deviating from this baseline. The user profile may be updated by the S-MMS controller 110B, constantly measuring user input in relationship to the surroundings, and comparing the current reaction time readings with previous results.

In an embodiment, an S-MMS 18 comprises a human machine interface 352 operably configured to provide control instructions, an S-MMS controller 110B configured to receive the control instructions and generate a control signal, wherein the generated control signal causes one or more components of the S-MMS 18 to respond. The response may be preconfigured and include operation of one or more motors or actuators by one or more motor controllers 351. The embodiment further comprises one or more sensors operably configured to generate health data related to a user, wherein the health data related to the user is stored in a secure first memory 120 connected to the S-MMS controller 110B, wherein the stored user health data is used to bias the control signal for the S-MMS 18.

In an embodiment, one or more sensors and/or interfaces of a paired smart device (e.g. 602 FIG. 6) may be used as a sensor at S-MMS 18 setup time to measure a user's reaction time. This reaction time may be measured using a game as previously depicted and described with reference to FIG. 10. The reaction time may then be stored in memory 120 of the S-MMS 18 and accessed by the S-MMS controller 110B. Additionally or alternatively, an audible tone or visual indicator may be turned on, and the delay before the S-MMS user reacts with HMI 352 input may be measured by the S-MMS controller 110B and used to estimate a user's current reaction time in some embodiments.

Referencing again the example illustrated in FIG. 43, upon review of the user data collected by the S-MMS controller 110B and stored in memory 120, the user may have a 0.6-second reaction time, and a rules engine of the collision monitor 530 (FIG. 5) may require one-third the distance to the object as a minimum tolerance for a safety factor (e.g. 4320), in the example 10-feet. With now a 6-second warning, a 2-second buffer (⅓)=10 feet, a 0.6-second reaction time (0.6*5)=3-feet, and 2-seconds for stopping safely=another 10 feet or a total of 23-feet, which equates to approximately 1.5-seconds of forward travel before the S-MMS controller 110B takes over. The variable in this example is the user.

As an object is detected with a time to impact that begins to approach a combination of the S-MMS 18 system reaction time and the user reaction time, the SAC 302B (FIG. 3) will begin to modify S-MMS 18 behavior and provide feedback to the user via the HMI 352. A non-limiting example of this behavior would be that as the S-MMS 18 approaches an object 4310 if the estimated time to impact is within a selected threshold selected (e.g. set in the SAC 302B) based on the user's known reaction time (e.g., two times the user's reaction time); then the S-MMS 18 begins to slow, and the user is notified via the HMI 352 that an object 4310 has been detected. This behavior would continue with successive slowing of the S-MMS 18 until the estimated time to impact is within a selected threshold (e.g. set in the SAC 302B) based on the system reaction time (e.g. two times the system reaction time); then the S-MMS 18 will block motion in the direction of that object 4310.

Feedback to the user is an important part of the previously disclosed behavior. Research has shown that machine override of user commands can be jarring and frustrating for users if poorly implemented. In order to alleviate this frustration, the S-MMS may include one or more indicators that signal when the system is intervening in a user command (e.g. entered via an HMI 352) and when the user has overridden the safety system. Additionally or alternatively, haptic feedback on the user input device may be used to guide the user and signal when the system is intervening. Non-limiting examples of haptic feedback on an S-MMS 18 input device 352, such as a joystick, may include one or more of:
  a. blocking movement in one or more directions when an unsafe condition is detected in that direction,
  b. progressively increasing the resistance or force feedback to motion in a direction as an impending unsafe condition approaches,
  c. selectively reducing resistance or force feedback (from some nominal steady state value) in the directions deemed most safe by the sensor system, and/or,
  d. selectively limiting bulk (e.g. all directions) movement by some percentage based on the level of perceived threat in the environment.

Using the user profile, a unique feature of the disclosed system is the ability to tie haptic (and other types) feedback via the HMI 352 to one or more user measurements (e.g. user reaction time). By using haptic feedback to feed information to the user ahead of anticipated problems based on their individual reaction times, haptic feedback systems may be significantly improved.

S-MMS Capability Scaling

In addition to biasing the control signal for an S-MMS 18 with user health data, in some embodiments, other data may be used to bias control signals, wherein other data may include time of use of a particular S-MMS 18 and/or environmental factors. As the environment and the user change, the reaction time of the "human-in-the-loop" system changes dynamically. Environmental factors such as lighting, temperature, and noise can significantly impact the capabilities, or lack thereof, of users.

In an example, first time users of a particular S-MMS 18 often find it challenging to control the S-MMS 18. For this reason, the S-MMS controller 110B may recognize when a new user profile has been loaded into memory 120. If the user profile has no previous history with the particular S-MMS 18, then it is assumed the user is driving a new make or model of S-MMS 18. The S-MMS controller 110B may continuously learn the user's driving style over time by comparing received threats to user actions over an initial learning period and store these settings in memory 120 as part of the user profile, in some embodiments. In some embodiments, the S-MMS 18 may continue to monitor the user over time and adjust one or more settings as the user changes over time. These settings may be stored as part of the user profile. For example, the S-MMS controller 110B may start with conservative maximum speed and proximity to threat settings. Over time, the S-MMS controller 110B may collect data indicating speed, turning, and lack of collisions etc. and store this data in the user-profile or otherwise perform analysis on data over time for trend analysis. In this way, the S-MMS controller 110B may work to find the lowest level of acceptable S-MMS controller 110B intervention settings possible for the user on a particular model. This continuous learning and tuning of the user profile may be ongoing unless the user or operator manually resets or overrides settings in their profile, in some embodiments.

In a simple example, the S-MMS controller 110B may increment a counter in memory 120 each time the SAC 302B intervenes (e.g. via a determination of the collision monitor 530 or stability manager 520) during a particular 24-hour period. A history of these counter scores for one or more 24-hour intervals may be maintained in memory 120. At a predetermined event (e.g. on startup of the S-MMS 18) the S-MMS controller 110 may analyze the history of counter scores. If the count of the last interval is significantly less than the average of the history in memory 120, then the S-MMS controller 110B may increase the maximum allowable speed or proximity settings for that user. Similar logic may be used to decrease settings when the number of collision events recorded increases. In an embodiment, the average and the sample standard deviation are calculated based on historical events. A count of that is more than 1-sigma from the historical mean may be used to cause an increase or decrease in settings in some embodiments.

The ability to tune S-MMS 18 behavior to macro user capabilities may be supplemented by micro adjustments to the S-MMS 18 behavior throughout the day. Lighting conditions, environmental conditions, and user health may continuously change a given S-MMS user's capabilities and therefore may change S-MMS controller 110B behavior. Examples of micro adjustments may include:

a. Decreasing SAC 302B threat sensitivity when ambient lighting conditions increase and increasing SAC threat sensitivity when ambient lighting conditions decrease. In an embodiment, the ambient light conditions may be provided by a light sensor on a paired smart device (e.g. 602 FIG. 6). Additionally or alternatively, a light sensor may be mounted directly to the S-MMS 18.

b. Increasing SAC 302B threat sensitivity to anomalies based on unusual biometric data of a user received from one or more sensor configured to measure one or more parameters of the user.

c. Lowering S-MMS 18 max allowable top speed if a high-threat environment, object, or event is detected.

d. Adjusting, enabling, or disabling displays and/or information displayed to the user through the HMI 352 based on one or more user parameters.

The S-MMS controller 110B may react by increasing or decreasing maximum speed settings, increasing or decreasing system warning zones such as collision alerts, and increasing or decreasing the sensitivity of systems such as active anti-tipping system. Modes of operation may be suggested to the user depending on environmental factors. Examples of this behavior include using distance and light measurements or data to increase or decrease system settings such as top speed when object proximity to obstacles 4610 increases or decreases (FIG. 46), bystander 4710 proximity increases or decreases (FIG. 47), or ambient lighting conditions change (FIG. 48). In some embodiments, input sensitivity may increase based on temperature data so that less motion is required in cold environments. Other inputs may cause the S-MMS controller 110B to otherwise update the S-MMS 18P operating parameters based on environmental conditions.

Figure 46B:
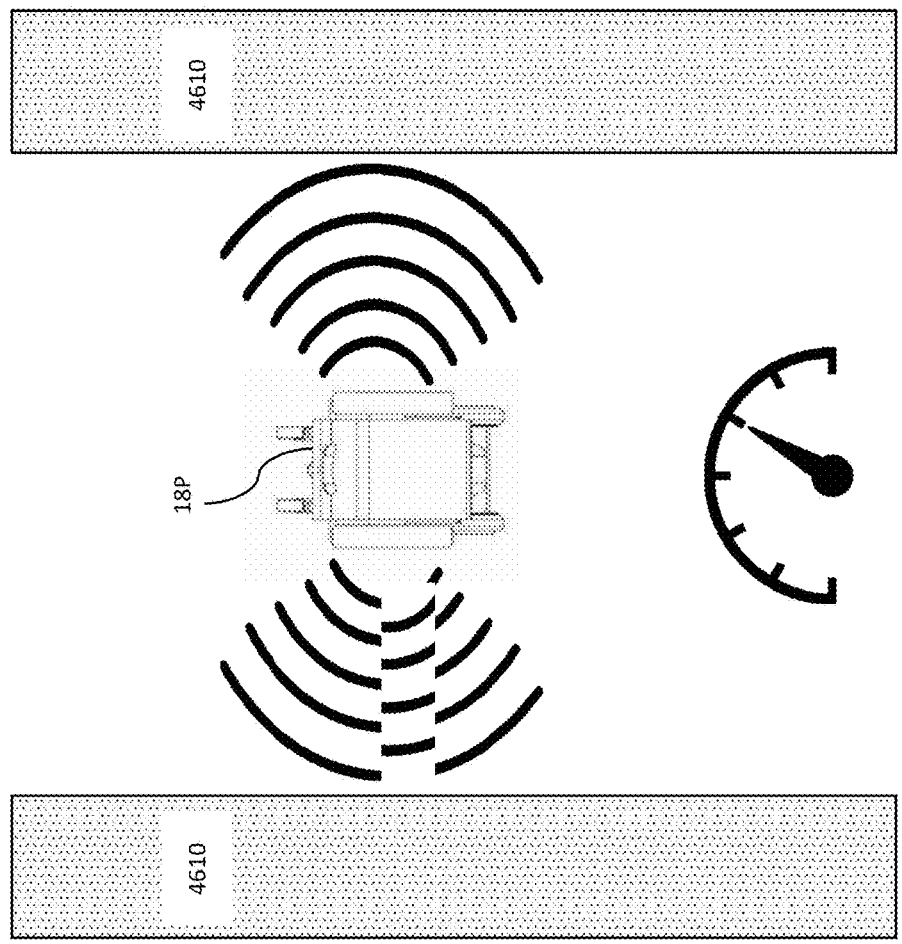
FIG. 46B depicts an S-MMS traveling between two stationary obstacles positioned far from the S-MMS.
Figure 46A:
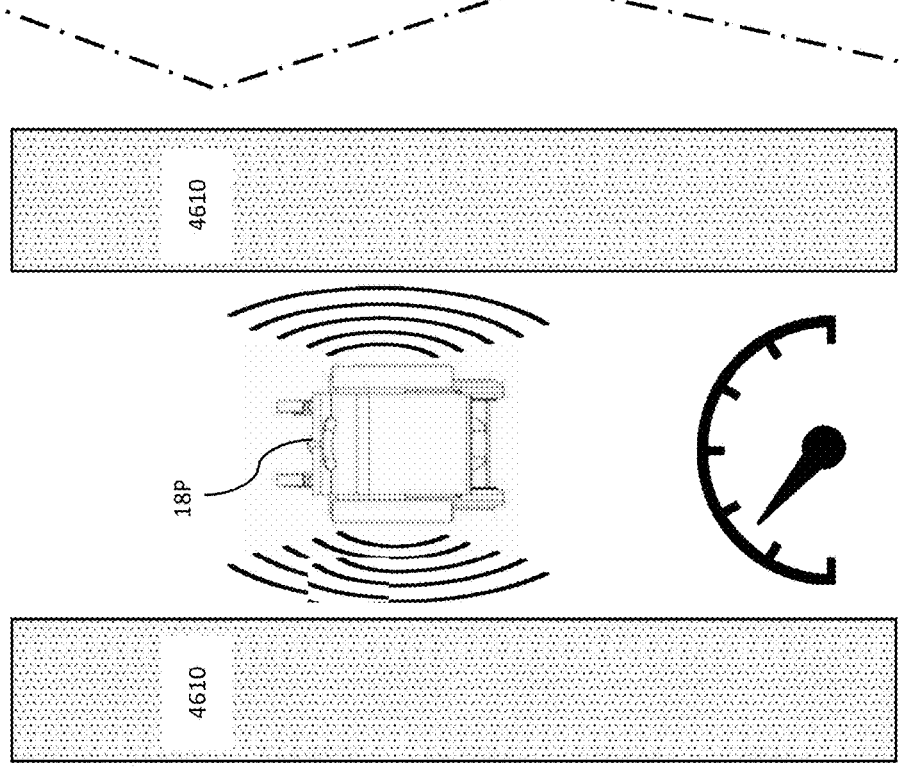
FIG. 46A depicts an S-MMS traveling between two stationary obstacles positioned close to the S-MMS.

FIGS. 46A-B depict an S-MMS 18P traveling between two stationary obstacles 4610. In an embodiment, one or more sensor reports (e.g. 372 FIG. 3) are received by the S-MMS controller 110B via an IAM 370. A collision manager 530 process of the SAC 302B may process the received sensor reports and determine that a collision is not imminent based on proximity (e.g. distance) measurements, and therefore the S-MMS controller 110B does not need to completely stop motion of the S-MMS 18P. In FIG. 46B, the obstacles 4610 may be close enough to the S-MMS 18P that a rules engine on the SAC 302B may determine that the S-MMS controller 110B maximum speed allowable may be limited to ⅘ of the maximum S-MMS 18P speed possible. As one or more obstacles become closer to the S-MMS 18P, the SAC 302B may determine that the S-MMS controller 110B maximum speed allowable may be limited to around ⅙ of the maximum S-MMS 18P speed possible. The allowable speed may be determined by a linear and/or nonlinear interpolation between two predefined distances. Alternatively, a standard PID loop may be established based on one or more target distances to one or more objects proximate to the S-MMS 18P. In this way, the proximity of one or more obstacles to the S-MMS 18P may cause the S-MMS controller 110B to limit one or more S-MMS 18P operations or settings.

Figure 47B:
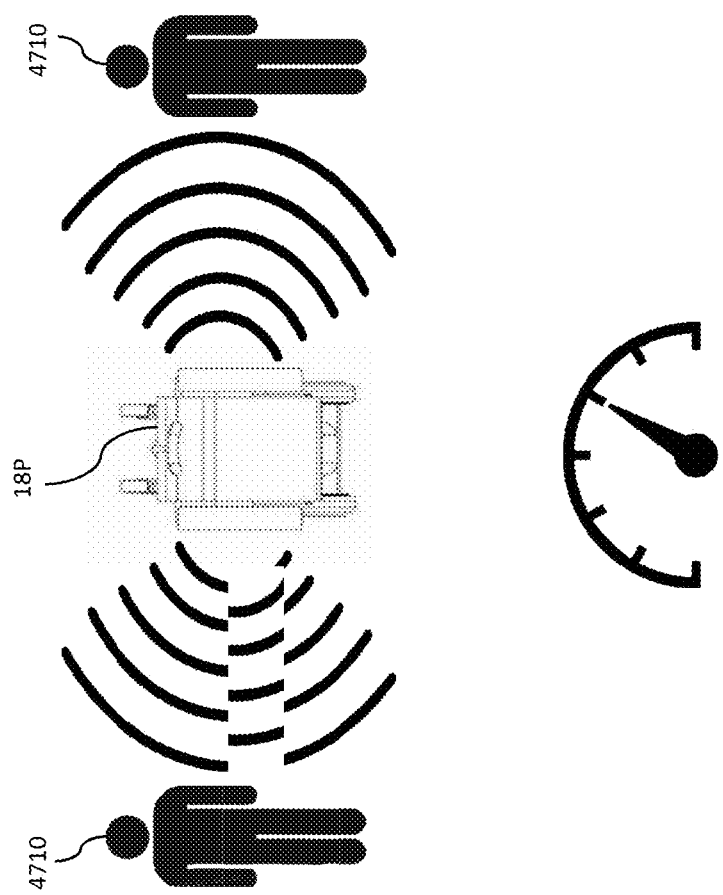
FIG. 47B depicts an S-MMS traveling in far proximity to one or more obstacles in motion.
Figure 47A:
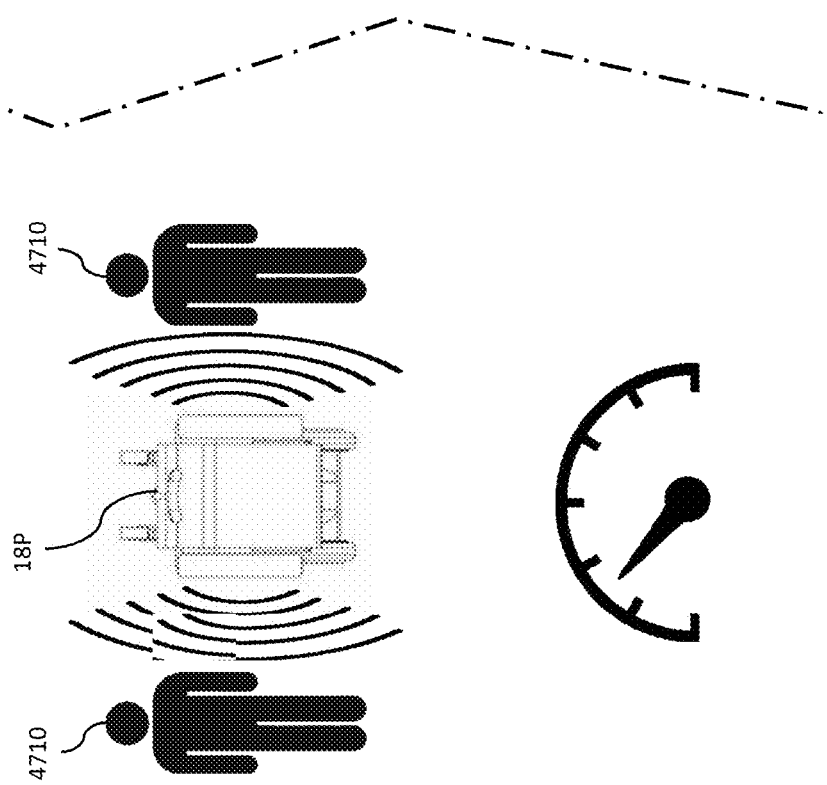
FIG. 47A depicts an S-MMS traveling in close proximity to one or more obstacles in motion.

FIGS. 47A-B depict an S-MMS 18P traveling between obstacles 4710 that may be in motion. In an embodiment, one or more sensor reports (e.g. 372 FIG. 3) are received by the S-MMS controller 110B via an IAM 370. A collision manager 530 process of the SAC 302B may process the received sensor reports and determine that a collision is not imminent based on calculations (e.g. time-of-flight based on the distance, velocity, and accelerations of one or more non-stationary objects 4710 proximate to the S-MMS 18P), and therefore the S-MMS controller 110B does not need to completely stop motion of the S-MMS 18P. In FIG. 47B, the moving objects 4710 may have a calculated threat to the S-MMS 18P such that a rules engine on the SAC 302B may determine that the S-MMS controller 110B maximum speed allowable may be limited to ⅘ of the maximum S-MMS 18P speed possible. As one or more obstacles become closer to the S-MMS 18P, the SAC 302B may determine that the S-MMS controller 110B maximum speed allowable may be limited to around ⅙ of the maximum S-MMS 18P speed possible. In this way, the calculated threat (e.g. time to impact or other numerical indicator) of one or more obstacles to the S-MMS 18P may cause the S-MMS controller 110B to limit one or more S-MMS 18P operations or settings. The allowable speed may be determined by a linear and/or nonlinear interpolation between two predefined values (e.g. to time to impact maximum and minimum time values). Alternatively, a standard PID loop may be established based on one or more target times to impact to one or more objects proximate to the S-MMS 18P.

FIGS. 48A-B depict an S-MMS 18P traveling during the day in bright light (e.g. 48B) and an S-MMS 18P traveling during the evening in dim light (e.g. 48A). In an embodiment, an S-MMS 18P comprises a human machine interface 352 operably configured to provide control instructions, an S-MMS controller 110B configured to receive the control instructions and generate a control signal, wherein the generated control signal causes one or more components of the S-MMS 18P to respond. The response may be preconfigured and include operation of one or more motors or actuators by one or more motor controllers 351. The embodiment further comprises one or more sensors operably configured to generate data related to the environment, wherein the data related to the environment is stored in a first memory 120 connected to the S-MMS controller 110B, wherein the stored data is used to bias the control signal for the S-MMS 18P. When one or more sensor measuring light intensity (e.g. a photo diode) on the S-MMS 18P detects light above a particular, predefined threshold value, the SAC 302B may determine that the S-MMS controller 110B maximum speed allowable may be limited to around ⅘ of the maximum S-MMS 18P speed possible, as illustrated in FIG. 48B. Additionally or alternatively, when one or more sensor measuring light intensity (e.g. a photo diode) on the S-MMS 18P detects light below a particular, predefined threshold value, the SAC 302B may determine that the S-MMS controller 110B maximum speed allowable may be limited to around ⅙ of the maximum S-MMS 18P speed possible, as illustrated in FIG. 48A.

Use of Beacons

In some embodiments, one or more sensors of an S-MMS 18 may be used to determine one or more distances to an object or surface proximate to the S-MMS 18. Additionally or alternatively the S-MMS controller 110B may use one or more proximity-based communications to control one or more operations of an S-MMS 18. In an example, the S-MMS controller 110B of an S-MMS 18 may be configured to receive a proximity-based communication or indicia via CNI 371 as previously disclosed. A proximity-based communication or indicia may include wireless communications, for example using Bluetooth or other communication protocols. In an exemplary embodiment, the S-MMS controller 110B may be configured to bias one or more control signals of the S-MMS 18 based at least in part upon the received indicia. The proximity-based indicia may include one or more commands, data, or codes transmitted from a remote transceiver to the S-MMS controller 110B via CNI 371.

FIG. 49 depicts an S-MMS 18P approaching a Bluetooth beacon 4904. In an embodiment, the Bluetooth beacon 4904 is configured to broadcast data wirelessly 4902. The one or more communication processors 216 (FIG. 2) on the S-MMS 18P may receive the wireless transmission 4902 and pass the received data to the SAC 302B of the S-MMS controller 110B via CNI 371. One or more behaviors of the S-MMS 18P may be modified based on the received wireless data 4902. In an example, the maximum speed of the S-MMS 18P may be limited by the S-MMS controller 110B when the wireless transmission 4902 is received.

To facilitate the understanding of the embodiments described herein, a number of terms are defined below. The terms defined herein have meanings as commonly understood by a person of ordinary skill in the relevant art. Terms such as "a," "an," and "the" are not intended to refer to only a singular entity, but rather include the general class of which a specific example may be used for illustration. The terminology herein is used to describe specific embodiments, but their usage does not delimit the disclosure, except as set forth in the claims.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method, and/or process for physically transferring a signal from one point in a circuit to another. Also, unless indicated otherwise from the context of its use herein, the terms "known," "fixed," "given," "certain", and "predetermined" generally refer to a value, quantity, parameter, constraint, condition, state, process, procedure, method, practice, or combination thereof that is, in theory, variable, but is typically set in advance and not varied thereafter when in use.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding, with or without author input or prompting, whether these features, elements and/or states are included or are to be performed in any particular embodiment.

Communication between various systems and devices is disclosed herein. Communication may occur using wired and/or wireless communication methods and protocols including, but not limited to, cellular, 802.11, Wi-Fi, 802.15, Bluetooth, 802.20, and WiMAX.

Non-Transitory Computer Readable Medium

The various operations of methods described above may be performed by any suitable means capable of performing the operations, such as various hardware and/or software component(s), circuits, and/or module(s).

The various illustrative logical blocks, modules, and circuits described in connection with the present disclosure may be implemented or performed with a hardware processor, a digital signal processor (DSP), an application specific integrated circuit (ASIC), a field programmable gate array signal (FPGA) or other programmable logic device (PLD), discrete gate or transistor logic, discrete hardware components, or combinations thereof designed to perform the functions described herein. A hardware processor may be a microprocessor, commercially available processor, controller, microcontroller, or state machine. A processor may also be implemented as a combination of two computing components, e.g., a combination of a DSP and a microprocessor, a plurality of microprocessors, one or more microprocessors in conjunction with a DSP core, or any other such configuration.

In one or more aspects, the functions described may be implemented in software, firmware, or any combination thereof executing on a hardware processor. If implemented in software, the functions may be stored as one or more executable instructions or code on a non-transitory computer-readable storage medium. A computer-readable storage media may be any available media that can be accessed by a processor. By way of example, and not limitation, such computer-readable storage media can comprise RAM, ROM, EEPROM, CD-ROM or other optical disk storage, magnetic disk storage or other magnetic storage devices, or any other medium that can be used to store executable instructions or other program code or data structures and that can be accessed by a processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims. Processes or steps described in one implementation can be suitably combined with steps of other described implementations.

Certain aspects of the present disclosure may comprise a computer program product for performing the operations presented herein. For example, such a computer program product may comprise a computer readable storage medium having instructions stored (and/or encoded) thereon, the instructions being executable by one or more processors to perform the operations described herein.

Software or instructions may be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a terminal and/or base station can obtain the various methods upon coupling or providing the storage means to the device.

For the sake of convenience, the operations are described as various interconnected functional blocks or distinct software modules. This is not necessary, however, and there may be cases where these functional blocks or modules are equivalently aggregated into a single logic device, program, or operation with unclear boundaries. In any event, the functional blocks and software modules or described features can be implemented by themselves or in combination with other operations in either hardware or software.

Having described and illustrated the principles of the systems, methods, processes, and/or apparatuses disclosed herein in a preferred embodiment thereof, it should be apparent that the systems, methods, processes, and/or apparatuses may be modified in arrangement and detail without departing from such principles. Claim is made to all modifications and variation coming within the spirit and scope of the following claims.

What is claimed is:

1. A system for a motorized mobile chair comprising:
a human machine interface (HMI) to receive one or more user inputs, transmit one or more first control instructions in response to the one or more user inputs, receive one or more second control instructions, and provide haptic feedback through the human machine interface to assist user navigation of the motorized mobile chair in response to the one or more second control instructions;
one or more sensors to generate sensor data about an area proximate to the motorized mobile chair; and
at least one processor to:
receive the one or more first control instructions;
receive the sensor data from the one or more sensors about the area proximate to the motorized mobile chair;
determine one or more states of the motorized mobile chair based on the sensor data;
generate the one or more second control instructions based on the one or more states of the motorized mobile chair, the one or more first control instructions, and a user reaction time; and
transmit the one or more second control instructions to the human machine interface.

2. The system of claim 1, wherein the at least one processor decreases a maximum top speed of the motorized mobile chair when the user reaction time is slow.

3. The system of claim 1, wherein the at least one processor increases a distance at which threats are determined to be relevant when the user reaction time is slow.

4. The system of claim 1, wherein the at least one processor begins scaling speed down when a threat is detected near the motorized mobile chair when the user reaction time is slow.

5. The system of claim 1, wherein the at least one processor evaluates sensor data for a first distance from the motorized mobile chair based on a first user reaction time and evaluates sensor data for a second distance from the motorized mobile chair based on a second user reaction time.

6. The system of claim 1, wherein the at least one processor evaluates sensor data for a distance from the motorized mobile chair beyond a normal distance from the motorized mobile chair when the user reaction time is slow.

7. The system of claim 1, wherein the user reaction time is determined by the at least one processor using other sensor data from one or more other sensors of the motorized mobile chair.

8. The system of claim 1, wherein the user reaction time is stored in memory of the motorized mobile chair and retrieved by the at least one processor from the memory.

9. The system of claim 1, wherein:
the one or more states of the motorized mobile chair comprise a possible collision zone; and
the at least one processor determines the possible collision zone based on the one or more first control instructions, the sensor data, angular velocity of the motorized mobile chair, and the user reaction time.

10. The system of claim 1, wherein:
the one or more states of the motorized mobile chair comprise a possible collision zone; and
the at least one processor determines the possible collision zone based on the one or more first control instructions, the sensor data, linear velocity of the motorized mobile chair, and the user reaction time.

11. The system of claim 1, wherein:
the one or more states of the motorized mobile chair comprise a possible collision zone; and
the at least one processor determines the possible collision zone based on the one or more first control instructions, the sensor data, angular velocity of the motorized mobile chair, the user reaction time, and a distance the motorized mobile chair coasts after a stop is initiated by the motorized motor chair.

12. The system of claim 1, wherein:
the one or more states of the motorized mobile chair comprise a possible collision zone; and
the at least one processor determines the possible collision zone based on the one or more first control instructions, the sensor data, linear velocity of the motorized mobile chair, the user reaction time, and a distance the motorized mobile chair coasts after a stop is initiated by the motorized motor chair.

13. The system of claim 1, wherein the at least one processor:
determines the one or more states of the motorized mobile chair based on the sensor data, and the user reaction time; and
generates the one or more second control instructions based on the one or more first control instructions and the one or more states of the motorized mobile chair.

14. The system of claim 1, wherein the at least one processor:
determines the one or more states of the motorized mobile chair based on the sensor data;
determines a level of feedback for a user based on the one or more states and the user reaction time; and generates the one or more second control instructions based on the one or more first control instructions, the one or more states of the motorized mobile chair and the level of feedback for the user.

15. The system of claim 1, wherein:
the sensor data about the area proximate to the motorized mobile chair comprises sensor data about an object; and
the at least one processor determines the one or more states of the motorized mobile chair to be a time to impact by the motorized mobile chair of the object based on at least the sensor data about the object and the user reaction time.

16. The system of claim 1, wherein the one or more states comprises one or more of an unstable state of the motorized mobile chair and an impending collision state of the motorized mobile chair.

17. The system of claim 1, wherein:
the one or more user inputs comprise at least one first navigation operation of the motorized mobile chair;
the sensor data about the area proximate to the motorized mobile chair is indicative of a threat to the motorized mobile chair if the at least one first navigation operation would be performed by the motorized mobile chair; and
the at least one processor generates the one or more second control instructions to cause the haptic feedback of the human machine interface to notify a user of the motorized mobile chair of the threat.

18. The system of claim 17, wherein the threat comprises an object in a direction of travel of the first navigation operation.

19. The system of claim 1, wherein:
the one or more user inputs comprise at least one first navigation operation of the motorized mobile chair; and
the at least one processor:
determines, based on the sensor data, there is a threat to the motorized mobile chair if the at least one navigation operation would be performed by the motorized mobile chair; and
causes the motorized mobile chair to operate according to at least one second navigation operation to avoid the threat.

20. The system of claim 1, wherein:
the one or more user inputs comprise at least one first navigation operation of the motorized mobile chair; and
the at least one processor:
determines, based on the sensor data, there is a threat to the motorized mobile chair if the at least one navigation operation would be performed by the motorized mobile chair;
generates a third control instruction comprising at least one second navigation operation of the motorized mobile chair to avoid the threat; and
transmits the at least one third control instruction for reception by another processor of the motorized mobile chair to cause the motorized mobile chair to operate according to the second navigation operation.

21. The system of claim 1, wherein the haptic feedback comprises at least one of:
blocking movement of the human machine interface in one or more directions when an unsafe condition is detected in the one or more directions;
progressively increasing resistance to motion of the human machine interface in a first direction as the motorized mobile chair nears an unsafe condition in the first direction;
progressively increasing force feedback to motion of the human machine interface in a second direction as the motorized mobile chair nears an unsafe condition in the second direction;
selectively reducing resistance of the human machine interface in one or more directions determined by the at least one processor to be most safe;
selectively reducing force feedback of the human machine interface in one or more directions determined by the at least one processor to be most safe; and
selectively limiting movement of the human machine interface by a selected percentage based on a threat proximate to the motorized mobile chair.

22. The system of claim 1, wherein the human machine interface comprises a joystick.

23. The system of claim 1, wherein the one or more sensors comprise a plurality of sensors.

24. The system of claim 1, wherein the at least one processor comprises a plurality of processors.

25. The system of claim 1, wherein the one or more sensors each comprise a device that detects or measures a physical property and at least one of records, indicates, and transmits data of the detected or measured physical property.

26. The system of claim 1, wherein one or more sensors each comprise at least one of one or more LIDAR sensors, one or more RADAR sensors, one or more ultrasonic sensors, one or more infrared sensors, one or more image capturing sensors, one or more video cameras, one or more cameras capable of distance detection, one or more optical sensors, one or more acoustic sensors, and one or more magnetic sensors.

27. The system of claim 1, wherein:
the sensor data about the area proximate to the motorized mobile chair comprises sensor data about an object; and
the object comprises at least one of a wall, a person, an object, an environmental element, a plane, a surface, a ground profile, a drop along a path of travel, a rise along the path of travel, and an obstacle.

28. A system for a motorized mobile chair comprising:
a human machine interface (HMI) to receive one or more user inputs, transmit one or more first control instructions in response to the one or more user inputs, receive one or more second control instructions, and provide haptic feedback by the human machine interface to assist user navigation of the motorized mobile chair in response to the one or more second control instructions;
one or more sensors to generate sensor data about one or more objects proximate to the motorized mobile chair; and
at least one processor to:
receive the one or more first control instructions;
receive the sensor data from the one or more sensors about the one or more obstacles proximate to the motorized mobile chair;
determine one or more states of the motorized mobile chair based on the sensor data;
generate the one or more second control instructions based on the one or more states of the motorized mobile chair, the one or more first control instructions, and a user reaction time; and
transmit the one or more second control instructions to the human machine interface.

29. The system of claim 28, wherein the one or more obstacles each comprise at least one of a wall, a person, an object, an environmental element, a plane, a surface, a ground profile, a drop along a path of travel, and a rise along the path of travel.

30. A method for a motorized mobile chair comprising:
generating sensor data from one or more sensors about an area proximate to the motorized mobile chair;
receiving one or more user inputs at a human machine interface (HMI) and transmitting one or more first control instructions from the human machine interface in response to the one or more user inputs;
receiving the one or more first control instructions at at least one processor;
receiving the sensor data from the one or more sensors about the area proximate to the motorized mobile chair at the at least one processor;
determining, by the at least one processor, one or more states of the motorized mobile chair based on the sensor data;
generating, by the at least one processor, one or more second control instructions based on the one or more states of the motorized mobile chair, the one or more first control instructions, and a user reaction time;
transmitting the one or more second control instructions to the human machine interface;
receiving the one or more second control instructions at the human machine interface; and
providing haptic feedback through the human machine interface to assist user navigation of the motorized mobile chair in response to the one or more second control instructions.

31. The method of claim 30, wherein the at least one processor decreases a maximum top speed of the motorized mobile chair when the user reaction time is slow.

32. The method of claim 30, wherein the at least one processor increases a distance that threats are considered relevant when the user reaction time is slow.

33. The method of claim 30, wherein the at least one processor begins scaling speed down when a threat is detected near the motorized mobile chair when the user reaction time is slow.

34. The method of claim 30, wherein the at least one processor evaluates sensor data for a first distance from the motorized mobile chair based on a first user reaction time and evaluates sensor data for a second distance from the motorized mobile chair based on a second user reaction time.

35. The method of claim 30, wherein the at least one processor evaluates sensor data for a distance from the motorized mobile chair beyond a normal distance from the motorized mobile chair when the user reaction time is slow.

36. The method of claim 30, wherein the user reaction time is determined by the at least one processor using other sensor data from one or more other sensors of the motorized mobile chair.

37. The method of claim 30, wherein the user reaction time is stored in memory of the motorized mobile chair and retrieved by the at least one processor from the memory.

38. The method of claim 30, wherein:
the one or more states of the motorized mobile chair comprise a possible collision zone; and
the at least one processor determines the possible collision zone based on the one or more first control instructions, the sensor data, angular velocity of the motorized mobile chair, and the user reaction time.

39. The method of claim 30, wherein:
the one or more states of the motorized mobile chair comprise a possible collision zone; and
the at least one processor determines the possible collision zone based on the one or more first control instructions, the sensor data, linear velocity of the motorized mobile chair, and the user reaction time.

40. The method of claim 30, wherein:
the one or more states of the motorized mobile chair comprise a possible collision zone; and
the at least one processor determines the possible collision zone based on the one or more first control instructions, the sensor data, angular velocity of the motorized mobile chair, the user reaction time, and a distance the motorized mobile chair coasts after a stop is initiated by the motorized motor chair.

41. The method of claim 30, wherein:
the one or more states of the motorized mobile chair comprise a possible collision zone; and
the at least one processor determines the possible collision zone based on the one or more first control instructions, the sensor data, linear velocity of the motorized mobile chair, the user reaction time, and a distance the motorized mobile chair coasts after a stop is initiated by the motorized motor chair.

42. The method of claim 30, wherein the at least one processor:
determines the one or more states of the motorized mobile chair based on the sensor data, and the user reaction time; and
generates the one or more second control instructions based on the one or more first control instructions and the one or more states of the motorized mobile chair.

43. The method of claim 30, wherein the at least one processor:
determines the one or more states of the motorized mobile chair based on the sensor data;
determines a level of feedback for a user based on the one or more states and the user reaction time; and
generates the one or more second control instructions based on the one or more first control instructions, the one or more states of the motorized mobile chair and the level of feedback for the user.

44. The method of claim 30, wherein:
the sensor data about the area proximate to the motorized mobile chair comprises sensor data about an object; and
the at least one processor determines the one or more states of the motorized mobile chair to be a time to impact by the motorized mobile chair of the object based on at least the sensor data about the object and the user reaction time.

45. The method of claim 30, wherein the one or more states comprises one or more of an unstable state of the motorized mobile chair and an impending collision state of the motorized mobile chair.

46. The method of claim 30, wherein:
the one or more user inputs comprise at least one first navigation operation of the motorized mobile chair;
the sensor data about the area proximate to the motorized mobile chair is indicative of a threat to the motorized mobile chair if the at least one first navigation operation would be performed by the motorized mobile chair; and
the at least one processor generates the one or more second control instructions to cause the haptic feedback of the human machine interface to notify a user of the motorized mobile chair of the threat.

47. The method of claim 46, wherein the threat comprises an object in a direction of travel of the first navigation operation.

48. The method of claim 30, wherein:
the one or more user inputs comprise at least one first navigation operation of the motorized mobile chair; and the at least one processor:
   determines, based on the sensor data, there is a threat to the motorized mobile chair if the at least one navigation operation would be performed by the motorized mobile chair; and
   causes the motorized mobile chair to operate according to at least one second navigation operation to avoid the threat.

49. The method of claim 30, wherein:
the one or more user inputs comprise at least one first navigation operation of the motorized mobile chair; and
the at least one processor:
   determines, based on the sensor data, there is a threat to the motorized mobile chair if the at least one navigation operation would be performed by the motorized mobile chair;
   generates at least one third control instruction comprising at least one second navigation operation of the motorized mobile chair to avoid the threat; and
   transmits the at least one third control instruction for reception by another processor of the motorized mobile chair to cause the motorized mobile chair to operate according to the second navigation operation.

50. The method of claim 30, wherein the haptic feedback is selected as at least one of:
   blocking movement of the human machine interface in one or more directions when an unsafe condition is detected in the one or more directions;
   progressively increasing resistance to motion of the human machine interface in a first direction as the motorized mobile chair nears an unsafe condition in the first direction;
   progressively increasing force feedback to motion of the human machine interface in a second direction as the motorized mobile chair nears an unsafe condition in the second direction;
   selectively reducing resistance of the human machine interface in one or more directions determined by the at least one processor to be most safe;
   selectively reducing force feedback of the human machine interface in one or more directions determined by the at least one processor to be most safe; and
   selectively limiting movement of the human machine interface by a selected percentage based on a threat proximate to the motorized mobile chair.

51. The method of claim 30, wherein the human machine interface is selected as a joystick.

52. The method of claim 30, wherein the one or more sensors are selected as a plurality of sensors.

53. The method of claim 30, wherein the at least one processor is selected as a plurality of processors.

54. The method of claim 30, wherein the one or more sensors each are selected as a device that detects or measures a physical property and at least one of records, indicates, and transmits data of the detected or measured physical property.

55. The method of claim 30, wherein one or more sensors each are selected as at least one of one or more LIDAR sensors, one or more RADAR sensors, one or more ultrasonic sensors, one or more infrared sensors, one or more image capturing sensors, one or more video cameras, one or more cameras capable of distance detection, one or more optical sensors, one or more acoustic sensors, and one or more magnetic sensors.

56. The method of claim 30, wherein:
the sensor data about the area proximate to the motorized mobile chair comprises sensor data about an object; and
the object comprises at least one of a wall, a person, an object, an environmental element, a plane, a surface, a ground profile, a drop along a path of travel, a rise along the path of travel, and an obstacle.

57. A method for a motorized mobile chair comprising:
generating sensor data from one or more sensors about one or obstacles proximate to the motorized mobile chair;
receiving one or more user inputs at a human machine interface (HMI) and transmitting one or more first control instructions from the human machine interface in response to the one or more user inputs;
receiving the one or more first control instructions at at least one processor;
receiving the sensor data from the one or more sensors about the one or more obstacles proximate to the motorized mobile chair at the at least one processor;
determining, by the at least one processor, one or more states of the motorized mobile chair based on the sensor data;
generating, by the at least one processor, one or more second control instructions based on the one or more states of the motorized mobile chair, the one or more first control instructions, and a user reaction time;
transmitting the one or more second control instructions to the human machine interface;
receiving the one or more second control instructions at the human machine interface; and
providing haptic feedback through the human machine interface to assist user navigation of the motorized mobile chair in response to the one or more second control instructions.

58. The system of claim 57, wherein the one or more obstacles each comprise at least one of a wall, a person, an object, an environmental element, a plane, a surface, a ground profile, a drop along a path of travel, and a rise along the path of travel.

* * * * *